(12) United States Patent
Sonneland et al.

(10) Patent No.: US 6,950,786 B1
(45) Date of Patent: Sep. 27, 2005

(54) METHOD AND APPARATUS FOR GENERATING A CROSS PLOT IN ATTRIBUTE SPACE FROM A PLURALITY OF ATTRIBUTE DATA SETS AND GENERATING A CLASS DATA SET FROM THE CROSS PLOT

(75) Inventors: Lars Sonneland, Tananger (NO); Thomas Gehrmann, Hundvåg (NO)

(73) Assignee: Schlumberger Technology Corporation, Houston, TX (US)

( * ) Notice: Subject to any disclaimer, the term of this patent is extended or adjusted under 35 U.S.C. 154(b) by 755 days.

(21) Appl. No.: 09/685,494

(22) Filed: Oct. 10, 2000

(51) Int. Cl.[7] .............................................. G06F 17/10
(52) U.S. Cl. ............................................. 703/2; 702/16
(58) Field of Search ............................ 703/2; 702/16, 702/14, 15; 367/73

(56) References Cited

U.S. PATENT DOCUMENTS

| | | | |
|---|---|---|---|
| 4,964,096 A | 10/1990 | Ruckgaber | |
| 5,440,525 A | 8/1995 | Dey-Sarkar et al. | |
| 5,598,377 A | 1/1997 | Fishburn et al. | |
| 6,226,596 B1 * | 5/2001 | Gao | 702/16 |
| 6,272,444 B1 * | 8/2001 | Thevoux-Chabuel et al. | 702/179 |
| 6,278,949 B1 * | 8/2001 | Alam | 702/16 |

OTHER PUBLICATIONS

"Seismic–guided estimation of log properties, part 1: a data–driven interpretation methodology", The Leading Edge, May 1994.

"Seismic–guided estimation of log properties, part 2: using artificial neural networks for nonlinear attribute calibration" The Leading Edge, Jun. 1994.

"Seismic–guided estimation of log properties, part 3: A controlled study" The Leading Edge, Jul. 1994.

"Multiattribute seismic analysis" The Leading Edge, Oct. 1997.

* cited by examiner

*Primary Examiner*—Albert W. Paladini
(74) *Attorney, Agent, or Firm*—John Bouchard; Danita Maseles

(57) ABSTRACT

A workstation stores a novel seismic classification software package (known as the "Seisclass software"). During execution of the Seisclass software by a processor of the workstation, the workstation processor will present a plurality of attribute data, describing the characteristics of a geological feature, simultaneously as "attribute data sets" and as "points in attribute space". Characteristic groupings and attribute dependencies can be detected, either automatically or with manual support using a-priori knowledge. Clusters, groups of data sharing particular characteristics, are classified, either automatically or with manual support. The classification result is presented as a "class data set" allowing the association of the attribute characteristics with data set positions. The type of attributes and their dependencies may allow a classification of a geological feature, such as a sub-surface, with respect to its reservoir properties, such reservoir properties including, for example, the possible existence of underground hydrocarbon deposits in an earth formation.

28 Claims, 64 Drawing Sheets

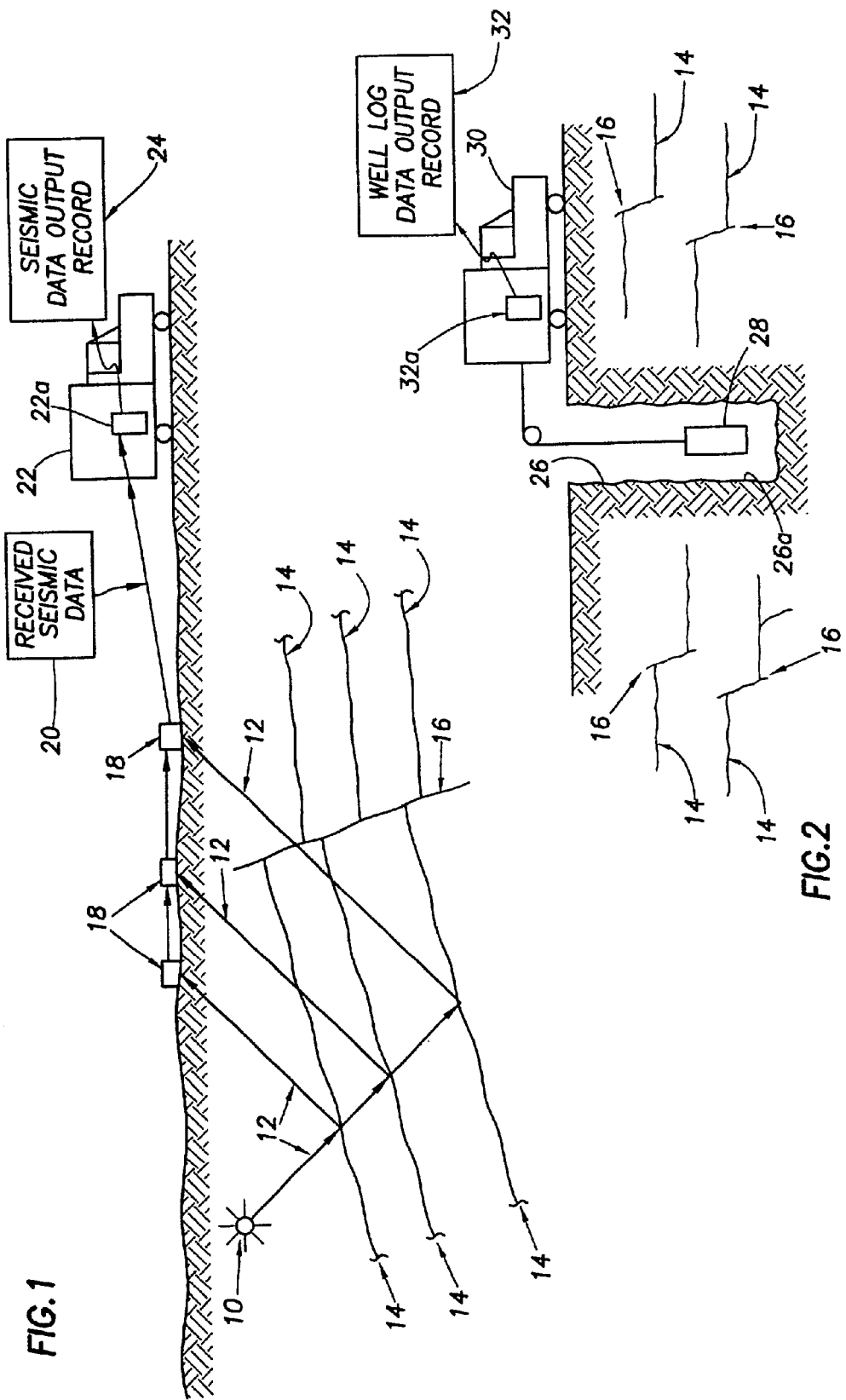

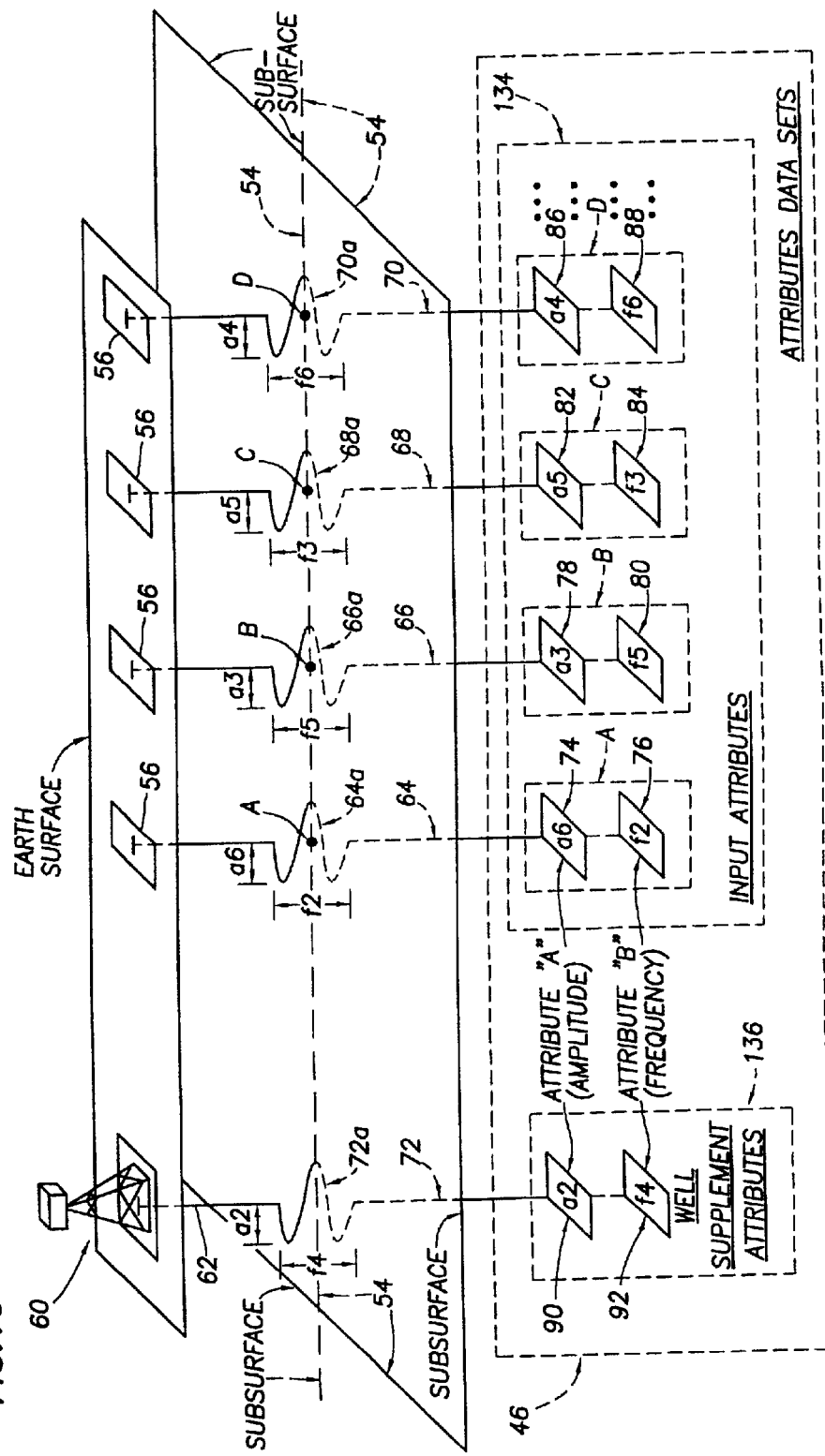

$$FIG.11 \begin{cases} A(X_1,Y_1) & E(X_5,Y_1) \\ B(X_2,Y_2) & F(X_6,Y_2) \\ C(X_3,Y_1) & G(X_7,Y_1) \\ D(X_4,Y_2) & G(X_8,Y_2) \end{cases}$$

FIG.12

ATTRIBUTE DATA SET — 54

ATTRIBUTE DATA SETS — 46
ATTRIBUTE DATA SET — 54a

B(a3)  D(a4)  F(a4)  H(a2)
A(a6)  C(a5)  E(a3)  G(a7)

B(f5)  D(f6)  F(f5)  H(f3)
A(f2)  C(f3)  E(f1)  G(f4)

54b — ATTRIBUTE MAP

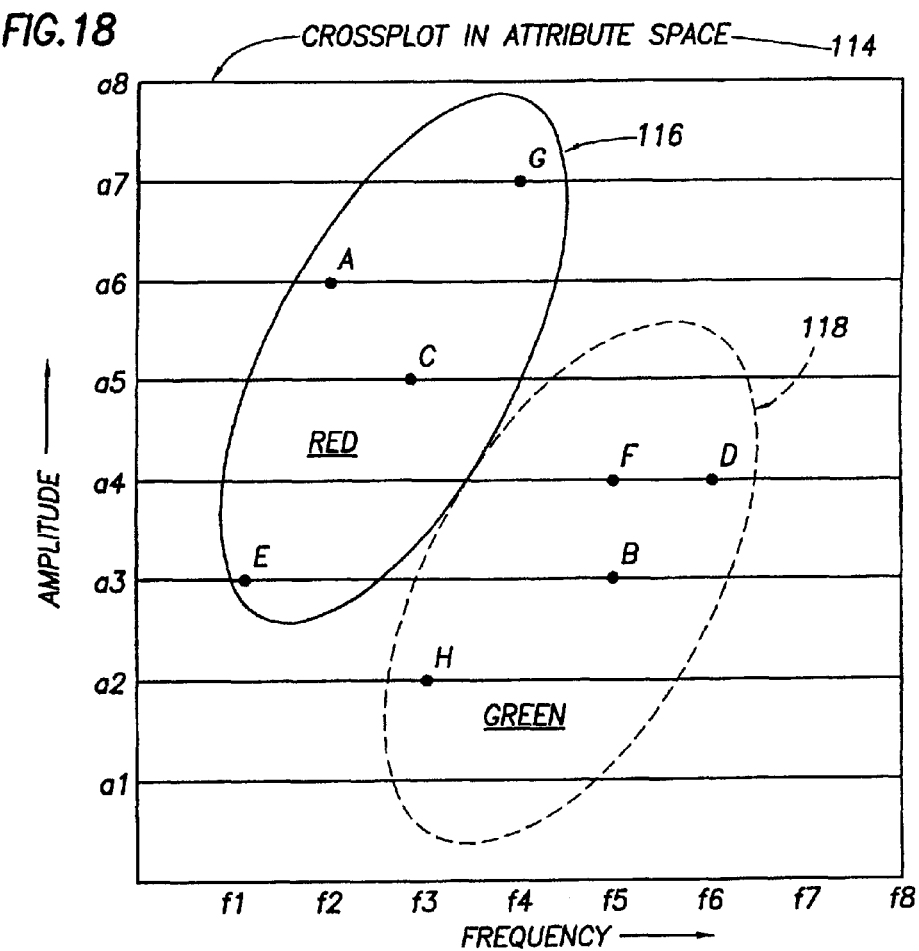

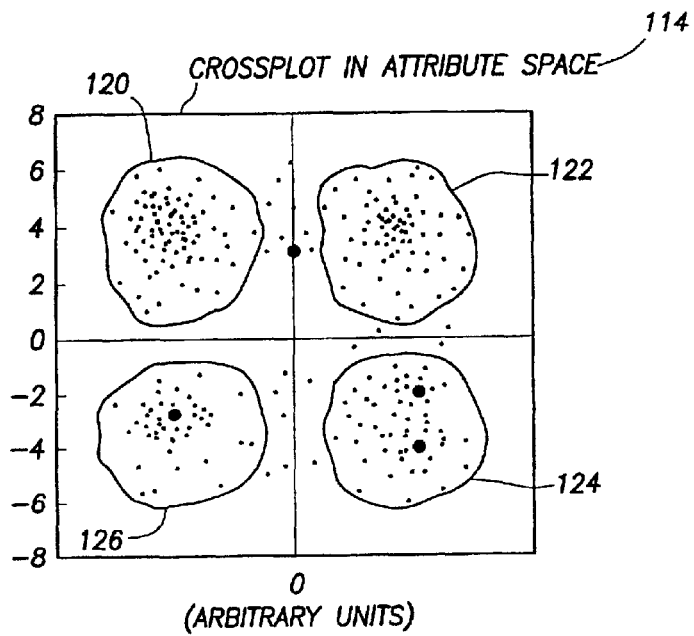
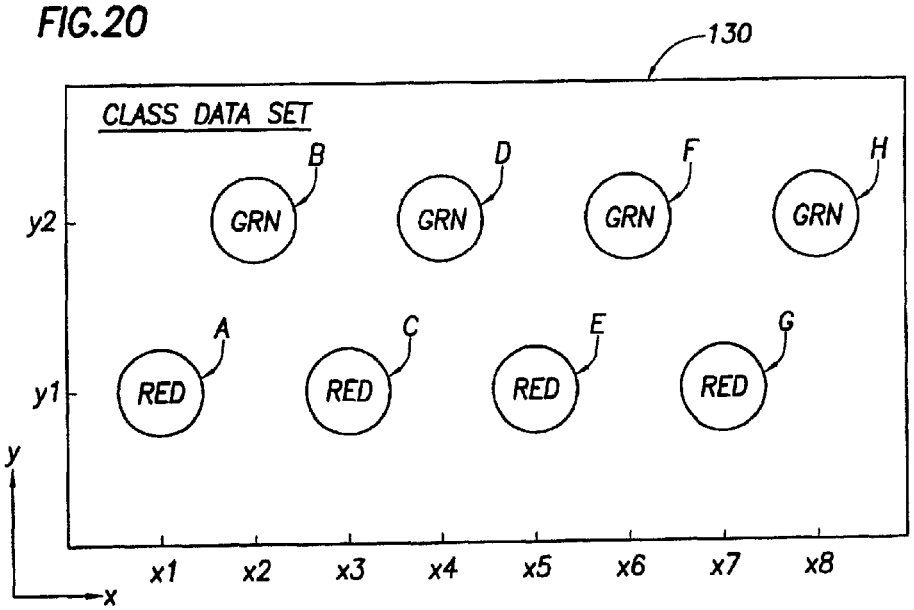

FIG.34

| TRAINING DATA | |
|---|---|
| BOREHOLE | POSITION |
| (A1,B1) | (a1,b1)<br>(a2,b2)<br>(a3,b3)<br>(a4,b4)<br>(a5,b5)<br>(a6,b6)<br>(a7,b7)<br>(a8,b8)<br>(a9,b9)<br>(a10,b10)<br>(a11,b11)<br>(a12,b12) |

FIG.35
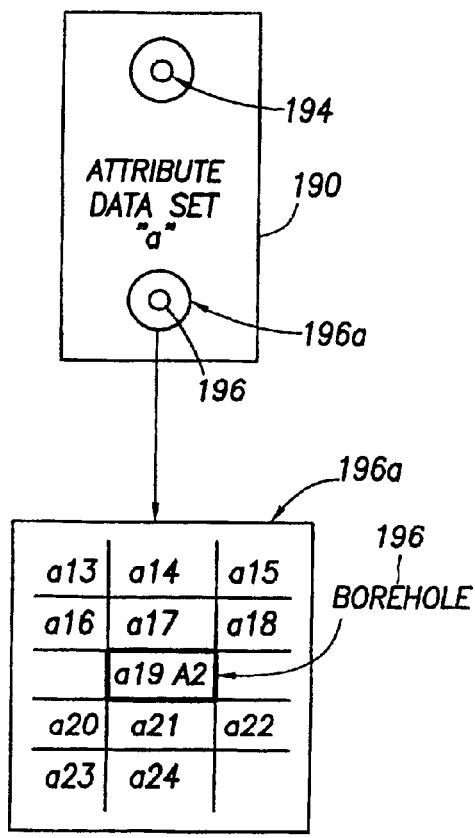
FIG.36
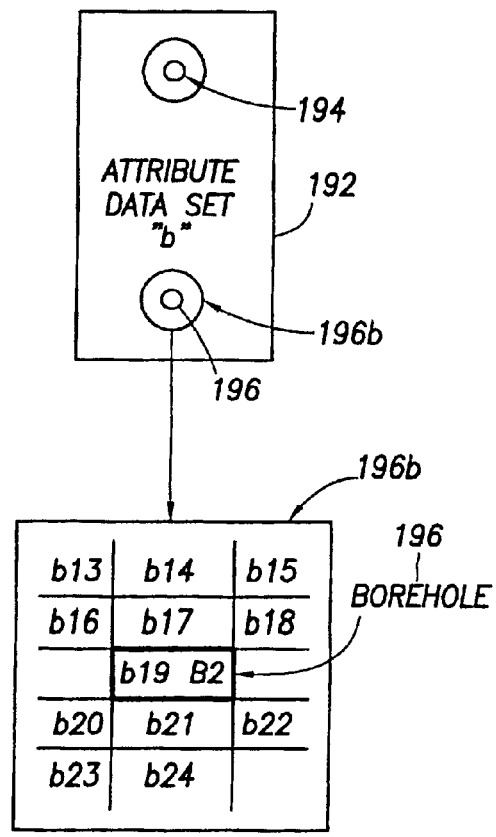
| VALIDATION DATA | |
|---|---|
| BOREHOLE | POSITION |
| (A2,B2) | (a13,b13)<br>(a14,b14)<br>(a15,b15)<br>(a16,b16)<br>(a17,b17)<br>(a18,b18)<br>(a19,b19)<br>(a20,b20)<br>(a21,b21)<br>(a22,b22)<br>(a23,b23)<br>(a24,b24) |
FIG.37

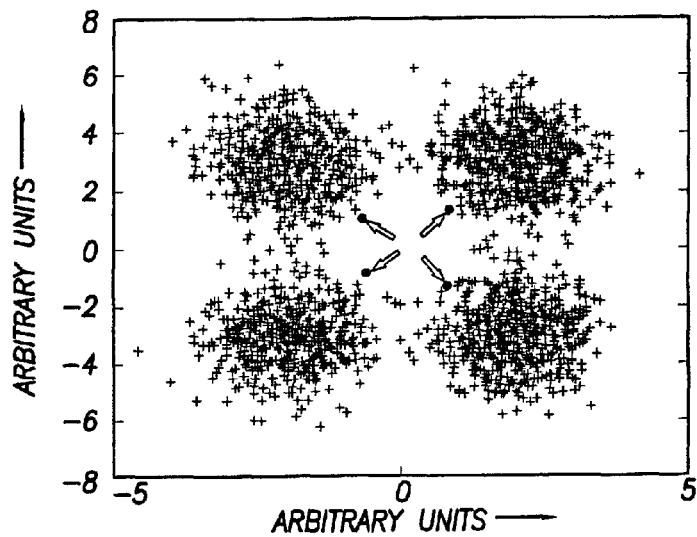
FIG.53a
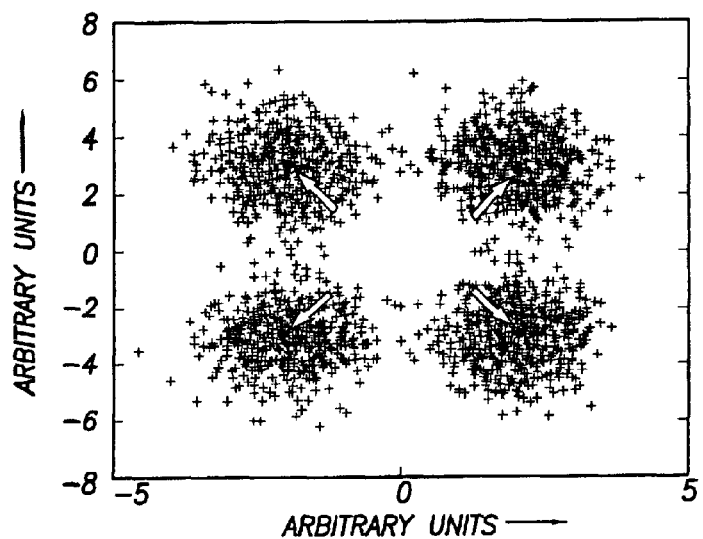
FIG.53b
FIG.55
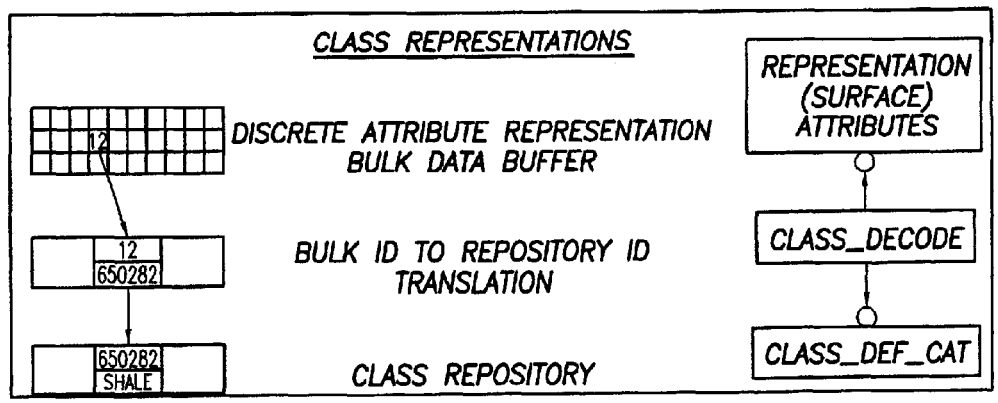

FIG.56
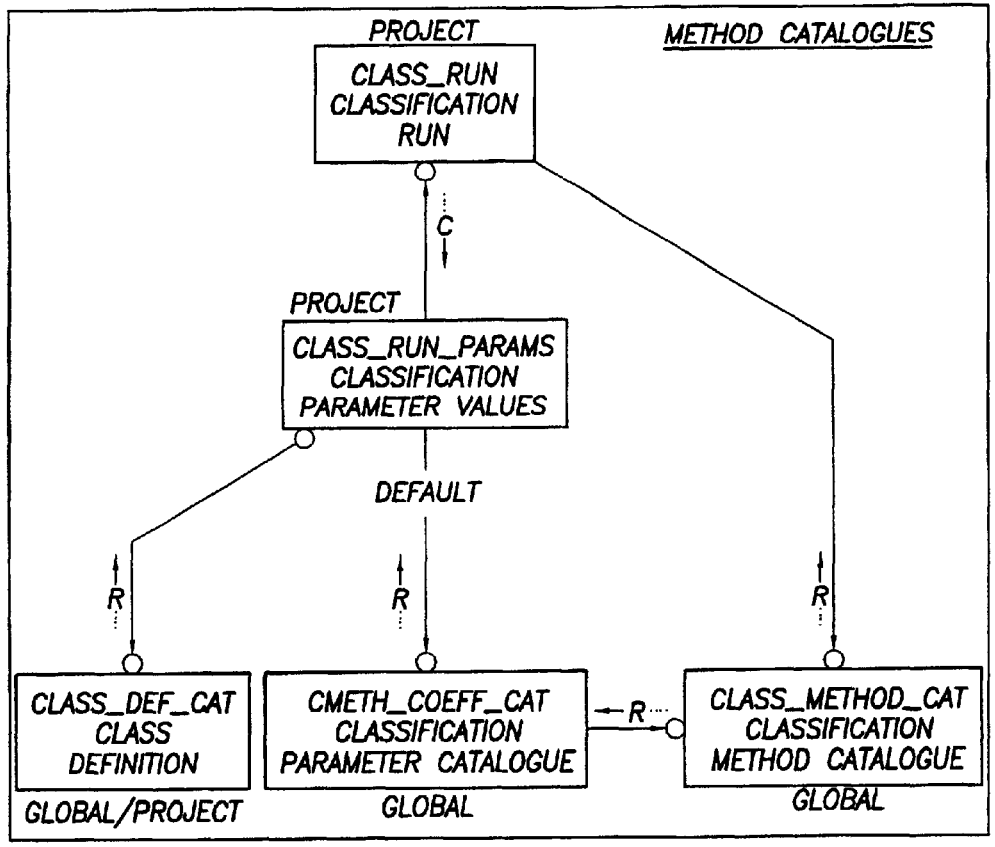
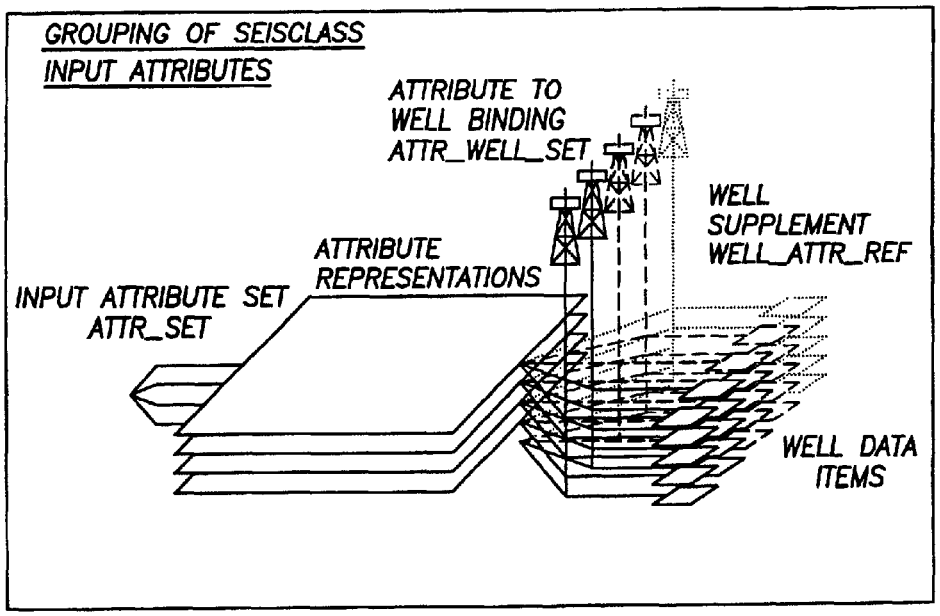
FIG.57

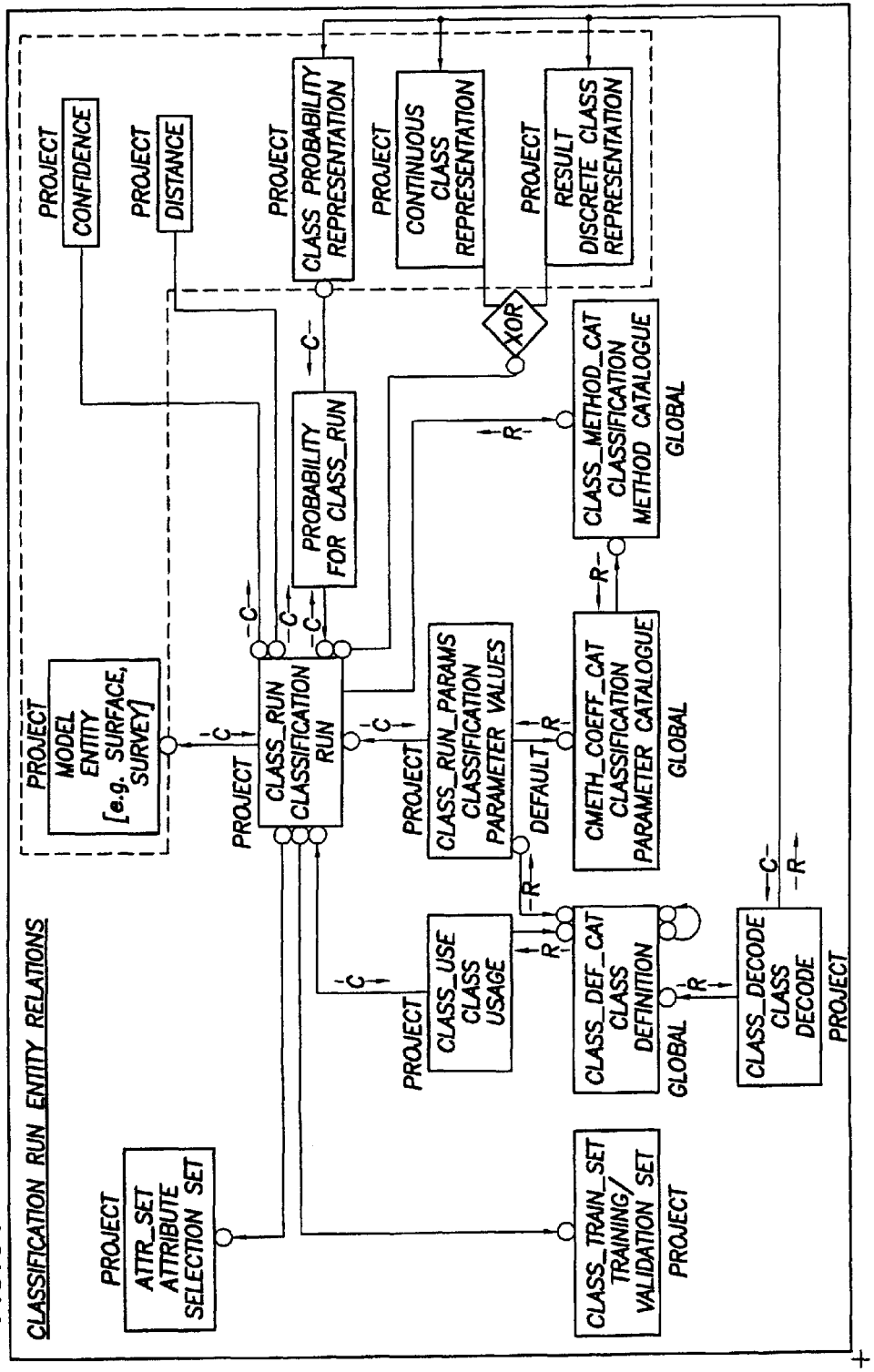

FIG.74

```
             ATTRIBUTE SELECTION
   ┌Attribute Selection─────────────────────────┐
   │ Domain  │Surface Attributes, Grid Representation│
   │ Reference │Horizon_U5 1 AA TimeInterpretation  │▼│
   │ Attribute Types        Attribute Representations│
   │ AcousticImpedanceContrast   CD; IntervalVelocity│
   │ AcousticSlowness            CF; IntervalVelocity│
   │ Amplitude                   CX; IntervalVelocity│
   │ Porosity                                        │
   │ IntervalVelocity                                │
   │                                                 │
   │ [Add Attribute] [Remove Attribute] [Remove all Attributes]│
   └─────────────────────────────────────────────┘
```

FIG.75

```
              ATTRIBUTES IN SET
   ┌Attributes in Set────────────────────────────┐
   │ CD; IntervalVelocity                         │
   │ CF; InstantaneousAmplitude                   │
   │ BY; ImpedanceContrast                        │
   │ BX; ReflectionHeterogenity                   │
   │                                              │
   │ Well Supplement [None/Done/To be reviewed] [Select...]│
   └──────────────────────────────────────────────┘
```

FIG.76

```
         NEW ATTRIBUTE SET DIALOGUE
      ┌─┤    New Attribute Set           │
      │ ┌New Attribute Set──────────────┐│
      │ │ Name      │Alternative 2│     ││
      │ │ Remarks   │20 VRS Attributes│ ││
      │ │ Domain    │Horizontal, Grids│ ││
      │ │ Reference │Horizon_U5 1 AA│▼│ ││
      │ │    □ Copy from current Context││
      │ └───────────────────────────────┘│
      │     [OK]  [Cancel]   [Help]      │
      └──────────────────────────────────┘
```

FIG.77
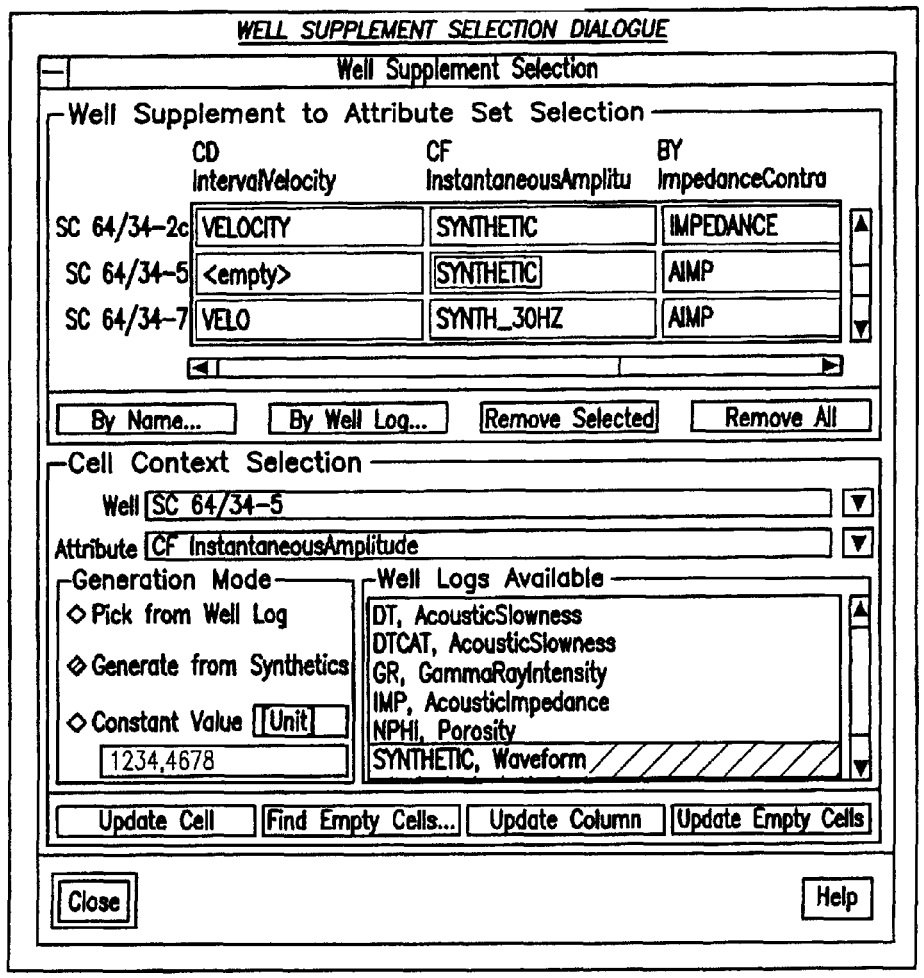
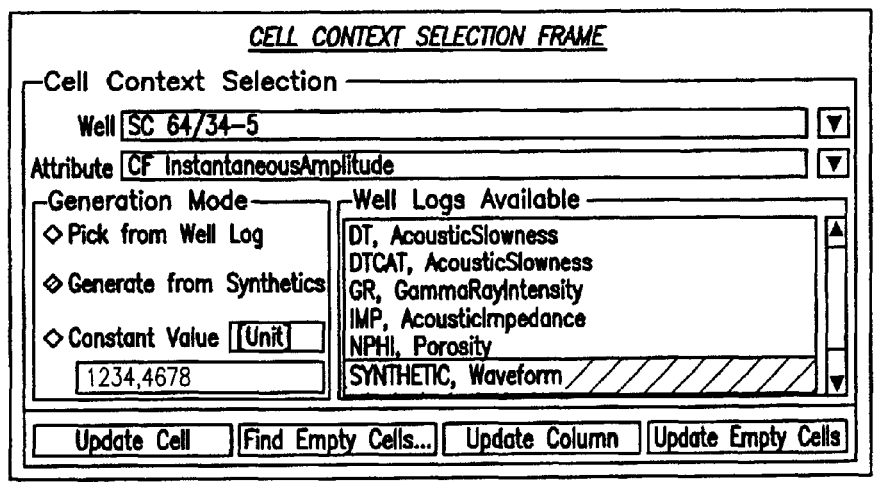
FIG.79

FIG.95
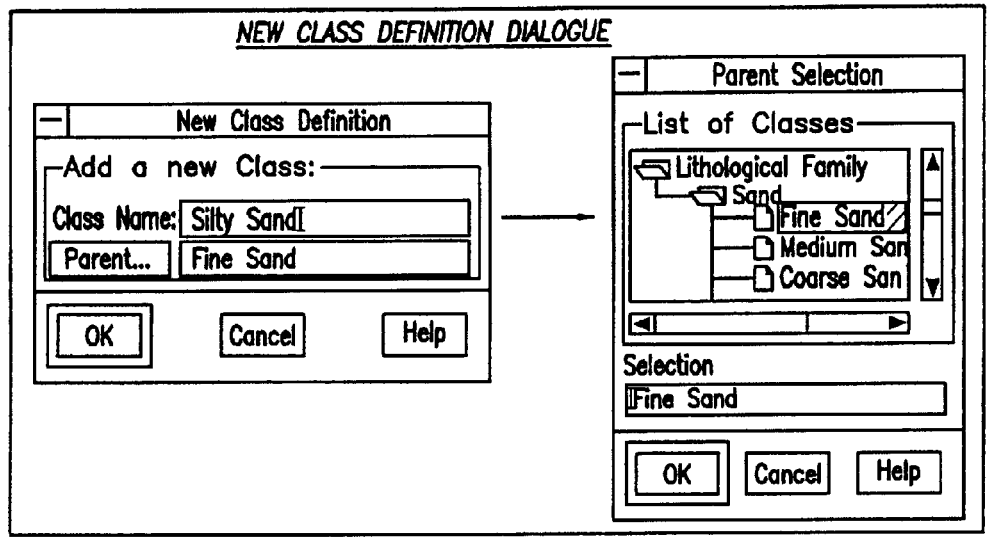
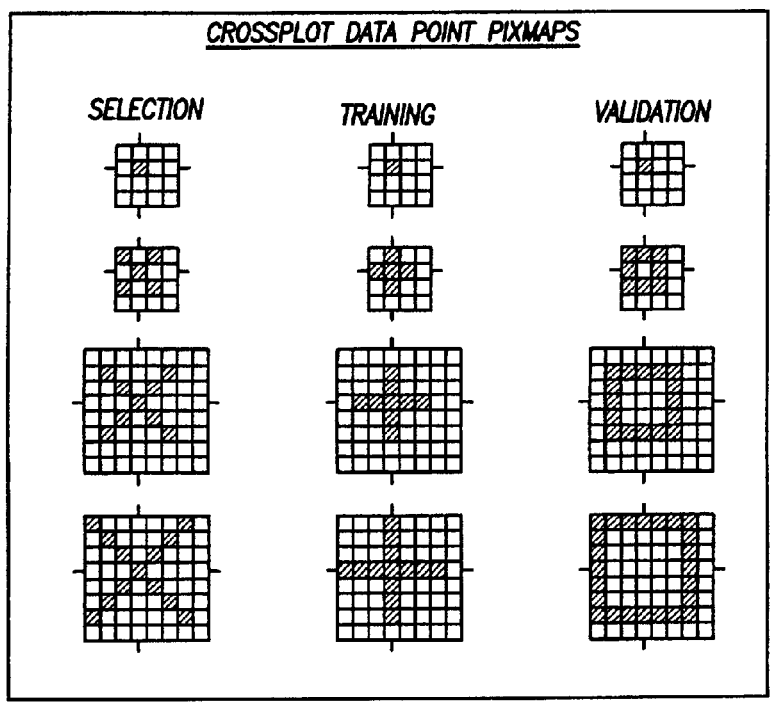
FIG.97

FIG.102
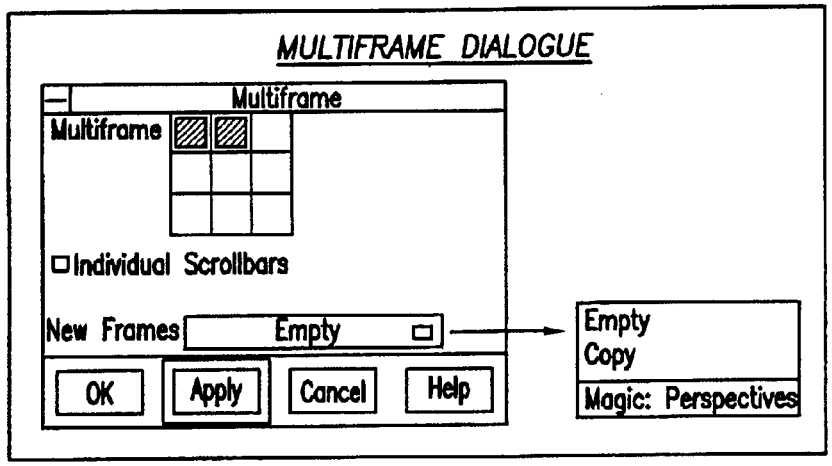
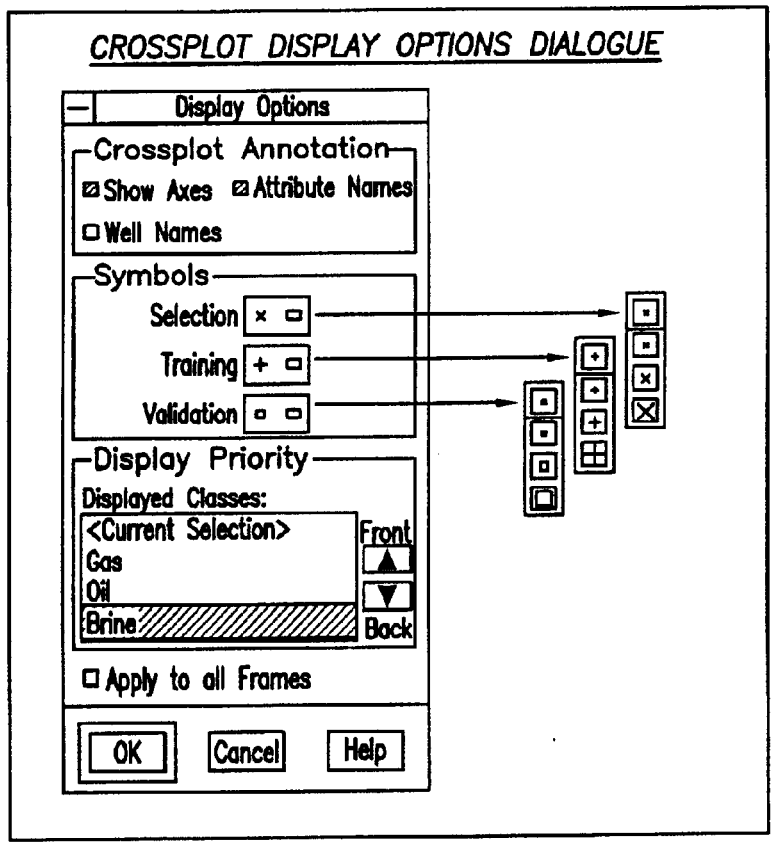
FIG.103

METHOD AND APPARATUS FOR GENERATING A CROSS PLOT IN ATTRIBUTE SPACE FROM A PLURALITY OF ATTRIBUTE DATA SETS AND GENERATING A CLASS DATA SET FROM THE CROSS PLOT

BACKGROUND OF THE INVENTION

This invention relates to the field of seismic data interpretation and, more particularly, to the processing of databases of well log and geophone-obtained seismic information to better assist interpreters in classifying subsurface formations.

The subject matter of the present invention relates to a method and apparatus for generating a cross plot in attribute space in response to a plurality of attribute data and then generating a classified result or "class data set" based on the data alignment in the crossplot. More particularly, the subject matter of the present invention relates to an apparatus and associated method including a computer workstation having a novel software package stored therein, the workstation having a display screen for displaying a novel classified result, known as a class data set, for viewing by a workstation operator. The class data set is generated and displayed on the display screen when the workstation processor executes the novel software package. When the novel software package is executed, a crossplot in attribute space is generated in response to a plurality of different attribute data obtained in response to a seismic operation, and the class data set is generated in response to the crossplot.

In the oil industry, well log data (obtained from well logging operations in wellbores) and/or seismic data (obtained from seismic operations) are obtained from underground earth formations, the data inherently containing information relating to the quantity or degree of underground deposits of hydrocarbons in the earth formations. Computer workstations in conjunction with software stored therein are used to process and interpret the data. The workstations include a processor, a memory for storing interpretation software, and an interactive display screen. The workstation will receive the well log or seismic data and, when the interpretation software stored in the workstation memory is executed by the processor, the workstation will interpret the data and display a novel set of results on the display screen. The set of results will include a novel visual display for viewing by an operator. The display may, for example, reveal the degree or quantity or type of underground deposits of hydrocarbons (e.g., oil) in the earth formation. One such novel set of results displayed on the workstation display screen is known as a "crossplot" and a "class data set". A class data set represents a top view of a subsurface in an earth formation, the top view of the subsurface including, for example, a plurality of different earth formation classes where each class of the plurality of classes in the subsurface possesses a different set of characteristics. When the operator of the workstation views the class data set on the workstation display screen, the characteristics of each class of the subsurface being displayed can be determined.

In the seismic interpretation field, there is a strong need for such a class data set, since the class data set would assist the workstation operator to determine, for example, the type of and/or the existence of underground deposits of hydrocarbon in the earth formation.

SUMMARY OF THE INVENTION

Accordingly, it is a primary object of the present invention to improve upon the interpretation systems of the prior art by providing a new interpretation system hereinafter called a "seismic classification system" which is adapted for generating a classified result that can be recorded and displayed on a workstation display.

It is a primary aspect of the present invention to provide a new seismic classification system which will produce a classified result by: (a) receiving at least a first attribute data set where the attribute data set includes a plurality of points and a plurality of attribute data corresponding, respectively, to the plurality of points, (b) generating a first cross plot in attribute space in response to the attribute data on the first attribute data set, and (c) generating the classified result in response to the plurality of points on the first attribute data set and the cross plot in attribute space.

It is a further aspect of the present invention to provide the new seismic classification system which will produce the classified result, wherein the receiving step (a) for receiving at least a first attribute data set includes the following steps: (a1) reflecting sound vibrations or velocities off the plurality of points on a subsurface, the first attribute data set corresponding to the subsurface, and (a2) generating the plurality of attribute data "(a, b)" associated, respectively, with the plurality of points on the first attribute data set, where "a" could represent, for example, an amplitude value, and "b" could represent, for example, a frequency value.

It is a further aspect of the present invention to provide the new seismic classification system which will produce the classified result, wherein the generating step (b) for generating the cross plot in attribute space in response to the attribute data on the first attribute data set includes the following steps: (b1) selecting a subset of the attribute data on the first attribute data set to represent a first set of inspection data, (b2) generating a second cross plot in attribute space from the first set of inspection data, the second cross plot having a distribution/separation of clusters, and (b3) evaluating the distribution/separation of the clusters on the second cross plot.

It is a further aspect of the present invention to provide the new seismic classification system which will produce the classified result, wherein the generating step (b) for generating the cross plot in attribute space in response to the attribute data on the first attribute data set includes the following additional steps: (b4) selecting a subset of the points among a set of clusters on the cross plot in attribute space to represent a second set of inspection data, (b5) generating a second attribute data set from the second set of inspection data, the second attribute data set having a distribution of points, and (b6) evaluating the distribution of the points on the second attribute data set.

It is a further aspect of the present invention to provide the new seismic classification system which will produce the classified result, wherein the generating step (b) for generating the cross plot in attribute space in response to the attribute data on the first attribute data set includes the following additional steps: (b7) selecting some of the attribute data on the first attribute data set to represent training data, (b8) selecting other attribute data on the first attribute data set to represent validation data, a class of the training data being approximately the same as a class of the validation data, (b9) generating a third cross plot in a particular attribute space in response to the training data, and (b10) generating a fourth cross plot in said particular attribute space in response to the validation data, whereby a cluster in said particular attribute space resultant from said validation data should be located adjacent to another cluster in the same said particular attribute space resultant from said training data when said class of said training data is approximately the same as said class of said validation data.

It is a further aspect of the present invention to provide the new seismic classification system which will produce the classified result, wherein the generating step (b) for generating the cross plot in attribute space in response to the attribute data on the first attribute data set includes the following additional step and sub-steps: (b11) generating said cross plot in attribute space having at least two clusters of points in response to the attribute data on the first attribute data set when the following three sub-steps have been implemented successfully: (1) the distribution/separation of the clusters on the second cross plot evaluated during the step (b3) is acceptable, (2) the distribution of the points on the second attribute data set evaluated during the step (b6) is acceptable, and (3) said cluster in said particular attribute space resultant from said validation data is located adjacent to said another cluster in the same said particular attribute space resultant from said training data when said fourth cross plot in said particular attribute space is generated during the step (b10).

It is a further aspect of the present invention to provide the new seismic classification system which will produce the classified result, wherein the generating step (c) for generating the classified result in response to the plurality of points on the first attribute data set and the cross plot in attribute space, having said at least two clusters of points, includes the following steps: (c1) assigning a first label, such as color, to a first one of said at least two clusters of points on said cross plot in attribute space, each point in said first one of said at least two clusters of points on said cross plot in attribute space having assigned thereto said first label, such as color, and corresponding to a first set of locations on said first attribute data set, (c2) assigning a second label, such as color, to a second one of said at least two clusters of points on said cross plot in attribute space, each point in said second one of said at least two clusters of points on said cross plot in attribute space having assigned thereto said second label, such as color, and corresponding to a second set of locations on said first attribute data set, (c3) assigning each of said first set of locations on said first attribute data set with said first label, such as color, and (c4) assigning each of said second set of locations on said first attribute data set with said second label, such as color.

In accordance with the above referenced object and the above aspects of the present invention, a novel seismic classification system in accordance with the present invention includes, in combination, a workstation and a novel seismic classification software, known as "Seisclass", stored in the workstation, for performing a novel seismic classification function when the Seisclass software is executed by a processor of the workstation. The novel seismic classification system of the present invention includes the following system components: (1) "Attribute data sets" which collectively represent the "input attribute data" that are provided to the seismic classification system, the attribute data sets each being shown in a geographical data set coordinate system, the attribute data set being a window for offering a view into the attribute data in accordance with their individual geographic positioning, (2) "Attribute space" which represents a coordinate system having one coordinate axis for each attribute of the aforementioned attribute data, a "crossplot" representing a view into the attribute space, (3) "Administration" which represents the methods for managing the contents of the "input attribute data", for managing the selection of the proper Classification Method, and for managing the parameter control, and (4) a "Class data set" which represents the results of a classification process.

The novel seismic classification system of the present invention further includes the following Classification Methods: (1) "Unsupervised Classification Methods" which look at data clustering/grouping in attribute space, will reveal and confirm natural clustering unbiased by subjective measures but do not necessarily provide a geologically interpretable result, and (2) "Supervised Classification Methods" which adds an "a-priori" knowledge to the classification process as represented by certain selected "training data", the Supervised Classification Methods providing class definitions that can be targeted directly to geology or to the specific problem, and allowing for testable validation by holding out data which have an "a-priori" known class association.

However, the Unsupervised classification method and the Supervised classification method each include a different functional operation and therefore enforce a different workflow.

For example, the workflow of the Unsupervised classification method includes: (1) selecting a plurality of attribute data sets which have the potential to show a separation of data points in attribute space, the attribute data sets being related to one and the same geological feature (e.g., subsurface, layer in an earth formation), (2) running a classification, (3) evaluating the classification via a crossplot in attribute space relative to a data set view in geographic space, and (4) drawing conclusions by interpreting the grouping in attribute space and perhaps starting a supervised classification to steer the outcome to a more interpretable result.

In addition, the workflow of the Supervised classification method includes: (1) the selection of attribute data sets having the potential to show separation of data points in attribute space (the same as in the unsupervised classification method), (2) the selection of training and validation data, the training and validation data each having a known class association and the analysis of the training and the validation data taking place prior to classification, (3) the interaction between a crossplot in attribute space and attribute data set displays in geographic space, (4) prior to running the classification, defining which of the potential training and validation data are used for "training", i.e., data used to build the classification function, and which of the potential training and validation data are "validation", i.e., data withheld from the classification process, (5) running the classification thereby producing a classification result, and optionally various quality and confidence measures, and (6) comparing the predicted class association from the classification result with the withheld validation data, i.e. the a-priori known class association, thereby providing a consistency and stability test.

Further applicability of the present invention will become apparent from the detailed description presented hereinafter. It should be understood, however, that the detailed description and the specific examples, while representing a preferred embodiment of the present invention, are given by way of illustration only, since various changes and modifications, within the spirit and scope of the invention, will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to limit the present invention, and wherein:

FIG. 1 illustrates a typical seismic operation;

FIG. 2 illustrates a well logging operation;

FIGS. 7 through 13 illustrate how the attribute data sets are produced from a seismic operation;

FIGS. 17 through 21 illustrate how the class data set of the present invention is produced when the attribute data sets of FIG. 13 are used by the workstation processor of FIG. 14 to produce the class data set of the present invention during execution of the seisclass software of the present invention;

FIGS. 32 through 34 illustrate how one could select and declare training data in connection with the 'training/validation' of FIG. 30;

FIGS. 35 through 37 illustrate how one could select and declare validation data in connection with the 'training/validation' of FIG. 30;

FIG. 53a illustrates an unsupervised method of classification, specifically K-Means Clustering, used in accordance with a preferred embodiment of the present invention.

FIG. 53b illustrates an unsupervised method of classification, specifically Competitive Learning, used in accordance with a preferred embodiment of the present invention.

FIG. 55 illustrates class representations including a class definition repository having an additional translation layer in accordance with a preferred embodiment of the present invention.

FIG. 56 illustrates method catalogs and their relationship to other SEISCLASS entities, in accordance with a preferred embodiment of the present invention.

FIG. 57 illustrates grouping of SEISCLASS input attributes including the grouping of input attribute representations, corresponding well derived attributes to individual attribute representations, and training/validation representations in accordance with a preferred embodiment of the present invention.

FIG. 61 illustrates classification run entity relations and, in particular, the presentation of the various links to other data entities organized counterclockwise starting from 'model entity' at the top of this figure, in accordance with a preferred embodiment of the present invention.

FIF. 72 illustrates a selections pull down menu (Administration) dialog in accordance with a preferred embodiment of the present invention.

Figure 73:
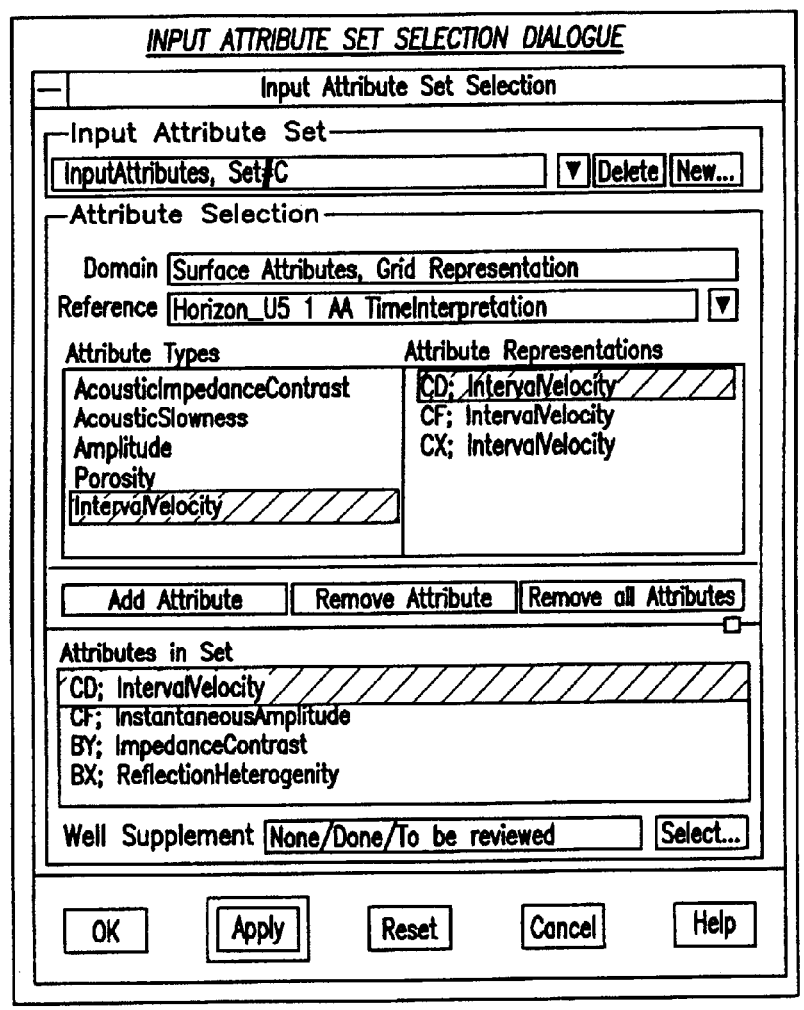

FIG. 73 illustrates a dialog for input attribute set selection allowing for the definition of a collection of attributes to be used with a classification, in accordance with a preferred embodiment of the present invention.

FIG. 74 illustrates a dialog for attribute selection, in accordance with a preferred embodiment of the present invention.

FIG. 75 illustrates an attributes in set dialog associated with attribute selection, in accordance with a preferred embodiment of the present invention.

FIG. 76 illustrates a new attribute set dialog for creation of new input attribute sets, in accordance with a preferred embodiment of the present invention.

FIG. 77 illustrates a dialog for well supplement selection, in accordance with a preferred embodiment of the present invention.

Figure 78:
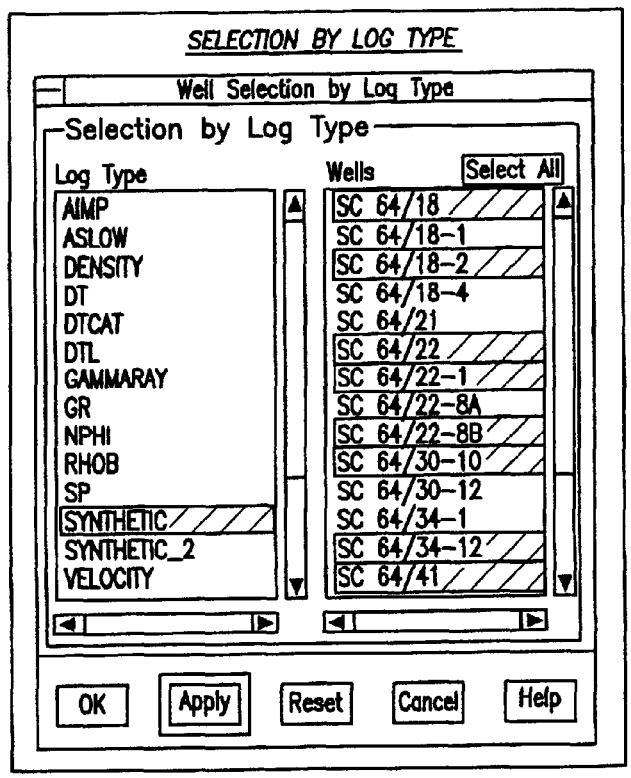

FIG. 78 illustrates a dialog for selection by log type, in accordance with a preferred embodiment of the present invention.

FIG. 79 illustrates a cell context selection frame in accordance with a preferred embodiment of the present invention.

Figure 80:
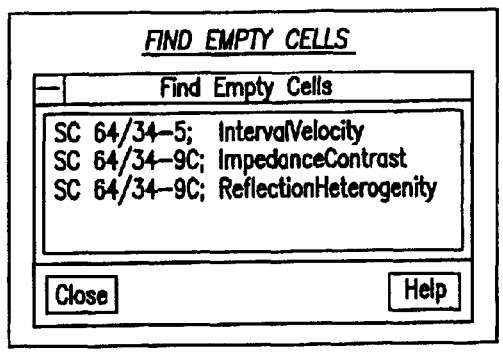

FIG. 80 illustrates a "Find Empty Cells" dialog including an action button to find empty cells, in accordance with a preferred embodiment of the present invention.

Figure 81:
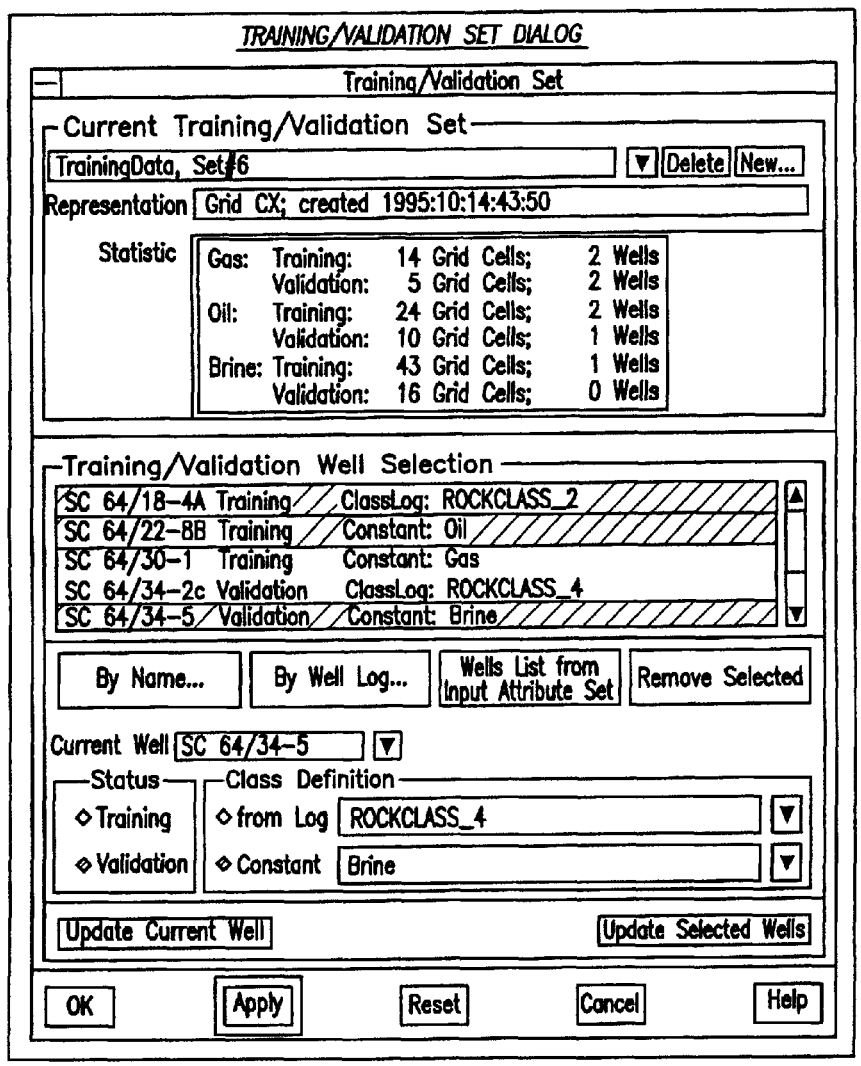

FIG. 81 illustrates a training/validation set dialog for training/validation set selection allowing the definition of a set of data used with the training or validation step during a 'supervised' classification, in accordance with a preferred embodiment of the present invention.

Figure 82:
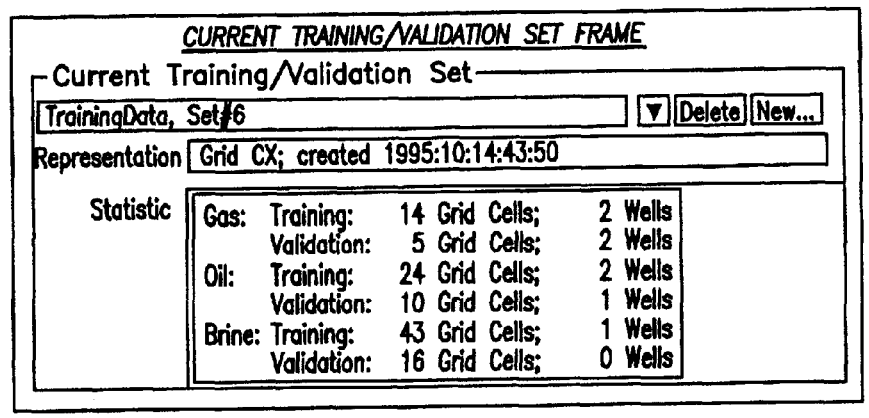

FIG. 82 illustrates a current training/validation set frame, in accordance with a preferred embodiment of the present invention.

Figure 83:
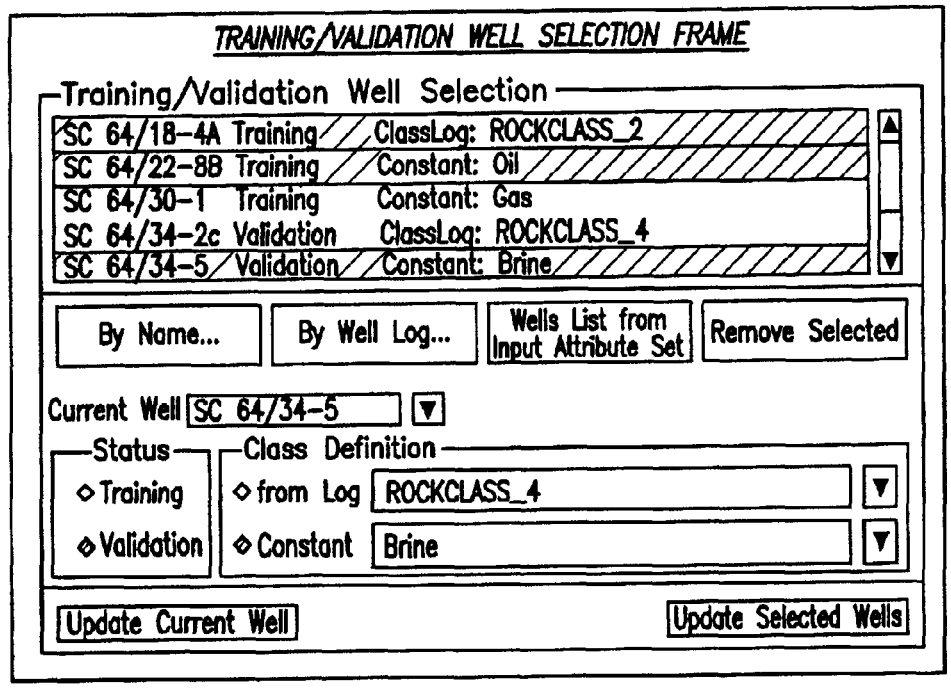

FIG. 83 illustrates a training/validation well selection frame for concentrating all functions relating to the 'well supplement', in accordance with a preferred embodiment of the present invention.

Figure 84:
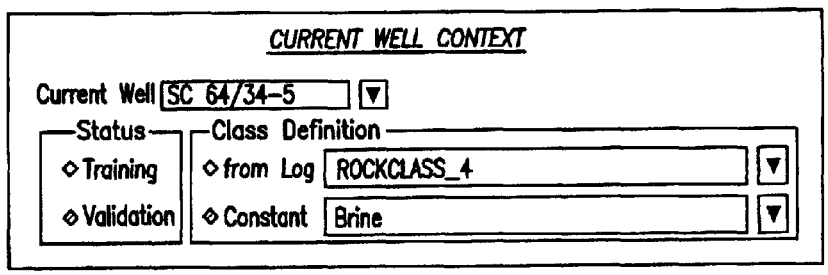

FIG. 84 illustrates a current well context frame that indicates a well in context and allows an alternative well selection, in accordance with a preferred embodiment of the present invention.

Figure 85:
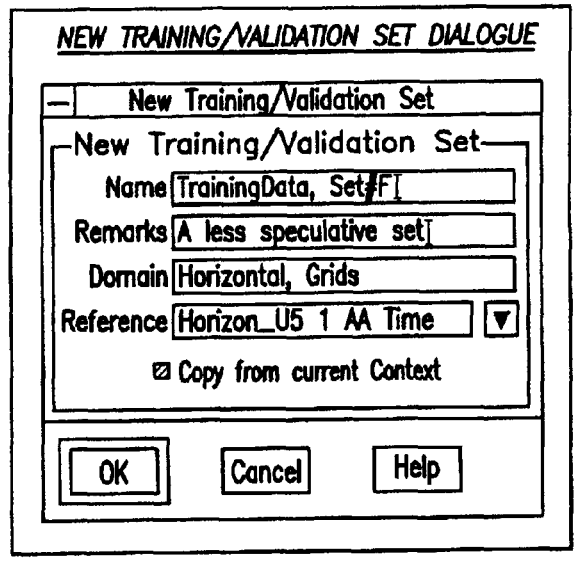

FIG. 85 illustrates a new training/validation set dialog enabling the creation of new training/validation sets, in accordance with a preferred embodiment of the present invention.

Figure 86A:
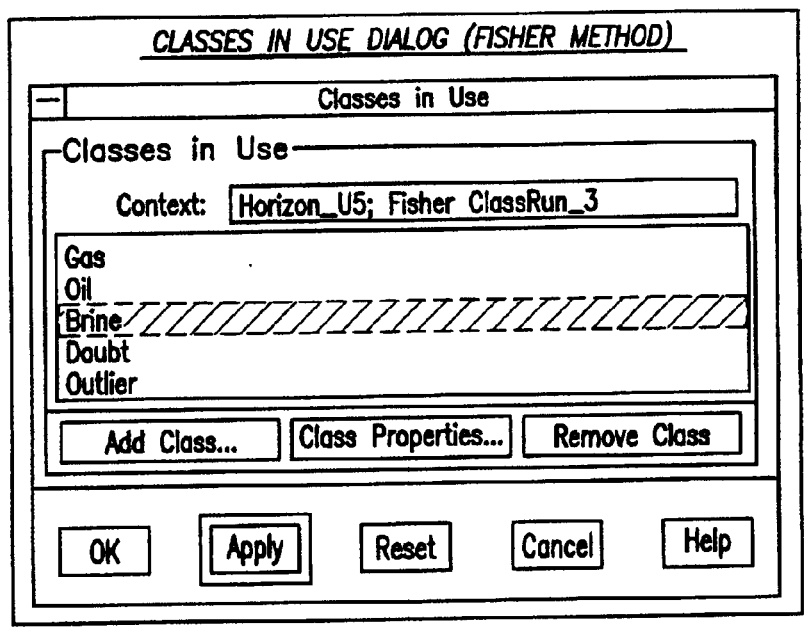

FIG. 86a illustrates a "Classes in Use" dialog for classes in use, Fisher Method, for supervised methods in accordance with a preferred embodiment of the present invention.

Figure 86B:
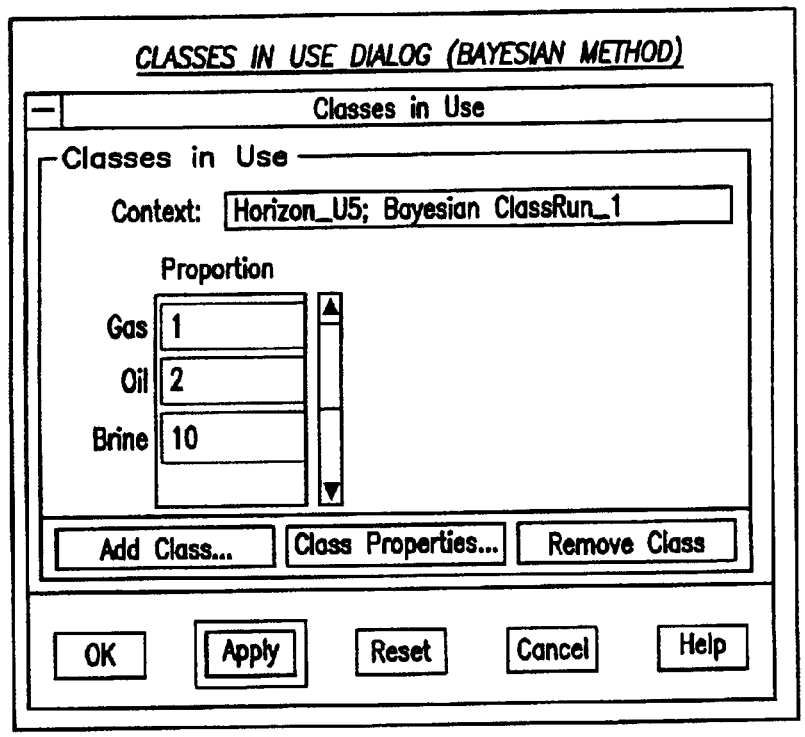

FIG. 86b illustrates a "Classes in Use" dialog for classes in use, Bayesian Method, for supervised methods in accordance with a preferred embodiment of the present invention.

Figure 86C:
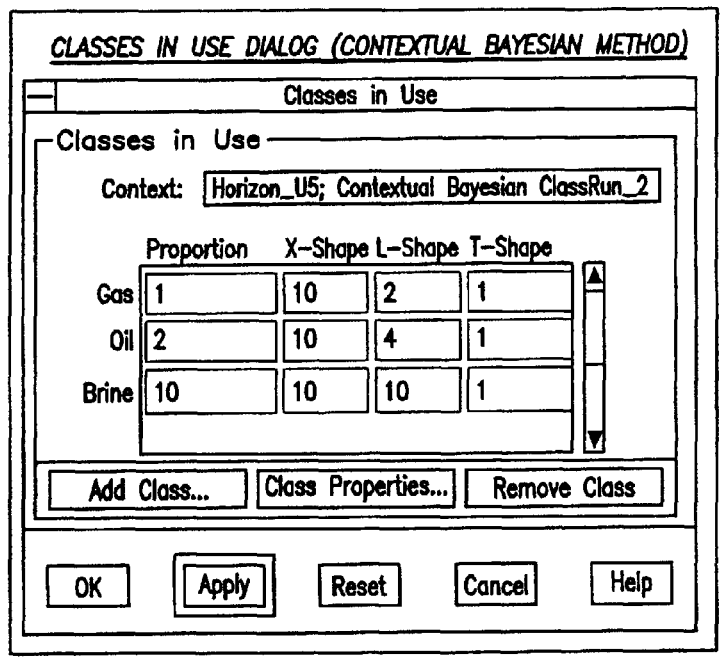

FIG. 86c illustrates a "Classes in Use" dialog for classes in use, Contextual Bayesian Method, for supervised methods in accordance with a preferred embodiment of the present invention.

Figure 87:
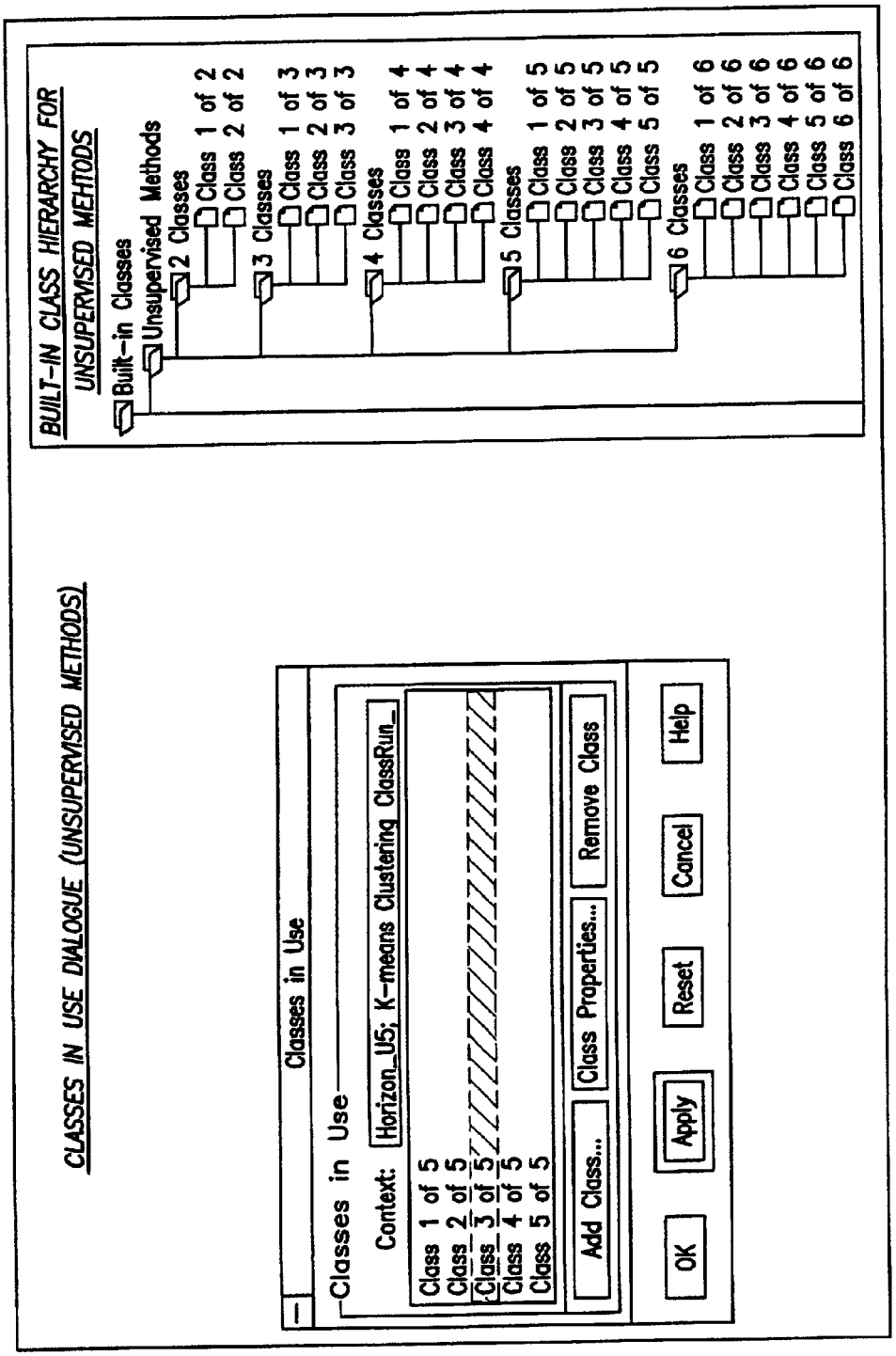

FIG. 87 illustrates a "Classes in Use" dialog for classes in use, unsupervised methods, including a Built-in Class Hierarchy for unsupervised methods in accordance with a preferred embodiment of the present invention.

Figure 88:
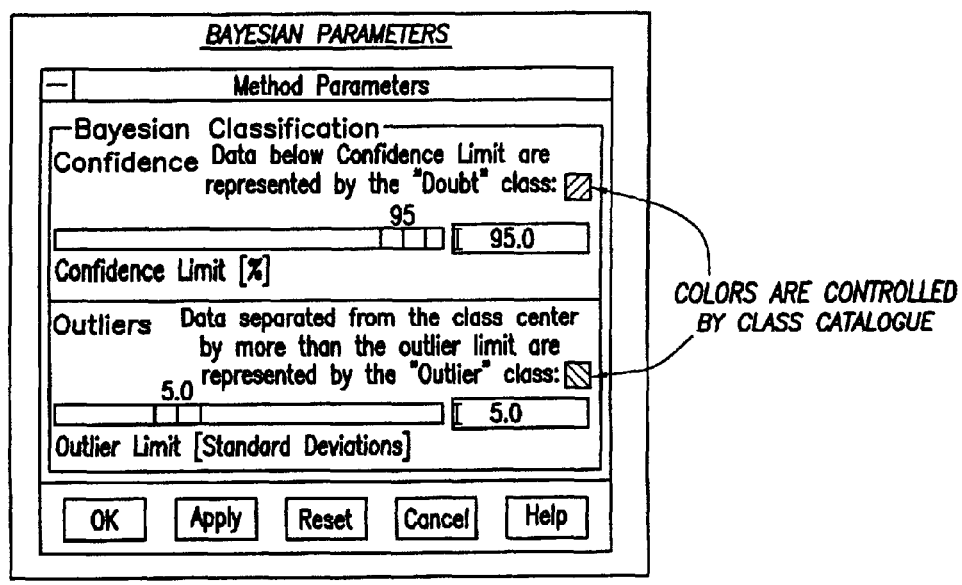

FIG. 88 illustrates a Bayesian parameters dialog for the Bayesian Method and for the Contextual Bayesian Classification Method, in accordance with a preferred embodiment of the present invention.

Figure 89:
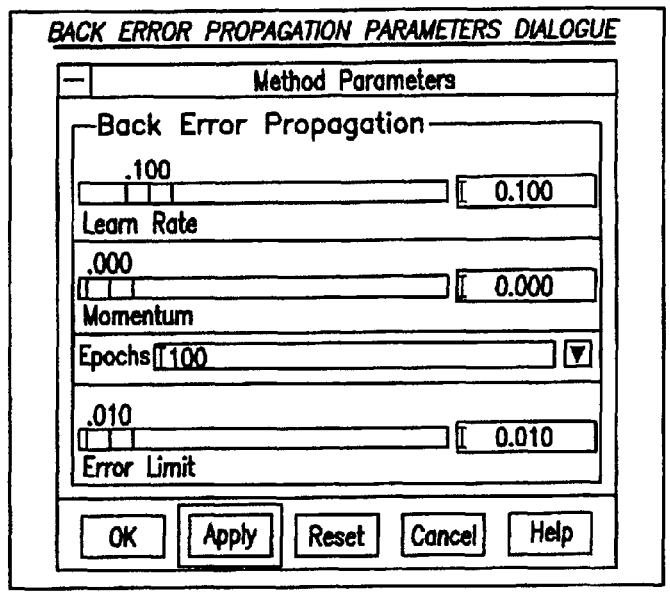

FIG. 89 illustrates a Back Error Propagation Parameters dialog for back error propagation parameters, in accordance with a preferred embodiment of the present invention.

Figure 90:
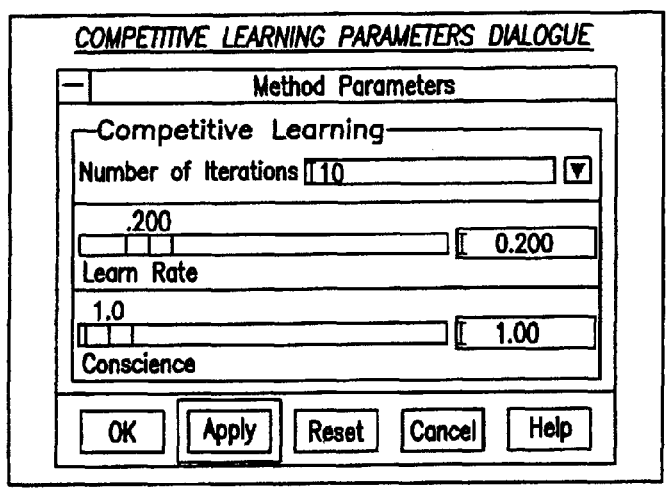

FIG. 90 illustrates a Competitive Learning Parameters dialog for Competitive Learning parameters, in accordance with a preferred embodiment of the present invention.

Figure 91:
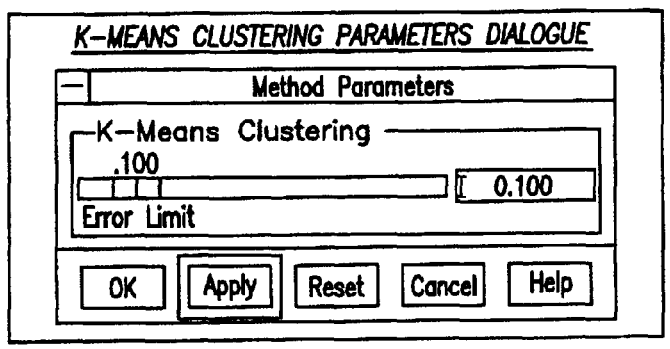

FIG. 91 illustrates a K-Means Clustering Parameters dialog for K-Means clustering parameters, in accordance with a preferred embodiment of the present invention.

Figure 92:
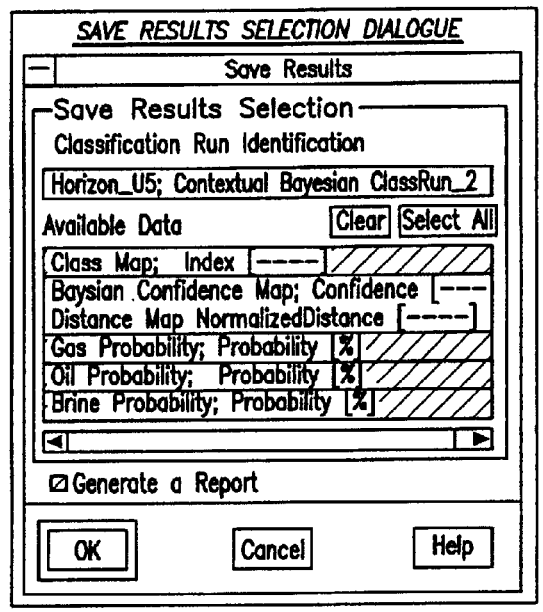

FIG. 92 illustrates a Save Results Selection dialog for the selection/ de-selection of the output data, in accordance with a preferred embodiment of the present invention.

Figure 93:
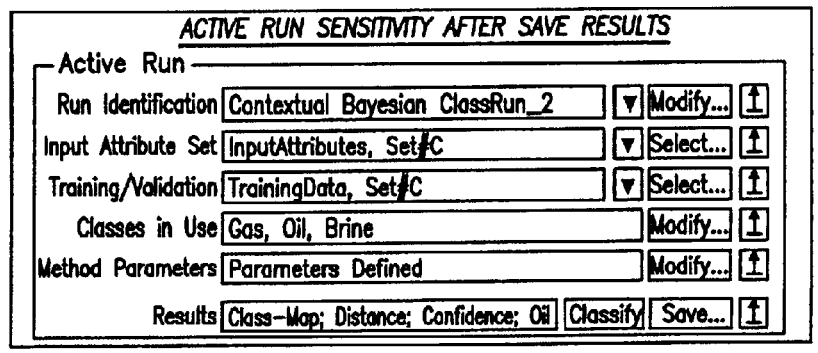

FIG. 93 illustrates an "active run sensitivity after save results" frame, in accordance with a preferred embodiment of the present invention.

Figure 94:
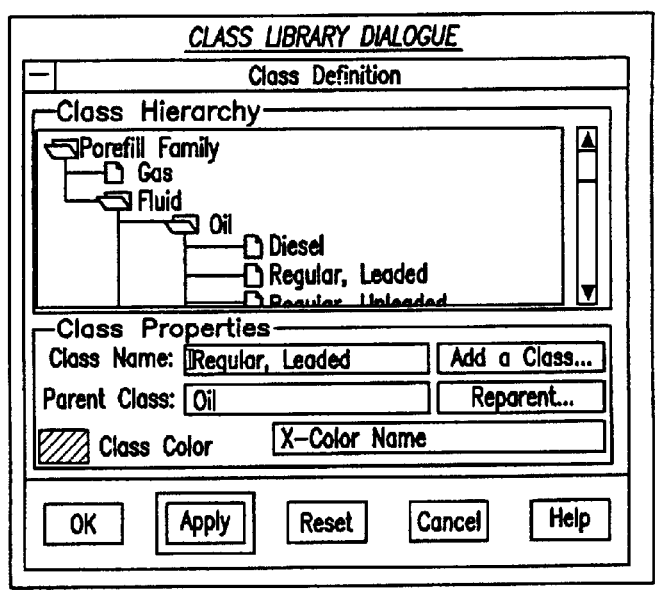

FIG. 94 illustrates a class library dialog, including a 'Class Hierarchy' top frame serving as a navigation and selection device, in accordance with a preferred embodiment of the present invention.

FIG. 95 illustrates a new class definition dialog, where a 'class name' can be typed into an editable text field, in accordance with a preferred embodiment of the present invention.

Figure 96:
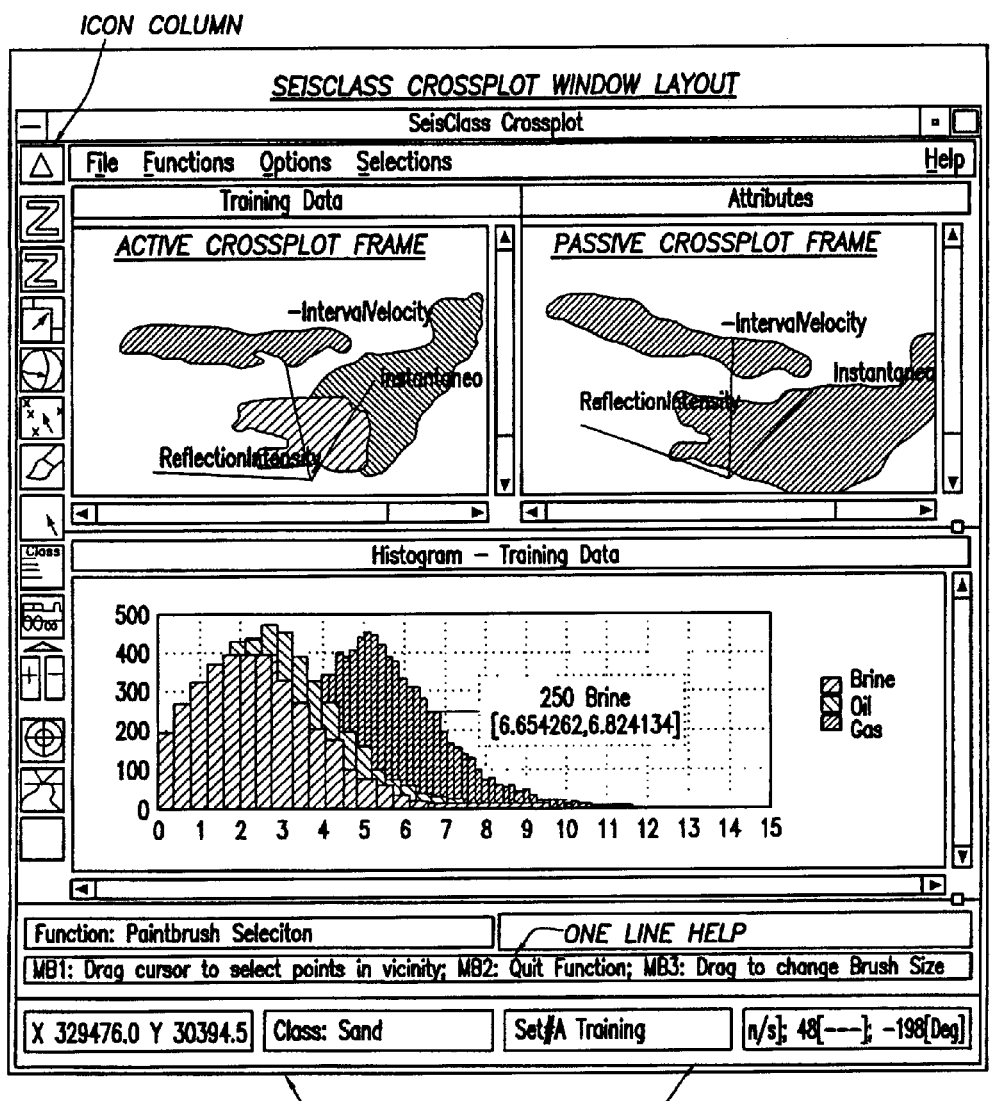

FIG. 96 illustrates a SEISCLASS crossplot window layout including a histogram, an active crossplot frame, and passive crossplot frames, in accordance with a preferred embodiment of the present invention.

FIG. 97 illustrates a crossplot datapoint Pixmaps frame including selection, training, and validation in accordance with a preferred embodiment of the present invention.

Figure 98:
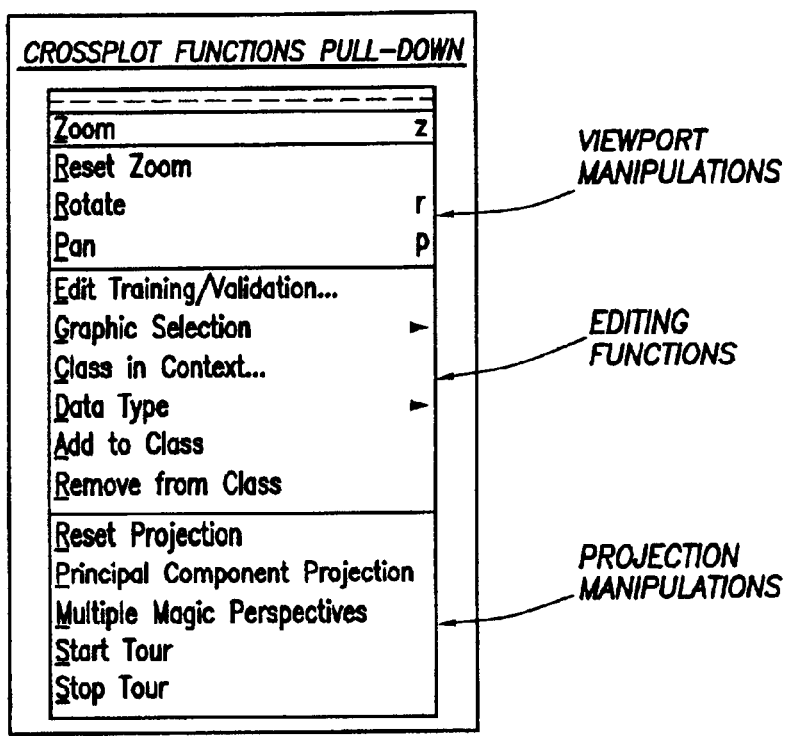

FIG. 98 illustrates a crossplot functions pull-down window, including viewpoint manipulations, editing functions, and projection manipulations, in accordance with a preferred embodiment of the present invention.

Figure 99:
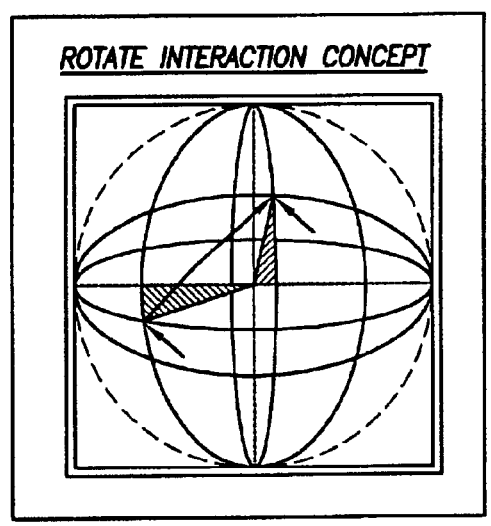

FIG. 99 illustrates a "rotate interaction concept", in accordance with a preferred embodiment of the present invention.

Figure 100:
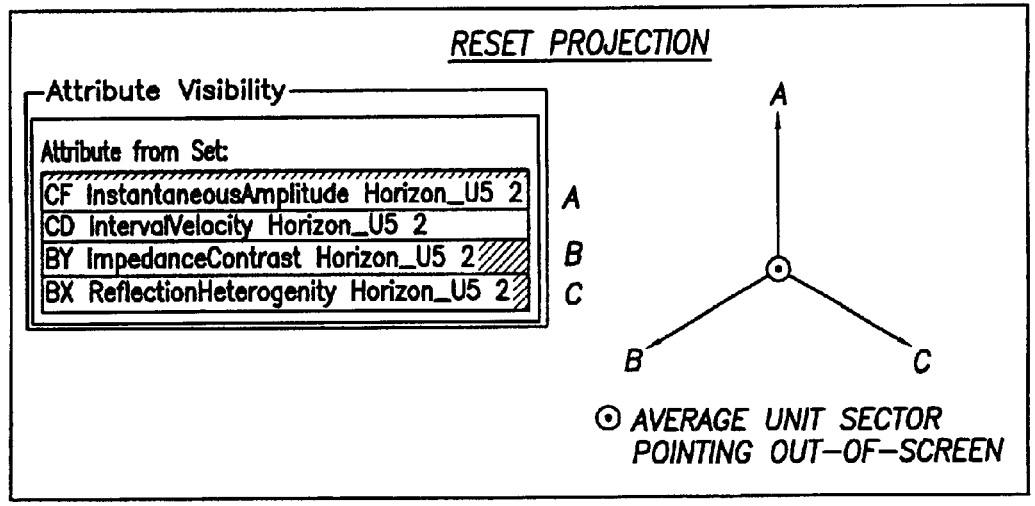

FIG. 100 illustrates a reset projection function in accordance with a preferred embodiment of the present invention.

Figure 101:
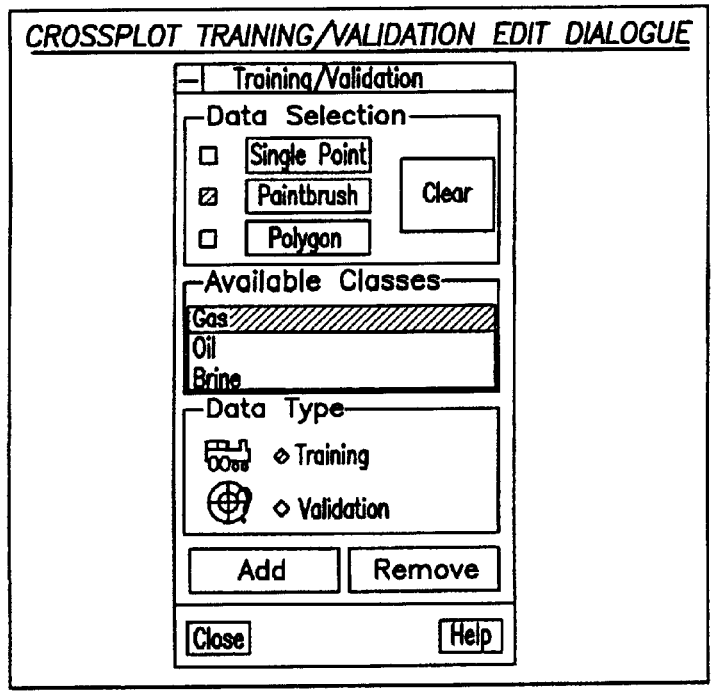

FIG. 101 illustrates a crossplot training/validation edit dialog for collecting all functional controls and context selections required for editing training/validation data in crossplot frames, in accordance with a preferred embodiment of the present invention.

FIG. 102 illustrates a multiframe dialog which is available via the 'crossplot options' menu bar in accordance with a preferred embodiment of the present invention.

FIG. 103 illustrates a crossplot display options dialog for collecting all crossplot display option selections, in accordance with a preferred embodiment of the present invention.

Figure 104:
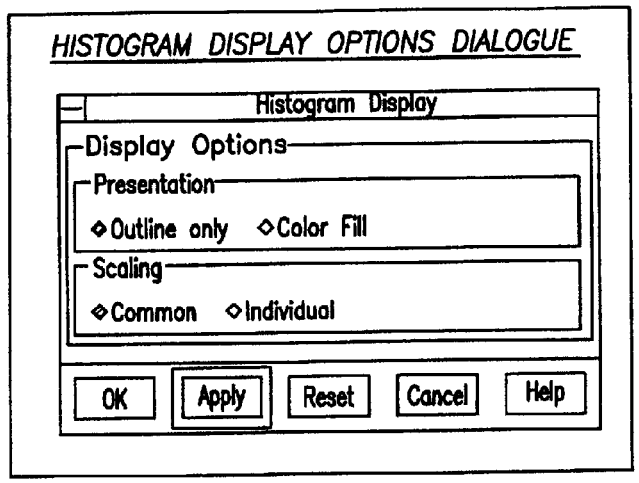

FIG. 104 illustrates a histogram display options dialog for histogram display options available via a 'crossplot options' menu bar pull down in accordance with a preferred embodiment of the present invention.

Figure 105:
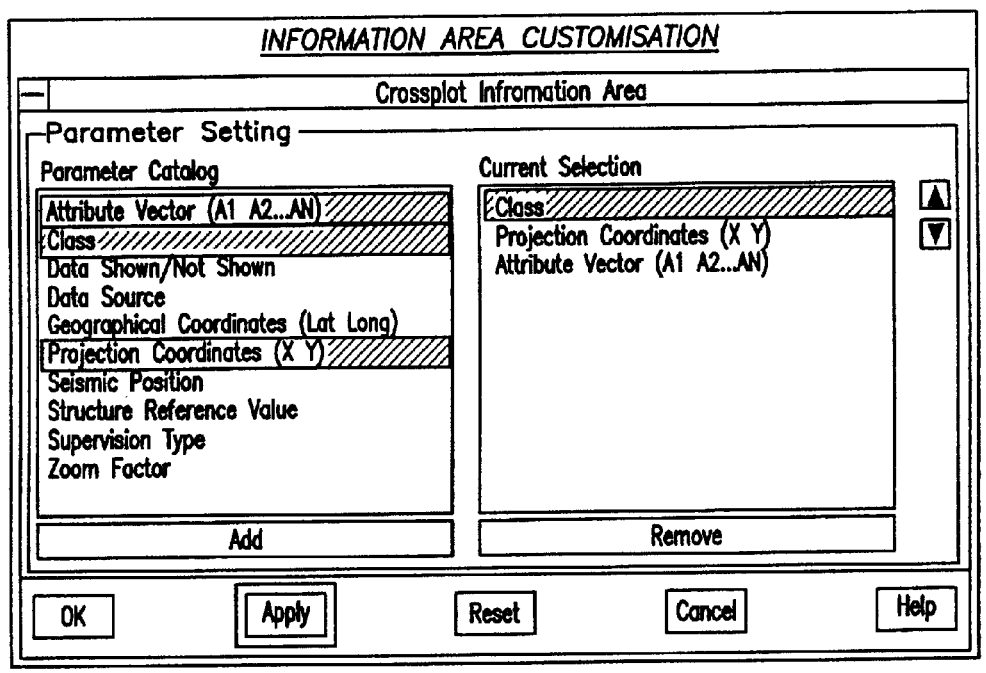

FIG. 105 illustrates an information area customization dialog for information area customization containing crossplot relevant items, in accordance with a preferred embodiment of the present invention.

Figure 106:
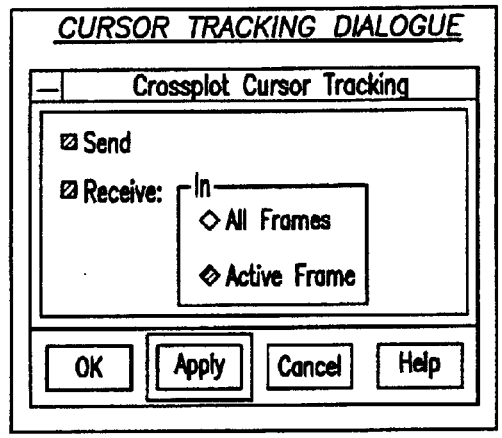

FIG. 106 illustrates a dialog for cursor tracking in accordance with a preferred embodiment of the present invention.

Figure 107:
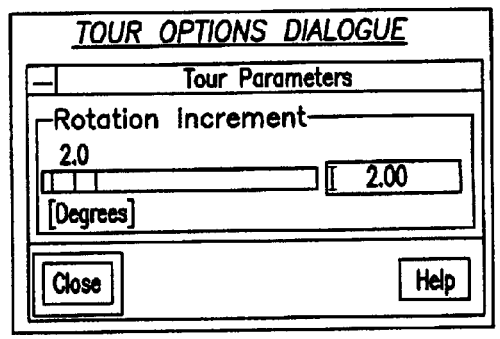

FIG. 107 illustrates a tour options dialog which offers a slider selection for the rotation increment used for the start tour function in accordance with a preferred embodiment of the present invention.

Figure 108:
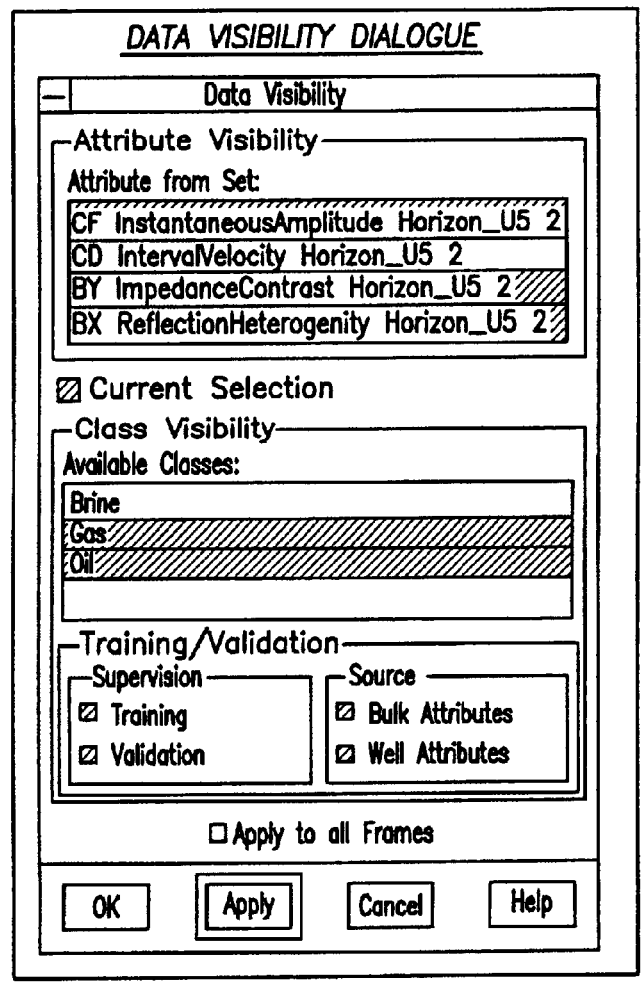

FIG. 108 illustrates a data visibility dialog allowing the selection of attributes defining the coordinate system and a data visibility selection according to category in accordance with a preferred embodiment of the present invention.

Figure 109:
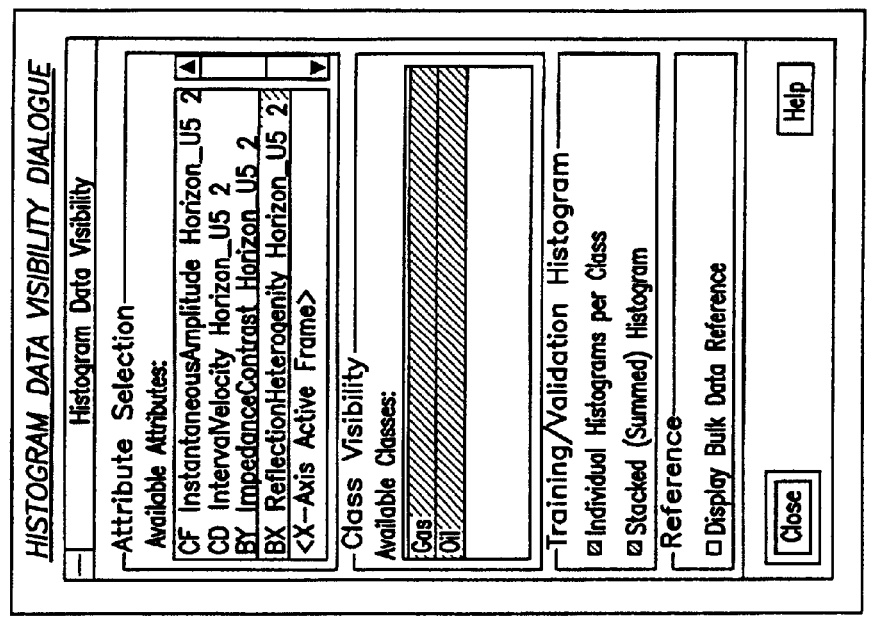

FIG. 109 illustrates a histogram data visibility dialog which defines 'data visibility' for crossplot frames in accordance with a preferred embodiment of the present invention.

Figure 110:
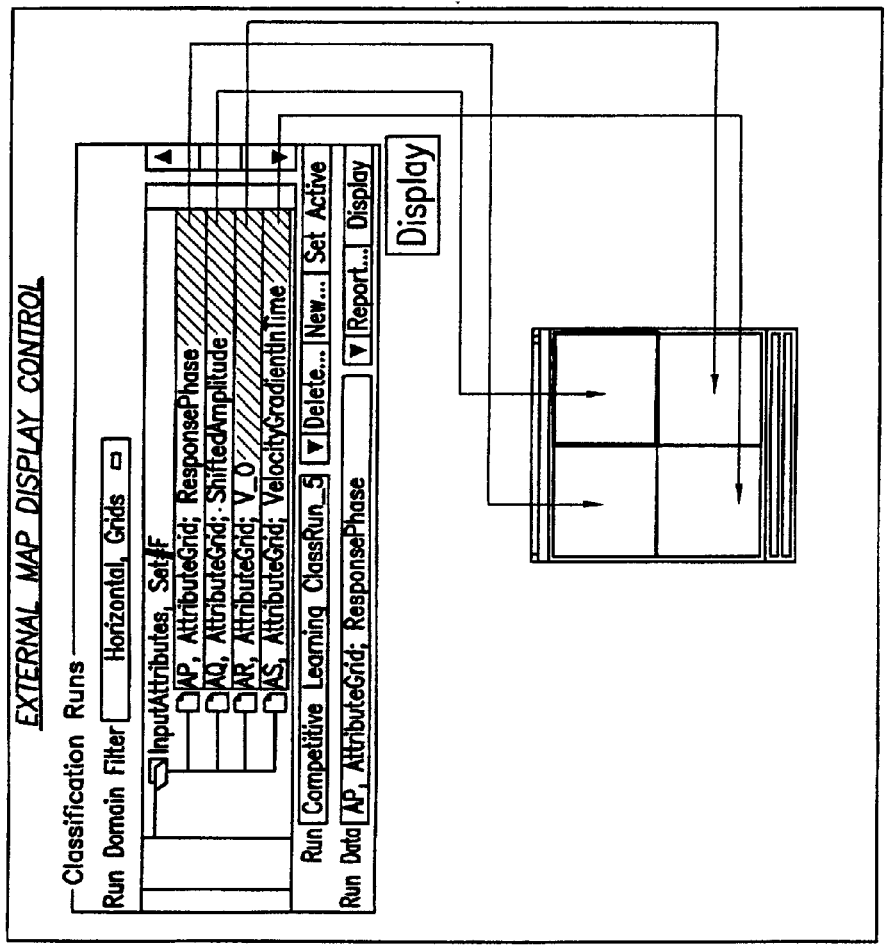

FIG. 110 illustrates an external map display control involving a dedicated display function in accordance with a preferred embodiment of the present invention.

Figure 111:
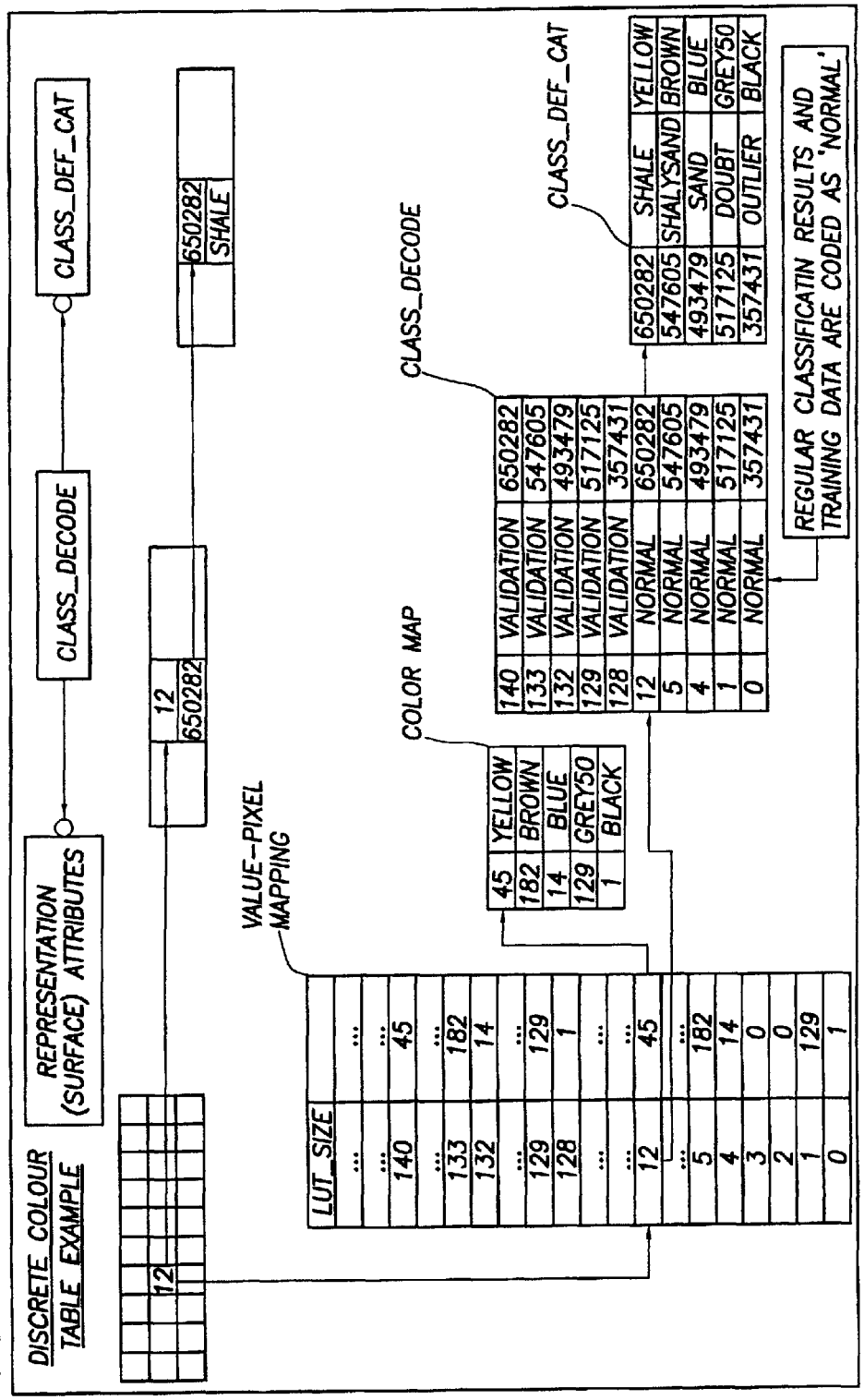

FIG. 111 illustrates a "Discrete Colour Table Example" including a class grid display adapted for mapping into a discrete class color look-up table in accordance with a preferred embodiment of the present invention.

DESCRIPTION OF THE PREFERRED EMBODIMENT

Referring to FIG. 1, a seismic operation is illustrated. An acoustic source 10 produces sound vibrations 12 which are reflected off a plurality of subsurfaces 14 of an earth formation, the subsurfaces being separated by a fault 16. The use of sound vibrations generated by the acoustic energy source is given by way of example only, since the sound vibrations generated by the acoustic energy source is only a subset of a larger set of all measureable quantities derived from or associated with seismic data, such as velocities which is a property closely related to seismic data. The sound vibrations 12 are received in a plurality of geophone receivers 18, and electrical signals are generated from the receivers, those electrical signals representing the "received seismic data" 20 in FIG. 1. The received seismic data 20 are provided as input data to a recording truck 22 which includes a recording truck computer 22a. The recording truck computer 22a will receive the "received seismic data" 20 and it will thereafter produce a "seismic data output record" 24 which stores the received seismic data 20.

Referring to FIG. 2, although not shown in FIG. 1, a wellbore has been drilled in the earth formation of FIG. 1, that wellbore being illustrated in FIG. 2. In FIG. 2, the wellbore 26 penetrates the formation, and a logging tool 28 logs the formation. A logging truck 30 is disposed at the earth surface, the logging truck 30 including a computer 32a which produces a "well log data output record" 32 which records and/or stores information representing the characteristics of the earth formation that is located nearest the wall 26a of the wellbore 26.

Figure 3:
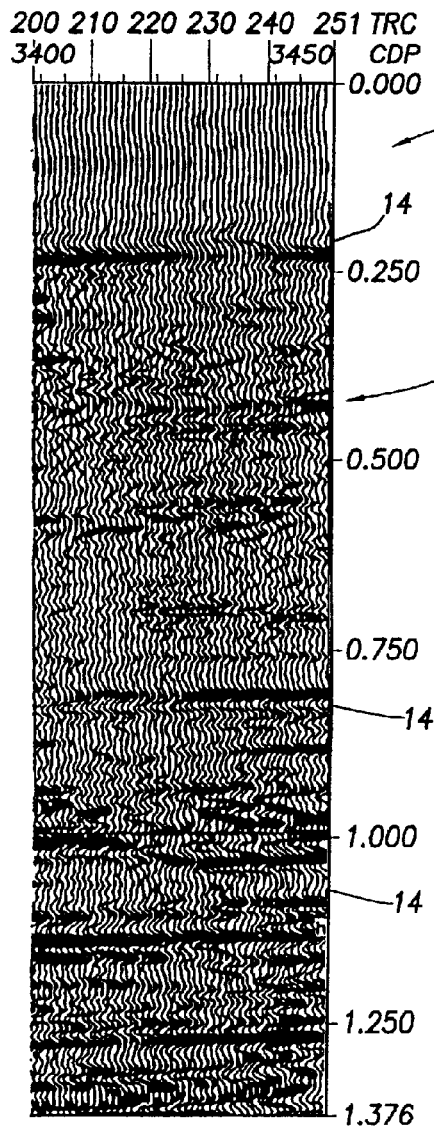
FIGS. 3 and 4 illustrate the seismic signals which are received by the geophones of FIG. 1.
Figure 4:
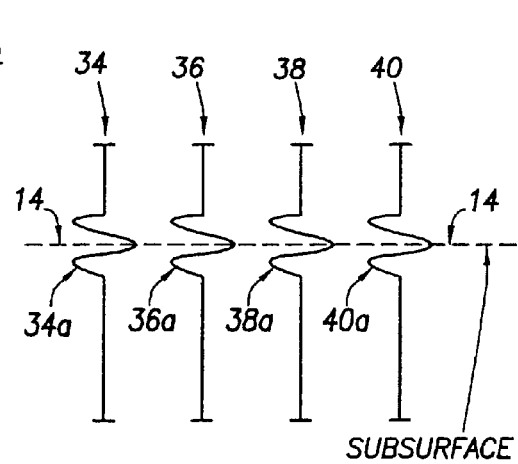

Referring to FIG. 3, an example of the "received seismic data" 20 of FIG. 1 which is stored on the seismic data output record 24 of FIG. 1 is illustrated. Note, in FIG. 3, that the received seismic data 20 is actually comprised of a multitude of seismic "traces", where each seismic trace includes a plurality of variations in amplitude plotted over time. FIG. 4 illustrates an exploded view of a portion of a single such seismic trace of FIG. 3.

Referring to FIG. 4, an exploded view of a portion of four seismic traces from FIG. 3 is illustrated. In FIG. 4, each of the seismic traces 34, 36, 38, and 40 include an amplitude variation 34a, 36a, 38a, and 40a. The amplitude variations 34a through 40a actually represent the location (that is, the depth) in the earth formation where an earth subsurface 14 is located. FIG. 4 illustrates the earth subsurface 14 by using a dotted line 14 passing through the four amplitude variations 34a through 40a. Referring back to FIG. 3, a multitude of such amplitude variations are now visible in the seismic traces representing a plurality of such earth subsurfaces 14 located along a depth dimension of the earth formation.

Figure 5:
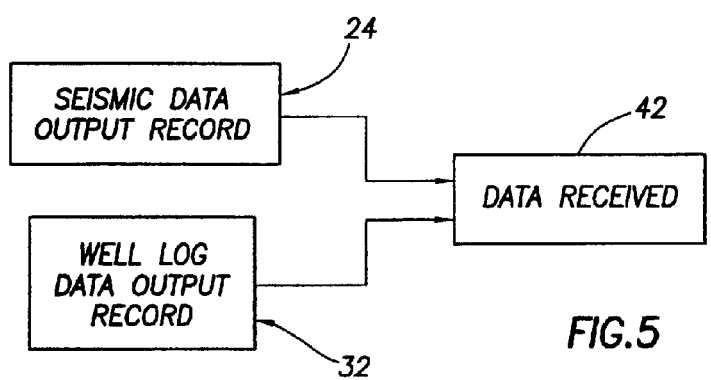
FIG. 5 illustrates how the seismic data output record and the well log data output record combine to represent the "data received"
Figure 6:
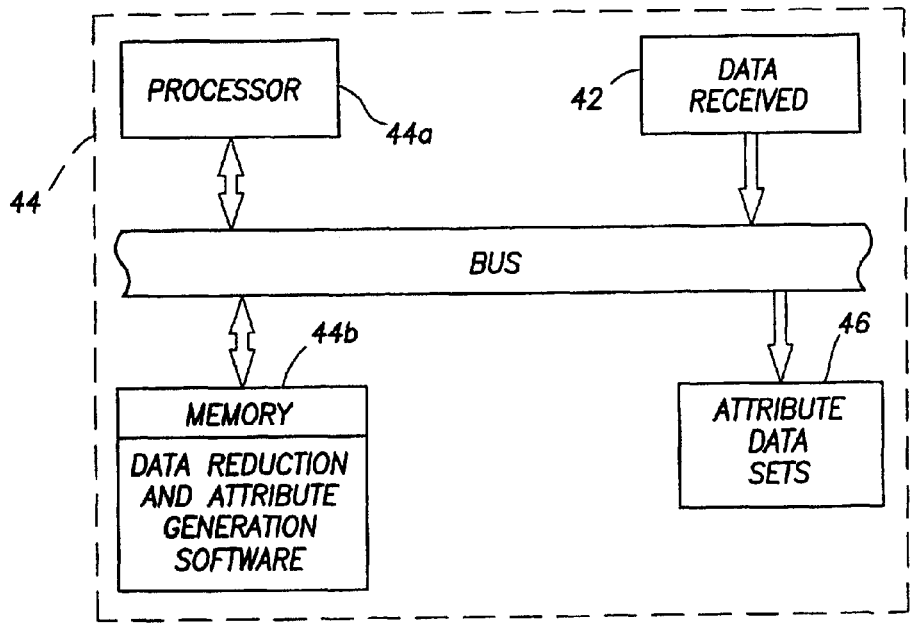
FIG. 6 illustrates how the attribute data sets are generated from the data received of FIG. 5.

Referring to FIG. 5, the seismic data output record 24 and the well log data output record 32 combine to produce the "data received" 42 which is input to the mainframe computer of FIG. 6.

Referring to FIG. 6, the data received 42 is received by a workstation computer 44. The processor 44a will receive the data received 42, it will execute a "data reduction and attribute generation software" stored in the workstation computer memory 44b, and responsive thereto, it will produce a plurality of "attribute data sets" 46. One such "data reduction software" is disclosed in a book called "Seismic Velocity Analysis and the Convolutional Model", by Enders A Robinson, the disclosure of which is incorporated by reference into this specification. An attribute data set 46 includes a first "attribute data set" consisting of a plurality of parameters of a first type and at least a second "attribute data set" consisting of a plurality of parameters of a second type. For example one attribute data set 46 could include a first "attribute data set" consisting of a set of amplitude parameters, and a second "attribute data set" consisting of a set of frequency parameters.

Referring to FIGS. 7 through 13, a simple example is illustrated which will demonstrate how the attribute data sets 46 of FIG. 6 are generated by the workstation computer 44.

Figure 7:
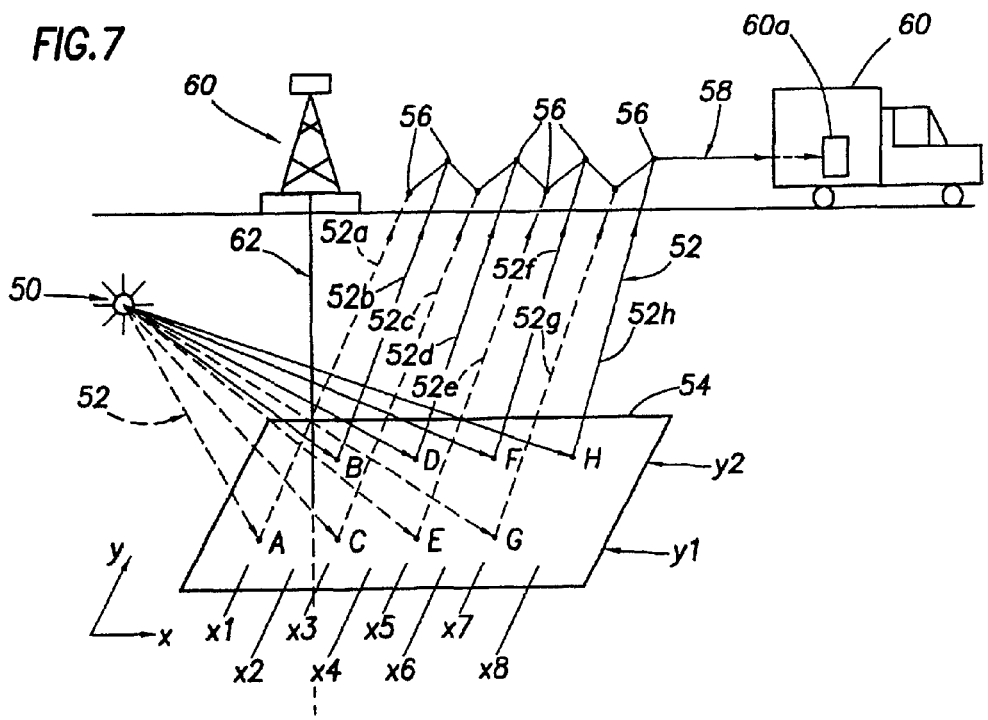

In FIG. 7, an acoustic source 50 (which is given by way of example only since all measurable quantities associated with seismic data could be utilized) produces sound vibrations 52 which reflect off a subsurface layer 54 in an earth formation. The sound vibrations 52 are reflected off the subsurface layer 54 and are received in a plurality of geophones 56 disposed on the earth's surface. Electrical signals 58 are input to a computer 60a of a recording truck 60. In FIG. 7, the subsurface layer 54 includes at least eight (8) points or cells: point A, point B, point C, point D, point E, point F, point G, and point H. The subsurface layer 54 also has an x-y coordinate system imposed thereon, where the x-axis along the subsurface layer 54 includes coordinate values "x1" through "x8", and the y-axis along the subsurface layer 54 includes coordinate values "y1" and "y2". From FIG. 7, it is evident that points A through H on subsurface layer 54 have the following (x, y) coordinate values which identify their physical geographic locations on the subsurface 54:

A (x1, y1) E (x5, y1)
B (x2, y2) F (x6, y2)
C (x3, y1) G (x7, y1)
D (x4, y2) H (x8, y2)

Figure 8:
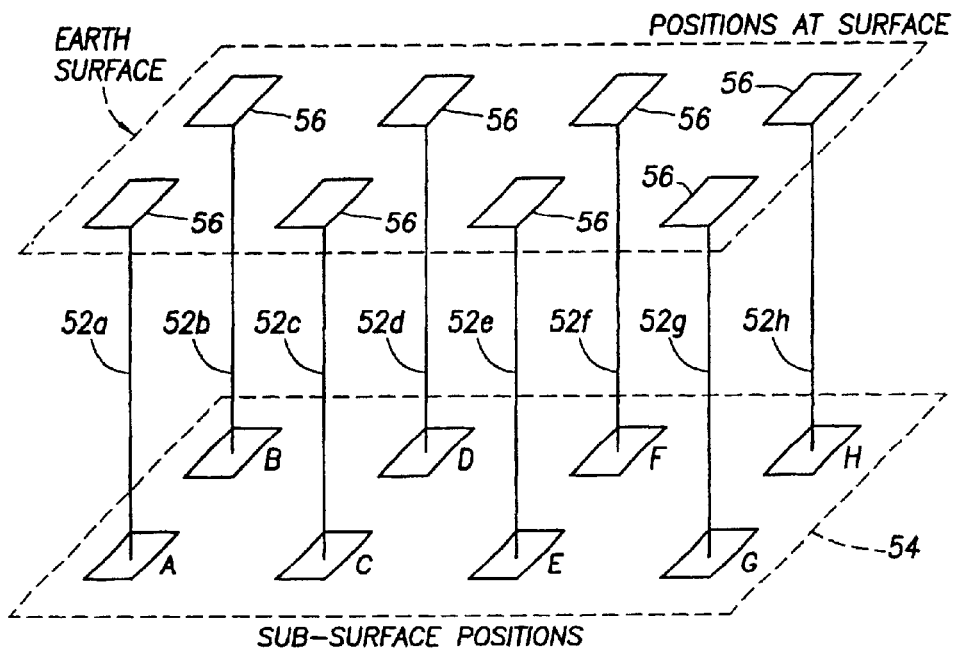
Figure 9:
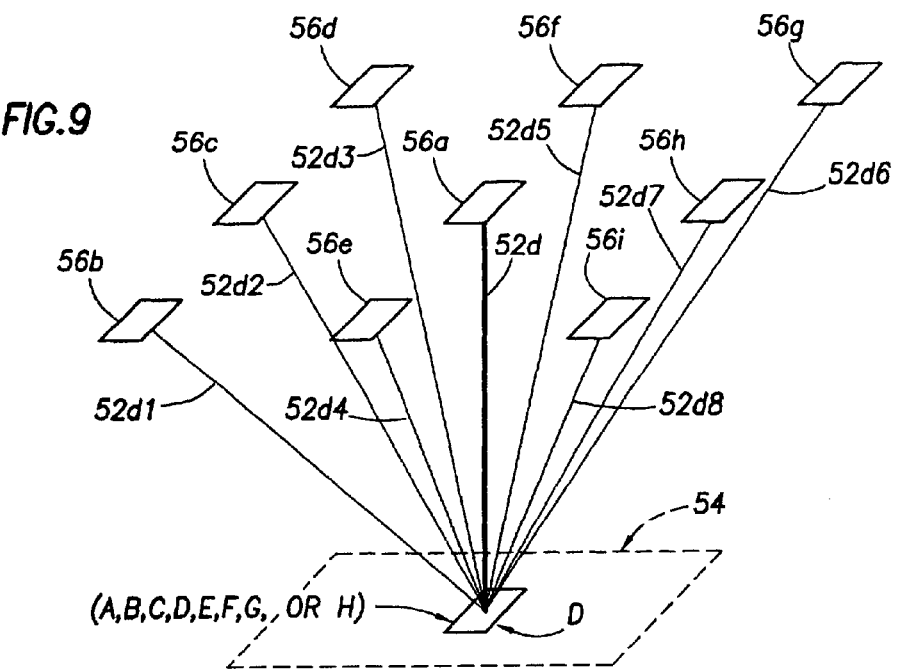

In FIG. 7, an oil well 60 is located above a wellbore 62 which penetrates an earth formation. The wellbore 62 intersects with and penetrates the subsurface layer 54 in the earth formation of FIG. 7. In addition, it appears from FIG. 7 that the reflections of the sound vibrations 52 off the subsurface layer 54 are non-vertical. However, this is not quite true. FIGS. 8 and 9 will correct any misconceptions which are generated by the FIG. 7 illustration. Before referring to FIG. 8, however, refer to FIG. 7 again and note that the sound vibrations 52 reflecting off the subsurface layer 54 actually include the following individual sound vibration reflections: a first sound vibration reflection 52a reflecting from point A on subsurface layer 54, a second sound vibration reflection 52b from point B, a third sound vibration reflection 52c from point C, a fourth sound vibration reflection 52d from point D, a fifth sound vibration reflection 52e from point E, a sixth sound vibration reflection 52f from point F, a seventh sound vibration reflection 52g from point G, and an eighth sound vibration reflection 52h reflecting from point H on subsurface layer 54.

In FIG. 8, the sound vibration reflections 52a through 52h actually reflect substantially vertically off the points A through H on the subsurface layer 54 when such sound vibration reflections propagate between points A through H on the subsurface layer 54 and the geophone receivers 56 on the earth's surface. However, as noted in FIG. 9, when such sound vibrations reflect upwardly from any one particular point (A through H) on the subsurface layer 54, there exist several such reflections.

In FIG. 9, using point D on subsurface layer 54 as an example, a sound vibration reflection 52d reflects upwardly off the point D on the subsurface layer 54 and it is received in a geophone receiver 56a; however, other sound vibration reflections 52d1 through 52d8 also reflect off the point D and are received in other geophone receivers 56b through 56i which are also positioned on the earth's surface.

Refer back to FIGS. 3 and 4, and recall that FIG. 3 comprises a multitude of seismic traces, similar to the seismic traces 34, 36, 38, and in FIG. 4. In addition, recall that each of the seismic traces in FIG. 3 include a plurality of amplitude variations similar to e amplitude variations 34a, 36a, 38a, and 40a in the seismic traces 34 through 40 in FIG. 4.

In FIG. 10, a method for determining at least one (1) pair of "attributes" associated with each point (e.g., points A through H) on the earth's subsurface layer 54, off which one of the sound vibrations 52 of FIG. 7 are reflected, is illustrated.

In FIG. 10, a seismic trace having an amplitude variation is associated with each of points A, B, C, and D on the subsurface layer 54. Although not shown in FIG. 10, a seismic trace having an amplitude variation is also associated with points E, F, G, and H on the subsurface layer 54. In FIG. 10, locate point A on the subsurface layer 54, and notice that point A has a seismic trace 64 which includes an amplitude variation 64a, the amplitude variation 64a having an amplitude "a6" and a frequency "f2". Point B has a seismic trace 66 which includes an amplitude variation 66a, the amplitude variation 66a having an amplitude "a3" and a frequency "f5". Point C has a seismic trace 68 which includes an amplitude variation 68a, the amplitude variation 68a having an amplitude "a5" and a frequency "f3". Point D has a seismic trace 70 which includes an amplitude variation 70a, the amplitude variation 70a having an amplitude "a4" and a frequency "f6". Therefore, in FIG. 10, for point A on the subsurface layer 54, one "attribute" 74 associated with point A is amplitude "a6" 74 and another "attribute" 76 associated with point A is frequency "f2" 76. Similarly, for point B, one "attribute" 78 associated with point B is amplitude "a3" 78 and another "attribute" 80 associated with point B is frequency "f5" 80. For point C, one "attribute" 82 associated with point C is amplitude "a5" 82 and another "attribute" 84 associated with point C is frequency "f3" 84. For point D, one "attribute" 86 associated with point D is amplitude "a4" 86 and another "attribute" 88 associated with point D is frequency "f6" 88.

However, in FIG. 10, a seismic trace having an amplitude variation is also associated with the wellbore 62. That is, in FIG. 10, a seismic trace 72 having an amplitude variation 72a is also associated with the wellbore 62. The amplitude variation 72a has an amplitude "a2" and a frequency "f4". Therefore, for the wellbore 62, one "attribute" 90 associated with the wellbore 62 is amplitude "a2" 90 and another "attribute" 92 associated with the wellbore 62 is frequency "f4" 92. Actually, the attributes 90, 92 associated with the wellbore 62 are "synthesized". That is, the wellbore 62 in FIG. 10 will produce wellbore data similar to the well log output record 32 of FIG. 2; and, from that wellbore data, the seismic trace 72 in FIG. 10 is "synthesized"; and, from that seismic trace 72, the attribute 90 (amplitude "a2") and the attribute 92 (frequency "f4") are generated.

In FIG. 11, recall from FIG. 7 that points A through H on subsurface layer 54 have the following (x, y) coordinate values:

A (x1, y1) E(x5, y1)
B (x2, y2) F(x6, y2)
C (x3, y1) G(x7, y1)
D (x4, y2) H(x8, y2)

In FIG. 12, the subsurface layer 54 is again illustrated, the subsurface layer 54 including our example points A, B, C, D, E, F, G, and H.

Using the "method for determining at least one (1) pair of 'attributes' associated with each point (A through H) on the earth's subsurface layer 54" that was discussed above with reference to FIG. 10, let us now assume, for purposes of our example, that the "attributes" for point A on subsurface layer 54 are (f2, a6), where "f2" is a frequency and "a6" is an amplitude. Similarly, assume that the "attributes" for point B on subsurface layer 54 are (f5, a3).

Refer now to FIG. 12, and assume, for purposes of our example, that points A through H on the subsurface layer 54 in FIG. 12 have the following (x, y) "coordinates" and points A through H also have the following (f, a) "attributes", where "f" designates frequency and "a" designates amplitude:

| The point on subsurface layer 54 | (x, y) coordinates | (f, a) "attributes" |
|---|---|---|
| A | (x1, y1) | (f2, a6) |
| B | (x2, y2) | (f5, a3) |
| C | (x3, y1) | (f3, a5) |
| D | (x4, y2) | (f6, a4) |
| E | (x5, y1) | (f1, a3) |
| F | (x6, y2) | (f5, a4) |
| G | (x7, y1) | (f4, a7) |
| H | (x8, y2) | (f3, a2) |

In FIG. 13, by using the (x, y) coordinates and the (f, a) "attributes" derived above with reference to FIG. 12, we can now determine the "Attribute Data Sets" 46 which were generated by the computer 44 of FIG. 6. In FIG. 13, one attribute data set 54a of the "attribute data sets" 46 of FIG. 6 would comprise the amplitude "attribute", and another attribute data set 54b of the "attribute data sets" 46 of FIG. 6 would comprise the frequency "attribute".

In FIG. 13, therefore, the one attribute data set 54a of the "attribute data sets" 46 comprised of the amplitude "attribute" would include the following data:

| The point on subsurface 54 | (x, y) coordinates | amplitude "attribute" |
|---|---|---|
| A | (x1, y1) | (a6) |
| B | (x2, y2) | (a3) |
| C | (x3, y1) | (a5) |
| D | (x4, y2) | (a4) |
| E | (x5, y1) | (a3) |
| F | (x6, y2) | (a4) |
| G | (x7, y1) | (a7) |
| H | (x8, y2) | (a2) |

In FIG. 13, another attribute data set 54b of the "attribute data sets" 46 comprised of the frequency "attribute" would include the following data:

| The point on subsurface 54 | (x, y) coordinates | frequency "attribute" |
|---|---|---|
| A | (x1, y1) | (f2) |
| B | (x2, y2) | (f5) |
| C | (x3, y1) | (f3) |
| D | (x4, y2) | (f6) |
| E | (x5, y1) | (f1) |
| F | (x6, y2) | (f5) |
| G | (x7, y1) | (f4) |
| H | (x8, y2) | (f3) |

Figure 14:
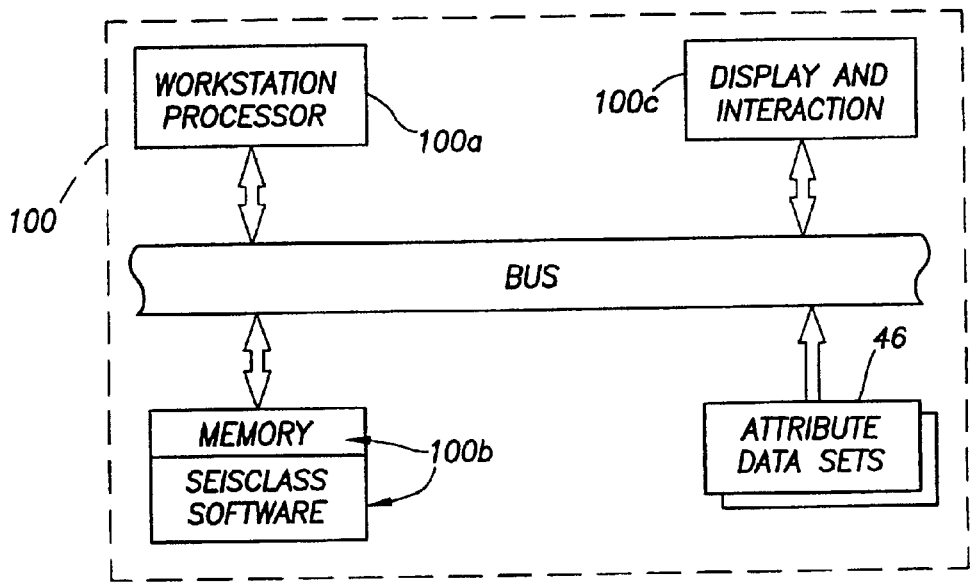
FIGS. 14 and 15 illustrate a workstation which stores the seisclass software of the present invention.
Figure 15:
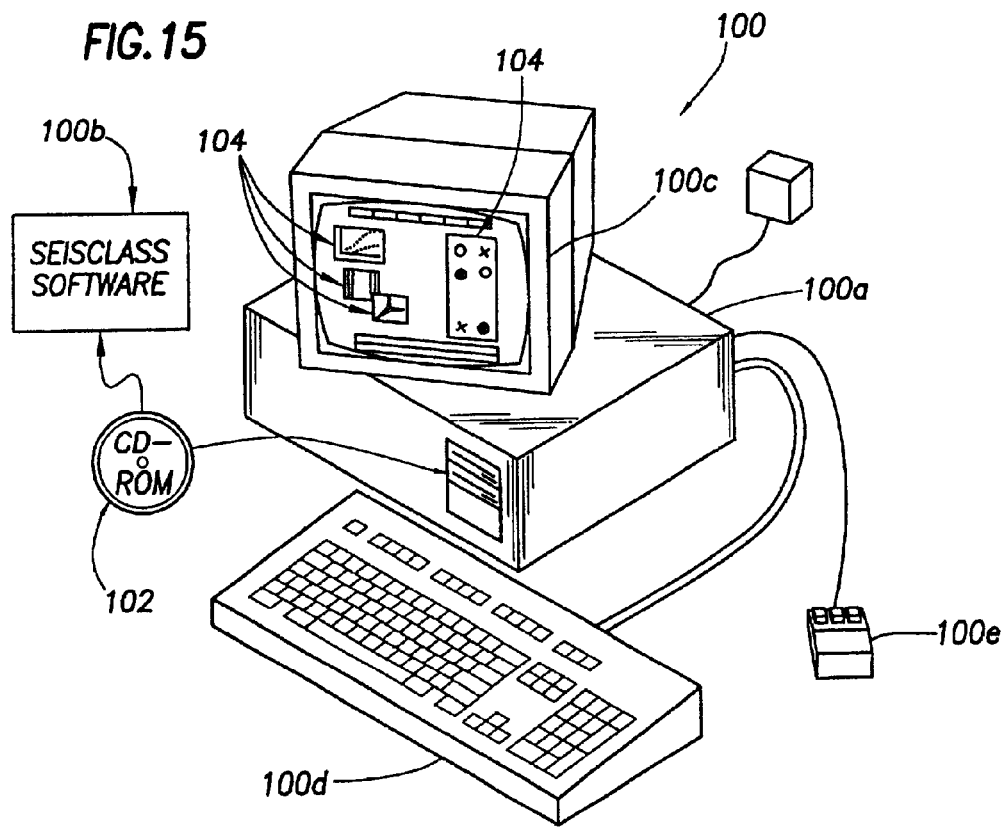

Referring to FIGS. 14 and 15, a computer workstation 100 is illustrated.

In FIG. 14, the workstation 100 includes a workstation processor 100a and a workstation memory 110b, the workstation processor 100a being connected to a system bus, and the workstation memory 100b being connected to the system bus. The Attribute Data Sets 46, generated by the computer 44 of FIG. 6 and illustrated in FIG. 13, are provided as "input data" to the workstation 100, and a workstation "Display and Interaction" 100c is visible to a workstation operator, the display 100c including one or more windows which are used by the operator for "interaction" purposes to manipulate subsequent operations. The workstation memory 100b stores a novel software package in accordance with the present invention, hereinafter known as the "Seisclass Software". When the Seisclass software 100b is executed by the workstation processor 100a, a variety of window displays are presented to the operator on the Display 100c, the window displays being used by the operator to execute and perform certain "interaction" functional operations which are designed for manipulating the functional operation of the seisclass software (those manipulations will be discussed later in this specification).

In FIG. 15, the workstation 100 includes a monitor/display 100c for performing the "interaction", a processor 100a which includes the memory 100b for storing the "seisclass software", a keyboard 110d, and a mouse 100e. A storage medium 102, usually a "CD-Rom" 102, initially stores the "seisclass software" 100b of the present invention. The CD-Rom 102 is inserted into the processor 100a of the workstation 100 in FIG. 15, and the "seisclass software", stored on the CD-Rom 102, is read from the CD-Rom 102 and is loaded into the workstation memory 100b. The monitor/display 100c in FIG. 15 is a cathode ray tube which is adapted for displaying a plurality of "window displays" 104 thereon that are used for "interaction" purposes. The word "interaction" implies an operator/window display interaction, whereby the operator would use the mouse 100e to place a cursor in a window display 104, click on the mouse 100e, and thereby perform the "interaction" involving the execution of a portion of the seisclass software 100b.

Figure 16:
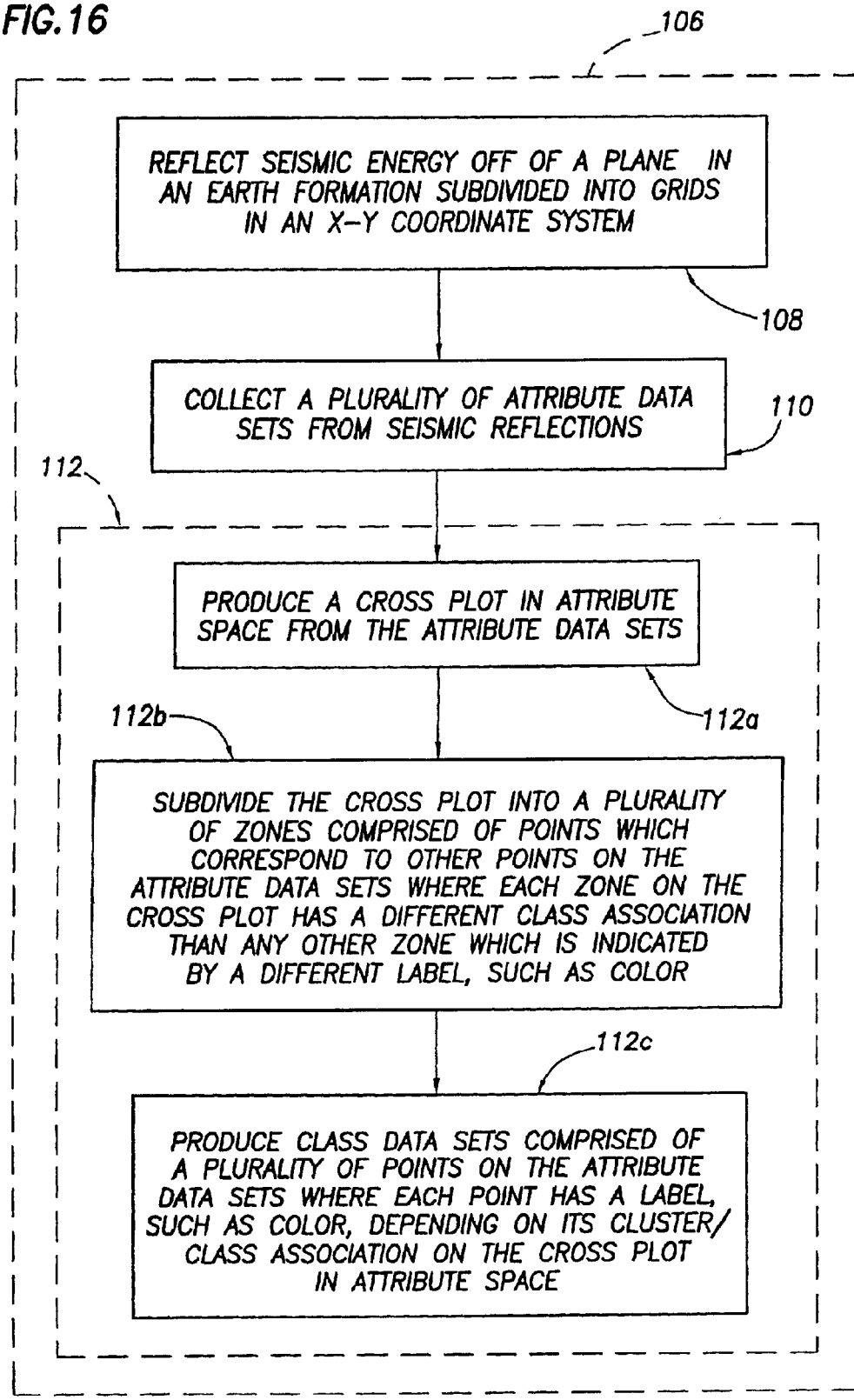
FIG. 16 illustrates a basic flowchart representing the overall functional operation of the present invention when the seisclass software of the present invention is executed.

Referring to FIG. 16, a flowchart 106 is presented which illustrates the functional operation performed by the seisclass software 100b when the seisclass software 100b is executed by the workstation processor 100a of FIG. 14. In FIG. 16, the first two blocks 108 and 110 of the flowchart 106 have already been discussed: block 108 "Reflect Seismic Energy off of a Plane in the Earth Formation subdivided into grids in an x-y coordinate system" (FIGS. 7 through 10), and block 110 "Collect a Plurality of Attribute Data sets from Seismic Reflections" (FIGS. 11 through 13).

However, block 112 of the flowchart 106 in FIG. 16 illustrates the function performed by the workstation processor 100a when the "seisclass software" 100b of the present invention is executed by the workstation processor 100a of FIG. 14. Block 112 of flowchart 106 comprises the following steps:

(1) "Produce a cross plot in attribute space from the attribute data sets", sub-block 112a, (2) "Subdivide the cross plot into a plurality of zones comprised of points which correspond to other points on the attribute data sets where each zone on the cross plot has a different class association than any other zone which is indicated by a different label, such as color", sub-block 112b, and (3) "Produce a Class Data Set comprised of a plurality of points on the attribute data sets where each point has a label, such as color, depending on its cluster/class association on the cross plot in attribute space", sub-block 112c.

The "Class Data Set", otherwise called a "classified result", is displayed on the workstation "Display" 100c of FIG. 14 and 15.

Referring to FIG. 17 through 21, when the Seisclass software of the present invention (represented by block 112 of the flowchart 106 of FIG. 16) is executed by the workstation processor 100a of FIG. 14, a functional operation is performed by that workstation processor 100a. That functional operation is set forth in the following paragraphs with reference to FIGS. 17 through 21.

In FIG. 17, recall from the above discussion with reference to FIGS. 12 and 13 that the points A through H on the subsurface layer 54 have a set of (x, y) coordinates and a corresponding set of (f, a) "attributes". That set of (x, y) coordinates and that set of (f, a) "attributes" are duplicated again in FIG. 17.

In FIG. 18, let us now plot the (f, a) coordinates in an "amplitude"-"frequency" coordinate system, where "amplitude" is plotted on the y-axis and "frequency" is plotted on the x-axis. When the (f, a) "attribute" coordinates of FIG. 17 are plotted in an "amplitude"-"frequency" coordinate system, the result of that plot is shown in FIG. 18 as element numeral 114. The plot shown in FIG. 18 is hereinafter called a "cross plot in attribute space" or "cross plot 114". The (f, a) "attribute" coordinates of FIG. 17 were carefully selected to demonstrate the "clustering" now visible in the cross plot in attribute space illustrated in FIG. 18. In the cross plot 114 of FIG. 18, note that points A, G, E, and C are "clustered" together in a "cluster" 116, and points F, D, H, and B are separately "clustered" together in a "cluster" 118. Let us now assign a label, such as color, to the cluster 116, and assign a separate and different label, such as color, to the cluster 118. The use of color as a label in FIG. 18 is given by way of example only, since other kinds of labels other than color, such as numeric tags, might be more meaningful. The color "red" is assigned to the cluster 116 in the cross plot 114 of FIG. 18, and the color "green" is assigned to the cluster 118 in the cross plot 114. Therefore, the points A, G, E, and C have been assigned the color "red", and the points F, D, H, and B have been assigned the color "green".

In FIG. 19, an actual cross plot 114 is illustrated. Note the clusters 120, 122, 124, and 126 in attribute space.

From the above discussion, it is apparent that the points A through H on the subsurface layer 54 in the earth formation have the following (x, y) coordinates and the following labels (i.e., "colors" in our example):

TABLE 1

| Point | (x, y) coordinates | Color label |
|---|---|---|
| A | (x1, y1) | red |
| B | (x2, y2) | green |
| C | (x3, y1) | red |
| D | (x4, y2) | green |
| E | (x5, y1) | red |
| F | (x6, y2) | green |
| G | (x7, y1) | red |
| H | (x8, y2) | green |

In FIG. 20, let us now plot the points A through H on subsurface layer 54 in an (x, y) coordinate system, using the above referenced (x, y) coordinates set forth in the above table 1, and then assign to each plotted point the "color" label indicated in the above table 1. The result of that plot (hereinafter called a "Class Data Set" 130) is shown in FIG. 20.

Figure 21:
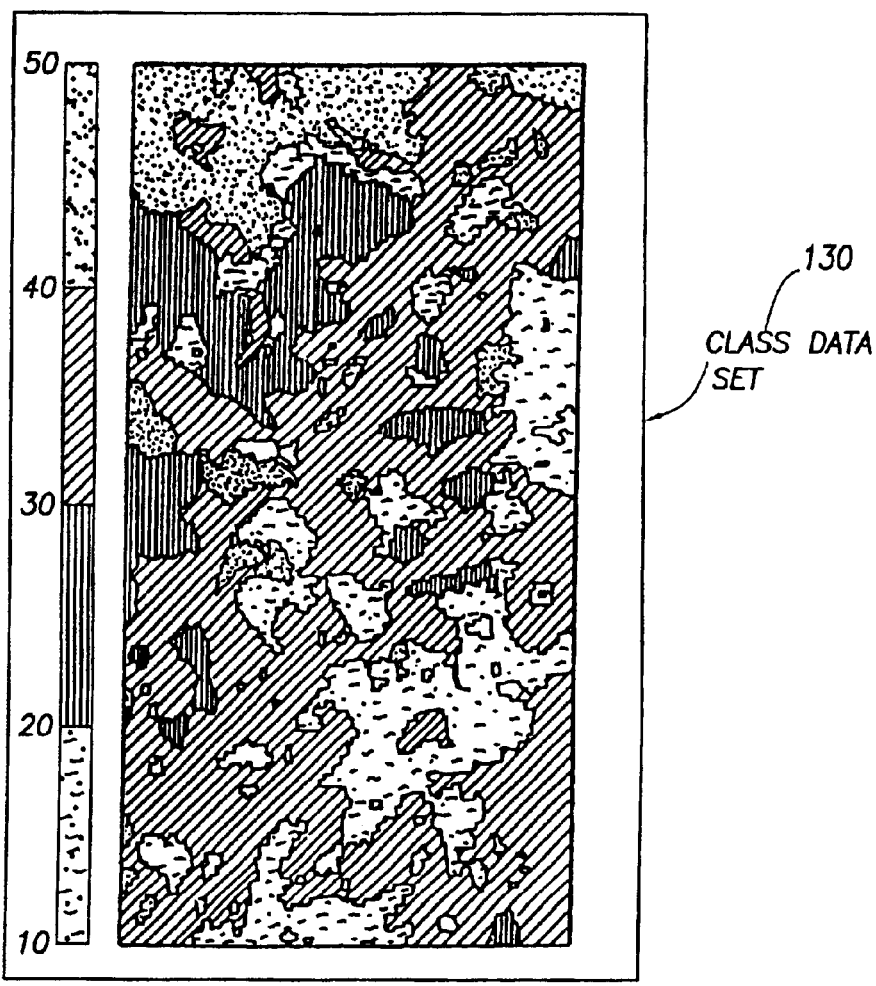

In FIG. 21, an actual "Class Data set" plot 130 is shown in FIG. 21 (actually, the actual Class Data Set plot would be illustrated in a plurality of different colors, but, for purposes of this specification, cross hatching is utilized). The "Class Data set" plot 130 of FIG. 21 is shown and displayed on the "Display" 100c of the workstation 100 of FIGS. 14 and 15. In addition, the "Class Data set" plot 130 of FIG. 21 can be recorded on a recorder that is connected to the system bus in of the workstation 100 of FIG. 14. The "Class Data set" 130 is also visible to an operator sitting at the workstation 100, the "Class Data set" being the end result that is produced in response to the execution of the "seisclass software" 100b of the present invention.

In the "Class Data set" plot of FIG. 21, different colors are indicated by a different shading (although, the real Class Data set will display colors and not shading). When the frequency and amplitude "attributes" associated with a "plurality of points" on the subsurface layer 54 of FIG. 7 are approximately the same, the labels, such as colors, associated with those "plurality of points" on the Class Data set 130 of FIG. 21 will also be the same.

On the other hand, when the frequency and amplitude "attributes" associated with a sound vibration reflecting from "first plurality of points" on the subsurface layer 54 are different from the frequency and amplitude "attributes" associated with a sound vibration reflecting from a "second plurality of points" on the subsurface layer 54 of FIG. 7, then the label, such as color, associated with that "first plurality of points" on the Class Data set 130 will be different from the label, such as color, associated with that "second plurality of points" on the Class Data set 130.

For example, if the "first plurality of points" reside on an area of the subsurface layer 54 which is "sand", and the "second plurality of points" also reside on an area of the subsurface layer 54 which is also "sand", then the frequency and amplitude "attributes" (as well as other such "attributes") associated with a sound vibration reflecting from the "first plurality of points" on the subsurface layer 54 will be the same as the frequency and amplitude "attributes" associated with a sound vibration reflecting from the "second plurality of points" on the subsurface layer 54 of FIG. 7. As a result, the color label associated with that "first plurality of points" on the Class Data set 130 will be the same as the color label associated with that "second plurality of points" on the Class Data set 130.

On the other hand, if the "first plurality of points" reside on an area of the subsurface layer 54 which is "sand", and the "second plurality of points" reside on an area of the subsurface layer 54 which is "brine" (i.e., not the same as 'sand'), then the frequency and amplitude "attributes" (as well as other such "attributes") associated with a sound vibration reflecting from the "first plurality of points" on the subsurface layer 54 will be different from the frequency and amplitude "attributes" associated with a sound vibration reflecting from the "second plurality of points" on the subsurface layer 54 of FIG. 7. As a result, the color label associated with that "first plurality of points" on the Class Data set 130 will be different from the color label associated with that "second plurality of points" on the Class Data set 130. Therefore, the different color labels visible on the Class Data set between a "first set of points" and a "second set of points" indicate that the set of characteristics (i.e., the amplitude, frequency, reflection intensity, etc) associated with the reflections of the sound vibrations from the "first set of points" on the subsurface layer 54 of FIG. 7 is different than the set of characteristics associated with the reflections of the sound vibrations from the "second set of points" on the subsurface layer 54 of FIG. 7.

When all the "set of characteristics" associated with all the points on the subsurface layer 54 of FIG. 7 are known, the operator sitting at workstation 100 of FIGS. 14 and 15 can study the resultant "Class Data set" 130 and, from that "Class Data set", the operator can more accurately determine the possibility of the existence of oil or other hydrocarbon bearing formations located adjacent or near that subsurface layer 54.

Figure 22:
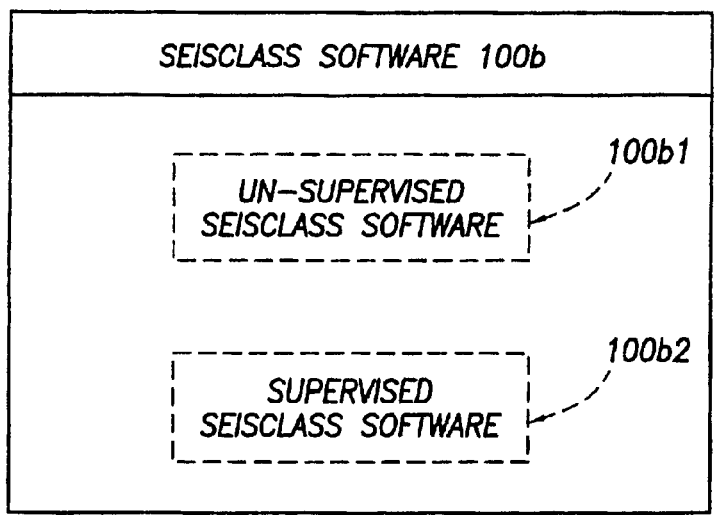
FIG. 22 illustrates a more detailed construction of the seisclass software of the present invention including an Unsupervised seisclass software and a Supervised seisclass software.

Referring to FIG. 22, the actual structure of the "seisclass software" 100b of FIG. 14 will be set forth in the following paragraphs with initial reference to FIG. 23. Before starting discussion of the structure of the "seisclass software" 100b, in FIG. 22, it should be noted that there are two types of "seisclass software" 100b: (1) an "Un-supervised" seisclass software 100b1, and (2) a "Supervised" seisclass software 100b2.

The "Un-supervised" seisclass software 100b1 is used when the "classes" of the data present within the "attribute data sets" 46 of FIG. 14 are not known, and the "supervised" seisclass software 100b2 is used when the "classes" of the data present within the "attribute data sets" 46 are known. The word "classes" means the class or category to which the data in the attribute data sets 46 belong. For example, the data may belong to one of the following classes: sand or shale or gas or fluid or oil or brine, etc. The classes will be discussed later in this specification.

Referring to FIGS. 23 through 29, the structure of the "Un-supervised" seisclass software 100b1 of FIG. 22 is illustrated.

Figure 23:
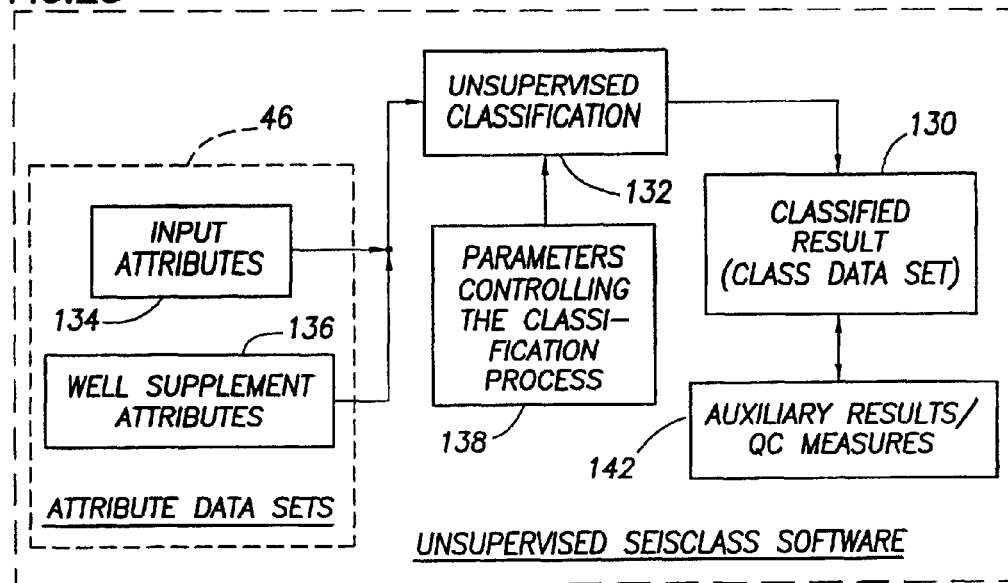
FIG. 23 illustrates a block diagram depicting the Unsupervised seisclass software of the present invention of FIG. 22.

In FIGS. 23 and 10, referring initially to FIG. 23, the Un-supervised seisclass software 100b1 comprises an "unsupervised classification" block of code 132 which is responsive to and receives three sets of input data: (1) input attributes 134, (2) well supplement attributes 136, and (3) parameters controlling the classification process 138. The input attributes 134 and the well supplement attributes 136 can best be understood by referring back to our simple example shown in FIG. 10. In FIG. 10, the input attributes 134 are the following: (1) the amplitude attribute "a6" 74 and the frequency attribute "f2" 76 for point A, (2) the amplitude attribute "a3 " 78 and the frequency attribute "f5" 80 for point B, (3) the amplitude attribute "a5 " 82 and the frequency attribute "f3" 84 for point C, and (4) the amplitude attribute "a4" 86 and the frequency attribute "f6" 88 for point D. On the other hand, in FIG. 10, the well supplement attributes 136 are the following: the amplitude attribute "a2" 90 and the frequency attribute "f4" 92 for the wellbore 62. Recall, from FIG. 10, that the wellbore seismic trace 72 is synthesized from the well log data obtained when the wellbore 62 is logged by a logging tool, as depicted in FIG. 2. Referring back to FIG. 23, the "parameters controlling the classification process" 138 refers to the parameters associated with the classification method in the "unsupervised classification" 132. Briefly, the seisclass software 100b offers a selection of classification methods, and each such method has its own particular "Parameters" which are closely related to the particular method. All parameters that are required by a classification method are defined in a "method/parameter catalogue". As noted below, when the "parameters" are selected, those "parameters" can control the classification process performed by the "unsupervised classification" 132. In addition, editing the "parameters" 138 will modify slightly the classification process performed by the "unsupervised classification" 132.

In FIG. 23, in response to the input attributes 134 and the well supplement attributes 136 and the parameters controlling the classification process 138, the unsupervised classification code 132 will produce a "classified result" 130, the "classified result" 130 being the aforementioned "Class Data set" 130. That is, in response to the input attributes 134 and the well supplement attributes 136 and the parameters controlling the classification process 138, the unsupervised classification code 132 will generate a cross plot in attribute space (similar to the cross plot 114 of FIG. 18) and then, responsive to the cross plot, the unsupervised classification code 132 will generate a "classified result" which is the Class Data set 130 (similar to the Class Data set 130 shown in FIGS. 20 and 21).

Figure 24:
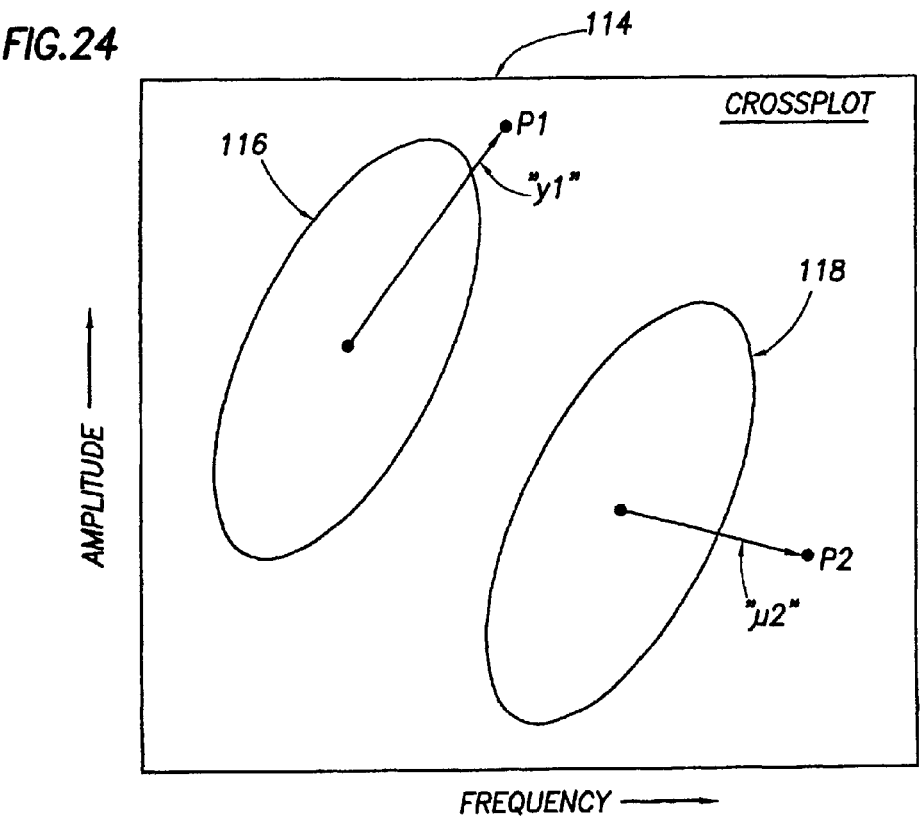
FIG. 24 illustrates the principles behind the "auxiliary results QC measures" code 142 of FIG. 23.

In FIG. 23, when the classified result 130 (the Class Data set 130) is produced, a quality control (QC) measure is implemented. After the class data set 130/classified result 130 is produced, the "Auxiliary Results/QC Measures" code 142 in FIG. 22 will help to assess the quality of the classified result 130, that is, to determine the degree of accuracy of the information set forth in the Class Data set 130 or classified result 140. Refer now to FIG. 24 to understand how the "Auxiliary Results/QC Measures" code 142 performs this function.

In FIG. 24, the cross plot 114 of FIG. 18 is illustrated again, showing the two clusters of data points 116 and 118. Note, however, that a point "P1" is associated with cluster 116 and point "P2" is associated with cluster 118, yet, points P1 and P2 are outside their respective clusters. That is, point P1 is outside its cluster 116 by a distance "y1" from the center of the cluster 116, and point P2 is outside its cluster 118 by distance "y2" from the center of the cluster 118.

When the "unsupervised classification" code 132 of FIG. 22 plots the cross plot in attribute space 114 in response to all of the input attributes 134 and the well supplement attributes 136 and the parameters controlling the classification process 138, the "Auxiliary Results/QC Measures" code 142 will notice that points P1 and P2 are outside their respective clusters 116 and 118 by distances "y1" and "y2 ". Since the distances "y1" and "y2" are quite large, the "Auxiliary Results/QC Measures" code 142 will assign a "lower confidence level" to the classification of points P1 and P2. As a result, in view of the aforementioned "lower confidence level" with regard to the classification of points P1 and P2, the "Auxiliary Results/QC Measures" code 142 in FIG. 23 has determined that the degree of accuracy of the information set forth in the classified result 130 (Class Data set 130) is less than previously expected.

Figure 25:
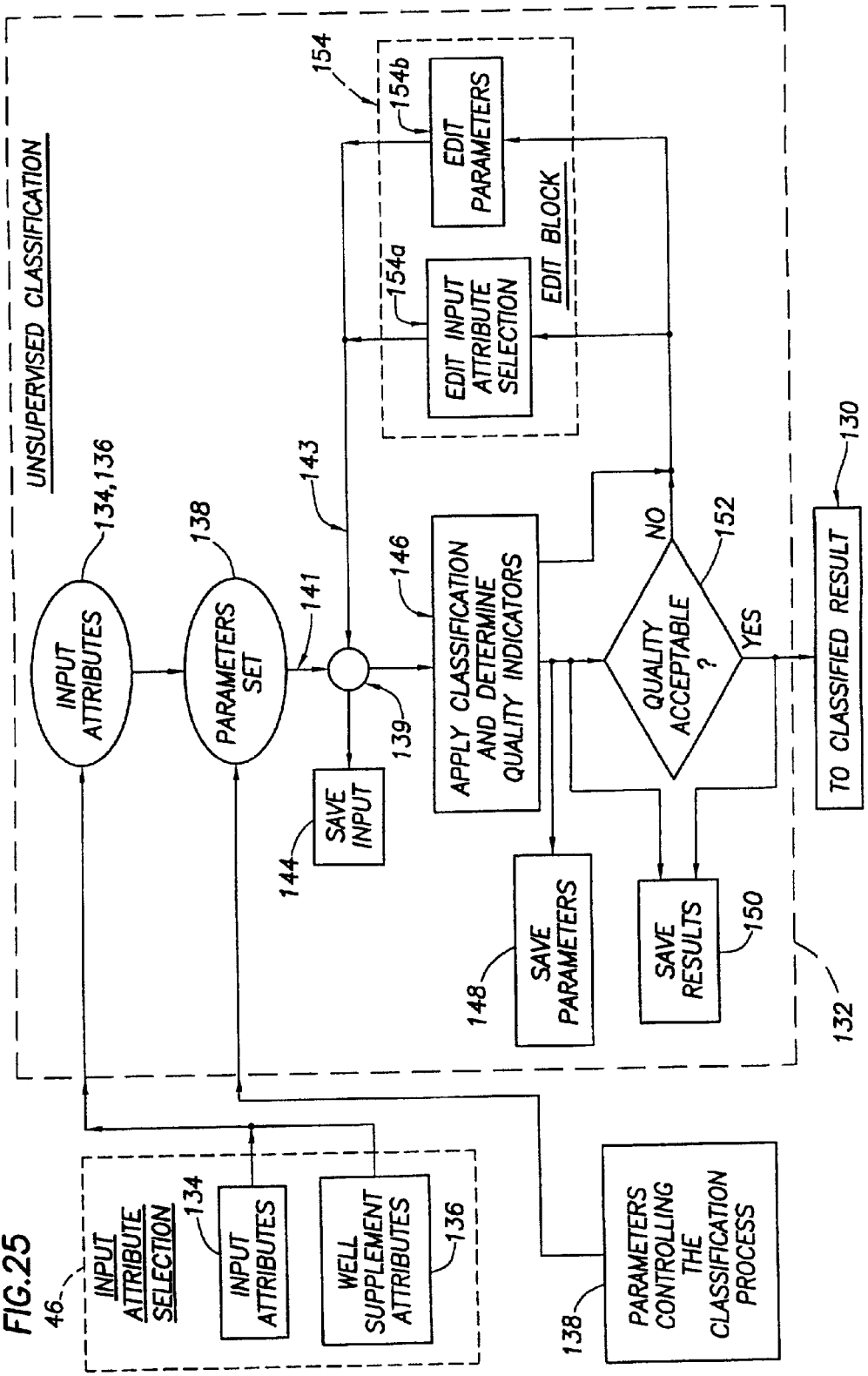
FIG. 25 illustrates a block diagram depicting the unsupervised classification code 132 of FIG. 23.

In FIG. 25, the structure and functional operation of the "unsupervised classification" code 132 of FIG. 23 is illustrated.

In FIG. 25, the "unsupervised classification" code 132 will receive the "input attribute selection", the input attribute selection including the "input attributes" 134 and the "well supplement attributes" 136. The "unsupervised classification" code 132 will also receive the "parameters controlling the classification process" 138 (the input attribute selection 134, 136 and the parameters controlling the classification process 138 being hereinafter collectively called "input"). Note, in FIG. 25, that the "parameter set" data block 138 is input to a summing element 139 via a first line 141; however, a second line 143 from an edit block 154 (discussed below) is also input to the summing element 139. The aforementioned "input" will be saved via the "save input" block 144 in FIG. 24 (i.e., the composition of the input attribute selection 134, 136 and the parameters 138 will be saved via the "save input" block 144 in order to re-run the classification to reproduce the results or to retain the composition as a reference for further tests using different components). In addition, that "input" will be received by the "apply classification and determine quality indicators" code 146 in FIG. 25 (see FIG. 26 for a construction of the "apply classification . . . " code 146). The "apply classification . . . " code 146 will then use the "parameters . . ." 138 to "apply the classification". That is, the "apply classification . . ." code 146 will use the "parameters . . ." 138 to produce a "cross plot in attribute space". In that cross plot, the "input attributes" 134 and the "well supplement attributes" 136 will be clustered in the same manner as discussed above with reference to FIG. 18 when the cross plot 114 in attribute space having clusters 116 and 118 were produced. When the "apply classification . . ." code 146 completes its function of producing the "cross plot in attribute space", the "parameters . . ." 138 are saved, via the "save parameters" block 148, and the resultant "cross plot in attribute space" is also saved, via the "save results" block 150. Next, the "unsupervised classification" code 132 asks, via the "quality acceptable?" block 152 in FIG. 24, whether the "cross plot in attribute space", produced by the "apply classification . . ." code 146, is acceptable from a quality standpoint. If the quality of the "cross plot in attribute space" is not acceptable when the "quality acceptable" code 152 is executed, the unsupervised classification code 132 is directed to the "edit block" 154 in FIG. 24. In the edit block 154, two methods of "editing" are implemented: (1) "edit input attribute selection" 154a (wherein the "input attribute selection" 134, 136 are edited/changed), and (2) "edit parameters" 154b (wherein the parameters controlling the classification process 138 are edited/changed). Following the editing-performed bye edit block 154, the "apply classification . . ." code 146 will use the edited/changed input attributes 134 and the edited/changed well supplement attributes 136 and the edited/changed parameters controlling the classification process 138 to re-apply the classification (i.e., to produce a "new cross plot in attribute space"). If the quality of the "new cross plot in attribute space" is acceptable (when the "quality acceptable" block 152 is executed), the "new cross plot in attribute space" is passed to the "classified result" 130 block of code in FIG. 22 where the Class Data set/classified result 130 will be plotted in response to the "new cross plot in attribute space".

Figure 26:
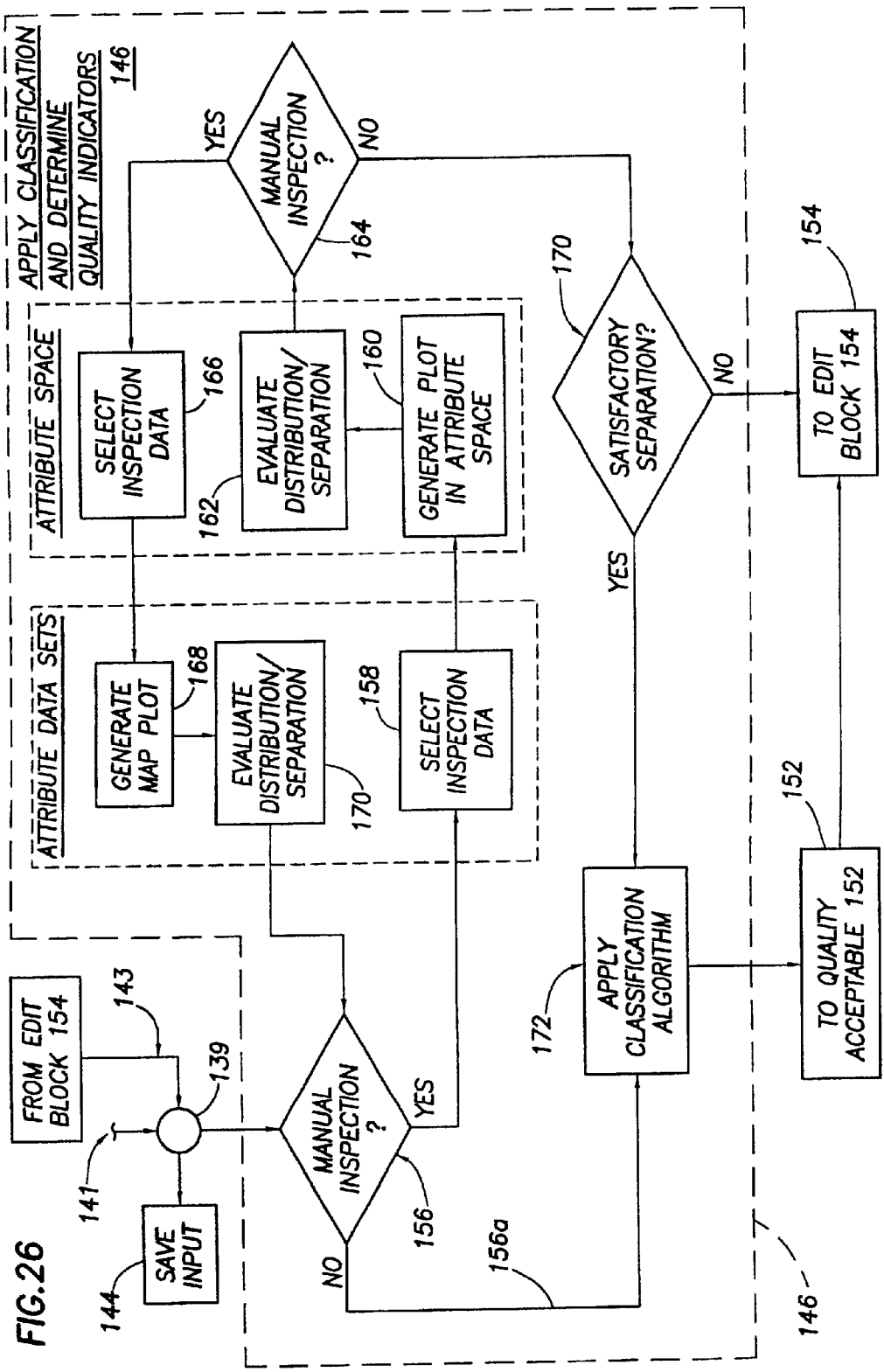
FIG. 26 illustrates a block diagram and description depicting the apply classification and determine quality indicators code 146 of FIG. 25.

In FIG. 26, the structure and functional operation of the "apply classification and determine quality indicators" code 146 of FIG. 25 is illustrated.

In FIG. 26, starting with the summing element 139, the input attributes 134, 136 (situated on the "attribute data sets" 54a and 54b of FIG. 13) and the parameters controlling the classification process 138 are input to the summing element 139 via a first line 141. An operator sitting at workstation 100 of FIG. 15 has an opportunity, at this point, to inspect the input attributes 134, 136 which are situated on their "attribute data sets" (of FIG. 13) relative to the "cross plot in attribute space" (of FIG. 18) which results from those input attributes by viewing the contents of the plurality of window displays 104 on the monitor of the workstation 100 of FIG. 15. If a manual inspection of the input attributes 134, 136 situated on the "attribute data sets" (of FIG. 13) relative to the resultant "cross plot in attribute space" (of FIG. 18) is necessary, the operator at the workstation 100 will indicate that such an inspection is necessary, thereby triggering the execution of the first "manual inspection" block 156 in FIG. 26 (note that there are two "manual inspection" blocks in FIG. 26, a first "manual inspection" block 156, and a second "manual inspection" block 164). Assume that the operator indicated that a manual inspection of the input attributes 134, 136 on their "attribute data sets" (of FIG. 13) relative to the resultant "cross plot in attribute space" (of FIG. 18) is necessary and that, as a result, the "yes" output from the first "manual inspection" block 156 in FIG. 25 is generated.

Figure 27:
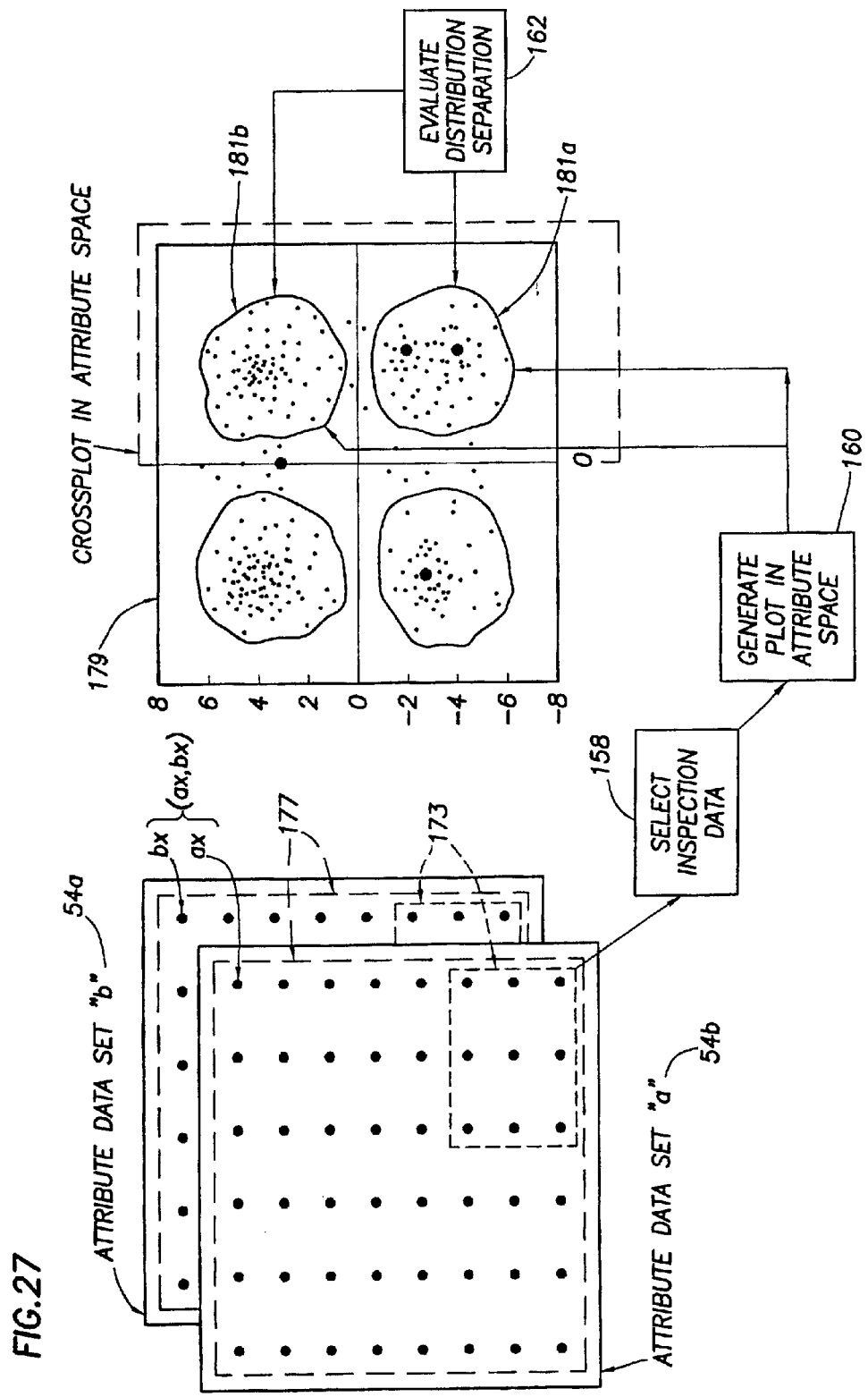
FIG. 27 illustrates the functional operation of blocks 158, 160, and 162 of FIG. 26.

In FIGS. 26 and 27, if the "yes" output from the first "manual inspection" block 156 of FIG. 26 is generated, the following portions of the "apply classification . . ." code 146 in FIG. 26 will be executed:

(Step 1) "select inspection data" 158 (FIG. 26),
(Step 2) "generate plot in attribute space" 160 (FIG. 26), and
(Step 3) "evaluate distribution/separation" 162 (FIG. 26).

In FIG. 27, inspection data 173 is selected (block 158 in FIG. 26). The inspection data 173 of FIG. 27 are comprised of a plurality of input attributes $(a_x, b_x)$ [such as the amplitude and frequency attributes "(f, a)" of FIG. 12] that are a subset of a larger plurality of input attributes 177 on the attribute data set "a"/attribute data set "b" of FIG. 27.

In response to the larger plurality of input attributes 177 on the attribute data sets "a" and "b", a "cross plot in attribute space" 179 is generated in FIG. 27 and, in our example, four clusters are formed in the "cross plot in attribute space" of FIG. 27.

However, in FIG. 27, the inspection data 173 on the attribute data set "a" and the attribute data set "b" in FIG. 27 [including a plurality of the input attributes $(a_x, b_x)$] are selected (block 158 in FIG. 26), and a "cross plot in attribute space" 181a and 181b in FIG. 27 is generated from that inspection data 173 (block 160 in FIG. 25). The distribution-separation of that "cross plot in attribute space" 181a, 181b of FIG. 27 is evaluated (block 162 of FIG. 25).

Figure 28:
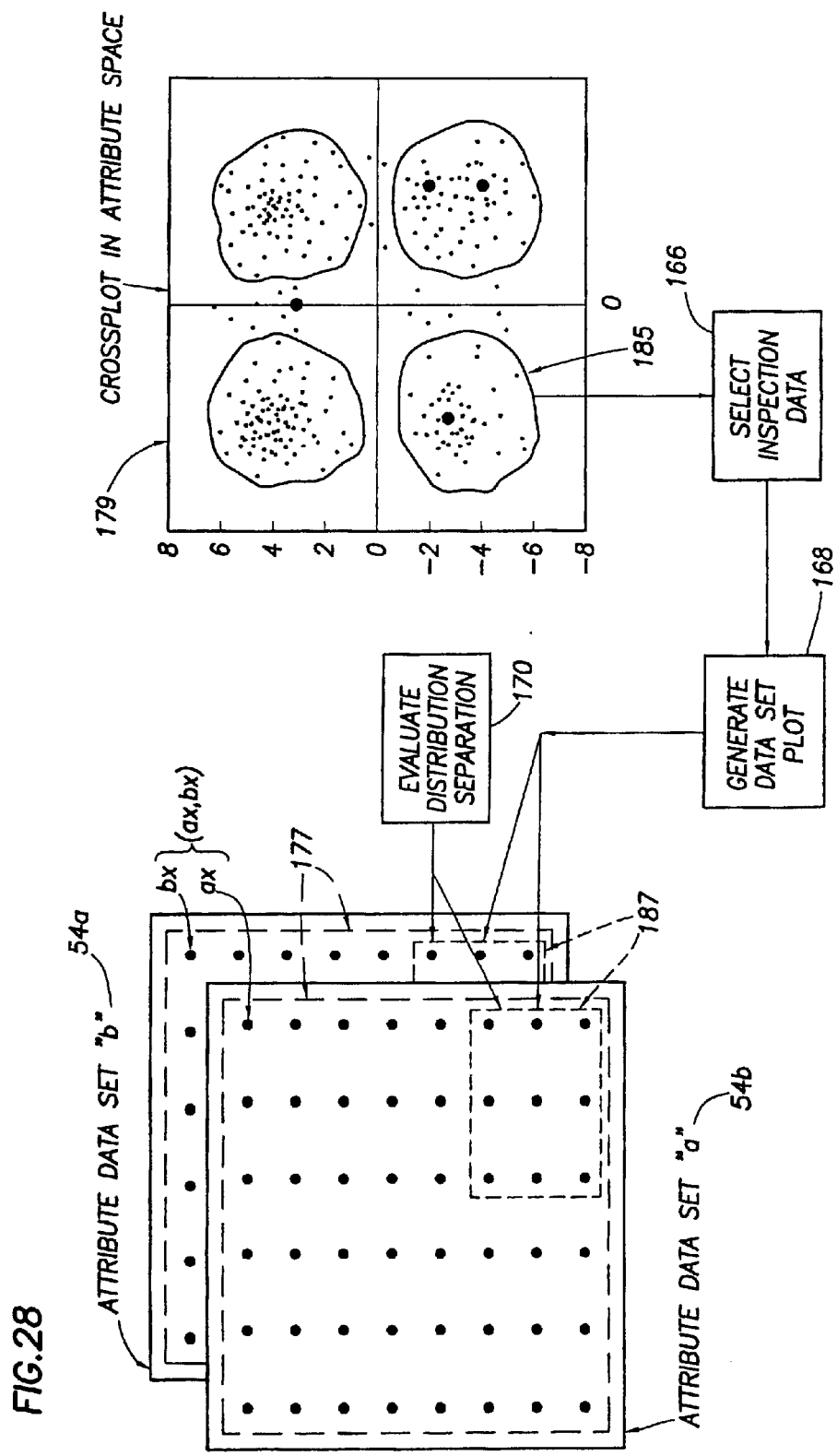
FIG. 28 illustrates the functional operation of blocks 166, 168, and 170 of FIG. 26.

In FIG. 26 and 28, if an additional manual inspection of the "cross plot in attribute space" 179 of FIG. 27 relative to the corresponding distribution of the $(a_x, b_x)$ input attributes on the "attribute data sets" is required, a "yes" output is generated from the second "manual inspection" block 164 in FIG. 26. As a result, the following additional portions of the "apply classification . . ." code 146 in FIG. 26 will be executed:

(Step 4) "select inspection data" 166 (FIG. 26),
(Step 5) "generate data set plot" 168 (i.e., the "attribute data set" 54a, 54b), and
(Step 6) "evaluate distribution separation" 170 (on the "attribute data set").

In FIG. 28, when the "cross plot in attribute space" 179 is generated from the larger plurality of input attributes 177 on the attribute data sets "a" and "b", additional "inspection data" 185 is selected from among some of the clustered points in the "cross plot in attribute space" 179 (block 166 of FIG. 26). Using that "inspection data" 185 on the "cross plot in attribute space" 179, another "attribute data set" plot 187 is generated from that inspection data 185 (block 168 of FIG. 26). The distribution-separation of the input attributes $(a_x, b_x)$ on said another "attribute data set" plot 187 in FIG. 28 is evaluated (block 170 of FIG. 26).

In FIG. 26, steps 1 through 3 above involve the clustering of "some" of the input attributes 134, 136 (called "inspection data") in attribute space, similar to the clustering of the attributes illustrated in FIG. 18, and evaluating the separation of the resultant clusters of the data to determine if such clustering is acceptable. It should be noted here that classification might still be viable even if the cluster separation is poor. The results might be less valuable, but those results might still be useful. Steps 4 through 6 involve the selection of some of the points within a cluster or between clusters in attribute space (further inspection data), the generation of an "attribute data set" plot from that further inspection data, and the evaluation of the distribution of the input attributes on the resultant "attribute data set" plot.

The assessment of the resultant "attribute data set" is done in an interactive fashion; that is, the resulting "intermediate attribute data set" is inspected visually and it is compared with its corresponding "cross plot in attribute space". The pointer-position in the attribute data set (i.e., the data set domain) identifies and highlights the respective sample in the crossplot in attribute space. Similarly, points in the cross plot in attribute space can be used to highlight the corresponding points in the "attribute data set". After the inspection, inherent in steps 1 through 6, is complete, the operator may draw different conclusions: (1) return to the input attribute selection step in order to de-select the attributes that do not contribute to class separation and/or to select other attributes that were not previously used, (2) try to improve the classification result by manipulation of the parameters 138 (the type of parameter and its effect depends on the classification method being used), and/or (3) declare the classification "finished" and save the intermediate results or part of the intermediate results to storage.

When step 6 ("evaluate distribution separation" 170 of the resultant attribute data set) is complete, the operator at workstation 100 of FIGS. 14 and 15 will have another opportunity to indicate whether another "manual inspection" of the input attributes 134, 136 and the parameters 138, relative to its corresponding cross plot in attribute space, is necessary via the manual inspection block 156 in FIG. 26.

Assume now that another such manual inspection of the input attributes 134, 136, relative to the resultant cross plot in attribute space, is not necessary, and, as a result, a "no" output 156a is generated from the manual inspection block 156 in FIG. 26.

In FIG. 26, if a "no" output 156a is generated from the manual inspection block 156, the input attributes 134, 136 and the parameters 138 of FIG. 24 were "tested" by clustering "some" of the attributes 134, 136 (called "inspection data") in attribute space (similar to the attribute space 114 shown in FIG. 18), and determining if that "inspection data" clustered acceptably in attribute space (114 of FIG. 18). In addition, the input attributes 134, 136 were further tested by selecting some of the points within a cluster on the "cross plot in attribute space" (called "further inspection data"), generating a corresponding "attribute data set" (54a, 54b in FIG. 13) from that further inspection data, and evaluating the distribution of the attribute data on the resultant "attribute data set" relative to the further inspection data in the "cross plot in attribute space".

Alternatively, in FIG. 26, the operator could have tested the clustering of "some" of the attributes 134, 136 (the inspection data 158) in attribute space, determined if the attribute "inspection data" clustered in an acceptable fashion in attribute space (114), and then exited, at this point, via the "manual inspection" block 164 in FIG. 26 by answering "no" to the question "manual inspection?" 164. In that case, a "yes" answer to the question "satisfactory separation" 170 in FIG. 26 would be generated, indicating that the separation of the clusters in the "cross plot in attribute space" (114) were acceptable and satisfactory.

In FIG. 26, if a "no" output 156a is generated from the manual inspection block 156, then, the clusters in the "cross plot in attribute space" relative to the inspection data on an "attribute data set" are acceptable, the distribution on a resultant "attribute data set" relative to inspection data on the "cross plot in attribute space" are also acceptable, and, as a result, the classification algorithm 172 in FIG. 26 can now be applied (i.e., the block "apply classification algorithm" 172 block of code of FIG. 26 can now be executed).

Figure 29:
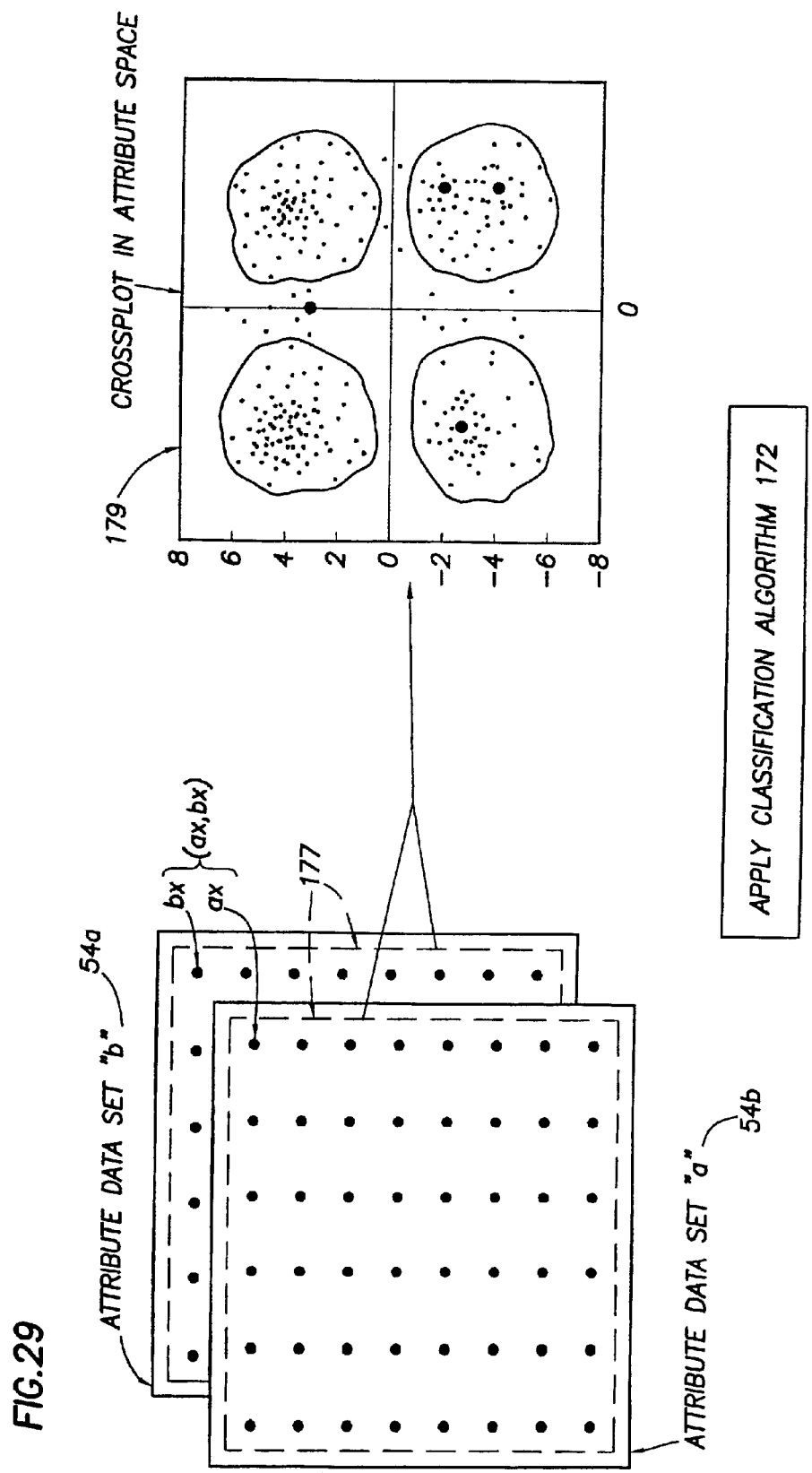
FIG. 29 illustrates the functional operation of block 172 of FIG. 26.

In FIG. 29, when the "apply classification algorithm 172 block of code of FIG. 26 is executed, while using the "parameters" 138 of FIG. 25, all of the plurality of input attributes ($a_x$, $b_x$) 177 of FIG. 29 (134, 136 of FIG. 25) on the "attribute data sets" of FIG. 29 will now be clustered in the "cross plot in attribute space" 179 of FIG. 29 (not just "some" of the input attributes which were previously called the "inspection data"). A different label, such as color, will now be assigned to each cluster in attribute space. In addition, after the different labels, such as colors, are assigned to the respective clusters in attribute space 179, a "final resultant class data set" 130 (i.e., the "Classified Result" 130 in FIG. 23) is generated, wherein each of the respective plurality of points on the "a"/"b" composite "attribute data set" (of FIG. 12) is colored with its respective color, that color being obtained from one of the clusters on the "cross plot in attribute space" 179 of FIG. 29.

The above discussion with reference to FIGS. 23 through 29 discussed the "Un-supervised" seisclass software 100b1 of FIG. 22. The following discussion with reference to FIGS. 30 through 43 will now discuss the "Supervised" seisclass software 100b2 of FIG. 22.

Recall that the "Un-supervised" seisclass software 100b of FIG. 22 is "used when the "classes" of the input attribute data on the attribute data sets 54a, 54b of FIG. 13, disposed within the attribute data sets 46 of FIG. 14, are not known. However, the "Supervised" seisclass software 100b2 of FIG. 22 is used when such "classes" are known (where the word "classes" means the class or category to which the data in the attribute data sets 46 belong).

Referring to FIGS. 30 through 43, the "Supervised" seisclass software 100b2 of FIG. 22 is discussed in the following paragraphs with reference to FIGS. 30 through 43.

Figure 30:
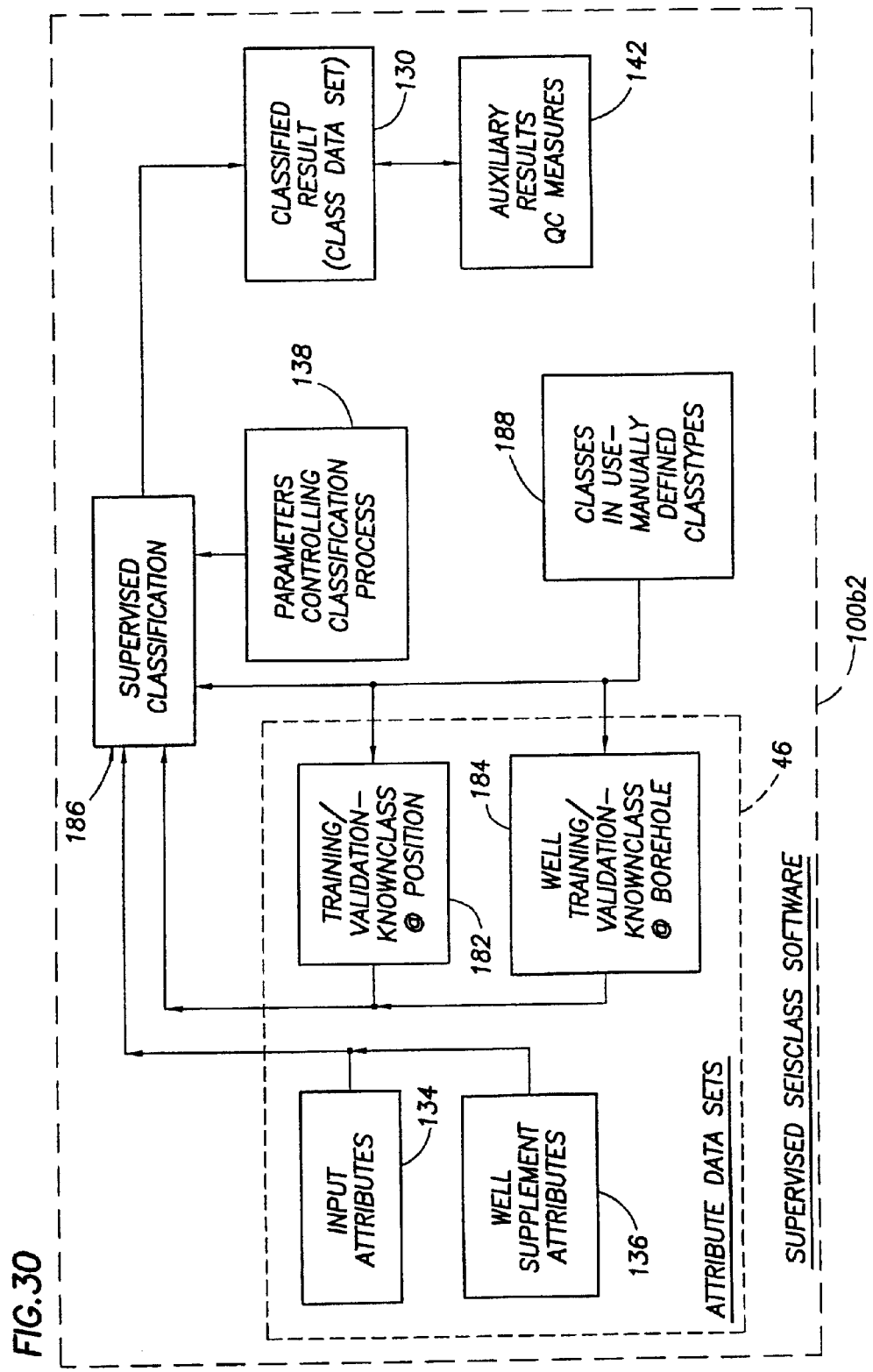
FIG. 30 illustrates illustrates a block diagram depicting the Supervised seisclass software of the present invention of FIG. 22.

In FIG. 30, the structure of the Supervised seisclass software 100b2 includes the following. A supervised classification block of code 186 will receive six (6) different blocks of input data: (1) the input attribute data 134, (2) the well supplement attribute data 136, (3) a group of attribute data known as "training/validation known class at position" 182, (4) another group of attribute data known as "well training/validation known class at borehole" 184, (5) the "parameters controlling the classification process" 138, and (6) the "classes in use—manually defined class types" 188. In response to the above six (6) blocks of data, the supervised classification code 186 will be executed, and a "cross plot in attribute space" will be generated. Different labels, such as colors, are assigned to each cluster in the "cross plot in attribute space". Then, the "classified result" 130 block of code will generate a class data set 130, similar to the class data set 130 shown in FIG. 21. The "auxiliary results QC measures" code 142 will be executed in an identical manner as described above with reference to FIG. 24.

Figure 31:
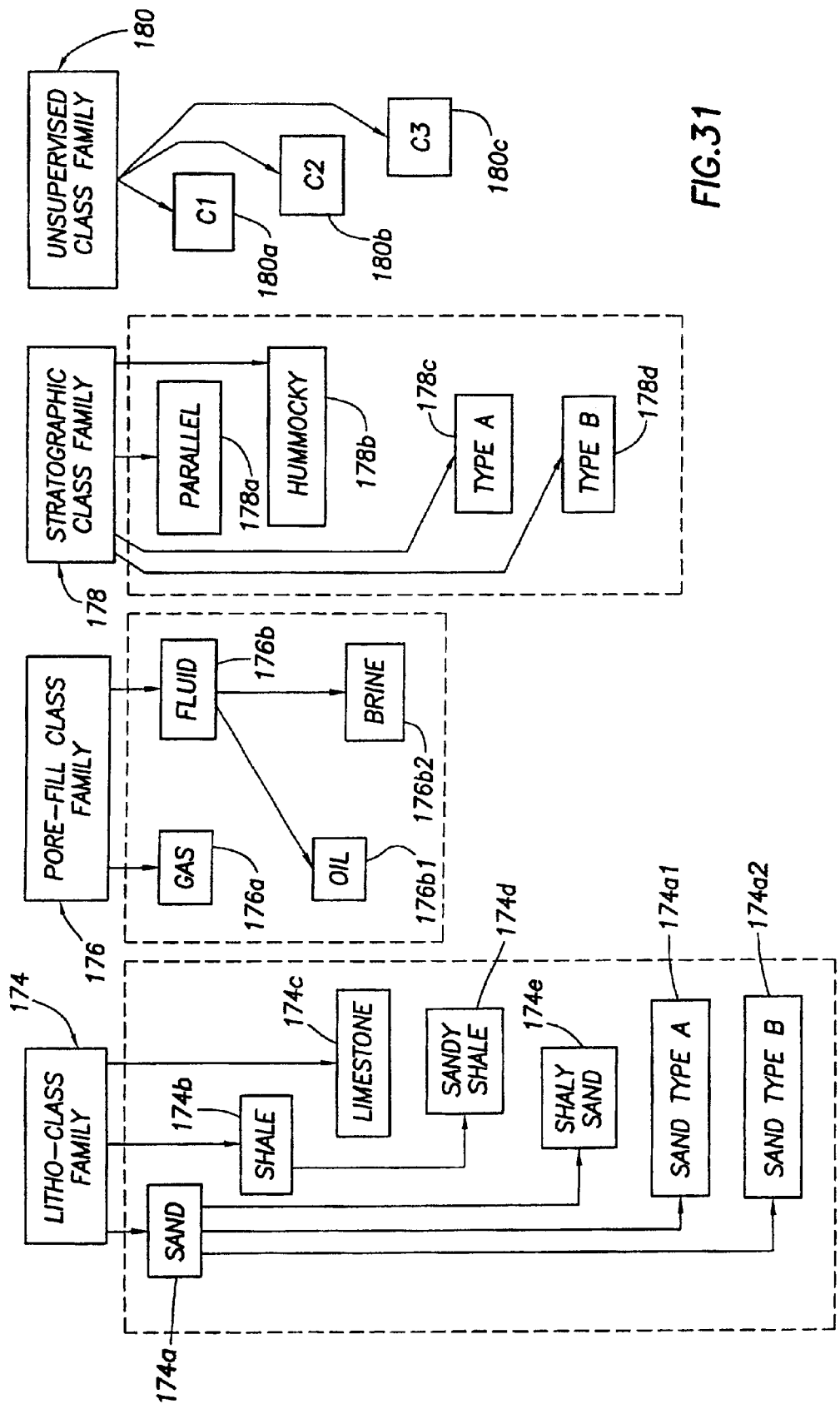
FIG. 31 illustrates the various classes which may be selected for the 'classes in use—manually defined class types' of FIG. 30.

In FIG. 31, the above referenced input data entitled "classes in use—manually defined class types" 188 of FIG. 30 will be defined and discussed below with reference to FIG. 31.

The input attribute data on the attribute data sets of FIG. 13 and in the attribute data sets" 46 of FIG. 14 include a plurality of "subsets" of data, and different ones of those "subsets" of data may belong to different "classes". Those different "classes" are illustrated in FIG. 31. The different "classes" of FIG. 31 are categories to which the attribute data in the attribute data sets 46 belong. Some of the attribute data in the attribute data sets 46 belong to one class or category, and other attribute data in the attribute data sets 46 belong to another class or category. In FIG. 31, there are four (4) such classes or categories illustrated: (1) the "litho-class family" 174, (2) the "pore-fill class family" 176, (3) the "stratographic class family" 178, and (4) the "unsupervised class family" 180. The litho-class family 174 includes: sand 174a, shale 174b, limestone 174c, sandy shale 174d, and shaly sand 174e, and the sand 174a further includes sand type "A" 174a1 and sand type "B" 174a2. The pore-fill class family 176 includes: gas 176a and fluid 176b, and the fluid 176b further includes oil 176b1 and brine 176b2. The stratigraphic class family 178 includes the following: parallel 178a, hummocky 178b, type A 178c, and type B 178d. The unsupervised class family 180 includes: C1 180a, C2 180b, and C3 180c (when attribute data in the attribute data sets are not known to belong to any particular class, the unsupervised class family 180 is selected by the operator).

The operator at workstation 100 of FIGS. 14 and 15 will view the "attribute data sets" 46 and he will attempt to categorize the individual input attribute data set forth within the "attribute data sets" 46 of FIG. 14 by grouping sub-sets of that data into the one or more of the classes illustrated in FIG. 31. That is, the operator defines a set of "classes" to be used in the classification, simultaneously requiring that the classes or its children be rep resented in the training and validation step to be discussed below. The selection, by the operator, of the "classes", into which the operator classifies the data, is an interpretative decision. In each specific setting, there should be a minimum justification for selecting a class, e.g., through evidence that the transition from "class A" to "class B" correlates with an observable change in attribute values that again have a physical explanation.

In FIG. 30, the structure of the "Supervised" seisclass software to 100b2 of FIG. 22 will again be discussed with reference to FIG. 30.

Recall that the Seisclass software 100b of FIGS. 14 and 22 includes two parts: the "Un-supervised" seisclass software 100b1, and the "Supervised" seisclass software 100b2. Compare FIG. 23 ("Unsupervised" seisclass software 100b1) with FIG. 30 ("supervised" seisclass software 100b2). In FIG. 30, a "supervised classification" block 186 receives certain "inputs", and, responsive thereto, a "classified result (class data set)" 130 is generated. The quality of the classified result 130 (i.e., the quality of the class data set 130) is checked via the "auxiliary results QC measures" block 142 in FIG. 30, as discussed above with reference to FIGS. 23 and 24. In FIG. 30, the "input attributes" 134 and the "well supplement attributes" 136 and the "parameters controlling the classification process" 138, discussed above with reference to FIG. 23, are also provided as "inputs" to the "supervised classification" block 186. However, in addition to the "input attributes" 134 and the "well supplement attributes" 136 and the "parameters controlling the classification process" 138, there are three additional "inputs" being provided to the "supervised classification" 186 block of FIG. 30: (1) "training/validation—known class at position" 182, (2) "well training/validation—known class at borehole" 184, and (3) "classes in use—manually defined class types" 188.

In FIG. 30, recall from FIG. 10 that the "input attributes" 134 represent, for example, the following amplitude and frequency attributes: (a6, f2) 74, 76, (a3, f5) 78, 80, (a5, f3) 82, 84, and (a4, f6) 86, 88. addition, the "well supplement attributes" 136 represent, for example, the following amplitude and frequency attribute: (a2, f4) 90, 92. Recall also, in connection with the "parameters controlling the classification process" 138, that the seisclass software 100b offers a selection of classification methods, and each such method has its own particular "parameters" which are closely related to the particular method. In addition, in FIG. 30, the "classes in Use—manually defined class types" 188 have already been discussed above with reference to FIG. 31 and include the following classes: the litho-class family 174, the pore fill class family 176, the stratigraphic class family 178, and the unsupervised class family 180.

However, in FIG. 30, in addition to the input data entitled "input attributes" 134 and "well supplement attributes" 136 and "parameters" 138 and "classes" 188, there are two other blocks of input data being provided as inputs to the supervised classification code 186 of FIG. 30: (1) "training/ validation—known class at position" block 182, and (2) swell "training/validation—known class at borehole" block 184.

In FIGS. 32 through 37, the input data in FIG. 30 entitled "training/validation—known class at position" 182 and "well training/validation—known class at borehole" 184 of FIG. 30 will be discussed below with reference to FIGS. 32 through 37.

In the following paragraphs, reference is made to the "a" attribute and the "b" attribute, or the attribute data set "a" or the attribute data set "b". The "a" attribute can, for example, be one of the "amplitude" attributes of the attribute data set 54a of FIG. 13, and the "b" attribute can, for example, be one of the "frequency" attributes of the attribute data set 54b of FIG. 13.

Figure 32:
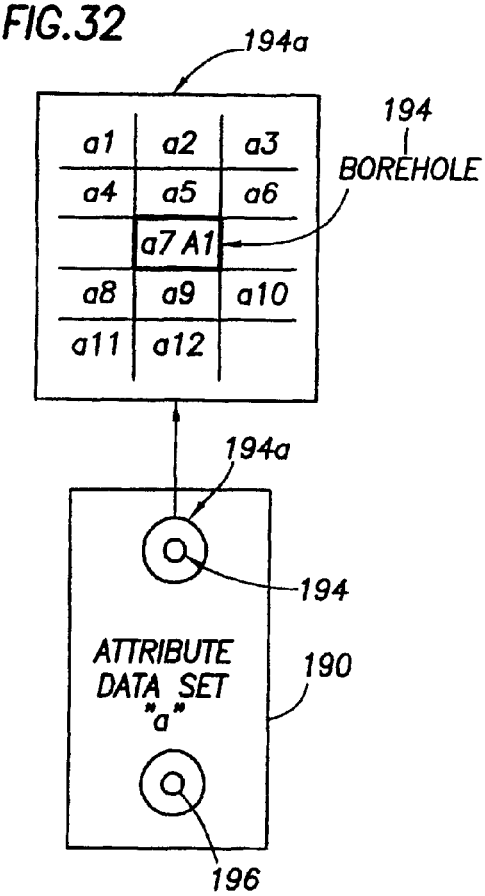
Figure 33:
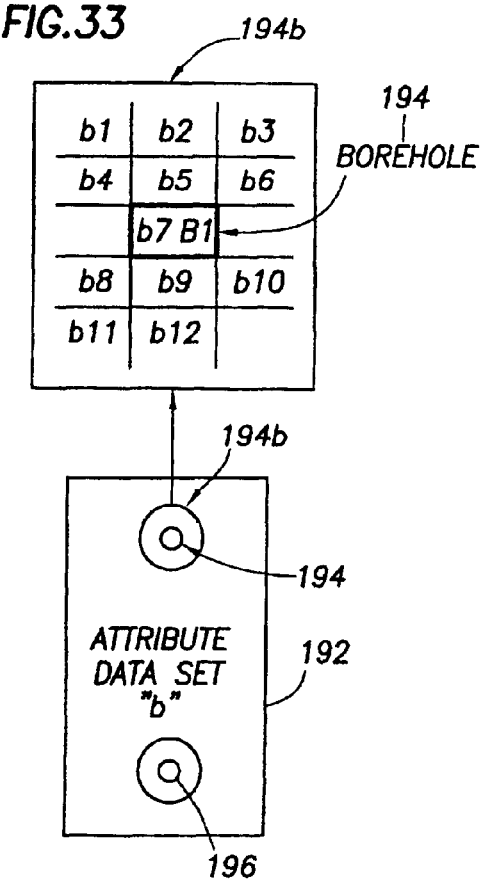

In FIGS. 32 and 33, an attribute data set "a" 190 and attribute data set "b" 192 have two boreholes 194 and 196 disposed through the attribute data sets. These boreholes 194,196 have been logged using the logging techniques discussed above with reference to FIG. 2 and therefore the "classes" 188 for both said boreholes 194, 196 have been determined. Let us assume, for purposes of this discussion, that the "class" 188 for borehole 194 is the same as the "class" 188 for borehole 196. The reason for this assumption will become apparent from the following discussion. The attribute data set "a" 190 contains "a" attributes, such as frequency "f", and the attribute data set "b" 192 contains "b" attributes, such as amplitude "a".

In FIG. 32, the "a" attributes located inside borehole 194 and located around the borehole 194 are illustrated. By way of definition, the "A1" attribute located inside the borehole 194 is labelled "borehole attribute" and the "a" attributes located inside and around the borehole 194 (located within an outer boundary 194a) are labelled "position attributes". In FIG. 32, therefore, the "a" "position" attributes located within the boundary 194a are as follows: a1, a2, a3, a4, a5, a6, a7, a8, a9, a10, a11, a12. On the other hand, in FIG. 32, the "a" "borehole" attribute located inside the borehole 194 itself is "A1". The "a" "position" attributes "a1" through "a12" including "a7" were obtained from the seismic operation illustrated in FIG. 1, whereas the "a" "borehole" attribute "A1" was obtained from the logging operation illustrated in FIG. 2.

In FIG. 33, the "b" attributes located inside borehole 194 and located around the borehole 194 are illustrated. By way of definition, the "B1" attribute located inside the borehole 194 is labelled a "borehole attribute" and the "b" attributes located inside and around the borehole 194 (located within an outer boundary 194b) are labelled "position attributes". In FIG. 33, therefore, the "b" "position" attributes located within the boundary 194b are as follows: b1, b2, b3, b4, b5, b6, b7, b8, b9, b10, b11, b12. On the other hand, in FIG. 33, the "b" "borehole" attribute located inside the borehole 194 itself is "B1". The "b" "position" attributes "b1" through "b12" including "b7" were obtained from the seismic operation illustrated in FIG. 1, whereas the "b" "borehole" attribute "B1" was obtained from the logging operation illustrated in FIG. 2.

Let us now declare the "a" and "b" attributes shown in FIGS. 32 and 33 to be "training data", short for "training attribute data". In FIG. 34, a table is illustrated which specifically identifies the "borehole training data" to be "(A1, B1)", where A1 and B1 are the "borehole" attributes, and specifically identifies the "position training data" to be (a1, b1), (a2, b2), (a3, b3), (a4, b4), (a5, b5), (a6, b6), (a7, b7), (a8, b8), (a9, b9), (a10, b10), (a11, b11), and (a12, b12), where (a1, b1) through (a12, b12) are "position" attributes.

In FIG. 35, the "a" attributes located inside borehole 196 and located around the borehole 196 are illustrated. By way of definition, the "A2" attribute located inside the borehole 196 is labelled "borehole attribute" and the "a" attributes located inside and around the borehole 196 (i.e., located within an outer boundary 196a) are labelled "position attributes". In FIG. 35, therefore, the "a" "position" attributes located within the boundary 196a are as follows: a13, a14, a15, a16, a17, a18, a19, a20, a21, a22, a23, a24. On the other hand, in FIG. 35, the "a" "borehole" attribute located inside the borehole 196 itself is "A2". The "a" "position" attributes "a13" through "a24" including "a19" were obtained from the seismic operation illustrated in FIG. 1, whereas the "a" "borehole". attribute "A1" was obtained from the logging operation illustrated in FIG. 2.

In FIG. 36, the "b" attributes located inside borehole 196 and located around the borehole 196 are illustrated. By way of definition, the "B2" attribute located inside the borehole 196 is labelled a "borehole attribute" and the "b" attributes located inside and around the borehole 196 (i.e., located within an outer boundary 196b) are labelled "position attributes". In FIG. 36, therefore, the "b" "position" attributes located within the boundary 196b are as follows: b13, b14, b15, b16, b17, b18, b19, b20, b21, b22, b23, b24. On the other hand, in FIG. 36, the "b" "borehole" attribute located inside the borehole 196 itself is "B2". The "b" "position" attributes "b13" through "b24" including "b19" were obtained from the seismic operation illustrated in FIG. 1, whereas the "b" "borehole" attribute "B2" was obtained from the logging operation FIG. 2.

Let us now declare the "a" and "b" attributes shown in FIGS. 35 and 36 to be "validation data", short for "validation attribute data".

In FIG. 37, a table is illustrated which specifically identifies the "borehole validation data" to be "(A2, B2)" and specifically identifies the "position validation data" to be (a13, b13), (a14, b14), (a15, b15), (a16, b16), (a17, b17), (a18, b18), (a19, b19), (a20, b20), (a21, b21), b22), (a23, b23), and (a24, b24).

In FIGS. 34 and 37, referring alternately to the tables of FIGS. 34 and 37, the "training/validation—known class at position" 182 of FIG. 30 would include the following attribute data: (a1, b1), (a2, b2), . . . , (a12, b12) for training, and (a13, b13), (a14, b14), . . . , (a24, b24) for validation. Similarly, the "well training/validation—known class at borehole" 184 of FIG. 30 would include the following attribute data: (A1, B1) for training and (A2, B2) for validation.

Figure 38:
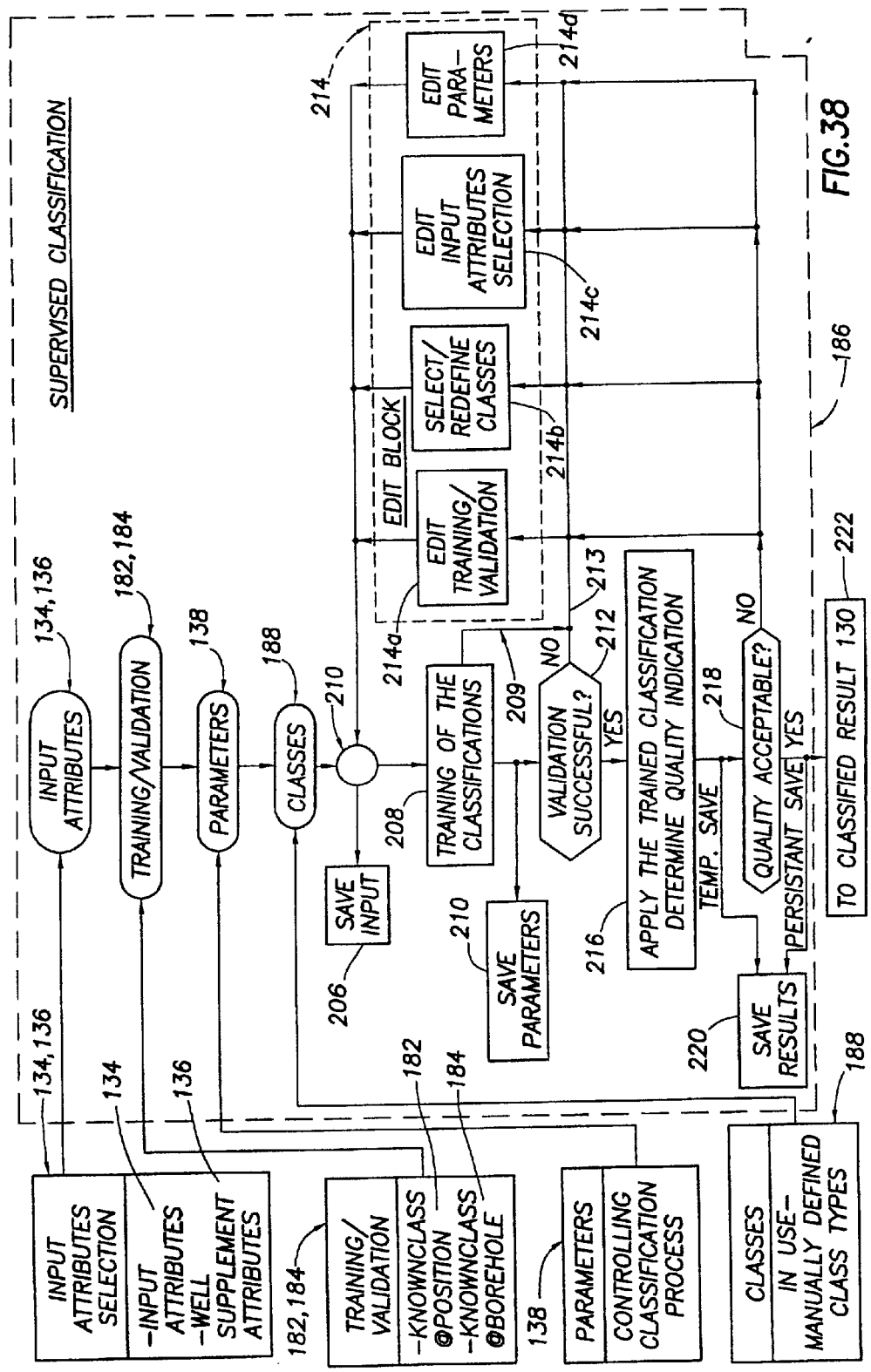
FIG. 38 illustrates a detailed construction of the supervised classification code 186 of FIG. 30.

Referring to FIG. 38, the structure of the "supervised classification" block 186 of FIG. 30 is illustrated.

In FIG. 38, the input data blocks, which are input to the "supervised classification" block 186 include the following: (1) "input attribute selection" 134, 136 consisting of the "input attributes" 134 and the "well supplement attributes" 136, (2) the "training/validation" 182, 184 consisting of the "training/validation—known class at position" 182 and the "well training/validation—known class at borehole" 184, (3) the "parameters controlling the classification process" 138, and (4) the "classes in use—manually defined class types" 188. Each of these input data blocks have been discussed in detail in the foregoing paragraphs of this specification.

In FIG. 38, in connection with the "classes" block 188, it is important to understand that the operator will attempt to determine into which "class" (of FIG. 31) each of the "input attributes" 134, 136 belong, and into which "class" (of FIG. 31) each of the "training/validation" attributes 182, 184 belong. When those "classes" for each of the "input attributes" 134, 136 and each of the "training/validation" attributes 182, 184 are determined, those "classes" will collectively comprise and constitute the "classes" block 188 in FIG. 38.

In FIG. 38, the input attributes selection 134, 136; and the training/validation 182, 184; and the parameters 138; and the classes 188 are each: (1) saved and stored, via the "save input" block 206 in FIG. 38, and (2) input to the "training of the classifications" block 208 via the element 210 in FIG. 38.

In FIG. 38, the "training of the classifications" block 208 is executed; the parameters 138 used during the execution of the "training of the classifications" 208 block of code are saved via the "save parameters" block 210; and the question "is validation successful?" is asked, via block 212. If the above referenced validation is not successful, a "no" output 213 is generated from the "validation successful" block 212 in FIG. 38, and the "edit block" 214 in FIG. 38 is executed. When the edit block 214 is executed, the operator can now change the "input data" and try again. In the edit block 214 of FIG. 38, the operator can either: (1) edit the "training/validation" 182, 184 via the "edit training/validation" block 214a, and/or (2) edit the "classes" 188 via the "select/redefine classes" block 214b, and/or (3) edit the "input attributes selection" 134, 136 via the "edit input attribute selections" block 214c, and/or (4) edit the "parameters" 138 via the "edit parameters" block 214d. In FIG. 38, if the operator will "edit training/validation" of block 214a, he will change and/or modify the "training/validation" attributes 182, 184 being input to the "training of the classifications" block 208. Alternatively, if the operator will "select/redefine classes" block 214b, he will change and/or modify the "classes" 188 which were originally selected by the operator. If the operator will "edit input attribute selection" block 214c, he will change and/or modify the "input attributes selection" 134, 136. If the operator will "edit parameters" block 214d, he will change and/or modify the "parameters" 138 in FIG. 38 which are input to the "training of the classifications" block 208. When the operator edits the training/validation or the classes or the input attributes or the parameters via the edit block 214 in FIG. 38, the "training of the classifications" block 208 is again re-executed as previously discussed, the parameters are re-saved via the "save parameters" block 210, and the following question is asked once again: "is validation successful" 212. If the validation is successful, the "apply the trained classification and determine quality indications", block 216 in FIG. 38, is executed. When the "apply the trained classification and determine quality indication" block 216 is executed, all of the input attribute data (including the training and validation attribute data) will be clustered in attribute space, in the same manner as illustrated in FIG. 18 of the drawings. The clustering in attribute space is studied to determine if "that clustering" is acceptable, via the "quality acceptable" block 218 in FIG. 38. The results achieved from "that clustering" are temporarily saved in the "save results" block 220. If the quality of "that clustering" is acceptable, the results from "that clustering" are permanently saved in the "save results" block 220, and the "classified result" 130 (i.e., the class data set 130 of FIG. 21) is generated, block 222 of FIG. 38 and block 130 of FIG. 30. If the quality of "that clustering" is not acceptable, a "no" output from the "quality acceptable" block 218 will be input to the "edit block" 214, wherein the training/validation attributes can be edited, 214a, and/or the classes can be redefined, 214b, and/or the input attribute selection can be edited, 214c, and/or the parameters can be edited, 214d, at which point, the "training of the classifications" block 208 and the "validations successful" blocks 212 can be re-executed in hopes of achieving an acceptable quality output from the "quality acceptable" block 218. The flowcharts of FIGS. 38 and 39 will be better understood following a reading of the remaining parts of this specification.

Figure 39:
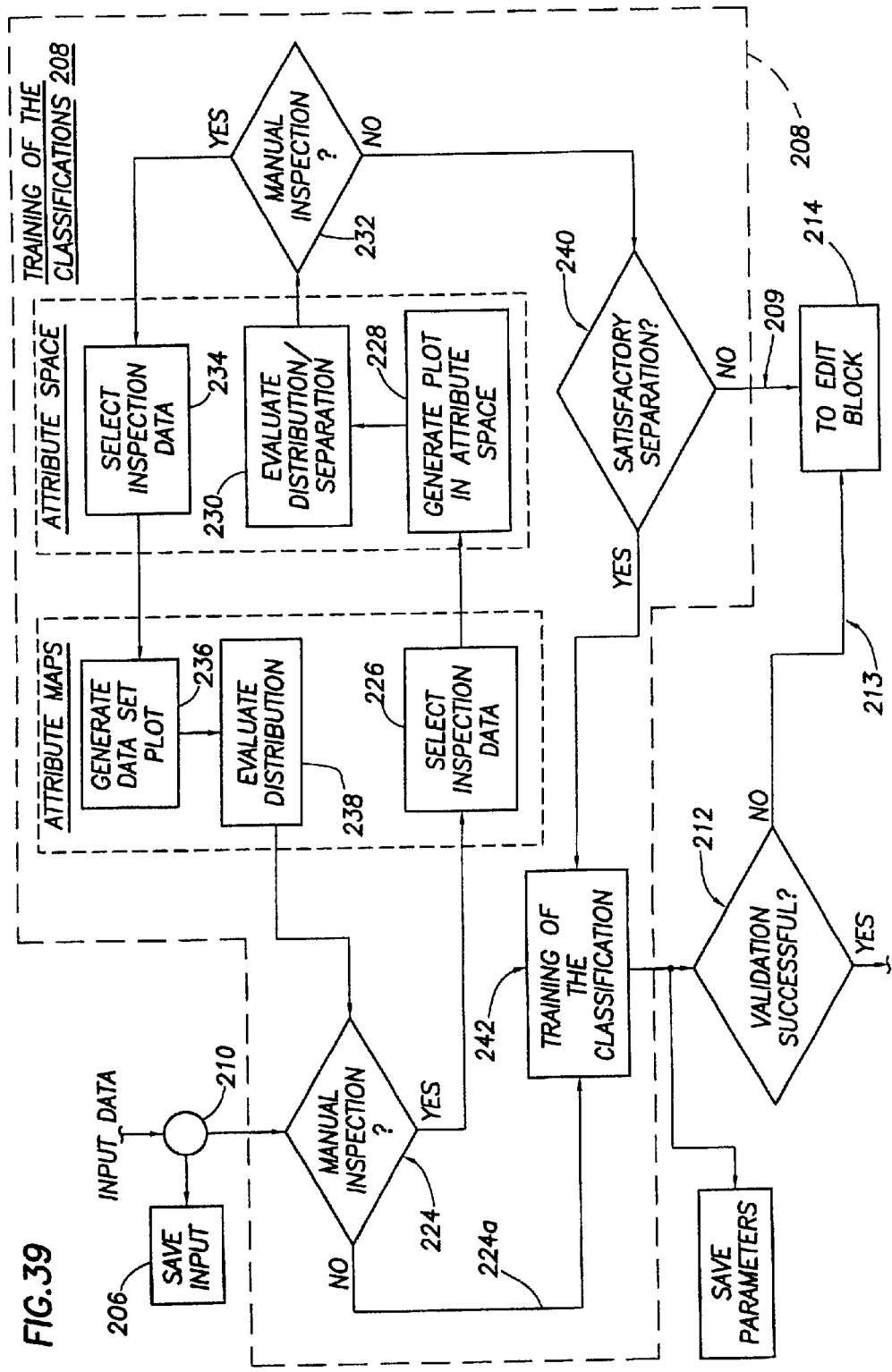
FIG. 39 illustrates a detailed construction of the "training of the classifications" code 208 of FIG. 38.

Referring to FIG. 39, the structure of the "training of the classifications" block of code 208 of FIG. 38 is illustrated.

In FIG. 39, starting with the element 210, the "input data" (which includes the input attributes 134, 136, the training/validation attribute data 182, 184, the parameters 138, and the classes 188) are input to the element 210. An operator sitting at workstation 100 of FIG. 15 has an opportunity, at this point, to inspect the input attributes 134, 136. If a manual inspection of the input attributes 134, 136 is necessary, the operator at the workstation 100 will indicate that such an inspection is necessary thereby triggering the execution of the first "manual inspection" block 224 in FIG. 39 (note that there are two "manual inspection" blocks in FIG. 39, a first "manual inspection" block 224, and a second "manual inspection" block 232). Assume that the operator indicated that a manual inspection of the input attributes 134, 136 is necessary and that, as a result, the "yes" output from the first "manual inspection" block 224 in FIG. 39 is generated. In FIG. 39, if the "yes" output from the first "manual inspection" block 224 of FIG. 39 is generated, the following portions of the "training of the classifications" code 208 in FIG. 39 will be executed:

(Step 1) "select inspection data" 226,
(Step 2) "generate plot in attribute space" 228, and
(Step 3) "evaluate distribution/separation" 230.

Figure 40:
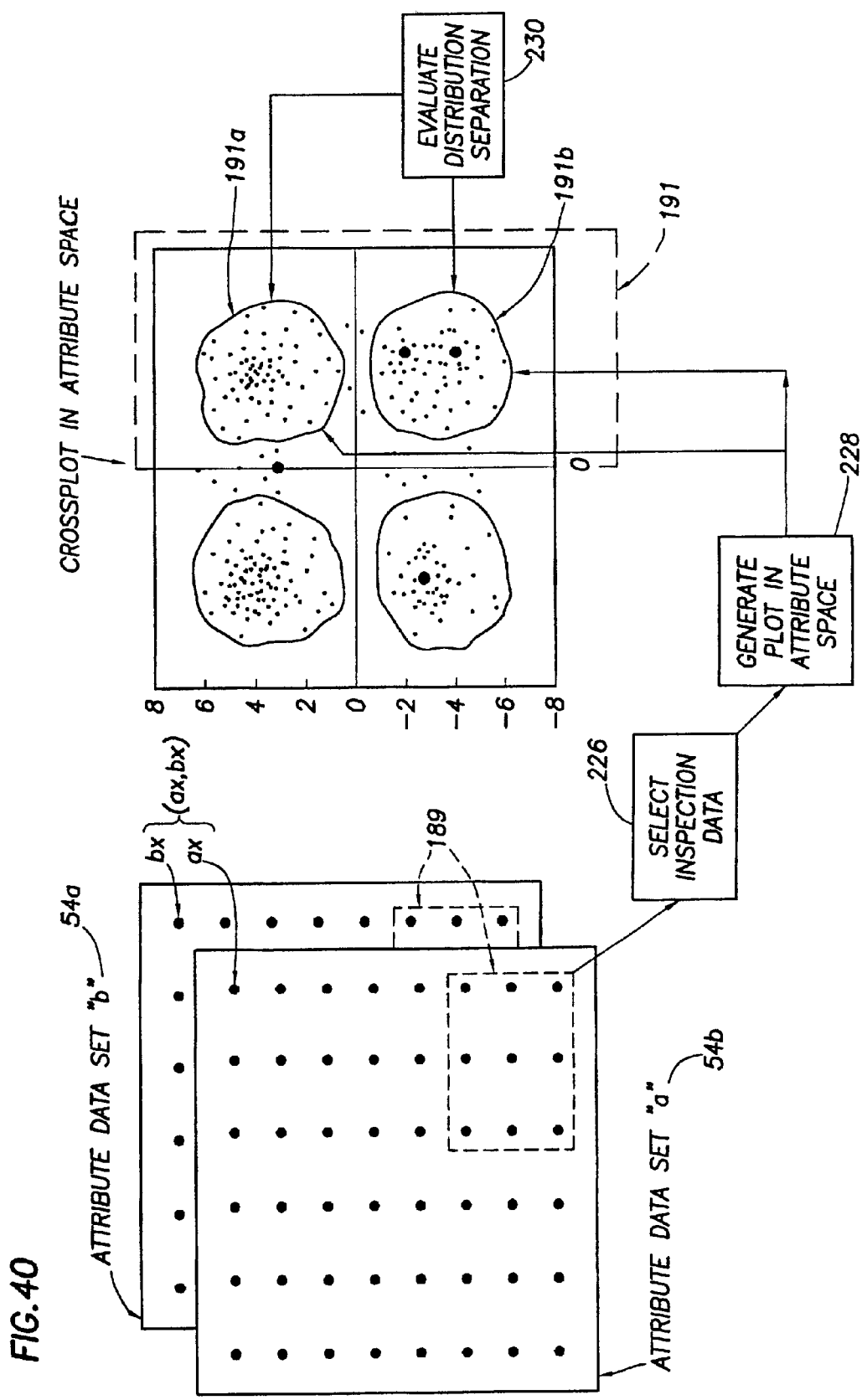
FIG. 40 illustrates the functional operation of blocks 226, 228, and 230 of FIG. 39.

In FIG. 40, during step 1, inspection data 189, consisting of a subset of the input attributes (ax, bx) on the attribute data sets 54a and 54, are selected from among all the other input attributes (ax, bx) on the attribute data sets 54a, 54b in FIG. 40 (block 226 of FIG. 39). During step 2, using that inspection data 189, a "cross plot in attribute space" 191 is generated in the same manner as discussed above with reference to FIG. 18 (block 228 of FIG. 39). During step 3, the distribution/separation of the two clusters 191a, 191b on the cross plot in attribute space 191 is evaluated (block 230 of FIG. 39).

In FIG. 39, if the "yes" output from the second "manual inspection" block 232 in FIG. 39 is generated, the following additional portions of the "training of the classifications" code 208 in FIG. 39 will be executed:

(Step 4) "select inspection data" 234,
(Step 5) "generate data set plot" 236, and
(Step 6) "evaluate distribution" 238

Figure 41:
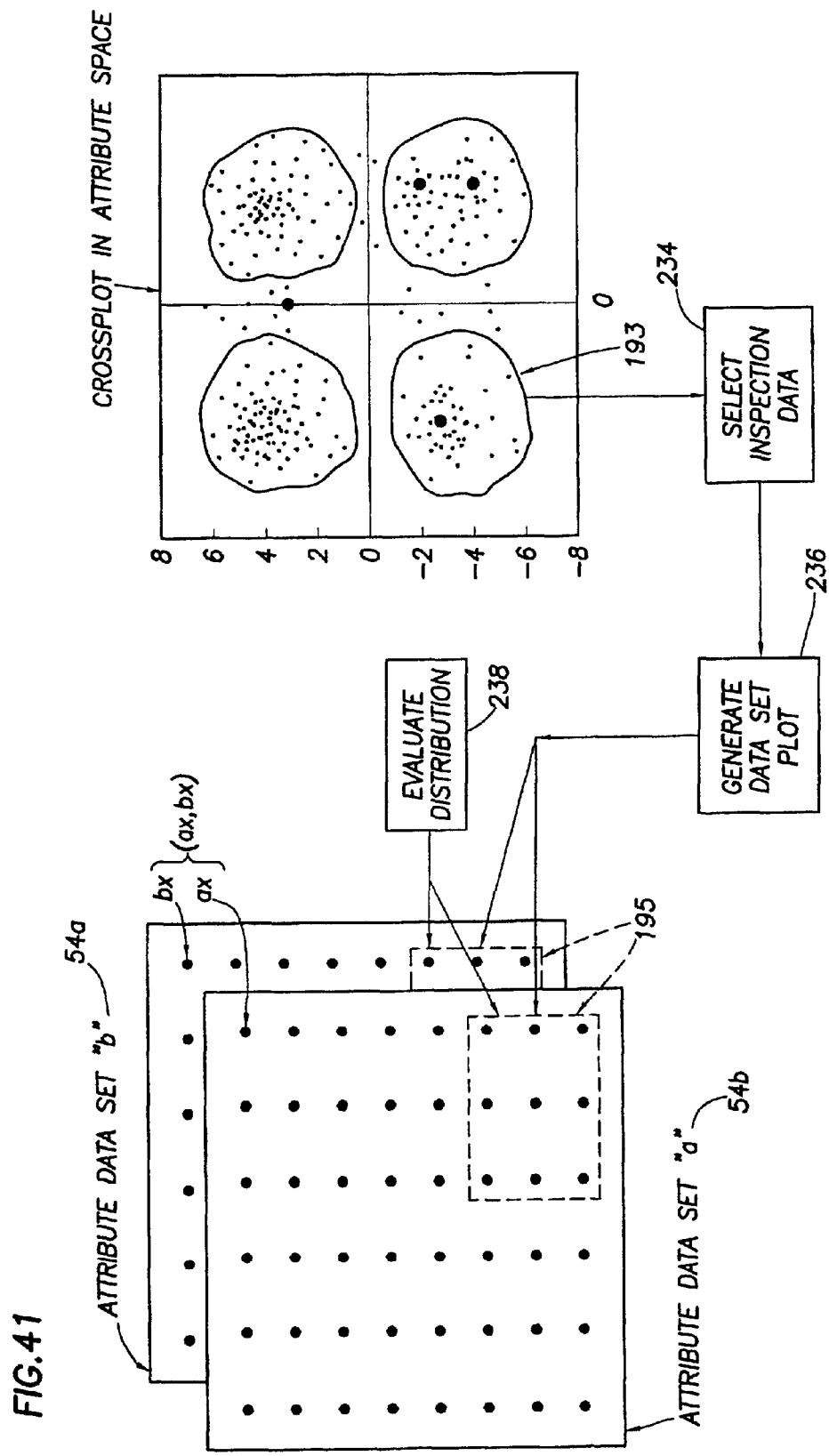
FIG. 41 illustrates the functional operation of block 234, 236, and 238 of FIG. 39.

In FIG. 41, during step 4, inspection data 193 is selected, the inspection data 193 consisting of a subset of the points on the "cross plot in attribute space". In our example in FIG. 41, a cluster 193 on the "cross plot in attribute space" has been selected to represent the inspection data 193 (block 234 of FIG. 39). During step 5, the inspection data 193 on the "cross plot in attribute space" of FIG. 41 is then used to generate a data set plot 195 on the attribute data sets 54a, 54b (block 236 of FIG. 39). During step 6, the distribution of the set of points on the data set plot 195 on the attribute data sets 54a, 54b is then evaluated (block 238 of FIG. 39).

In FIG. 39, when step 6 ("evaluate distribution" block 238 of FIG. 39) is complete, the operator at workstation 100 of FIGS. 14 and 15 will have another opportunity to indicate whether another "manual inspection" of the input attributes 134, 136 is necessary via the manual inspection block 224 in FIG. 39. Assume now that another such manual inspection of the input attributes 134, 136 is not necessary, and, as a result, a "no" output 224a is generated from the manual inspection block 224 in FIG. 39. In response to the "no" output 224a from the manual inspection block 224, the "training of the classification" code 242 in FIG. 39 is executed.

In FIGS. 39 and 30, when the "training of the classification" code 242 of FIG. 39 is executed, the attribute data stored under the label "training/validation—known class at position" 182 of FIG. 30 is first used to generate a "cross plot in attribute space".

In FIGS. 34 and 37, referring initially to FIG. 34, the "training-position attribute data" of FIG. 34 [(a1, b1), (a2, b2), . . . , and (a12, b12)] is first plotted in "attribute space" thereby generating a first set of points on the "cross plot in attribute space". We know, from our previous assumption, that the FIG. 31 class of the "training-position attribute data" of FIG. 34 is the same as the FIG. 31 class of the "validation-position attribute data" of FIG. 37. Therefore, the "validation-position attribute data" of FIG. 37 should cluster near or adjacent to the "training-position attribute data" of FIG. 34 on the "cross plot in attribute space". As a result, in FIG. 37, the "validation-position attribute data" of FIG. 37 [(a13, b13), (a14, b14), . . . , and (a24, b24)] is also plotted in "attribute space" alongside the "training-position attribute data" of FIG. 34 [(al, b1), (a2, b2), . . . , and (a12, b12)] thereby generating/plotting a second set of points on the same "cross plot in attribute space".

In FIGS. 39 and 30, when the "training of the classification" code 242 of FIG. 39 is further executed, the attribute data stored under the label "well training/validation—known class at borehole" 184 of FIG. 30 is then used to plot another set of points on the same "cross plot in attribute space".

In FIGS. 34 and 37, referring initially to FIG. 34, the "training-borehole attribute data" of FIG. 34 "(A1, B1)" is first plotted in the same "attribute space" thereby generating a third point on the same "cross plot in attribute space". We know, from our previous assumption, that the FIG. 31 class of the "training-borehole attribute data" of FIG. 34 is the same as the FIG. 31 class of the "validation-borehole attribute data" of FIG. 37. Therefore, the "validation-borehole attribute data" of FIG. 37 should cluster near or adjacent to the "training-borehole attribute data" of FIG. 34 on the same "cross plot in attribute space". As a result, in FIG. 37, the "validation-borehole attribute data" of FIG. 37 "(A2, B2)" is also plotted in "attribute space" alongside the "training-borehole attribute data" of FIG. 34 "(A1, B1)" thereby generating/plotting a second point on the same "cross plot in attribute space".

Figure 42:
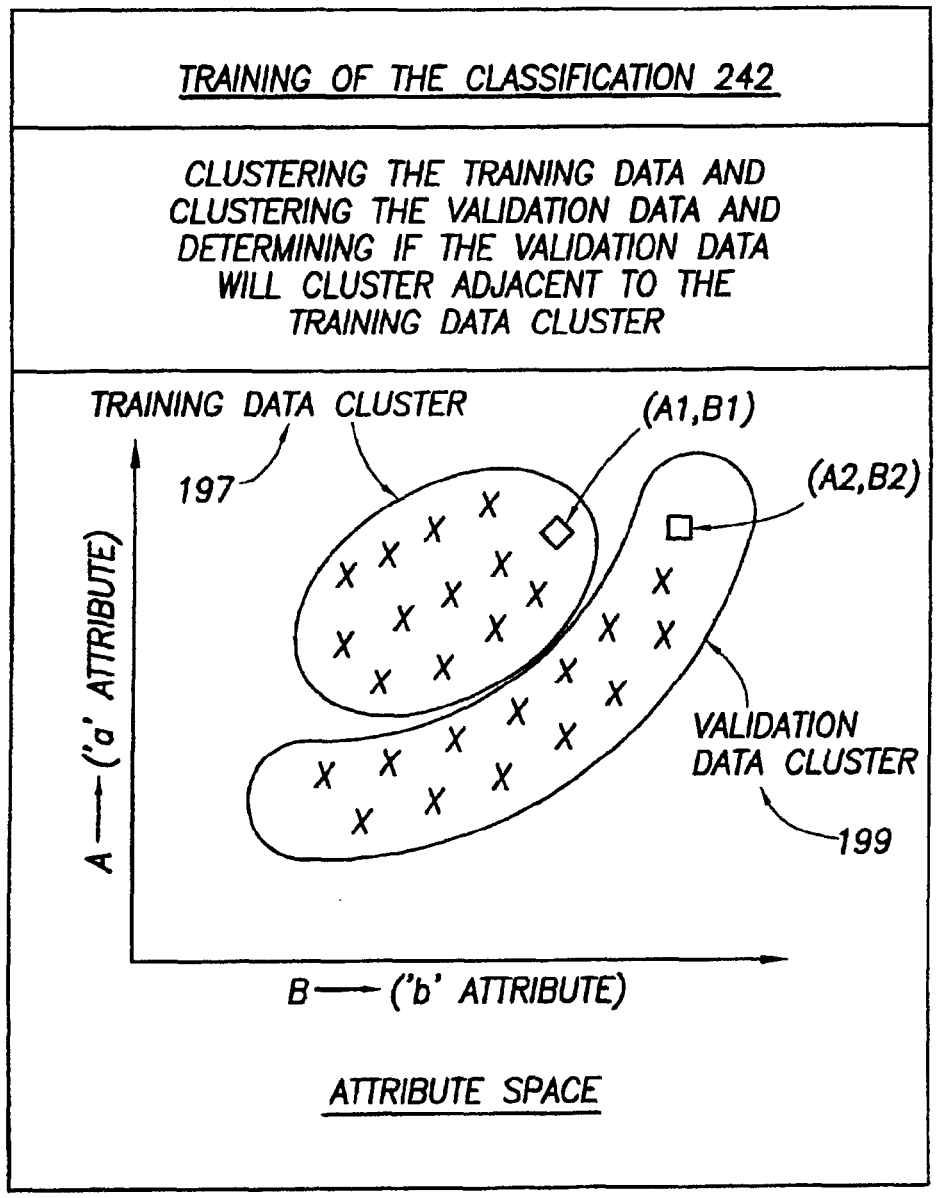
FIG. 42 illustrates the functional operation of the "training of the classifications" block 242 of FIG. 39.

In FIG. 42, regarding the execution of the "training of the classification" code 242 of FIG. 39, when the "training-position attribute data" of FIG. 34 and the "validation-position attribute data" of FIG. 37 and the "training-borehole attribute data" of FIG. 34 and the "validation-borehole attribute data" of FIG. 37 are plotted in the same "cross plot in attribute space", as discussed above, that same "cross plot in attribute space" is illustrated in FIG. 42. Note, in FIG. 42, that the "validation data cluster" 199 does, in fact, cluster adjacent to the "training data cluster" 197. The "validation data cluster" 199 should cluster adjacent to the "training data cluster" 197 because the FIG. 31 class of the training data of FIG. 34 was assumed to be the same as the FIG. 31 class of the validation data of FIG. 37.

In FIGS. 38 and 42, regarding the "validation successful" block 212 of FIG. 38, since the "validation data cluster" 199 of FIG. 42 did, in fact, cluster adjacent to the "training data cluster" 197 in FIG. 42, the validation was successful, and, as a result, a "yes" output is generated from the "validation successful" block 212 of FIG. 38. In FIG. 38, the next block of code to be executed is the "apply the trained classification determine quality indication" block 216 in FIG. 38. In order to under this block of code (216 in FIG. 38), refer now to FIG. 43.

Figure 43:
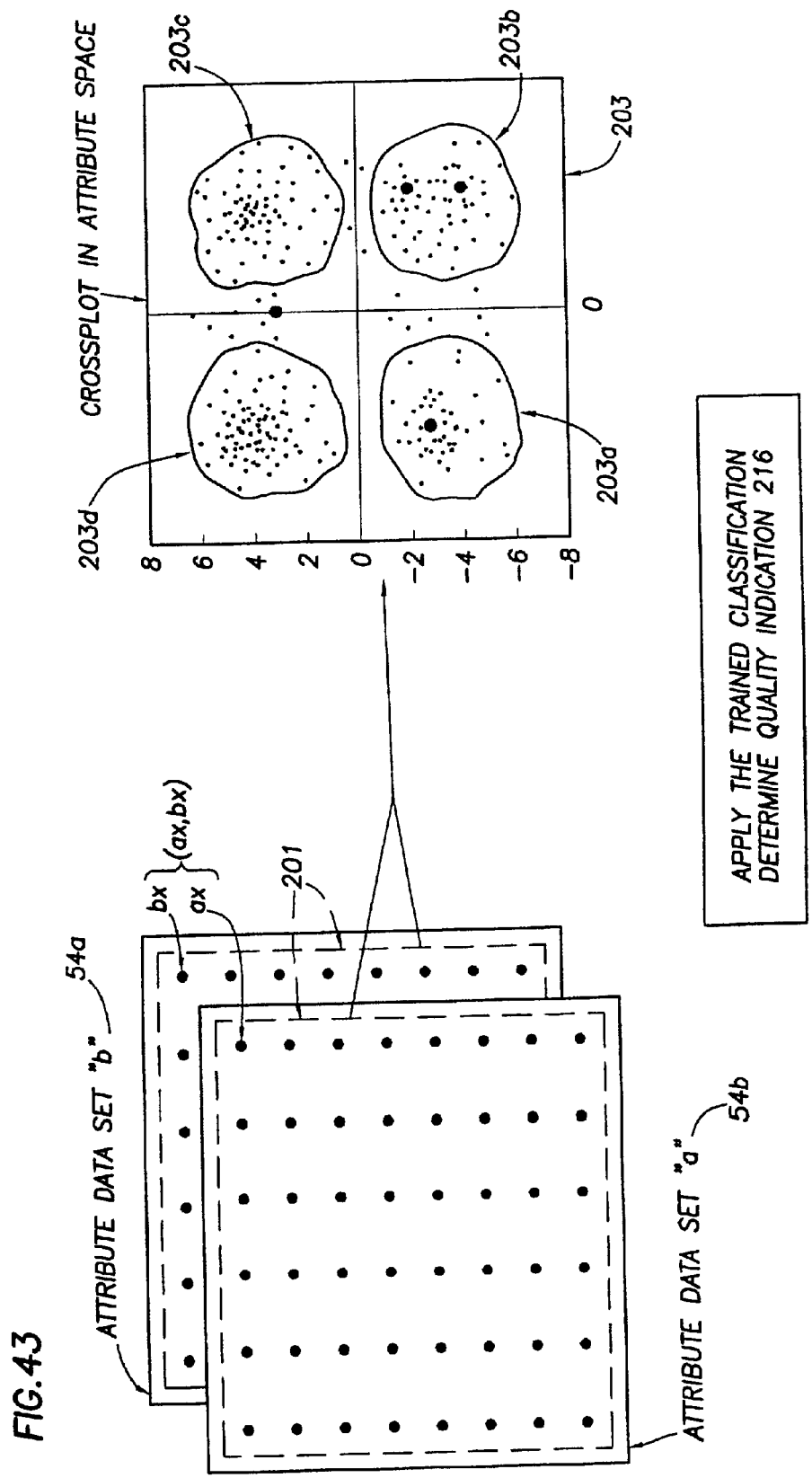
FIG. 43 illustrates the functional operation of the "apply the trained classification and determine quality indication" 216 of FIG. 38.

In FIG. 43, during the execution of the "apply the trained classification . . ." block 216 of FIG. 38, all of the attribute data 201 on the attribute data sets 54a, 54b in FIG. 43 will be plotted on a "cross plot in attribute space", using the techniques discussed above with reference to FIGS. 17 through 21. When that "cross plot in attribute space" is generated, the "cross plot in attribute space" 203 illustrated in FIG. 43 will be generated. The four clusters 203a through 203d in the cross plot 203 of FIG. 43 will each be assigned a different label, such as color. The attribute data inside each cluster will each be assigned a label, such as color.

In FIG. 38, assuming that the operator at workstation 100 of FIG. 15 believes that the quality of the "cross plot in attribute space" 203 of FIG. 43 is acceptable, a "yes" output is generated from the "quality acceptable" block 218 of FIG. 38. The next block of code to be executed is the "classified result" block of code 130 of FIG. 30 (or block 222 of FIG. 38).

Figure 44:
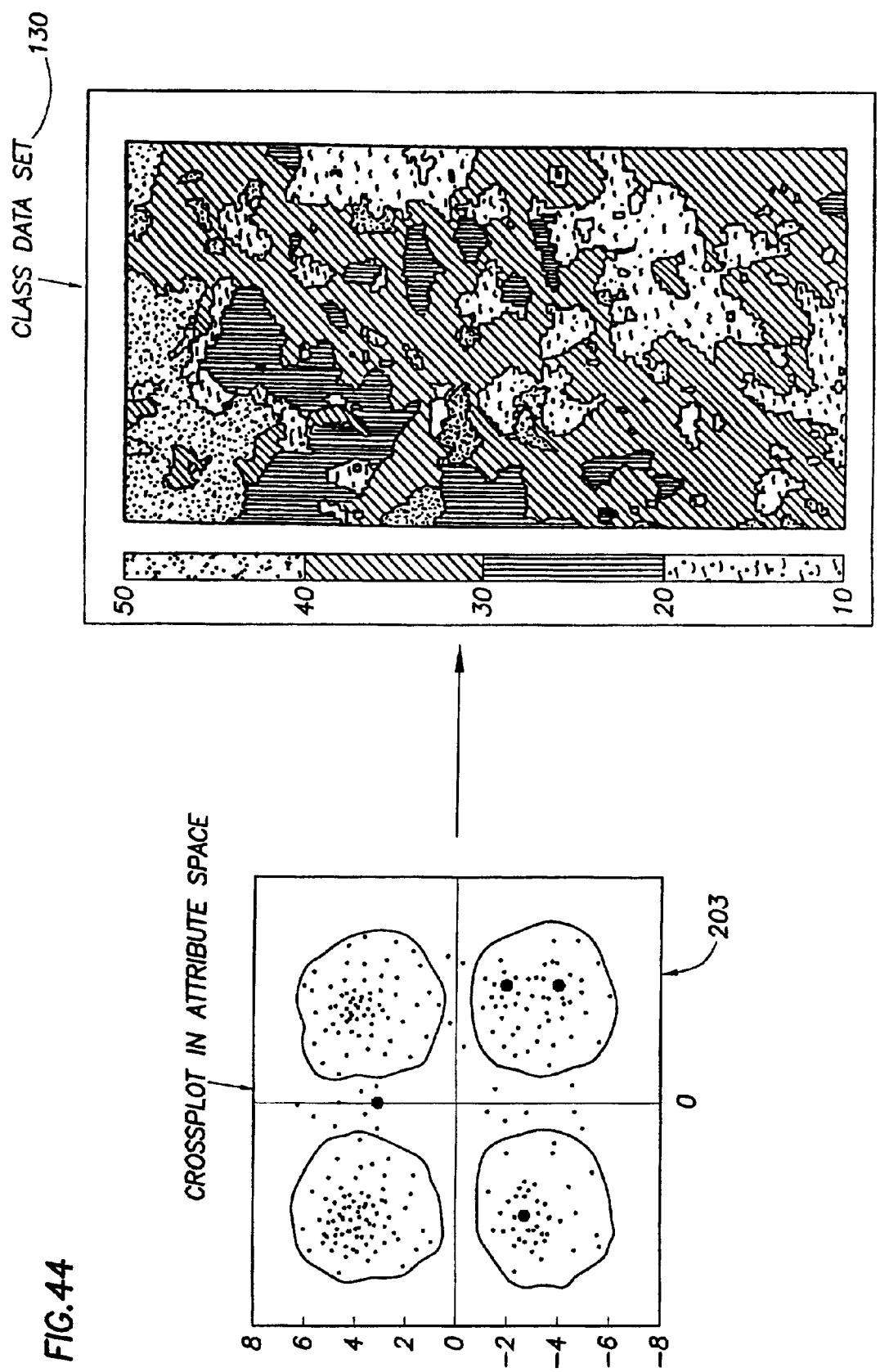
FIG. 44 illustrates the functional operation of the "classified result" or "class data set" block 130 of FIG. 30.

In FIGS. 30 and 44, when the "classified result" block 130 of FIG. 30 is executed, the "cross plot in attribute space" 203 of FIG. 44 (and FIG. 43) is used to generate a "class data set" 130 in FIG. 44, using the same techniques discussed above with reference to FIGS. 18 through 21.

Figure 44A:
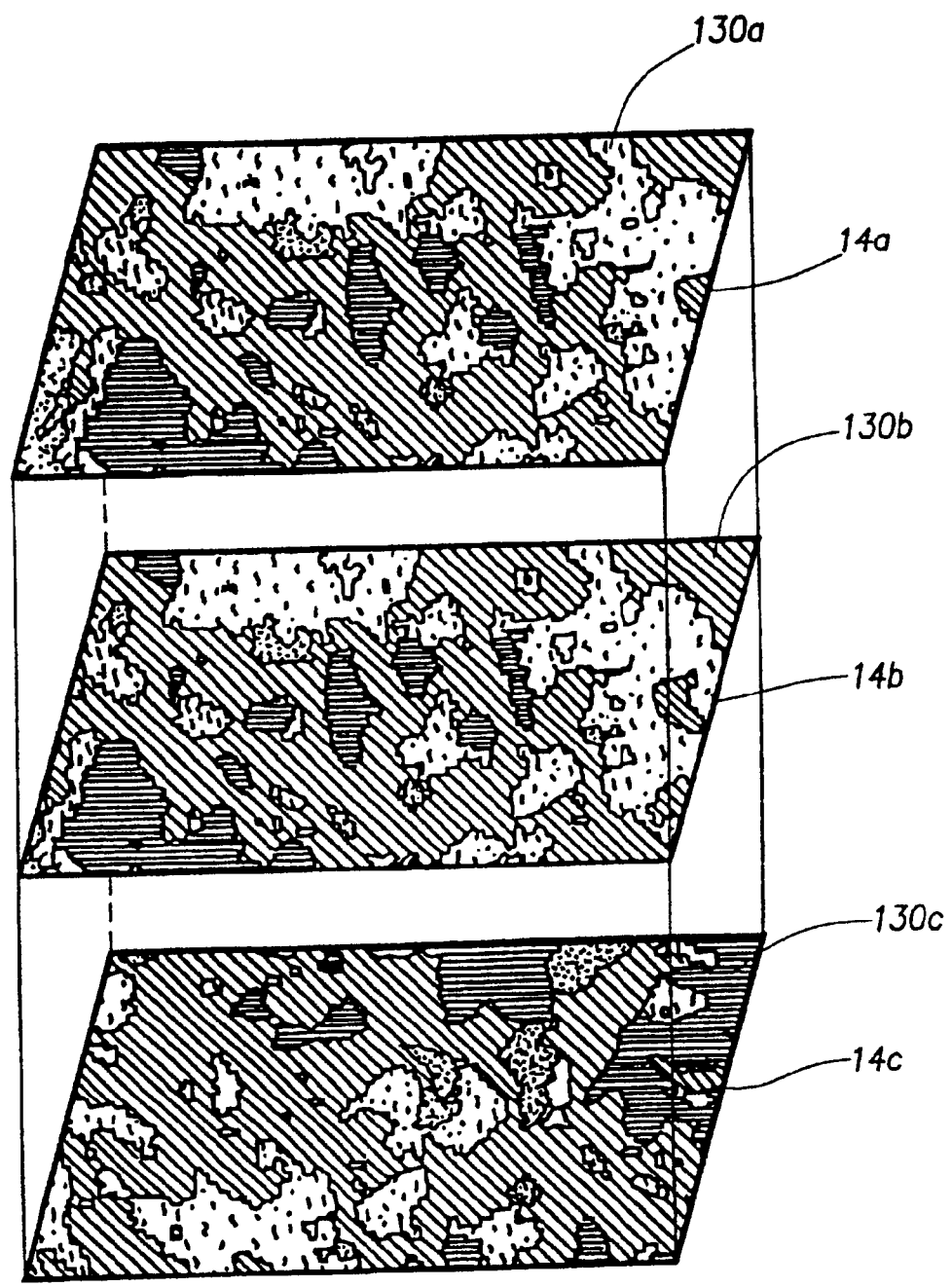
FIG. 44A illustrates a 3D cube which includes a plurality of such 'class data sets' corresponding, respectively, to a plurality of subsurfaces in an earth formation.

In FIG. 44A, now that we know how to generate the "class data set" 130 in FIG. 44, by using those same techniques, a 3D cube can be generated, such as the 3D cube illustrated in FIG. 44A. In FIG. 44A, three different sub-surfaces have three different class data sets associated therewith. That is, a first class data set 130a reflects a first set of characteristics of a first sub-surface 14a, a second class data set 130b reflects a second set of characteristics of a second sub-surface 14b, and a third class data set 130c reflects a third set of characteristics of a third sub-surface 14c in an earth formation. The class data set 130 of FIG. 44 is designed for 2D horizon/map data; however, the Seisclass software 100b of the present invention is also suited for classification of 3D cubes, such as the 3D cube illustrated in FIG. 44A, 4D time-lapse cubes (where time is the fourth dimension), or 5D pre-stack time-lapse cubes.

A functional operation of the "Seisclass Software" 100b of the present invention, when executed by the workstation processor 100a of FIG. 14, is set forth in the following paragraphs with reference to FIGS. 1 through 45 of the drawings.

A seismic operation is performed on an earth formation in the manner illustrated in FIG. 1 thereby producing a seismic data output record 24. In addition, a well logging operation is performed in the same earth formation in the manner illustrated in FIG. 2 thereby producing a well log output record 32. The seismic data output record 24 and the well log output record 32 combine to represent the data received 42 of FIG. 5; and, in FIG. 6, the data received 42 is used, by the computer 44 of FIG. 6, to generate the attribute data sets 46. For example, following the seismic operation of FIGS. 7, 8, and 9, the computer 44 of FIG. 6 will generate the attribute data set 46 of FIG. 13. The attribute data sets 46 of FIG. 13 includes a first "attribute data set" 54a and a second "attribute data set" 54b. The first attribute data set 54a in FIG. 13 will include a multitude of "a" attributes, such as "amplitude (a)" values. The second attribute data set 54b in FIG. 13 will include a multitude of "b" attributes, such as "frequency (f)" values. Actually, as shown in FIG. 10, the "attribute data sets" 46 of FIG. 13 actually include the "input attributes" 134 and the "well supplement attributes" 136.

In FIGS. 14 and 15, the attribute data sets 46 of FIGS. 10 and 13, which include the input attributes 134 and the well supplement attributes 136, are provided as "input data" to the workstation 100 of FIGS. 14 and 15. However, the "seisclass software 100b" in FIG. 15, initially stored on a storage medium 102, such as a CD Rom 102, is loaded into the workstation 100 of FIG. 15 and is stored into the workstation memory 100b. When the seisclass software 100b is stored in the workstation memory of FIG. 14, and when the workstation processor 100a of FIG. 14 executes the seisclass software 100b, the workstation processor 100a will perform the following overall function, as noted in FIG. 16: (1) produce a cross plot in attribute space from the attribute data sets, block 112a, (2) subdivide the cross plot into a plurality of zones comprised of points which correspond to other points on the attribute data sets where each zone on the cross plot has a different class association than any other zone which is indicated by a different label, such as a different color, block 112b, and (3) produce a class data set 130 comprised of a plurality of points on the attribute data sets where each point has a label, such as color, depending on its cluster/class association on the cross plot in attribute space, block 112c. The "cross plot in attribute space" is illustrated, in a simple example, by the cross plot 114 of FIG. 18, and the class data set is illustrated, in the simple example, by the class data sets 130 of FIGS. 20 and 21.

When the seisclass software 100b of FIG. 14 is executed, the operator at the workstation 100 must first examine the "attribute data", included within the attribute data sets 46 (including the input attributes 134 and the well supplement attributes 136), to determine whether that "attribute data" in the attribute data sets 46 can be conveniently classified into one or more of the "classes" which are illustrated in FIG. 31.

If that "attribute data" cannot be classified into one or more of the classes of FIG. 31, the "unsupervised" seisclass software 100b1 of FIG. 22 is executed. The "unsupervised" seisclass software 100b1 is discussed below with reference to FIGS. 23 through 29 of the drawings.

However, if that "attribute data" can, in fact, be classified into one or more of the classes of FIG. 31, the "supervised" seisclass software 100b2 of FIG. 22 is executed. The "supervised" seisclass software 100b2 is discussed below with reference to FIGS. 30 through 44 of the drawings.

In FIG. 23, if the "attribute data" in the attribute data sets 46 cannot be classified into one or more of the classes of FIG. 31 and the "unsupervised" seisclass software 100b1 of FIG. 22 is executed by the workstation processor 100a of FIG. 14, the unsupervised classification code 132 of FIG. 23 will begin execution in response to the input attributes 134 and the well supplement attributes 136 of the attribute data sets 46 and the parameters controlling the classification process 138. When the unsupervised classification code 132 has completed its execution, the classified result 130 (i.e., a class data set similar to the class data set 130 of FIG. 21) is generated. The auxiliary results/QC measures code 142 of FIG. 23 will assess the quality of the class data set/classified result 130.

In FIG. 25, recalling that the input attributes 134 and the well supplement attributes 136 comprise the input attributes 134, 136 of FIG. 25, when the unsupervised classification code 132 of FIGS. 23 and 25 is executed by the workstation processor 100a of FIG. 14, the "input data", consisting of the input attributes 134, 136 and the parameters 138, are initially saved via the save input block 144 in FIG. 25 and the "input data" are received by the "apply classification and determine quality indicators" code 146 of FIG. 25. This "apply classification . . . " code 146 will then "apply the classification" and then "determine quality". If the "quality" is not acceptable, via block 152 of FIG. 25, the input attributes 134, 136 can be edited, and the parameters 138 can be edited, via the edit block 154 of FIG. 25, and then the "apply classification and determine quality indicators" code 146 will be re-executed. If the "quality" is acceptable, via block 152 of FIG. 25, the classified result/class data set 130 is then generated. A sample class data set 130 is shown in FIGS. 20 and 21.

As noted above, the "apply classification and determine quality indicators" code 146 of FIG. 25 will "apply the classification" and then "determine quality". FIG. 26 illustrates how the "apply classification and determine quality indicators" code 146 "applies the classification" and "determines quality".

In FIGS. 26, the input attributes 134, 136 and the parameters 138 are received by the "apply classification . . . " code 146; and, responsive thereto, the "apply classification . . . " code 146 will: (1) perform its first function to "determine quality" by executing code blocks 156 through 170 in FIG. 26, and then, when the quality is acceptable, the "apply classification . . . " code 146 (2) will perform its second function to "apply the classification" by executing code block 172 in FIG. 26.

In FIGS. 26 and 27, when the "apply classification . . . " code 146 of FIG. 26 "determines quality" by executing the code blocks 156 through 170 in FIG. 26, the operator selects the inspection data 173 of FIG. 27 which represents a subset of the attribute data sets 54a, 54b of FIG. 13 (block 158 of FIG. 26), generates a "cross plot in the attribute space" consisting of a pair of clusters of points 181a and 181b in the attribute space of FIG. 27 (block 160 of FIG. 26), and evaluates the distribution and separation of the clusters 181a and 181b on the "cross plot in attribute space" in FIG. 27 (block 162 of FIG. 26).

In FIGS. 26 and 28, if a further manual inspection of the input attributes 134, 136 is necessary (block 164 of FIG. 26), the operator will select the cluster 185 in the attribute space of FIG. 28 as "inspection data" (block 166 of FIG. 26), generate the attribute data set plot 187 of FIG. 28 (block 168 of FIG. 26), and evaluate the distribution inherent in the attribute data set plot 187 of FIG. 28 (block 170 of FIG. 26). If the distribution or separation of the attribute data on the attribute data set plot 187 of FIG. 28 is satisfactory, no further manual inspection of the attribute data 134, 136 is necessary (see line 156a exiting from the "no" output from the "manual inspection" block 156 of FIG. 26). At this point, the "apply classification algorithm" 172 of FIG. 26 will begin execution.

In FIG. 29, when the "apply classification algorithm" 172 of FIG. 26 begins execution, all of the input attributes 134 and the well supplement attributes 136 of the attribute data sets 54a, 54b of the attribute data sets 46 of FIG. 29 (including the inspection data 173 of FIG. 27) are used to generate a "cross plot in attribute space" 179 and a "final crossplot in attribute space" 179 is produced which is similar to the cross plot 114 shown in FIG. 18. The "cross plot in attribute space" 179 is generated from the attribute data sets 54a, 54b of FIG. 29 using the same techniques discussed above with reference to FIGS. 12, 13, 17, and 18. In FIG. 25, the quality of that "final cross plot" 179 is assessed, via the "quality acceptable" block 152 of FIG. 25. If the quality of that "final cross plot" is acceptable, the "final cross plot" 179 data/results are saved via the "save results" block 150 in FIG. 25, and the "final cross plot" 179 is used to plot the final classified result 130/final class data set 130 in FIG. 23 and 25 similar to the class data set 130 shown in FIGS. 20 and 21, using the same techniques discussed above with reference to FIGS. 18, 20, and 21. The "auxiliary results QC measures" code 142 of FIG. 23 will assess the quality of that final class data set 130.

In FIG. 30, however, if the "attribute data" in the attribute data sets 46 can, in fact, be classified into one or more of the classes of FIG. 31, the "supervised" seisclass software 100b2 of FIG. 22 is executed by the workstation processor 100a of FIG. 14. When the "supervised" seisclass software 100b2 of FIG. 30 is executed by the workstation processor 100b2, the supervised classification code 186 of FIG. 30 will receive certain "input data". When the supervised classification code 186 of the supervised seisclass software 100b2 is executed, the supervised classification code 186 will respond to that "input data" by generating the classified result 130/class data set 130. A sample class data set 130 is illustrated in FIG. 21. The "auxiliary results QC measures" code 142 of FIG. 30 will assess the quality of the classified result 130/class data set 130 generated by the supervised classification code 186.

The "input data", received by the supervised classification code 186 of FIG. 30, includes the "attribute data sets" 46, the "parameters" controlling the classification process 138, and the "classes in use" 188. The "attribute data sets" 46 of FIG. 30 include four (4) parts: (1) the input attributes 134 of FIG. 10, (2) the well supplement attributes 136 of FIG. 10, (3) the training/validation known class at position attributes 182, and (4) the well training/validation known class at borehole attributes 184. The input attributes 134 and the well supplement attributes 136 were discussed above with reference to FIG. 10. The "training/validation known class at position" attributes 182 are represented by the attributes shown under the "position" column in the tables of FIGS. 34 and 37. The "well training/validation known class at borehole" attributes 184 of FIG. 30 are represented by the attributes shown under the "borehole" column in the tables of FIGS. 34 and 37. The "classes in use" 188 in FIG. 30 are defined by the operator; that is, in order to define the "classes in use" 188, the operator must classify each subset of the attribute data in the attribute data sets 46 of FIG. 30 to determine into which class, of the classes of FIG. 31, each subset of the attribute data belong. When this task is complete, the "classes in use—manually defined class types" block 188 of FIG. 30 are defined for the attribute data present in the attribute data sets 46. For example, in FIG. 30, since the "attribute data sets" 46 include the "input attributes" 134 and the "well supplement" attributes 136 and the "training/validation known class at position" attributes 182 and the "well training/validation known class at borehole" attributes 184, the operator must analyze all the attribute data in the attribute data sets (134, 136, 30 182, 184) of FIG. 30 and, for each "subset of attribute data" of the attribute data sets 46, the operator must determine into which class (of the classes of FIG. 31) each such "subset" belongs. For example, one "subset" may belong to the "sand" class 174a of FIG. 31 and another "subset" may belong to the "brine" class 176b2 of FIG. 31. When this task is complete, the "classes in use—manually defined class types" 188 block of "input data" of FIG. 30 is fully defined.

The supervised classification code 186 of FIG. 30 is illustrated in greater detail in FIG. 38. In FIG. 38, when the supervised classification code 186 is executed, the training of the classifications code 208 will receive the above referenced "input data". In FIG. 39, the training of the classifications code 208 will: select the inspection data 189 of FIG. 40 (block 226 of FIG. 39), generate a cross plot 191 in the attribute space of FIG. 40 (block 228 of FIG. 39), and evaluate the distribution of the clusters 191*a* and 191*b* in the attribute space 191 of FIG. 40 (block 230 of FIG. 39). Then, if a further manual inspection of the attribute data in the "input attributes selection" 134, 136 is necessary (block 232 of FIG. 39), the training of the classifications code 208 will: select the inspection data 193 in the "cross plot in attribute space" of FIG. 41 (block 234 of FIGS. 39 and 41), generate an attribute data set plot 195 of FIG. 41 (block 236 of FIGS. 39 and 41), and evaluate the distribution in the attribute data set plot 195 (block 238 of FIGS. 39 and 41). If the distribution of the attribute data on the attribute data set plot 195 of FIG. 41 appears to be satisfactory (block 238 of FIG. 39), the training of the classifications code 208 of FIG. 39 may then execute the "training of the classifications" code 242 in FIG. 39. The execution of the "training of the classifications" code 242 of FIG. 39 will involve: (1) the clustering of the "training-position" data of FIG. 34 in attribute space, clustering the "validation-position" data of FIG. 37 in the same attribute space, and determining if the "validation-position" data of FIG. 37 also clusters adjacent to the "training-position data of FIG. 34 in the same attribute space, and (2) the clustering of the "training-borehole" data of FIG. 34 in attribute space, clustering the "validation-borehole" data of FIG. 37 in the same attribute space, and determining if the "validation-borehole" data of FIG. 37 also clusters adjacent to the "training-borehole" data of FIG. 34 in the same attribute space. If all goes well, in FIG. 42, the validation data cluster 199 in FIG. 42 will be positioned adjacent to the training data cluster 197 in the attribute space of FIG. 42. The validation data cluster 199 of FIG. 42 should cluster adjacent to the training data cluster 197 of FIG. 42 because the class of the attribute data in the "validation data" of FIG. 37 was assumed to be the same as the class of the attribute data in the "training data" of FIG. 34.

When the execution of the "training of the classifications" code 242 of FIG. 39 is complete, the "validation successful" block 212 of FIG. 38 and 39 is executed. The "validation successful" block 212 of FIG. 38 will have a "yes" output (indicating a successful validation) when the "validation data" cluster 199 of FIG. 42 clusters adjacent to the "training data" cluster 197 of FIG. 42. However, in FIG. 38, if the validation is not successful (a "no" output from the validation successful block 212 of FIG. 38 is generated), the operator can now edit the "input data" and start again—that is, the operator can edit: the "input attribute selection" 134, 136 and/or the "training/validation" 182, 184 and/or the "parameters" 138 and/or the "classes" 188 in FIG. 38. This can be done by utilizing the edit block 214 of FIG. 38. In the edit block 214 of FIG. 38, the operator can now edit the "training/validation" input data 214*a*, or the operator can "select/redefine classes" 214*b*, or the operator can "edit input attributes selection" 214*c*, and/or the operator can "edit parameters" 214*d*. After the above referenced "input data" is edited via the edit block 214 of FIG. 38, the "training of the classifications" block 208 of FIG. 39 is reexecuted in the manner discussed above. However, on the next pass, if block 212 of FIG. 38 is satisfied, the validation will be successful, and the "apply the trained classification determine quality indicators" code 216 of FIG. 38 can be executed.

In FIG. 43, when the "apply the trained classification . . ." code 216 of FIG. 38 is executed, all of the attribute data 201 of FIG. 43 on the attribute data sets 54*a*, 54*b* of the "input attribute selection" of FIG. 38 will be used to generate a "cross plot in attribute space", such as the "cross plot in attribute space" 203 illustrated in FIG. 43.

In FIG. 44, when the "cross plot in attribute space" 203 of FIG. 43 is generated, that cross plot 203 is used to generate a classified result 130, such as the class data set 130 in FIG. 44. Recall that the individual attributes (ax, bx) on the attribute data sets 54*a*, 54*b* of FIG. 43 are plotted in attribute space, yielding the cross plot 203 of FIG. 43. Different labels, such as colors, are assigned to each cluster 203*a*, 203*b*, 203*c*, and 203*d* in the attribute space 203 of FIG. 43. Now, each of the individual attributes (ax, bx) have a label, such as color, unique to each attribute. In FIG. 43, the locations on the attribute data sets 54*a*, 54*b* of FIG. 43 are now provided with labels, such as the aforementioned colors, that correspond to the attribute data located thereon. The result is a class data set, such as the class data set 130 of FIG. 44. A sample classified result 130/class data set 130 is illustrated in FIGS. 20 and 21.

The class data set 130 comprises a plurality of areas, where each area has a label, such as color. In the "supervised" classification case, the label (i.e. color) of an area on the class data set indicates one of the classes of FIG. 31. For example, using a color label as an example, a color red in a first area on the class data set 130 may indicate that the first area has the "sand" class 174*a* of FIG. 31. In the "unsupervised" classification case, the color red on a second area of the class data set indicates a particular characteristic of that area which is different from the characteristic of a third area on the class data set.

DETAILED DESCRIPTION OF THE PREFERRED EMBODIMENT

1. Introduction

SeisClass provides methods and tools for discriminating statistically and non-statistically between different classes based upon seismically derived or any other attributes. Typical seismic attributes are amplitude, instantaneous attributes, and statistical moments. Classification may be applied to lithofacies estimation (sand, shale, etc.), pore fluid type estimation (gas, oil, water) and stratigraphic characterization.

Traditionally attribute maps have been used one by one to reveal the secrets of the subsurface. However, with the increasing number of attributes in addition to well logs, it becomes an intractable problem for the human interpreter to combine all this information into a few lithofacies or property classes that the interpreter is really interested in. The main goal of SeisClass is to assist interpreters classifying subsurface phenomena into lithofacies classes using many attribute maps and well logs.

Figure 45:
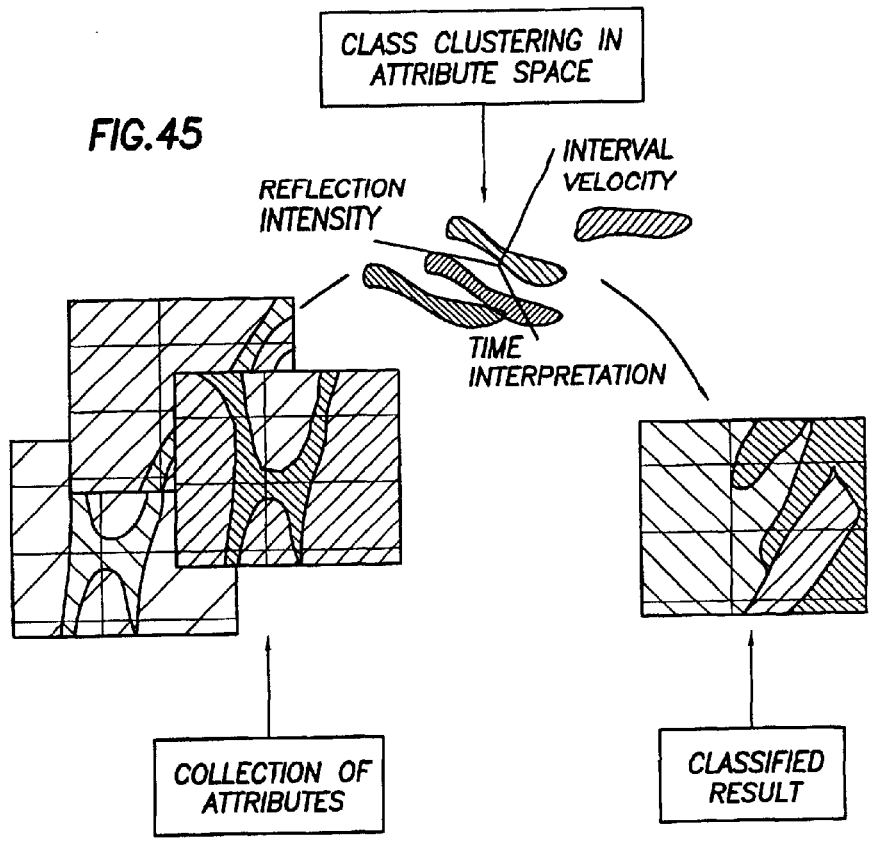
FIG. 45 illustrates an unsupervised method of classification, which attempts classification based upon natural clustering of data in attribute space and "supervised" methods which require training samples, in accordance with a preferred embodiment of the present invention.

Refer to FIG. 45.

SeisClass offers a variety of classification methods including "unsupervised" methods which attempt classification based upon natural clustering of data in attribute space and "supervised" methods, which require the provision of training samples.

2. Specifications

Figure 46:
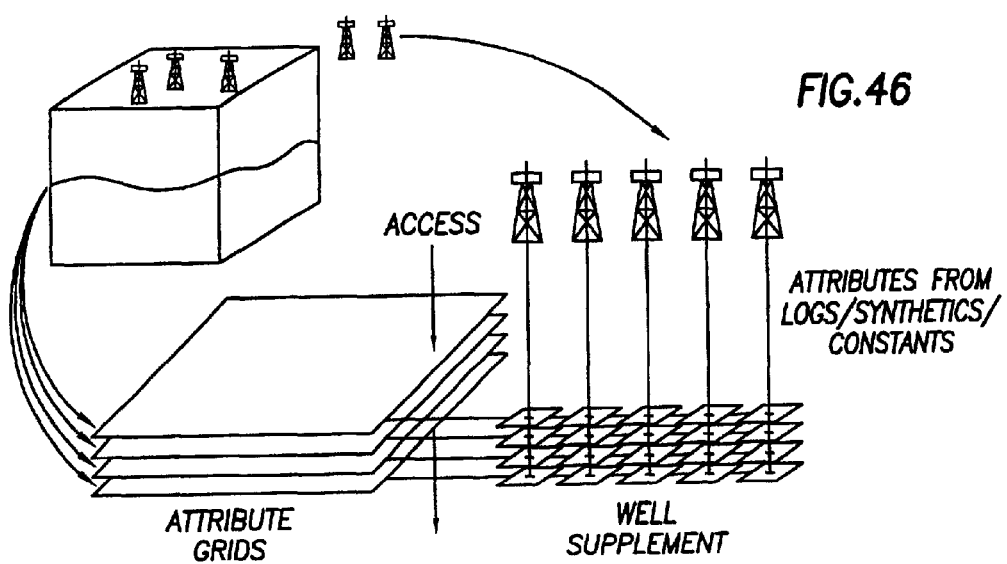
FIG. 46 illustrates horizontal classification using surface attribute grids in accordance with a preferred embodiment of the present invention.

Refer to FIG. 46.

SeisClass may operate in different domains:

"Horizontal Classification", using surface attribute grids as data source and geometric reference (which may later be extended to 2D line representations). The GridMap window serves as visualization tool for the individual attributes.

"Vertical Classification", using a zero-offset (vertical seismic) section from a seismic pre-stack cube as geometric reference: attributes, that are going to be used in classification are represented as vertical attribute sections referring to the zero-offset geometry. The section window serves as visualization tool for the individual attributes.

Figure 47:
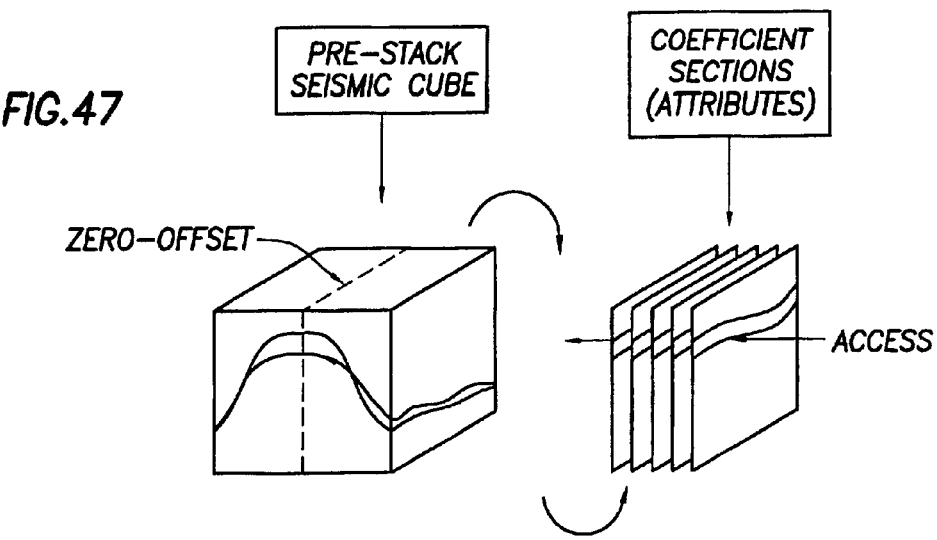
FIG. 47 illustrates data access vertical classification in accordance with a preferred embodiment of the present invention.

Refer to FIG. 47 relating to Data Access Vertical Classification.

Attributes are generated evaluating the amplitudes in the pre-stack cub along the travel time curves/surfaces previously constructed or picked. The amplitude variation versus offset, AVO, is approximated by a "least squares" polynom. The polynomial coefficients, the attributes used by SeisClass, are geometrically associated with the zero-offset section. Any other attribute section having the same geometrical association can of course be used as additional classification input, e.g., interval velocities.

The specification generally regards the above classification domains as equivalent. A horizontal classification domain is often taken as example throughout the specification in order to keep the document readable. A dedicated section, "Vertical Classification (2.10)", deals with the specific differences in that approach. The main specification will refer to this section where ever it is necessary.

The section "Classification Methods (2.2)" lists SeisClass' repository of different classification methods. This section offers references to the theoretical background; some details are outlined in the "Appendix C Classification Method Reference".

The management of data involved in a classification require some extensions of the GeoModel. The new data entities are introduced in "SeisClass Data Entities 2.3" The section "Data Management (2.4)" presents the SeisClass data model from the application point of view. A detailed "Event List for Database Objects (D.1)" that illustrates the use of the SeisClass data entities can be found in "Appendix D."

SeisClass introduces tow new, dedicated windows, the "Administration Window (2.5)" and the "Crossplot (2.6)". The "Administration Window (2.5)" serves as SeisClass data and process manager. The specification covers dialogue layout and the functional description.

"Crossplot (2.6)" is the data visualization and exploration tool in the attribute space—"show all attributes at a given position". It offers selection and deselection capabilities of data in the attribute space. This section describes the local functionality and the human interface.

Depending on the classification domain, either the GridMap or the section window serve as the individual attribute visualization tool—"show all positions for a given attribute". As mentioned above, the horizontal classification is used as example, thus the section "GridMap Extension (2.7)" covers the SeisClass specific functional specification for the GridMap window. For the vertical domain, see "Functional Extensions Section Window (2.10.4)."

SeisClass requires very tight communication between a crossplot and an attribute visualization window. The section "Interactions between Windows (2.8)" is dedicated to this topic from a user's point of view.

The generation of attributes is considered to be independent of SeisClass. In principle, attribute generators are readily available in Charisma. A smooth work flow, however, requires substantial overhauling of this module. The section "Attribute Generator (2.9)" collects the specifications for this part of IMain.

The section "Vertical Classification (2.10)" covers all special features and exceptions for classification in a vertical domain. It can he seen as an extension of the functionality required for horizontal classification.

2.1 Product Perspective

SeisClass is based on the Charisma 4.0 architecture. Charisma 4.0 is the first release that tightly integrates with the GeoFrame well data. All other data types are still modeled and managed by GeoModel. GeoShare will provide the exchange of these data types. A dedicated link for girded surfaces is under consideration. The following sketches the position of SeisClass versus GeoFrame.

Figure 48:
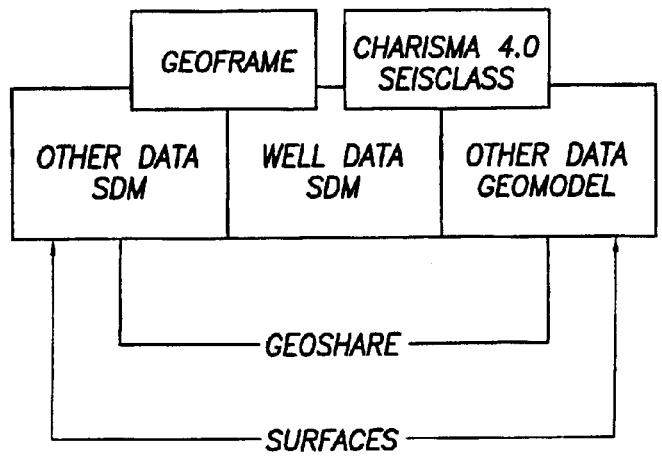
FIG. 48 illustrates a software architecture depicting a portion of SEISCLASS and CHARISMA versus GEOFRAME in accordance with a preferred embodiment of the present invention.

Refer to FIG. 48.

SeisClass moves onto GeoFrame pick-a-back on Charisma IMain. GeoFrame/SDM is hidden from SeisClass by IMain's application data access layer (CDM). The GeoFrame ITC and database update notifications are implemented for well data objects following the Charisma 4.0 specification.

SeisClass can be launched from within Charisma IMain or as a separate module SeisClass. The SeisClass specific functionality is license controlled. It will not be available, i.e. insensitive if no license is available. License handling and human interface follow the InDepth example. Details can be found in "Appendix E".

When launching SeisClass, the user faces two new windows that serve SeisClass specific purposes.

Figure 49:
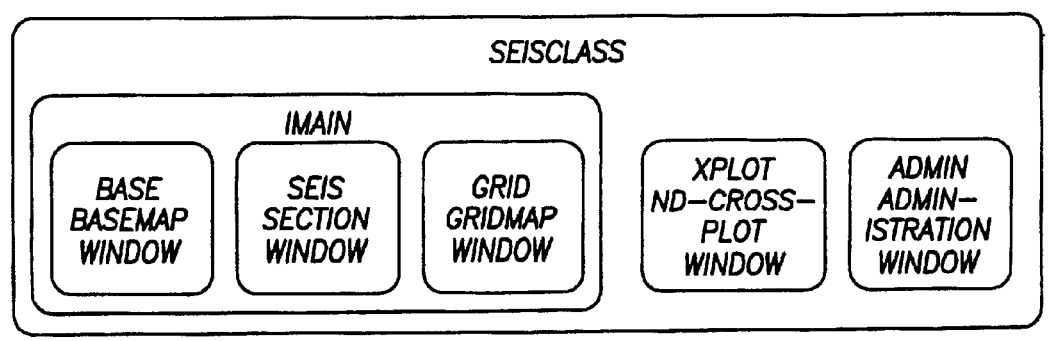
FIG. 49 illustrates SEISCLASS windows including the 'Administration Window' adapted for running a classification and data management and the crossplot and the map or section windows adapted for serving as data exploration windows in accordance with a preferred embodiment of the present invention.

Refer to FIG. 49.

IMain, not all windows are equally important in a SeisClass scenario. The Administration window stands out as the main interface for running a classification and data management. The crossplot and, depending on the classification domain, the map or section window serve as data exploration windows. The other windows, positioned on the lower left, play only a secondary role and can be iconified on demand.

Figure 50:
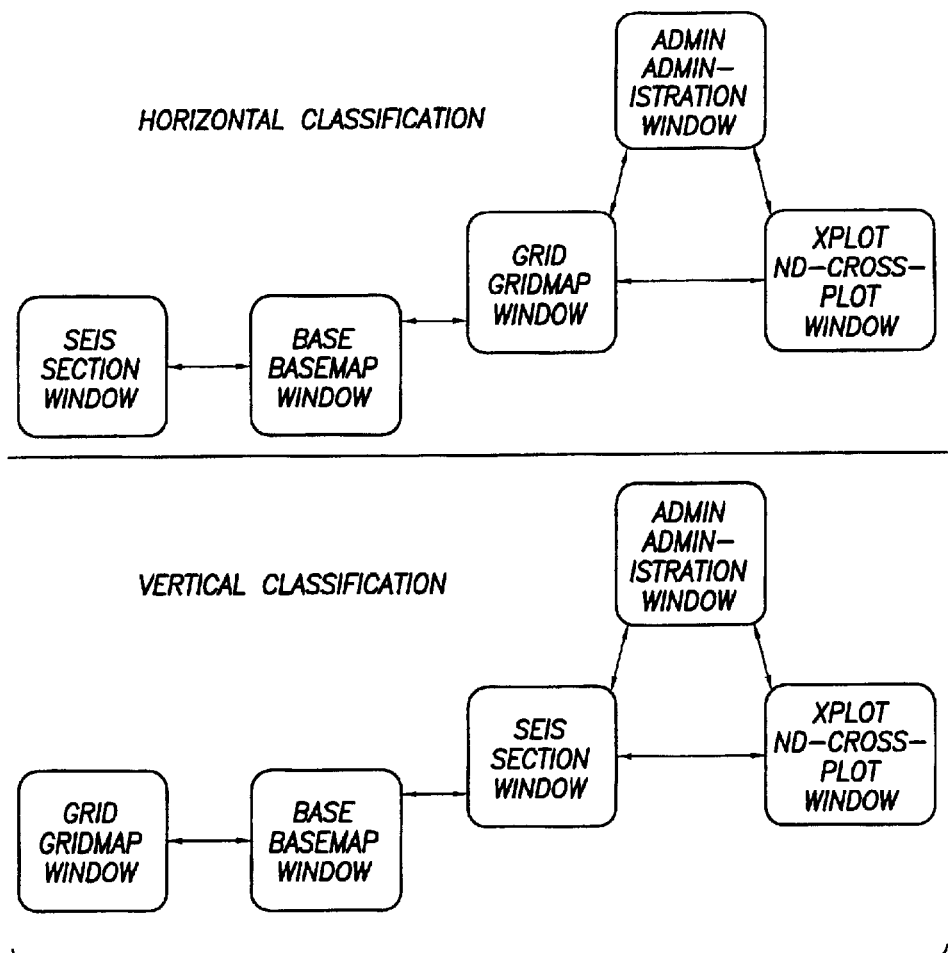
FIG. 50 illustrates window usage depending upon classification domain, in accordance with a preferred embodiment of the present invention.

Refer to FIG. 50 for Window Usage depending on Classification Domain.

2.1.1 Context Diagram

The methods offered in SeisClass can be grouped into:

unsupervised methods that perform classification according to the input data's clustering, and supervised methods that require a manual class definition and a training step, a manual cluster definition.

Therefore we present context diagrams for both method classes, beginning with the diagram for unsupervised methods because fewer data objects are involved.

Refer to FIGS. 23, 25, and 26.

A stack of "input attributes" and "optionally supplementary well attributes" are input "to the unsupervised classification process". The input attribute bulk representations—grid for horizontal; section for vertical classification—have a common, regular positioning. The attribute vectors with which the classification process is dealing are generated by sampling the values in the attribute stack at a common position. (See also "Input Attributes to Attribute Vectors".) The well supplement, however, is positioned highly irregularly, i.e. at the bore hole locations. The "Circle 1" left of the process box represents the conversion attribute vectors. After this transition, position information is no longer part of the vector; it is kept as source reference.

Depending on the classification method used, "parameters" can influence the classification result. Data dependent parameters may supplement purely method dependent parameters in the course of a classification process. The data dependent parameters can be seen as part of the classification result, the output binding, or as feedback information to refine the classification. The feedback loop, indicated by "2" in "Unsupervised Classification Context Diagram" is not necessarily transparent to the user.

In the "classification process" the relative attribute vector location is evaluated against the overall attribute vector distribution. Following the rules of the method used, one single class is assigned to the input attribute vector's location, i.e. grid or section cell. The "classified result" is saved using a geometric representation identical to that of the input attributes.

The "classified result" may be complemented by other grids or sections describing the quality or probability of the classification result.

The context diagram for supervised classification can be seen as an extension of "Unsupervised Classification Context Diagram:"

Refer to FIGS. 30, 38, and 39

Class definition and attribute vector to class assignment is manually accomplished when running a supervised classification. This is a highly interactive process. Before starting any supervised classification process, the classes that are going to be used must be defined "classes in use".

This a priori decision is a part of the process parameterization. It includes also class dependent parameters.

Like the "well supplement" to the "input attributes", some bore holes may also be identified as training/validation data, the "well training/validation supplement". However, the usage of "well training/validation supplement" will be limited to horizontal classification. (See "Training/Validation Data from Wells" for further explanation.)

The loop between "classes in use, training/validation" and the "supervised classification" process implies the need for high interactivity.

The following figure shows another aspect of the functional context, the sequence of actions in a classification process, both for unsupervised and supervised classification. These figures are the basis for the "Scenario Drive Events Lists."

2.1.2 External Interfaces

As outlined in the "Product Perspective," SeisClass will either be running in a Charisma 4.0 or in a heterogeneous GeoFrame 3.0 environment.

2.1.2.1 Charisma 4.0 SeisClass

Figure 51:
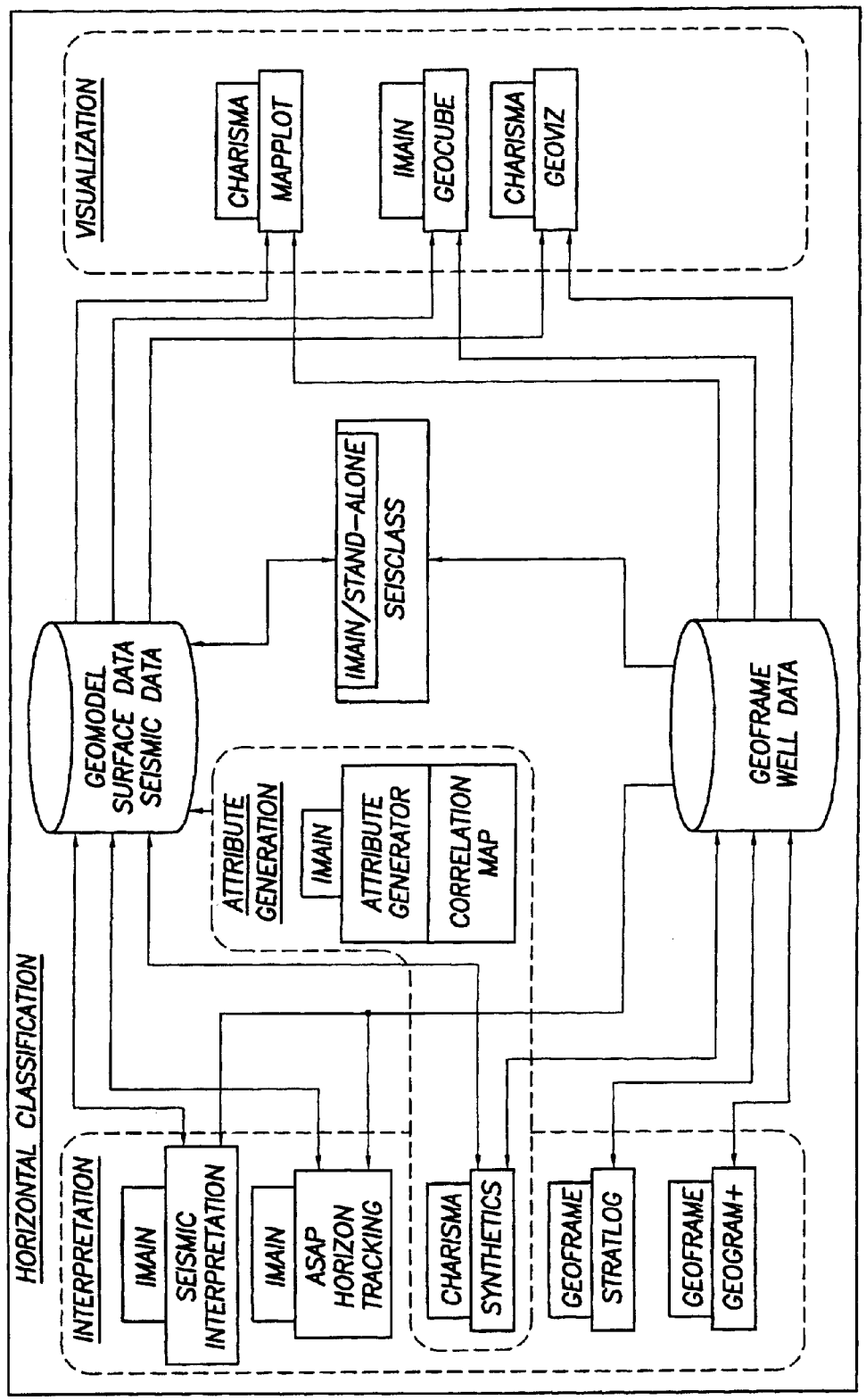
FIG. 51 is a block diagram that illustrates the flow of data types between applications that are relevant to SeisCiass when horizontal classification is used in a preferred embodiment of the present invention.

FIG. 51 focuses on the flow of data types between applications that are relevant for SeisClass.

A description of data types, that are exchanged in this context can be found in "Table 2: Data Types Exchanged in SeisClass/Charisma 4.0 Environment."

Prime input data are surface attributes (surface data in "Table 2:") either generated by IMain's "Attribute Generator", the "Correlation Map" function or imported attributes provided by any other external application. Usually these surface attributes are associated to an interpreted horizon or layer; this interpretation is provided by IMain "Seismic Interpretation" or by "ASAP," IMain's automatic tracking module.

Qualitative and quantitative well control is provided by "Synthetics", "StratLog" and "GeoGram+". "StratLog" offers multi-well, geological correlation and identifies the sequences to interpreted and classified. "GeoGram+" provides a rigorous velocity log calibration in order to build a reliable depth-time relation. Once the well logs are prepared, "Synthetics" creates the synthetic seismograms that are used to tied the seismic interpretation domain to the well interpretation domain. Then the wavelet extraction function in "Synthetics" supplies the calibrated, optimal synthetic well reference.

SeisClass collects the well logs and synthetics in the well supplement to establish the quantitative well control. The synthetic seismograms are the basis for an identical attribute generation "on-the-fly" in SeisClass, since the surface attributes provided the "Attribute Generator" allow an exact reconstruction of the process and parameters.

SeisClass communicates with "GeoModel" to keep track of all data bindings and parameter settings that are required in a classification run.

The output of SeisClass, the classified result and quality measures, may be selected in various visualization applications. "MapPlot" may be used to provide high quality hardcopies, "GeoCube" and "GeoViz" offer 3D visualization on composite displays.

The following "Table 2:" lists all the data types, their storage environment and access type. Most important is the type "Surface Data". This term is to be understood as surface attribute representations of type grid that may have boundary (fault) information. Class Grids, the main output of SeisClass, are also "Surface Data", but are mentioned explicitly where applications have to deal with this new type of "Surface Data", namely "MapPlot," "GeoCube" and "GeoViz".

TABLE 2

Data Types Exchanged in SeisClass/Charisma 4.0 Environment

| Applications | GeoModel reading | GeoModel writing | GeoFrame reading | GeoFrame writing |
|---|---|---|---|---|
| Imain Seismic Interpretation | Seismic Data WellTies | Surface Data WellTies | Well Well Logs Well Markers | |
| IMain ASAP Horizon Tracking | Seismic Data Surface Data WellTies | Surface Data | | |
| Charisma Synthetics | Seismic Data Surface Data WellTies | WellTies | Well Well Logs Well Markers Wells | Reflectivity Synthetics (Well Logs) Well Markers Wells |
| GeoFrame StratLog | | | Well Markers Well Logs Surface Data[a] | Well Markers Well Logs Surface Data[a] |
| GeoFrame GeoGram+ | | | Wells Well Markers Well Logs | Calibrated Logs Reflectivity Synthetics |
| Imain Attribute Generator | Seismic Data Surface Data | Attributes (Surface Data) | | |
| Imain Correlation Map | Seismic Data Surface Data | Attributes[b] (Surface Data) | | |
| IMain/Stand-alone SeisClass | Attributes (Surface Data) WellTies | Class Grids, QC-Attributes (Surface Data) | Well Markers Well Logs Synthetics | |
| Charisma MapPlot | Seismic Data Surface Data Class Grids | | Wells Well Markers[c] | |
| Imain GeoCube | Seismic Data Surface Data Class Grids | | Wells Well Logs Well Markers[c] | |
| Charisma GeoViz | Seismic Data Surface Data Class Grids WellTies | | Wells Well Logs Well Markers[c] | |

[a]These data have to be exchanged via GeoShare.
[b]Well supplements cannot be generated from single trace synthetics to match Correlation Map results.
[c]Required new functionality, independent of SeisClass.

2.1.2.2 GeoFrame 3.0 SeisClass (IESX Scenario)

The importance of surface data has been stressed in the previous section. This requires smooth surface attribute data exchange between IESX and SeisClass. Surface attributes in grid representation are part of the GeoFrame 3.0. The following scenario assumes that GeoFrame 3.0 attribute grids and fault boundary descriptions are transparent and equally accessible through SeisClass.

"GeoModel" is used as classification run administration data storage. It relates the input attribute grids, the well supplement, classification parameters and classified output for each classification run.

Generally all components shown in "SeisClass in Charisma 4.0" are also available in this scenario: some of them, however, have been omitted for the sake of clarity. It is assumed that the seismic data are exclusively handled inside the IESX environment and not transparent to SeisClass.

IESX time interpretation is gridded and released to the grid storage in "GeoFrame". The surface attributes are produced by the "Computation Manager" and put out into "GeoFrame", stored in the same grid library.

Since the seismic data are local to the IESX environment, the seismic-to-well correlation must occur in the IESX domain as well. "IESX Synthetics" is supposed to deliver the calibrated synthetic seismograms to the GeoFrame well log storage. It is supposedly necessary to generate the attributes, corresponding to the "Computation Manager" results, also in "IESX Synthetics", because methods and parameters cannot yet be communicated through GeoFrame.

The modules "CPSLink" and "CPS 3" take the place of "MapPlot" in "SeisClass in Charisma 4.0". This requires, however, that "CPS 3" is able to handle index grid representations (class grids).

Interactive visualization is done in "GeoViz" (the Charisma 4.0 variant).

Figure 52:
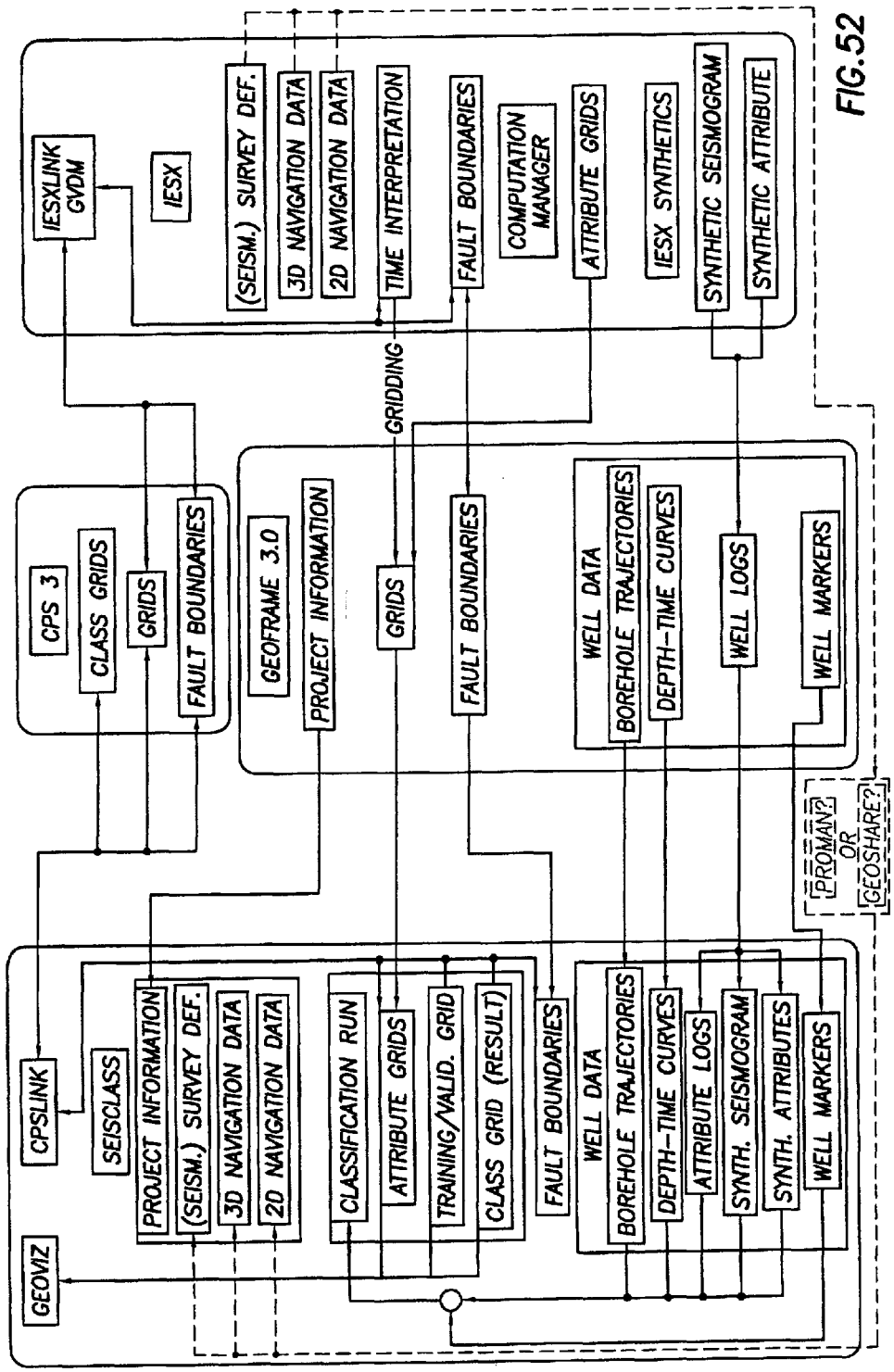
FIG. 52 is a block diagram that illustrates the flow of data when SEISCLASS is used with GEOFRAME 3.0 including the interaction of CPSLINK, CPS 3, and IESX with SeisClass in a preferred embodiment of the present invention.

Refer to FIG. 52.

2.2 Classification Methods

The methods that SeisClass is using are catalog controlled. New algorithms can be made available as soon as the method and method/parameter catalogs have been updated with their properties and attributes. (See "C3 Tables: Classification Methods".)

Six different methods are part of the first commercial version of SeisClass. They belong to classification methods of either of the following groups:

"unsupervised" or

"supervised"

2.2.1 Unsupervised Methods

Unsupervised methods base their classification on the clustering of the entire dataset in attribute space. The result does not depend on a priori information.

The usage of unsupervised methods is appropriate where one of the following exist:

no reliable a-priori information is available an un-biased cluster analysis should be carried out in order to verify the existence of clusters and their respective separation The number of classes, i.e. the number of clusters in attribute space is the dominant parameter for the two unsupervised methods offered.

2.2.1.1 K-Means Clustering Method

K-Means Clustering is a classical algorithm due to Mac-Queen [M1967]. It is often used as an initialization of computationally more expensive algorithms. The algorithm will always converge, but might give different results for different runs due to local minima in the objective function used by the algorithm.

K-Means Clustering does not make any assumptions about the distribution of the data. Depending upon the number of classes "k", "k" cluster centers are randomly selected from the available attribute vectors. In the classification process, all attribute vectors are assigned to one of "k" clusters based upon minimizing the distance from the vector to the mean of the cluster. This is done by iterative improvement, thereby updating the cluster means after each new assignment. The iteration is carried on either until there are now assignments or until a maximum number of iterations has been reached. The initial positions of the cluster means are randomly chosen by selecting "k" different attribute vectors from the entire attribute vector collection.

"Advantages"

fast convergence no assumptions about underlying data and data distribution well-proven classical method "Disadvantages"

results depend on initial selection of cluster centers which is usually method controlled method does not always select expected clusters.

Refer to FIG. 19.

2.2.1.2 Competitive Learning Method

Competitive Learning is usually labeled as a neural network paradigm and considered as an alternative approach to statistically motivated methods like K-Means Clustering. However, one may as well view the algorithm as an extended variation of K-Means Clustering. Comparative studies with Competitive Learning have yield good results in several fields.

Like K-Means Clustering, Competitive Learning does not make any assumptions about the distribution of the data. The number of classes is specified a priori. The method itself controls the initial cluster center distribution. During training, attribute vectors are iteratively presented and the cluster vector that is closest to the attribute vector is updated so that it is even more likely to win the next time the particular attribute vector is presented. Training is stopped after a certain number of iterations, or when the cluster vector only changes marginally.

"Advantages"

produces same results for identical initial user-supplied conditions no assumptions about underlying data and data distribution "Disadvantages"

method does not converge in general, but this is compensated with weight decay slow training of network the theoretical foundation is not as solid as classical statistical methods Refer to FIG. 53.

2.2.1.3 Comparison of Unsupervised Methods

In general one can expect Competitive Learning to perform better, but only after very time-consuming training runs. It is shown how the methods perform on a simple dataset with four natural clusters. The Competitive Learning algorithm moves slowly, but steadily toward the cluster centers while the Competitive Learning algorithm always finds the optimal solution. The K-Means algorithm will typically find something similar to that, but sometimes will also come up with the perfect solution. Note, however, that this is a highly artificial training set. One may conclude that in general, Competitive Learning is expected to produce better results, but at a much higher price.

2.2.2 Supervised Methods

Very often detailed and reliable information is available at wells. This information is too important not to be considered in a classification process. Therefore, it is desirable to feed in this auxiliary information.

On the other hand, there might be a clear question to be answered by a classification. The classes involved in the play are given by an interpretive analysis of the entire system rather than a statistical definition. The margins for modifications or adaptations of class definitions can be very limited.

The available attributes might not be ideally suitable or fully describe the system properties that are to be classified. A priori knowledge can supplement the attribute data and compensate for missing and not fully quantifiable attributes.

Usually the a priori information is fed in to the system as training data, i.e. attribute vectors that have a known class relationship. It is evident that a substantial number of attribute vectors have to be made available for each class in order to get a proper statistic description of the data distribution. Under the assumption that sufficient data are available for each class, a subset can be taken away from the training data and be reserved as validation data. A successful classification will predict the correct class at the validation data locations.

SeisClass offers three statistical and one neural net type of supervised methods. The statistical methods will be discussed first, ordered by their level of sophistication.

2.2.2.1 Fisher Method

Fisher's discriminant function is based on the assumption that the distribution of the classes is equal meaning that the energy distribution in the covariance matrices is equal. The goal is to find projection functions (discriminant function) for each pair of classes that maximize the distance between the training data populations. An attribute vector is then classified by using the discriminant function to find the class to which it has least distance.

"Advantages"

fastest statistical classification method requires only training data definition, no parameters any type of data distribution, as long as the distribution of the training data per class are equal "Disadvantages"

overlapping data distributions/bad training data obscure classification result the requirement of equal training data distribution (equal covariance matrix) may be difficult to achieve. In practice the method is nevertheless very robust against violations of this condition.

For further details, see "Section C.2.1.1".

2.2.2.2 Bayesian Method

This method derives the class probability from the training data. The implementation of the Bayesian method in SeisClsass requires Gaussian distribution for all classes. According to that attribute vector's position in attribute space, the probability for belonging to a certain class is determined for all classes. The class giving highest probability is assigned to t he vector. If the highest probability is lower than the required confidence level, the "doubt class" is assigned instead. The "outlier class" is assigned, if the vector is more than a predefined distance away from the most probable class center.

"Advantages"

rigorous mapping of the individual class probabilities; good opportunities for quality assurance handles automatically doubt and outlier classes supports a prior class proportion definition "Disadvantages"

the requirement of Gaussian distribution and equal training data distribution is difficult to achieve. In practice the method is—like the Fisher method—robust against violations of this condition.

For further details, see "Section C.2.1.2".

2.2.2.3 Contextual Bayesian Method

In addition to an individual point-by-point approach, the Contextual Bayesian method considers additionally the neighborhood of the classified location. The configuration probability is defined for each class. Three different shapes, contextual prototypes are offered. Locations that have been classified as "doubt", can be re-classified because of the class context of its neighborhood.

"Advantages"

resulting class maps coherent, having a low noise level rigorous mapping of the individual class probabilities; good opportunities for quality assurance handles automatically "doubt" and "outlier" classes supports a priori class proportion definition "Disadvantages"

the requirement of Gaussian distribution and equal training data distribution is difficult to achieve method is comparatively slow 2.2.2.4 Back Error Propagation Method The back-propagation algorithm is the most popular and widely used learning method in neuro-computing today. It is easy to understand and to apply and is also very powerful. See Lippmann for an introduction, and Hecht-Nielsen for a more in-depth analysis of this learning law. It works by doing iterative gradient descent in weight space, minimizing the squared error between the desired and actual outputs.

Figure 54:
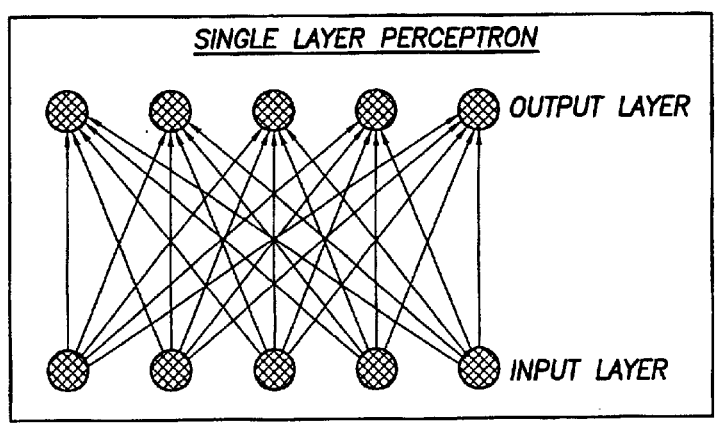
FIG. 54 illustrates a supervised method of classification, specifically Back-Error Propagation method involving a 'single layer perceptron' representational power, used in accordance with a preferred embodiment of the present invention.

Refer to FIG. 54.

A single layer perceptron has the same representational power as a linear Fischer discriminant classifier. Back-propagation type networks work by constructing hyperplanes, thus dividing the n-dimensional hyperspace into decision regions. These nets often successfully compete with Bayesian classifiers, especially in cases of unknown, highly non-gaussian input probability density functions.

"Advantage"

can resolve non-linear attribute/class relations no assumptions about data distribution "Disadvantages"

method is comparatively slow no rigorous theoretical framework that relates the output to in put and justifies the output from method and input data; the method works rather as a black box the random network initialization can cause different results each time the method is applied; the degree of variation in the result can however be seen as a quality indication.

For further details, see "Section C.2.1.4".

2.3 SeisClass Data Entities

ScisClass introduces some new concepts into the existing data model. The most striking of all is the idea of a discrete property in contrast to continuous properties, that up to now have solely been dealt with. The first parts, Classes (2.3.1) and Class Representations (2.3.2) are dedicated to the introduction of this concept.

The new process "classification" requires necessarily its own input/output binding and parameter management, as long as the results are supposed to be repeatable, provable and verifiable. This follows the concept of a "module-run" that is already established in GeoFrane and parts of Geo-Model "Classification Run (2.3.6)".

The experiences gained with the use of the prototype suggest the collection of input data into sets that are likely to be re-used. The required integration of surface and well data adds some complexity. Also here, collection techniques that have already been established earlier "Extensions to general set (2.3.4)" are re-used and extended where necessary, "Well Binding (2.3.5)".

2.3.1 Classes

Attributes are currently referring to a measurement, defining the physical context of the property being quantified. The assumption is that the measured quantity describes a continuous property. Although the preferred reconstruction rules may vary from measurement to measurement, it is generally acknowledged that the data can be "interpolated".

Discrete properties break with this concept. The discrete value has no meaning in itself; it must be translated into the discrete property description. This is usually implemented by a look-up-table that joins the index (discrete value) with the full property description.

SeisClass uses a class library as repository for class properties. (See "Class Library (2.5.9)".)

The purpose of the classification as well as the classification method require different types of classes that are normally not used in one and the same run. This suggests the use of class families.

The class library is supposed to be a resource open to other applications performing similar tasks. The GeoFrame RockClass application, e.g. accomplishes lithological classification on log data. Unfortunately, RockClass is not using a transparent class repository and an implementation of such as repository is not planned in the GeoFrame 3.0 time frame. It is nevertheless attractive to combine interpretations of RockClass with SeisClass. The level of detail, resolution and even ambition in RockClass may be substantially different to that in SeisClass. The concept of partitioning class families into many different levels and gradations allows parallel use of the class repository from applications working in entirely different domains.

SeisClass will deliver a default class repository, a starter class library that may be extended to meet specific needs when performing particular classifications. This is indicated by the global area in "Example Class Hierarchy."

Unsupervised classification methods will require their own set of classes. The default class repository provides these definitions. A class family tag prevents mixing class definitions in a particular classification run across class families in a particular classification run.

The classes have attributes such as a class color. The user is provided with means to control the attribute settings on a project level through a dialog described in conjunction with Section 2.5.9 (Class Library).

Refer to FIG. 31. FIG. 31 shows an example of a class repository consisting of some class family trees. Classes from different families are never expected to be used in a single classification run.

Furthermore, some classification runs may require very data or problem specific class definitions. It is therefore unlikely that those classes are being re-used in other projects. Classes may therefore be specified locally for a project. This requires, however, that project backup and restore must take care of and maintain the class definition repository.

2.3.2 Class Representations

The class definition repository or class library provides the foundation for discrete surface attributes and their bulk representation. However, a direct coupling of bulk data samples to a common class repository by a method type description, defining the method to be a "discrete" or a "continuous" classification a supervision type description, defining whether the method is "unsupervised" (no training/validation data required) or "supervised" (training/validation data mandatory)

a descriptive string, further describing the method, i.e. for the "Back Error Propagation" method "Artificial Neural Net"

"Table 9: Classification Method Catalogue" in "Appendix C.3 Tables: Classification Methods" presents an overview over the methods. See also the relations to the parameter catalog (next chapter "2.3.3.2") and the classification run entity (See "2.3.6 Classification Run".)

2.3.3.2 Parameter Catalog

All parameters that are used by any classification method ("2.3.3.1 Method Catalog") are registered In the parameter catalog. A parameter definition is uniquely linked to a method in the method catalog. The intention of this parameter catalog is to provide the following:

as much information as possible to build a method dependent user interface for method parameterization and reasonable defaults for process initialization that may later be overruled by classification run specific settings Among the parameter catalog attributes are the following:

the parameter name that is used in the user interface when referring to this parameter a value type specification defining whether the parameter is an integer float or vector an identifier denoting parameter validity, either "per method" or "per class" (having a link to the class catalog: see "2.3.1. Classes")

an identifier denoting whether the parameter should be transparent, i.e. editable for or hidden from the user and finally a default value and value range description The definition of default value and range are optional depending on the parameter and method.

Table 10 Method—Parameter Catalogue" in "Appendix C.3 Tables: Classification Methods" presents a complete list of parameters, attributes and defaults per method. See again the relational diagram.

Data dependent information can also be saved as 'hidden parameter'. This will be the case when e.g., discriminant functions have been built, using training data and method parameters; once defined, the discriminants could also be applied to other similar input data sets. This includes the 'statistical signature' for statistical methods.

2.3.4 Extensions to "General_Set"

The "general_set" did successfully solve the InDepth problem of collecting representations belonging to various different data model domains. SeisClass faces a similar situation. The goal is to group the following:

input attribute representations, both for horizontal and vertical classification, into re-usable sets, corresponding well-derived attributes to individual attribute representations, training/validation representation and well training/validation data.

This resembles the velocity function velocity_func" in InDepth. The multiple bindings to well data items require, however, an extension.

Refer to FIG. 57.

The implementation requires two new sub-types of "general_set", the "attr_set" and "attr_well_set" objects. The only purpose of "attr_set" is to group a number of "attr_well_set" objects. Each "attr_well_set" object refers to an at tribute representation (either surface or section). "Attr_well_set" objects can be referred to by well supplements. The well supplements are implemented through "attr_well_ref" that split up into either logs or constants. (See "Section 2.3.5" for details.)

In order to simplify the bulk data access, the attribute representations in an attribute set must refer to a "common geometry". This means that all members must refer to the same grid library (horizontal classification domain) or the same seismic line geometry (vertical classification domain). The application is responsible for enforcing the geometry constraints. Mixing grid libraries or geometries in an "attr_set" or "attr_well_set" is a violation of the data model and is considered an error.

Analogous structure has been selected for the training/validation set to keep a symmetric data model though training/validation set is conceptually less complex. A training/validation set—class_train_set—will consist only of one discrete attribute representation. It may be accompanied by a well supplement consisting of class-to-well assignments, symmetrically to the input attribute set structure.

Figure 58:
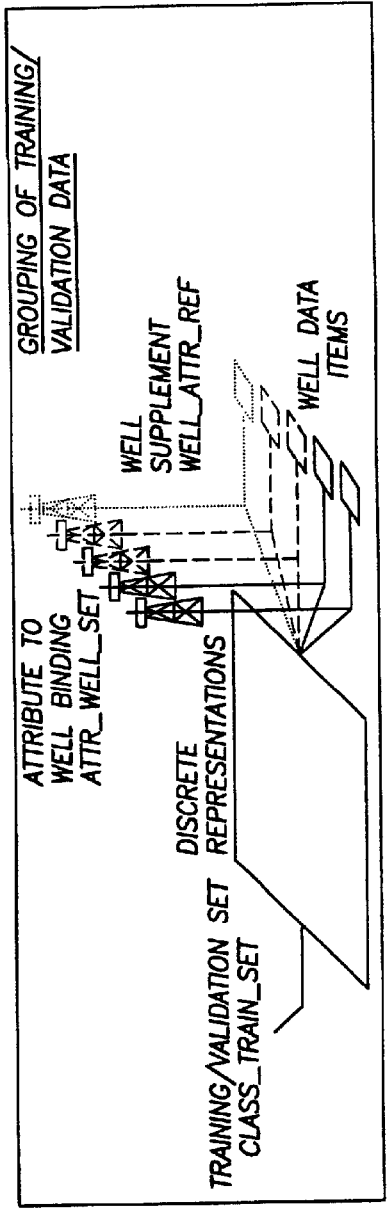
FIG. 58 illustrates grouping of training/validation data in accordance with a preferred embodiment of the present invention.
Figure 59:
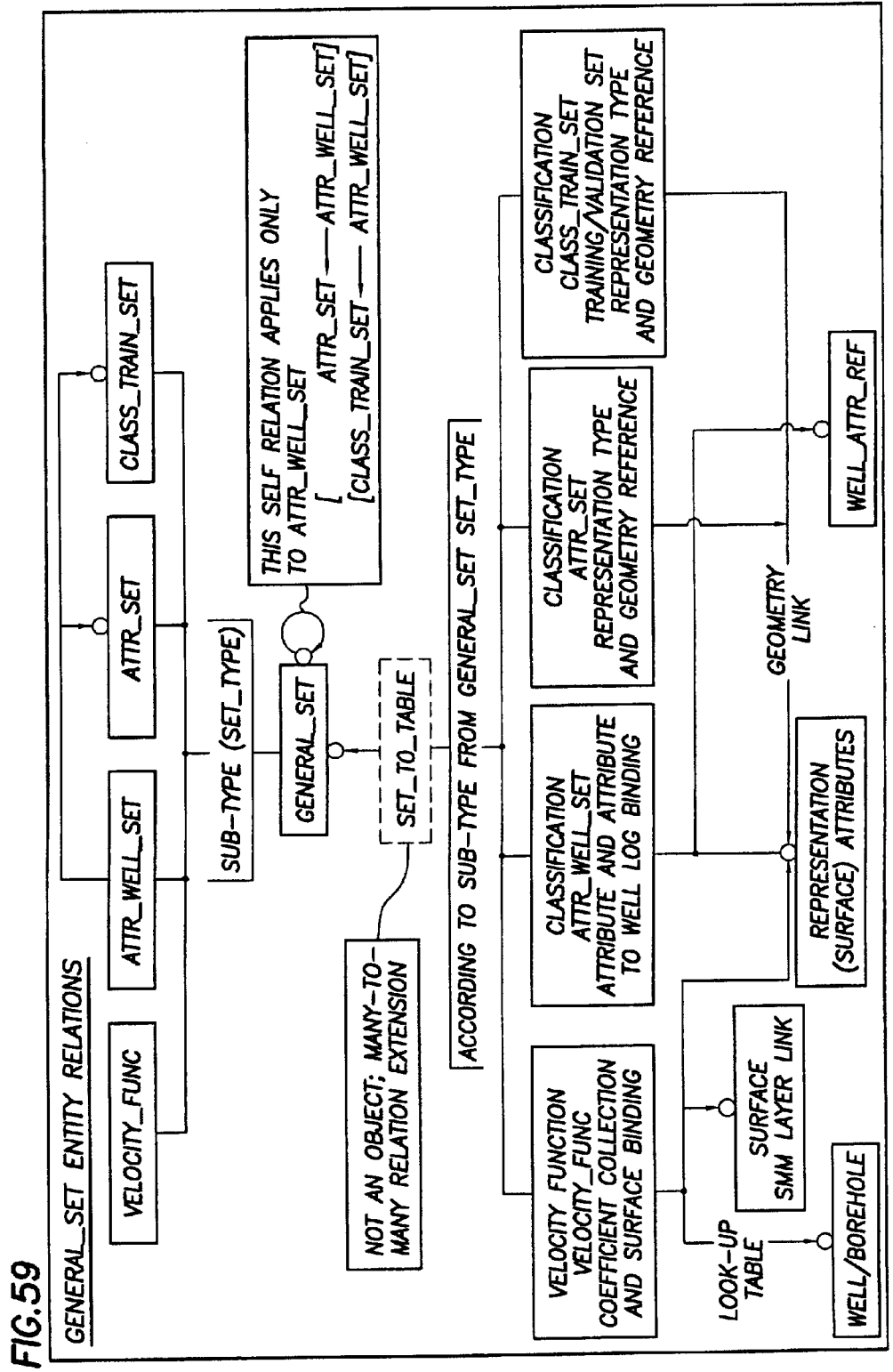
FIG. 59 illustrates General Set entity relations in accordance with a preferred embodiment of the present invention.

Refer to FIGS. 13, 58 and 59. The use of new sub-types of "general_set" is illustrated in the entity relation diagram in FIG. 55. It includes all variants of "general_set" types, namely "velocity-func".

2.3.5 Well Binding

Figure 60:
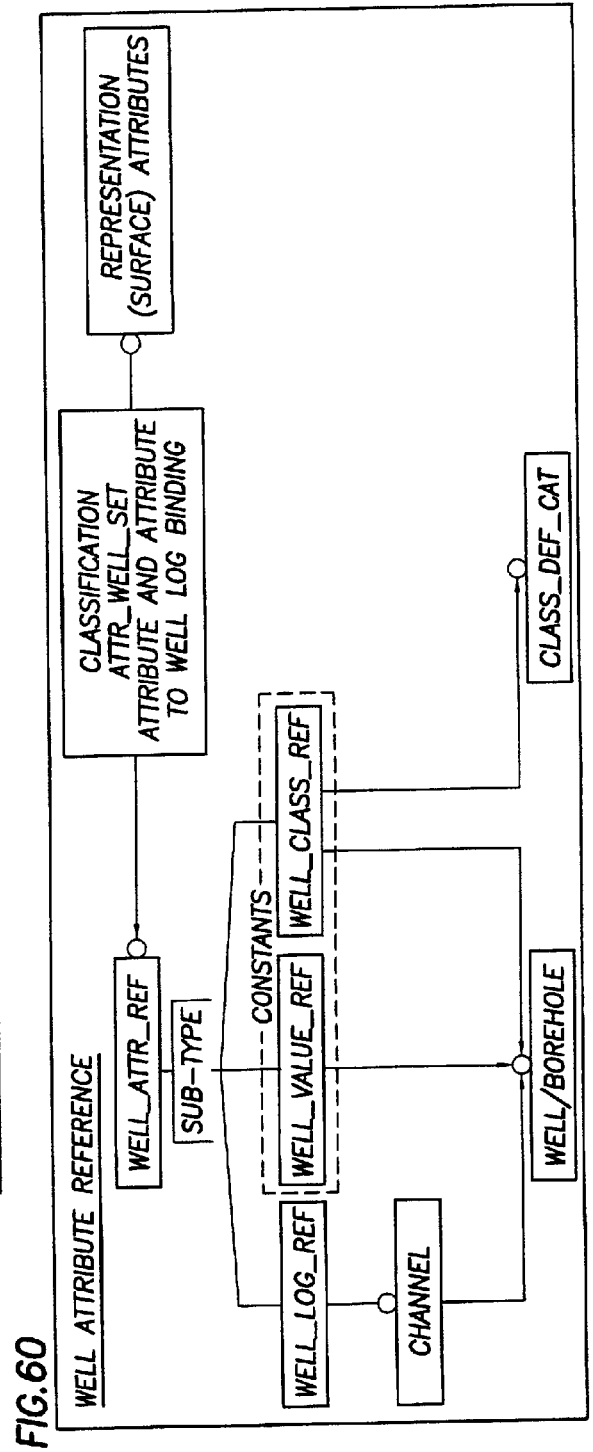
FIG. 60 illustrates Well Attribute Reference in connection with Well Binding and, specifically, which intermediate objects have to be added in order to branch from "well_attr_ref" to logs or constants having continuous or discrete representations, in accordance with a preferred embodiment of the present invention.

Refer to FIG. 60.

The requirement to always extract well attributes from well logs has been regarded as too strict since the existence of attribute logs for all wells is necessary. It becomes even more evident for training/validation logs. The introduction of constants significantly improves the usability. Attributes can sometimes be provided more easily by user defined constants than by a comparably heavy log interpolation at the well trajectory/horizon intersection. Additionally the class assignment for a given well is more conveniently done via a constant than a class log interpretation.

The flexibility with respect to usage has its price in an increased data model and HI complexity. FIG. 60 shows in detail which intermediate objects have to be added in order to branch from "well_attr_ref" to logs or constants having continuous or discrete representations.

2.3.6 Classification Run

This "module_run"—equivalent "class_run"—is the main administrative instrument. It keeps track of the input binding, parameters and classification status report information on all data involved in a classification can be provided at any time.

As seen from the data model, a classification run can exist on its own. However, it is recommended that classification runs without any reference to other objects are removed.

In FIG. 61, the presentation of the various links to other data entities Is organized according to FIG. 61 counter-clockwise starting from "model entity" at the top.

Fundamental Properties

The classification domain is set by a link to a "model entity". It is a structural surface (grid) for horizontal classification or a seismic section for vertical classification. This link does not constrain the actual geometry for input sets which is the responsibility of the application. (See "common geometry".) Since the representation type is not restricted, the model is also open for an extension to 2D horizontal classification.

A classification run uniquely relates to a classification method from the method catalog "class_method_cat" which has already been illustrated. The type of method regulates the following:

which input bindings are required
what output can be generated and
the parameter suite The definitions for each method are given in "Section C.3", Table 8, "Classification Methods, Overview", Table 10, "Method—Parameter Catalogue".

Input Binding

The link to one input attribute set "attr_set" is mandatory for all classification methods. (See "Section 2.3.4".) If a method is "supervised", the training/validation set "class_train_set" becomes a mandatory input.

Refer to FIG. 61.

Parameters

Parameters or intermediate results, i.e. grain during network training are kept in "class_run_params" objects. Method parameters not explicitly represented in "class_run_params" are supplemented by the defaults defined in the classification parameter catalog "cmeth_coeff_cat". The application, i.e. the classification process, will always be able to construct a complete set of parameters. Meaningful defaults or sensible 'reset' conditions can always be provided. For details, see Table 10, "Method—Parameter Catalogue".

It is important to know at any time which classes are involved in the classification process. The "class_usage" relation provides this information. The "class_usage" relation will be used when new discrete representations are to be created, e.g. training/validation sets or classification results.

Output Bindings

The primary result of a classification run will be the class map or class section. Depending on the classification type, it will either be a discrete or a conventional continuous attribute representation. The classification run will keep a reference to the result if it already exists.

As already introduced in "Section 2.3.2", discrete representations have as many "class_decode" entries associated with them as classes that have been used "(classes_in_use)". This applies also for continuous classification results. A continuous classification result describes the transition from one class to another in form of a ratio. Each extreme, zero and one, refer to a class definition via "class_decode".

Some methods can produce auxiliary output for quality control purposes. The two main types are 'confidence' and 'distance to cluster' data. Both operate on conventional representations. The classification run will keep a reference to the QC data if they have been saved.

Bayesian methods offer additionally the output of probabilities per each class involved in the classification. The probabilities are connected to the classification run via a relation 'probability for class_run'. The class binding is realized by "class_decode" entries which produces consistent and accurate classification results. (See above.)

Classification Run Integrity

Any changes in the parameter setting or input binding invalidate any previous results of the current, temporary classification run. Note that runs stored in the database and with persistent results are read-only and can therefore not be invalidated.

2.4. Data Management

This section discusses recommended usage of the data model extensions for SeisClass. The data model defines many relations as optional because the user can and will add elements one by one. Before an input is valid in a SeisClass context, many of the objects must be in place.

The application manipulating SeisClass objects must follow the rules stated in the following sections. The user interface for data management and manipulation is presented in the section "Administration Window (2.5)".

2.4.1 Input Attribute Set

The concept of input attribute sets makes it possible to share an input set in many classification runs. Modifications should be conducted in such a way that they cause least disturbance.

Rule 1: When changing the contents of an input attribute set that is already referred to by more than one classification run, a new input attribute set must be created. The existing classification runs might specifically refer to individual components of the input attribute set.

Rule 2: When changing the contents of an input attribute set that is only referred to by the current classification run, the "results_valid" flag must be set to false if any results exist.

Rule 3: Only grids belonging to the same grid library can be selected into an input attribute set (horizontal classification); only sections ("seismic_sect") belonging to the same 2D-line ("survey_line") having identical horizontal and vertical extent (CDP/time extent) can be selected into an input attribute set (vertical classification).

Rule 4: On changes of the well supplement, any existing temporary results must be flagged as invalidated ("results_valid").

Rule 5: An input attribute set can only be modified if it refers solely to the currently active classification run. Any modifications are stored in an automatically generated attribute set.

Rule 6: Sets are identified by the user-defined name and the creation date. Automatic copies keep the name, but have a different creation date.

2.4.2 Training/Validation Set

Training and validation sets are like input attribute sets shareable between classification runs. Similar constraints as in "Section 2.4.1" apply equivalently.

Rule 7: When changing the contents of a training/validation set that is already referred to by one or more other classification runs, a new training/validation set must be created. The existing classification runs might specifically refer to individual components of the training/validation set.

Rule 8: When changing the contents of a training/validation set that is only referred to by the current classification run, the "results_valid" flag must be set to false if any results exist.

Rule 9: Sets are Identified by the user-defined name and the creation date. Automatic copies keep the name, but have a creation date.

Rule 10: On changes of the training/validation well supplement, all depending classification runs must flag the results invalidated ("results_valid").

2.4.3 Classification Run

The classification run relates input data, parameters and output data. The classification run constrains the management of objects even more, as outlined by the following rules:

Rule 11: The classification domain is a fundamental attribute. Once a classification run is created with a given domain—horizontal or vertical—it can never be modified.

Rule 12: When an input attribute set is linked to a classification run, the "model_13 entity" and the set members must belong to the same grid library or section geometry.

Rule 13: Once a classification run gets an output binding, i.e. persistent database representations as results, neither the input binding nor parameters may be changed since all modifications invalidate the results.

Rule 14: Classification runs having no persistent output binding should not be instantiated in the database; temporary scratch and memory representations are used in order to limit the number of persistent classification runs.

2.4.3.1 Input Binding

Rule 15: If the method defined with the classification run is supervised, input attribute set and training/validation set must belong to the same grid library (horizontal domain) or "survey_line" (vertical domain).

Rule 16: Changing the input attribute set must set the run status of the temporary classification run to invalidate ("results_valid").

Rule 17: If the geometry of the new input attribute set is incompatible, i.e. belongs to a different grid library (horizontal domain) or "survey_line" (vertical domain), any results must be cleared.

Rule 18: "Rule 17" implies for supervised classification runs that any previous training/validation set is decoupled from the classification run.

Rule 19: Changing the training/validation set for supervised classifications must set the status of the temporary classification run to invalidated ("results_valid").

2.4.3.2 Parameters, Classes in Use

Rule 20: Changing the type of classification method causes any results being cleared.

Rule 21: Any modification of classification method parameters must set the temporary run status to invalidated ("result_valid").

Rule 22: Adding or removing a class must set the temporary run status to invalidated ("results_valid"); parameters related to classes no longer used have to be removed synchronously.

Rule 23: Adding a class must result in a corresponding "class_decode" entry for the temporary training/validation representation.

Rule 24: It is not required that all classes defined in the training/validation set are actually used in a classification run. Such classes are traced upwards in the class hierarchy until a parent-class in use is found. Mismatches are signaled.

2.4.3.3 Output Binding

Rule 25: Each time a new classification is performed, the run status must to validated ("results_valid").

2.4.4 Hierarchical Lists

Two of the new entities will be presented in hierarchical lists: class definitions and classification runs. The hierarchical lists will also require a sort of data management that is closely synchronized with the management of the database objects.

The two cases will briefly be discussed in this section, focusing on different design requirements for a generic hierarchical list management.

2.4.4.1 Class Hierarchy

Classes have a unique child-parent relationship. Each class definition can refer to one and only one parent class definition. Management of hierarchical class definition require functions to:

- to look up a parent for a given class
- look up the ultimate progenitor of a given class
- add a class as child of a given class
- remove a class
- re-parent a class to a given new class The management of the hieraraphy must be consistent with t he data model at any time. The hierarchy displays in the SeisClass administration must always reflect the database state.

2.44.2 Classification Run Hierarchy

Unlike the class definition, non-unique child-parent relationships may exists. This is due to the fat that input attribute sets and training/validation sets can be re-used by many classification runs. In addition to the query functions in "Section 2.4.4.1", the classification run hierarchy displays in the SeisClass administration must always reflect the database state.

2.5 Administration Window

SeisClass handles a great number of data objects across different domains, like surfaces in seismic traveltime domain and well data in measured depth. Classification, especially supervised classification is a highly interactive and iterative process. In such an iteration process one may encounter a deadlock situation and want to step back to an earlier status and follow an alternative solution.

Data selection is seen as a time consuming process. SeisClass administration provides the tools to manage selections individually and re-use them in many classification runs. The previous sections have presented the individual objects in detail.

A good administration provides finally the basis for a continuous process tracking, process documentation and reporting.

In the following chapters, the individual dialogs involved are presented from top-level administration window down to sub-dialogs in a sequence typical for running a classification for the first time.

2.5.1 Classification Context

Figure 62:
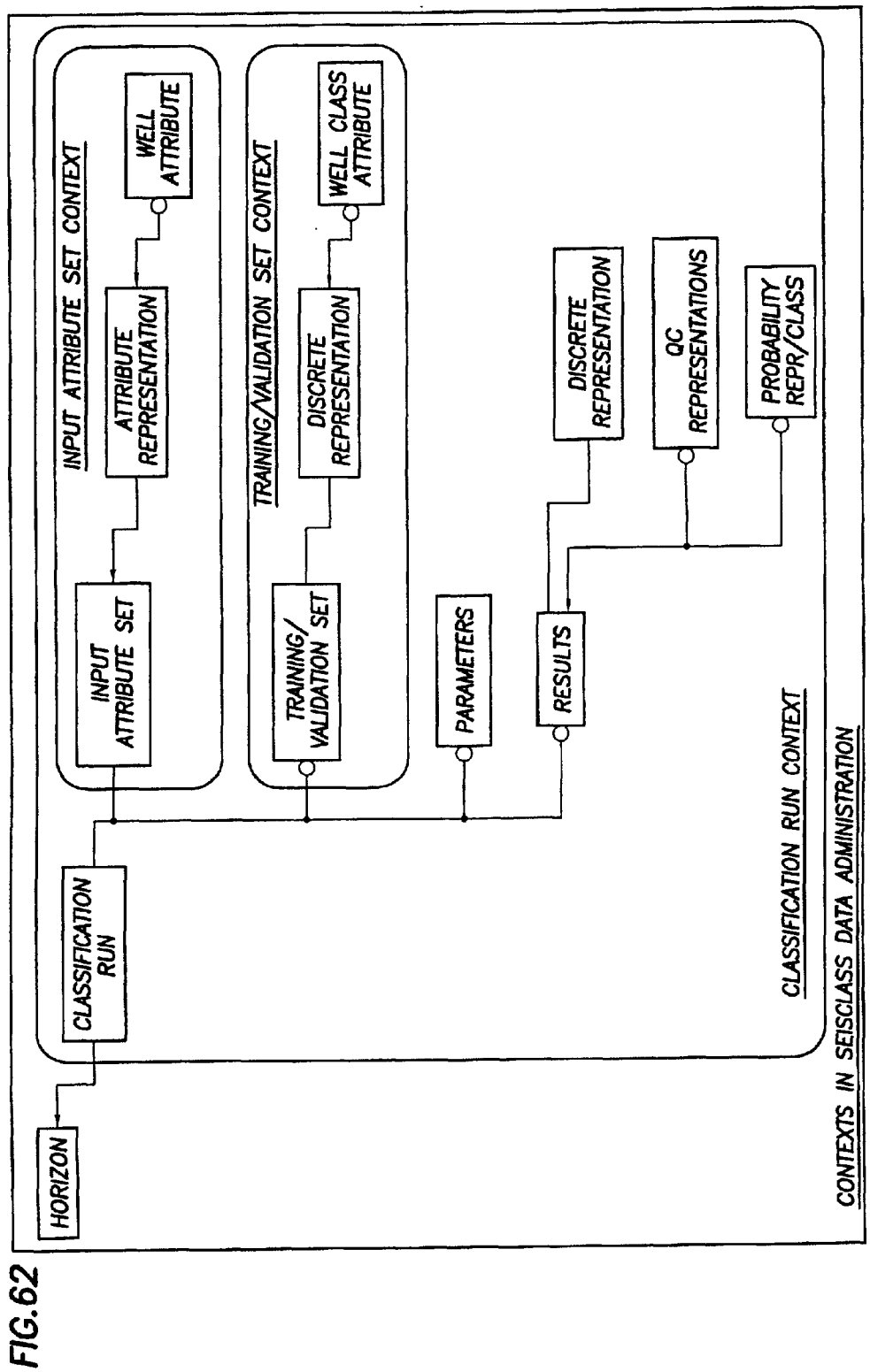
FIG. 62 illustrates contexts in SEISCLASS data administration and the data objects associated to a Classification Run Context, in accordance with a preferred embodiment of the present invention.

Refer to FIG. 62.

SeisClass will refer any data manipulations to a current context. The most important is the classification run context which is exclusively set by the administration window.

FIG. 62 shows the data objects associated to a classification run context.

The classification run in "Context" is exclusively valid on all IMain/SeisClass windows. Any selections and interactions relevant to SeisClass refer to this run in "Context".

A "Classification Run" can only be modified if It has no persistent output binding, i.e. the "Results" group contains only temporary (scratch) representations. In order to re-execute a persistent classification run with slightly modified parameters or different input binding, a new classification run must be created ("New Classification Run") which has no output binding yet and by convenience inherits input binding and parameters from the context. The Classification Run is not permanently instantiated in the database during editing and processing. Its results are temporary and are overwritten until they are explicitly saved ("Save Results Selection Dialogue").

By saving the results of a classification run, it is instantiated in the database and the result representations are permanently created. The classification run is no longer editable because the results would be invalidated.

During the installation or modification of a classification run's input binding, two other contexts are established, the "Input Attribute Set Context" and the "Training/Validation Set Context". These contexts are only locally valid inside the administration window and its sub-dialogs.

The context is handled strictly, implying the following rules:

Rule 26: If an existing classification run is selected as active run which has associated results (existing output binding), the classification run is read-only. The read-only status is clearly visible by insensitive edit functions.

Rule 27: An existing classification run with output binding can not be modified. A new classification run must be created with the same input binding and parameters as the existing run. This new classification run will be visible in the classification run hierarchy. It is marked as temporary classification run because it is not permanently saved to the database.

Rule 28: Before a request to change the classification run context is executed, the current active classification run context is tested for un-saved results. In case any results exist, the user is prompted for a decision.

Rule 29: Changing the classification run context means that any data display that depends on a previous run context is removed from the crossplot window.

Rule 30: Selections in any sub-dialogs that have not been applied yet are lost on changing the classification run context.

Rule 31: Changing the input binding causes the crossplot data display to be cleared. See also the data management rules in "Section 2.4.3.1. The same applies for GridMap(/Section) displays that specifically relate to a SeisClass classification run context.

Rule 32: Components of other classification runs can be displayed for comparison in the map or section window, e.g. training/validation data and results. The current classification run context is unchanged.

Rule 33: The contents of the SeisClass crossplot only reflect the current classification run context. Comparison of data distributions of different classification runs in attribute space is not possible.

2.5.2 Administration Main Window Dialog

The administration window serves as a data navigation and management window. The window makes use of the classification run hierarchy and uses a ListTree widget as browser. The classification context is controlled from here as well.

Figure 63:
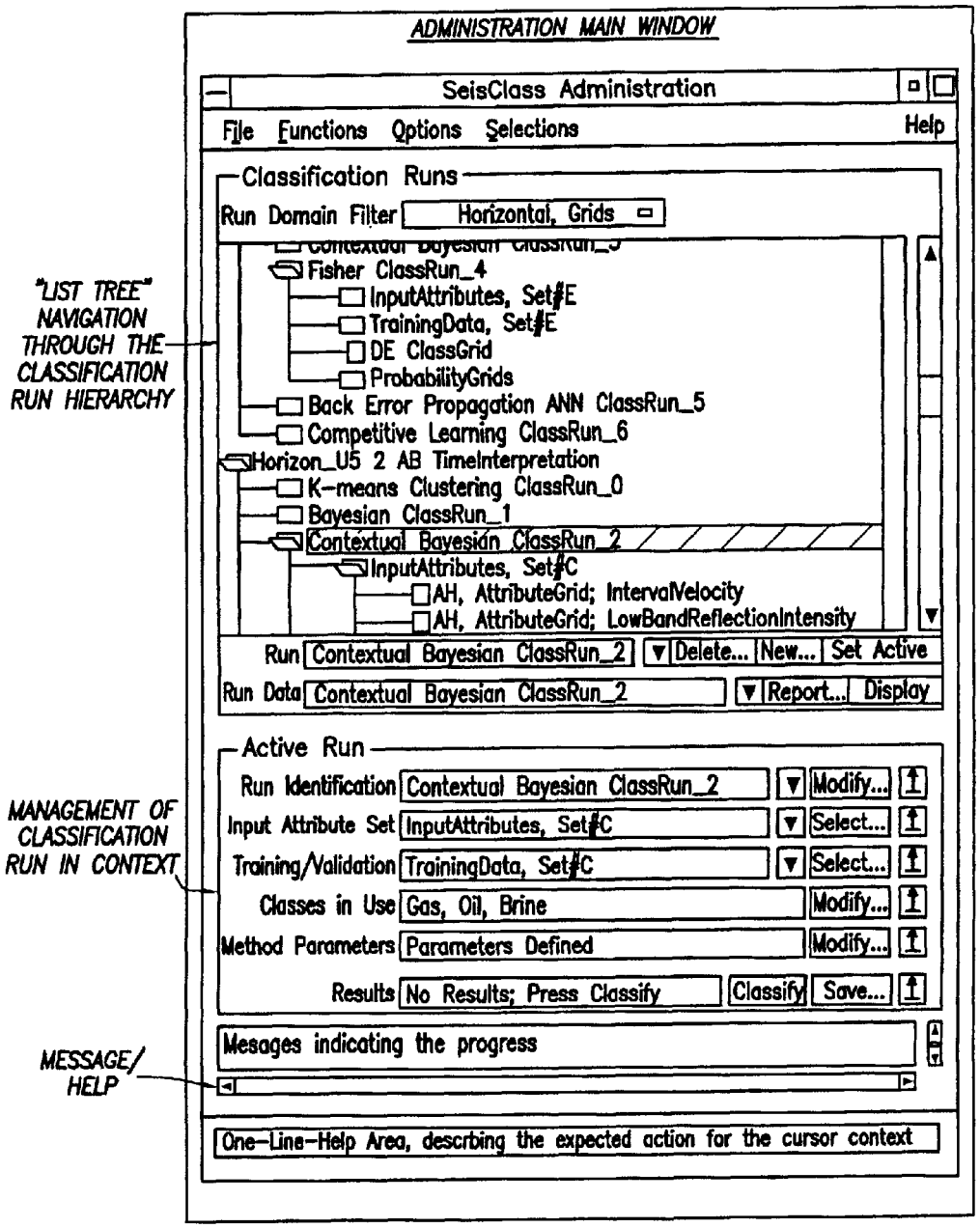
FIG. 63 illustrates SEISCLASS Administration main window including two main frames including 'classification runs' and 'active runs' for a preferred embodiment of the present invention.

Refer to FIG. 63.

The SeisClass Administration window consists of two main frames:

"Classification Runs" allowing the selection of classification runs or classification run components. Here the context for all other activities can be activated or data can be selected for comparison.

"Active Run" offers inspection and editing facilities for a given classification run in context.

Classification runs with persistent output bindings can only be inspected using the "i" inspection button. New runs or runs without persistent results are fully editable. All required input data can be selected from this frame and classification process can be started. All interactions in other windows, such as the map or section window, will refer to this context.

The lower part of the administration window contains an optional message area and the optional one-line help area. The visibility can be controlled via the Option menu.

Figure 64:
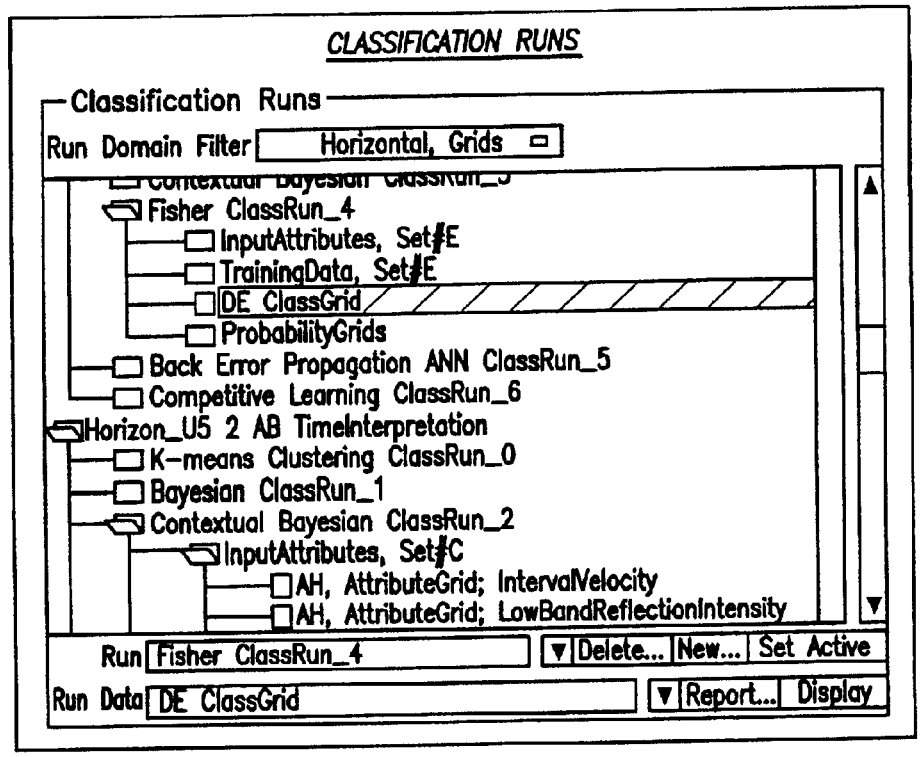
FIG. 64 illustrates classification runs hierarchy for a preferred embodiment of the present invention.

Refer to FIG. 64.

The ListTree widget catches the attention of the SeisClass user with the display of the classification run hierarchy. It serves as the navigation and data selection device. It offers a hierarchical view into the classification run structures via the e.g. interpretation horizons that belong to the given classification domain (here "Horizontal Grids").

The hierarchical structures may be packed/unpacked by selecting the folder icons, individual components are selected by clicking on their name. The user fully controls the level of detail.

The ListTree listing contains only data belonging to a specific domain.

Classification Domain

Data relevant for classification are available in different representation types, for example:

surface attributes as grid representation (default) or

AVO attributes as vertical section representation surface attributes as 2D-line representations (not being implemented in the first release)

Mixing attribute representations is neither meaningful nor technically convenient or possible. Therefore the a priori decision about which classification domain to focus on is useful for prohibiting the user from mixing incompatible data.

Changing the selection of the "Run Domain Filter" causes the classification run hierarchy to be updated.

Where ever a domain selection is required, the setting of the Run Domain filter will be used. The risk of mixing domains is therefore avoided.

Navigation, Selections and Context Activation

ListTree widget's (single) selection feature is used to identify a classification run and to select individual bulk-data representations. e.g. for "Display" in IMain's grid map window (equivalent to the "Display" function in InDepth's Administration Window). Once a classification run or dependent data are selected, the run can be activated as the classification run in context by pressing the "Set Active" button.

The "Run" is determined by tracing the hierarchy of the selected item (highlighted in ListTree) upwards until a classification run object is found. The ComboBox widget, right of the "Run" label, is updated accordingly. The ComboBox itself offers an alternative classification run selection on a 'run-by-run' basis that is independent of the hierarchy and its current complexity. It will offer all classification runs associated with the current reference horizon (in the case of "Horizontal, Grids domain").

Pressing "Set Active" changes the current classification context and updates the Active Run area. The editability of the classification run depends upon the existence of results coupled to the classification run.

New Contexts can be generated by calling the sub-dialog for creating a new classification run ("New" . . . button). The selected run can be deleted ("Delete" . . . button): this button is only sensitive if a classification run is selected.

"Run Data" reflect s the current selected component. Also this is implemented as a ComboBox widget, allowing an alternative selection mode for all data (representations) belonging to the same set (parent), e.g. all input attribute representations.

"Report . . . " opens a browse window that supplies descriptive information on the data selected in context.

Active Run

This section offers an overview over the main components of the classification run in context. The section is updated if the context is changed (e.g., by having pressed "Set Active" in the Classification Runs section).

Figure 65:
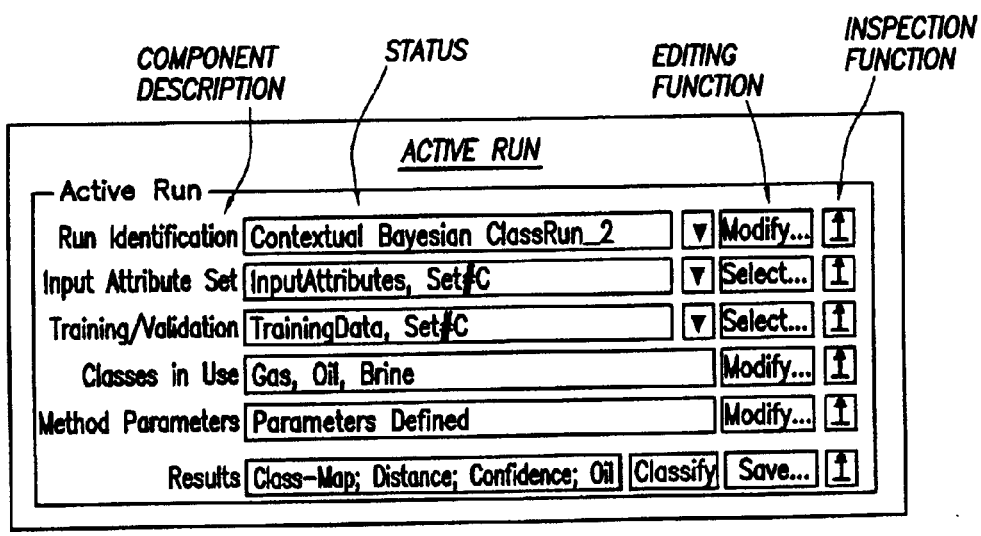
FIG. 65 illustrates information presented for an active run in a preferred embodiment of the present invention.

Each time a classification run context is replaced by a new context, the old context is tested for any temporary results that have not yet been saved, i.e., made persistent in the data base. If temporary results exist, the "Save Results Selection Dialogue" is automatically popped up, offering the opportunity to save the results obtained in the old classification run context Refer to FIG. 65.

Each component is described by label, read-only status/selection field and can be inspected—"i" button— or modified by pressing the respective action button. The sequence reflects the logical work flow.

If the classification run has no persistent output binding, i.e. no results have been stored yet, the editing functions are sensitive. (See "Rule 26:" and "Rule 27:")

Not all components will be required/meaningful for all classification methods. The classification method used in the current run controls the sensitivity of the component status display and the respective component inspection and edit action button.

"Run Identification"—The current classification run can be modified (Modify . . . ). The Modify . . . button is only sensitive if a classification run is selected.

"Input Attribute Set"—This component is mandatory for all classification methods. The selection can be facilitated or changed by selecting an Input Attribute Set already available via the ComboBox widget. The "Select . . . " button calls the "Input Attribute Set Selection Dialog" which offers creation of new or manipulation of existing Input Attribute Sets.

"Training/Validation"—This component is only required for supervised classification methods. The selection can be facilitated or changed by selecting a Training/Validation set already available via the ComboBox widget. The Select button class the "Training Validation Set Dialogue" which offers creation of new or manipulation of existing Training/Validation sets.

Classes in Use"

Unsupervised classification methods will do automatic class assignments. Only the number of classes is user-controlled. The read-only text field will signal the status: with "Modify . . . " the user gets the opportunity to change the number of classes being used or to define the class colors. (See also "Unsupervised Methods".)

Supervised classification methods require manual class assignments: the read-only text field will list the classes selected; with "Modify . . . " the user gets the opportunity to create/edit the current class definition. The classification method will control the actual layout of the dialog as it is also used for defining the class-dependent parameters. (See also "Supervised Methods".)

"Method Parameters"—Some methods will require the definition of method-dependent parameters. (See Table 8, "Classification Methods, Overview". In these cases, the definition status will be shown in the read-only text; by pressing "Modify . . . ", one may edit the method-dependent parameter settings. The respective dialog, of course, will vary from method to method. (See Table 10, "Method—Parameter Catalogue"). The individual dialogs are discussed in section "Method Parameters".

"Results"

A classification cannot be executed unless all required input data and parameters are set. The combination of mandatory components depends on the classification method being used. The read-only status line "Results" informs the user about whether the input specification is complete. A classification can be started or repeated.

"Classify" performs the classification or a re-classification if earlier, temporary results exist. This button will only be sensitive if all required input is specified. A process completion meter and interrupt dialog will appear as long as the process is running.

In case of the unsupervised "Competitive Learning Method", the neural network is trained first and the classification is started automatically afterwards.

In the case of an error that may obstruct any result or severely deteriorate the quality of the classification result, the user will be informed in advance. Error messages are presented as pop-up information dialogs and outline measures for remedy.

In the case the input attribute set contains data representations that are intolerable for the method assigned to the current classification run, these representations will be ignored. The user is informed by a pop-up information dialog.

"Save . . . "—If a classification has been performed, the current active run can be made persistent in the database, i.e. the results and the complete process history may finally be written to the database. Some methods offer optional output beyond the classification result. In such cases (see Table 8, "Classification Methods, Overview"), "Save . . . " will lead the user to the respective selection dialog ("Save Results Selection Dialogue"). After having saved the results, the classification run entry in the hierarchical list changes its status from temporary to persistent. The action buttons become insensitive (see "Edits Functions", including "Classify and Save . . . "); only a component inspection via the I-buttons will be accessible.

Message/Help Area

Figure 66:
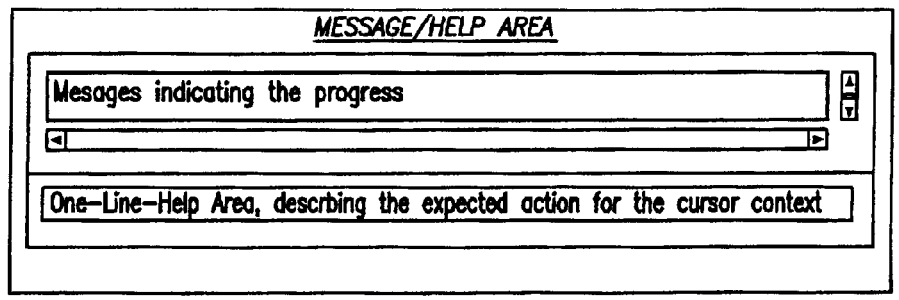
FIG. 66 illustrates a message help area dialog of SEISCLASS in a preferred embodiment of the present invention.
Figure 67:
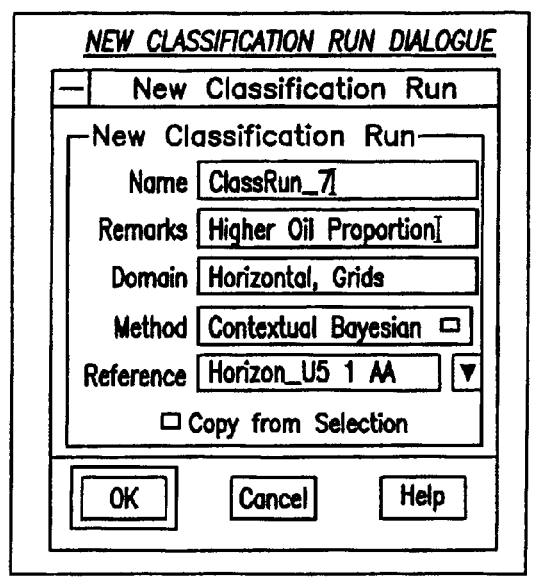
FIG. 67 illustrates a new classification run dialog of SEISCLASS in a preferred embodiment of the present invention.

Refer to FIGS. 66 and 67.

FIG. 66 illustrates the Message/Help Area. FIG. 67 illustrates the New Classification Run Dialogue.

Both the message area and the one-line-help-area are optional. The Option menu will offer the respective controls.

The relative size of the message area in relation to the Classification Runs hierarchy display can be controlled by a sash that is placed between the Classification Runs and the Active Run sections on the right hand side.

2.5.2.1 New Classification Run

This dialog offers the creation of a new classification run. The dialog is mode-less. The dialog does not require a classification run to be selected in context. It takes, however, the current context classification run as default settings. If a classification run is selected in the "Classification Runs" list. (See "Navigation, Selections and Context Activation".) The toggle "Copy from Selection" will be sensitive.

A classification run is identified by a user-defined "Name" and a "Remarks" string. The classification run is uniquely coupled to a classification domain which is inherited from the domain setting in the Administration Window. (See "Classification Domain".) This setting will later also constrain the input attribute set selection. Only sets consistent with the classification run's domain will be selectable. Furthermore, this dialog allows the specification of the classification "Method" and a structural "Reference", e.g. a horizon structure grid in the case of a classification domain "Horizontal, Grids". If a classification run is selected ("Navigation, Selections and Context Activation"), the settings are inherited.

The toggle "Copy from Selection" offers the option to copy a classification run in order to make an alternative run and compare the results. If a classification run is currently selected, this option is set by default. If no context is available, or the option is switched off, an empty classification is preset to be Fisher Discriminant. The user will create a new classification run (as a temporary classification run) by pressing "OK" or abort the specification with "Cancel", returning to the Administration Window.

2.5.2.2 Modify Classification Run

Figure 68:
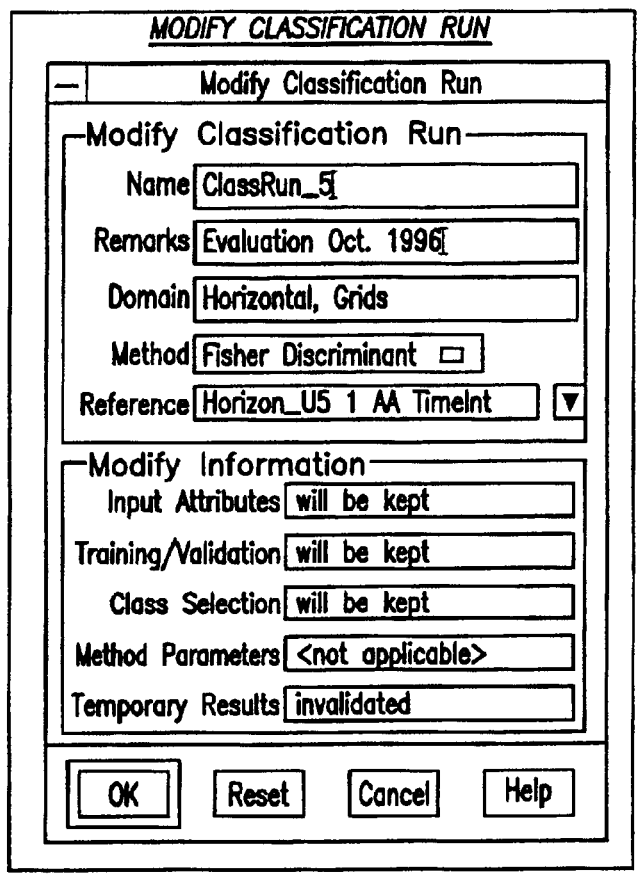
FIG. 68 illustrates a dialog for modifying an existing classification run, in accordance with a preferred embodiment of the present invention.

Refer to FIG. 68.

This dialog allows the modification of an existing classification run. It is application modal: it will not be possible to change the classification context as long as this dialog is visible. The dialog is accessible from the "Run Identification" convenience button "Modify . . . " and from the respective "Functions" menu bar entry.

It requires a classification run to be in context as "Active Run" and offers the current context as default. (See "Section 2.5.2".) The main purpose is to:

Change the classification runs "Name" and "Remarks". These modifications do not have any effect on results eventually existing.

Modify the classification "Method". This option is only sensitive if the classification run in context has no persistent output binding. If temporary results exist, the current run will be invalidated, i.e. cleared, if necessary.

The lower section "Modify Information" of this dialog offers a preview of what may happen to the selections/settings of the current context if "OK" is selected. Modification of these selections are handled via the section "Active Run".

"OK" will execute the modifications and return to the Administration Window. "Rest" will set the dialog state back to the current context. "Cancel" will close the dialog and not apply any changes.

2.5.2.3 Delete Classification Run

The scenario outlined in Appendix E of the SeisClass Requirements Document ["SC Req"] indicates that the number of classification runs quickly accumulates. Therefore, a convenient clean-up functionality is provided through this dialog.

Figure 69:
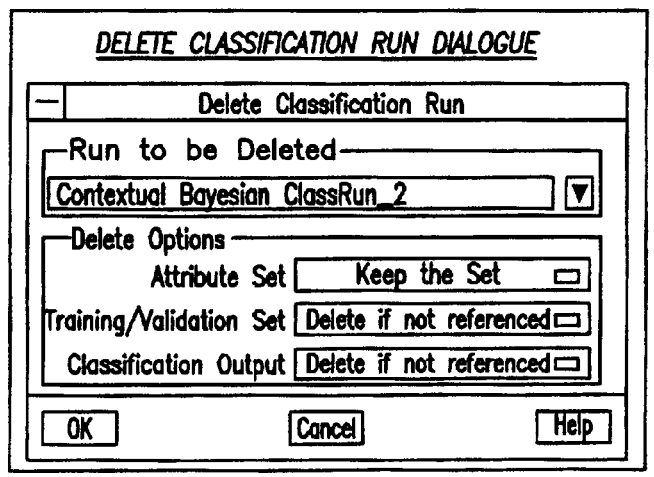
FIG. 69 illustrates a delete classification run dialog for deleting an existing classification run, in a preferred embodiment of the present invention.

Refer to FIG. 69.

The above specification presents the user with a classification run selector (ComboBox widget in section "Run to be deleted") that inherits the context from the current classification run.

In the subsequent section "Delete Options," it may be specified how the components should be handled when the run in context is being deleted.

"Input Attribute Set"

"Training/Validation Set"

The data model defines the Input Attribute Sets and Training/Validation Sets as independent and sharable between different classification runs. The user can therefore only express his/her intention to delete the sets in conjunction with the classification run (option "Delete if not referenced"). Any references to other existing classification runs must prevent the set deletion.

The default setting for the delete option of the sets is "Keep the Set".

"Classification Output" Keeping the results of a deleted classification run will generally not make sense. The deletion option default will therefore be "Delete" if not referenced. The user may exceptionally over steer this option to "Keep the Results".

Class collections and parameters are always deleted as they only refer to one classification run.

When leaving the dialog with "OK," the user is prompted for confirmation. Upon confirmation the data will be deleted in the database and the classification run hierarchy will be updated accordingly.

"Cancel" aborts the dialog and returns the user to the administration window.

2.5.2.4 Menu-Bar

As the SeisClass Administration Window is a main window, It owns a menu bar. Next to the mandatory "File" and "Help" entries the main functions are structured into the following:

"Functions" offering the available functions that may be executed

"Options" offering options for operational behavior and window layout

"Selections" offering the selection editors are necessary to define a classification run's components Functions The Function pull-down menu consists of three sections:

The classification run handling section allow the user to create, modify, delete and save classification runs. All functions require their own sub-dialogs, "New Classification Run," "Modify Classification Run," and "Delete Classification Run." Please note that the "Modify Classification Run" dialog may be partially read-only for classification runs with persistent output binding.

"Data Analysis" leads the user to another pull-down, offering various data analysis options. "Classify" executes a classification run and "Save Classification Run . . . " ("Save Results Selection Dialog") finally saves the classification run and its results as persistent database objects The report and message window hanging section offers management functions for "Report generation" (see "Report" for details) and the message window— "Display Message Area Log" —namely full page listings, print. The current contents of the message window can be deleted with the "Clear Message Window" option All functions are also available via convenience buttons in the administration main window except the message window handling.

Figure 70:
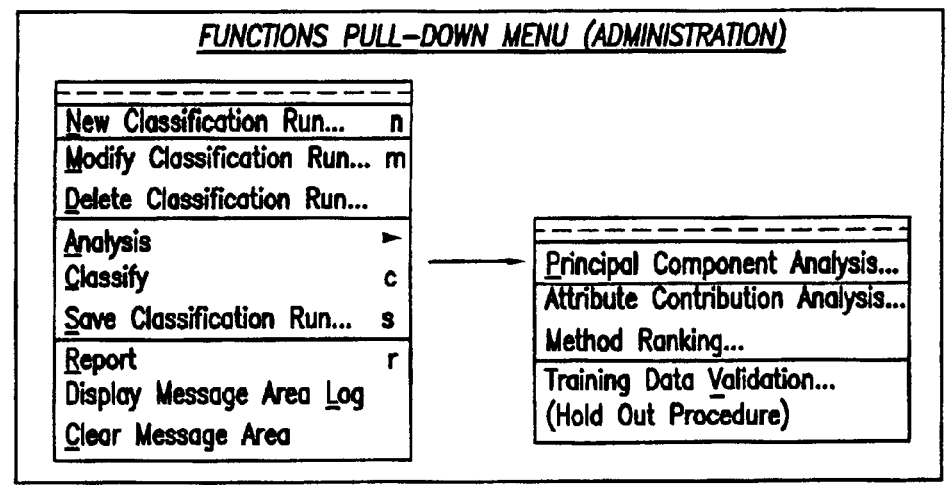
FIG. 70 illustrates a function pull down menu (Administration) dialog including three sections further including the classification run handling section, the data analysis section, and the report and message window hanging section in accordance with a preferred embodiment of the present invention.

Refer to FIG. 70.

Functions Analysis

All available functionality regarding systematic data analysis before and during classification is covered in this pull-down menu. The contents are regarded as auxiliary functionality and therefore not in the top-menu layer. However, it has a tear-off mode so that it can be kept visible on demand.

Note: This specification is based upon the requirements document. The availability of the functions mentioned here depends upon further research and feasibility studies. It is a question of prioritization and resources which functions are actually being implemented.

Most analysis methods are based on statistics; their significance to no-statistical classification methods is limited. Training Data Validation (Hold Out Procedure) applies only to supervised classification methods.

Functions that are not available/meaningful in the current classification run context will be insensitive; the respective sub-dialogs are automatically unmanaged if the context changes and makes the function unavailable/meaningless.

Options

Figure 71:
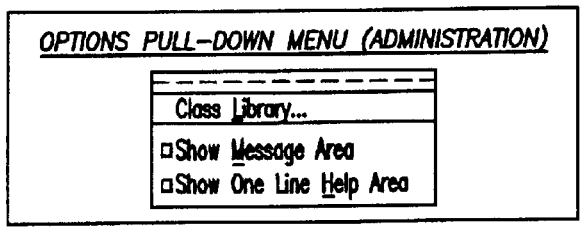
FIG. 71 illustrates an options pull down menu (Administration) dialog in accordance with a preferred embodiment of the present invention.

Refer to FIG. 71.

The Options pull-down menu consists of:

Class catalog management ("Class Library . . . ") which leads to a separate dialog (See section "Class Library".)

Dialog layout functions allowing visibility control of optional dialog components, namely "Message Area" and "One Une Help Area". The default is "Message Area" and "One Line Help Area" being visible.

Selections

The "Selections" pull-down menu allows access to all dialogs that perform selections relevant to the classification run context. Most of the selections can also be made via the convenience buttons in the section "Active Run".

Figure 72:
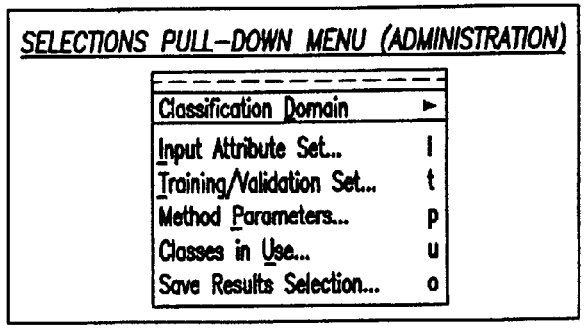

Refer to FIG. 72.

"Classification Domain" Selection

"Input Attribute Set" Selection

"Training/Validation Set" Selection

"Method Parameters" Selection

"Classes in Use" Selection

"Save Results" Selection

The individual selection options are sensitive/insensitive depending on the classification method context.

2.5.3 Input Attribute Set Selection

The Input Attribute Set Selection dialog allows the definition of a collection of attributes to be used in conjunction with a classification. Usually the number of available attributes is limited; building collections that are re-usable in many classification runs is therefore a convenient acceleration in the working sequence.

All set management functions, creation, modification and deletion are available from this dialog.

Refer to FIG. 73.

Entry Points

The dialog is made available from the Administration Window menu-bar "Selections", the convenience Select . . . and the i-button in the "Active Run" area. When initiated from the i-button, the dialog is operated in informational, read-only mode.

The dialog inherits the Administration Window's "Run Domain Filter" setting as pre-selection context. Only Input Attribute Sets belonging to the same domain can be created, edited or deleted.

Dialog Components

As indicated by the frame titles, the dialog contains two main sections:

the "Input Attribute Set"—allows the set selection and set management, name creation (New . . . )

The "Attribute Selection"—serves as attribute selector and attribute selection manager. From here it is also possible to call the "Well Supplement Selection Dialogue"

Input Attribute Set

The current context can be modified via the ComboBox widget, listing all the available existing input attribute sets, sorted by reference horizon. If any input attribute is already defined through a classification run context, this set is pre-selected as 'set in context'.

The "Delete" option will check whether the set in context is referred from another classification run and ask for confirmation if this is not the case. After confirmation, the set is deleted in the database. Sets that are used by other classification runs cannot be deleted; the user is informed via an information dialog and a message on the message window.

Refer to FIG. 74.

Attribute Selection

The first line shows the current "Domain" in context. Only attribute representations corresponding to this domain are selectable. Changes to the domain can only be performed in the administration window ("Classification Domain").

The second line consists of a ComboBox widget to set the "Reference". In the case of domain "Horizontal Grids", this will be the list of available structural surface grids defining a reference surface and grid library. The contents of the attribute/representation settings in the lists below are filtered by the "Reference" selector setting. It will definitely be possible to select representations belonging to another surface. The grid library must, however, be the same for all members of a set. The normal usage scenario assumes that it is most likely that all attribute representation belong to the same structural reference.

The left list, "Attribute Types", offers all attributes (surface attributes for horizontal classification), for which representations can be found. The right list, "Attribute Representations", offers all representations for the given reference (i.e. horizon) and attribute type (i.e. surface attribute).

The lists "Attribute Types" and "Attribute Representations" are tightly connected to the "Attributes in Set" listed below. The connection is managed by the action buttons:

"Add Attribute"—to add the selected attribute representation the Attributes in Set list "Remove Attribute"—to remove the selected representation in Attributes in Set from that list and "Remove All"—to clear all selections In Attributes in Set Refer to FIG. 75.

Any selection in "Attribute in Set" updates the following:
Reference ComboBox widget,
Attribute Types list and
Attribute Representations list Convenience Selection Behavior The following acceleration functions will be available via double-clicks. A double-click in "Attribute Types" causes the first representation in "Attribute Representations" to be added to the "Attributes in Set" (provided it was not selected before).

Well Supplement

An attribute set may have an additional collection of well data, the "well Supplement". For each well that is a member in the well supplement, a list of attributes equivalent to the attributes in Attributes in Set has to be provided. The attributes can either be directly derived from logs or from attribute generation from synthetics.

As this attribute collection is directly dependent on the Attributes in Set selection, it is invalidated if a new attribute representation is added to the set. The status of the Well Supplement is shown in the read-only field between the label and the "Select . . . " action button that pops up the "Well Supplement Selection Dialogue". The following states are possible:

"Supplement defined" if a well supplement selection is defined (attributes for at least one well/bore-hole) and complete, "Supplement incomplete" if a supplement selection exists which is incomplete, i.e. some attributes for some wells are undefined or "None" if no wells have been selected into the well supplement Dialogue Action Buttons The standard dialog action buttons perform the following functions:

"OK" applies the current selection to the input attribute set in context according to the rules. The set selected in context is communicated to the "Active Run" which is updated accordingly if necessary.

Any geometry incompatibility between the set and the "model_entity" of the current classification run is signaled:

"the structural reference of the classification run is incompatible with the selected input attribute set. Adjust the classification run's reference? [Yes][No]"

"Apply", the default button, same as "OK". The dialog, however, is kept on the screen. "Apply" stays insensitive if the dialog is in the read-only mode.

"Rest" restores the selections as they were after the last "Apply". The dialog is kept. "Reset" is insensitive if the dialog is in read-only mode.

"Cancel" quits any set modification and un-maps the dialog

"Help" calls the 'help in context' for input attribute selection 2.5.3.1 New Attribute Set Dialog Refer to FIG. 76.

This dialog enables the creation of new input attribute sets. The classification run domain is inherited from the administration window ("Classification Domain").

As input attribute set is identified by a user-defined "Name" and a user defined "Remarks" string. Both can only be set once in this dialog. It is not required that set names have unique names. In case of multiple sets with same name, the user will have to distinguish the sets by means of the creation date and time.

A set will be coupled to a structural reference, i.e. a structural grid surface in case of domain "Horizontal, Grids". This link is used for sorting and defaulting purposes. The reference is set by means of a ComboBox widget.

If an input attribute set was selected in context when activation the "New . . . " input attribute set creation function. the selection can be copied from that context. This includes all attribute selections and any available well supplements. If no set was selected in context before, the option is insensitive. Default is "Copy from current Context" on.

"OK" commits the requested set creation and removes the dialog. The new attribute set is automatically set into context of the Input Attribute Set selection dialog. The user is ready to select new attributes or edit the inherited selection.

"Cancel" quits the set creation process and removes this dialog. The context of the Input Attribute Set selection dialog stays unchanged.

2.5.4 Well Supplement Selection Dialog

The selection of "Well Supplement Selection Dialog" manages the quantitative well control of an attribute set. The Well Supplement Selection is part of the attribute set. Quantitative well control means to supplement the attribute vectors that are already given by the attribute grids with attribute vectors representing well data.

Please refer to section "Extensions to general_set" for the data modeling and specifically the sketch "Grouping of SeisClass Input Attributes" for the well binding.

The well attributes are derived from one of the following:

well logs (at the respective horizon/grid intersection or the respective horizon's well tie)

synthetics transformed into the 'seismic' attribute according to the history information (at the respective horizon/grid intersection or the respective horizon's well tie)

a constant if an attribute value can be estimated but not derived from log data.

Entry Point

This dialog is only callable from the Input Attribute Set Selection dialog, "Well Supplement Select . . . " ("Well Supplement").

Refer to FIG. 77.

Dialog Components

The dialog has two main frames:

The "well Supplement to Attribute Set Selection" containing a table listing all wells of the well supplement versus the attributes defined by the Input Attribute Set Selection: a newly created attribute set will have an empty Well Supplement, thus an empty table will be presented.

The "Cell Context Selection" shows the table cell context and allows its modification.

Both frames have their set of action buttons.

Well Supplement to Attribute Set Selection

The table catches the attention. The visible part of the table can be increased by resizing the dialog. Each well supplement attribute vector is represented by a table row. The columns refer to the attribute representations that have been defined in the input attribute selection. The column headers identify the attribute representations.

By clicking in a table cell, a table cell is activated. The "Cell Context Selection" frame is immediately updated; the well/bore-hole—identified by the row—is set as 'well in context' (ComboBox widget), the attribute—identified by the column—is set as 'attribute in context' (ComboBox widget).

The contents of the well supplement can be managed by means of the action buttons that are situated below the table. The user may add or remove table rows, i.e. add or remove a well from the well supplement by the following functions, available through action buttons:

"By Name . . . "—add a well/bore hole by name, presenting a well-by-name selection dialog, a simple standard well section dialog.

"By Well Log . . . "—add one or many wells that have at least one version of a named well log (channel name) in common: the selection is handled by a separate dialog, the dialog is a generalized version of the selector used in InDepth, Well Velocity Selection.

"Remove Selected"—removes the well/bore hole identified by the current row

"Remove All"—clears the whole table; the user is prompted for confirmation before this action is committed.

When new rows, i.e. wells/bore-holes are added to the table, its cells are filled with the text "<empty>" to mark them as 'to be defined'. Actually, any "<empty>" cell invalidates a whole attribute vector as all attributes must be defined in order to be used as a complete attribute vector. Some convenience functions ("Find Empty Cells . . . " and "Update Empty Cells . . . ") located under "Cell Context Selection" are offered to specifically address "<empty>" table cells.

Refer to FIG. 78 for selection by log type.

Cell Context Selection

Refer to FIG. 79 for cell context selection frame.

All information shown in this frame refer to the table cell which has been selected in the frame above, Well Supplement to Attribute Set Selection.

The cell context is indicated by two ComboBox widgets, identifying the well/bore-hole in context and attribute in context. These selections can be changed, thus offering an alternative way of navigation through the well supplement table.

The cell context selection can be manipulated by either of the following ways:

via cell selection in the well supplement table; updating the data in the Cell Context Selection, via the ComboBox widgets changing the row or column and updating the table selection.

The sub-frames "Generation Mode" and "Well Logs available" give a detailed description of how the attribute value is going to be generated. In total, there are three different modes available:

"Pick from Well Log"—This option is sensitive if at least one log (having the measurement given by the attribute) for the given well-bore-hole exists. The log list "Well Logs available" to the right, then shows this sub-set of well logs.

"Generate from Synthetics"—This option is sensitive in the following situations:

if at least one synthetics seismogram is available for this wells/bore-hole and if the attribute's history information is sufficient to generate the attribute from synthetic seismic.

The log list Well Logs available to the right is the n showing all well logs of type 'synthetics'.

"Constant Value"—This option is always sensitive. The text-field below the option is only sensitive if the option Constant Value is selected.

Cell Context Selection Action Buttons

The following action buttons offer a variety of options for how to populate the well supplement table. The well supplement status in the Input Attribute Set Selection dialog is updated accordingly, i.e. it is set to:

"Supplement defined" if the selection is complete

"Supplement incomplete" if the selection in incomplete, i.e. cells flagged with <empty> exist, or "None" if no wells have been selected into the well supplement.

In detail, the following actions are possible:

"Update Cell" applies the current setting in the "Cell Context Selection" to the well supplement table.

Refer to FIG. 80 for "Find Empty Cells".

"Find Empty Cells . . . " is only sensitive if table cells flagged with <empty> exist. Then a simple list is offered, listing all empty cells by well/attribute reference. Clicking onto a list element causes the well supplement table context and the "Cell Context Selection" to be updated. If any previously empty cells updated, it will be removed from the list. If the last list member has been removed, the dialog is automatically un-mapped.

"Update Column"—This option will be insensitive if the constant attribute value option has been selected. In all other cases, the system will try to fill all cells in the column (wells/bore-holes) with the current "Cell Context Selection". The specified well log name (channel name) is searched for each well/bore-hole and the latest version is selection into the well supplement table. Wells for which the given log does not exist are flagged as <empty>. The following function is more selective:

"Update Empty Cells"—This function will be insensitive if the constant attribute value option has been selected. In all other cases, the system will follow the same procedure as "Update Column", but will only set <empty> cells. If this option is repeatedly executed, a specific hierarchy of well logs can be selected.

Convenience Selection Behavior

Any well attribute selection is not immediately reflected in the well supplement table above. A double-click selection in the "Well Logs available" list will cause an implicit "Update Cell" action.

Dialog Action Buttons

The well supplement dialog does not keep Its own buffer of last changes. The well supplement is part of the attribute set selection which keeps a status to which it can be reset. Therefore, only a "Close" button is offered with the well supplement selection dialog:

"Close" un-maps the well supplement selection dialog

"Help" calls the 'help in context' for well supplement selection

Refer to FIG. 82.

2.5.5 Training Validation Set Dialog

The Training/Validation Set selection dialog allows the definition of a set of data to be used in conjunction with the training and/or validation step during a supervised classification. Training and validation data represent a priori information and are naturally quite limited in the number. Furthermore, the distribution of the a priori data is invariable within a project so that it is very likely that training data can repeatedly be used. Therefore the definition of a training/validation set is a convenient acceleration in the working sequence.

Refer to FIG. 81.

Entry Points

The dialog is made available from the menu-bar "Selections" pull-down, the convenience "Select . . . " and through the i-button in the "Active Run" area. It is available only in a classification run context using a supervised classification method. It is read-only if initiated from the i-button.

The dialog inherits the Run Domain filter ("Classification Domain") setting as the pre-selection context. Only Training/Validation sets belonging to the administration windows domain can be created, edited or deleted.

Dialog Components

The dialog comprises two main frames:

The "Current Training/Validation Set" section enables set management (via the function buttons "New . . . " (see "New Training/Validation Set Dialogue") and "Delete") and gives an statistical overview on the training and validation data defined in the bulk representation of the set.

The "Training/Validation Well Selection" offers the opportunity to add well data as training/validation data.

Current Training/Validation Set

The main component of a training/validation set is the 'mask-grid', a discrete index representation assigning specific cells as a training or validation location for a specific class (the type is encoded as sign-bit; as the grid is single valued, the cell can either be a training or validation data point). The geometry of this bulk data representation must be identical to the input attribute set. The data model does not provide an explicit link between input attribute set and training/validation set. The requirement that training/validation set and input attribute set must have identical geometry must be ensured by the application that couples the set to a given classification run. This consistency check has to be performed if a training/validation set selection is committed ("OK" or "Apply").

As existing training/validation set can be selected into context by means of the ComboBox widget, offering all training/validation sets for the classification domain in context.

Right of the ComboBox widget, the "Delete" function offers the training/validation set in context to be deleted from the database. A Training/validation set can only be deleted if it is not referred to by any other classification run than the run in context. If a set cannot be deleted this is reported by an information dialog, it is ready for deletion a confirmation dialog will protect the set against unwanted deletions.

Right of the Delete button the "New . . . " function pops up a separate set definition dialog ("New Training/Validation Set Dialog"). Below the set management controls a brief statistic is given about how many training and validation samples were defined for each class. The class selection is inherited from the classification run in context. It is given by the index-to-class-id decode relation, attached to the training/validation bulk representation.

The contents of the training/validation bulk representation are managed either from the IMain Map window or the "nD-Crossplot" window.

Training/Validation Well Selection

This frame concentrates all fuctionality related to the Well Supplement of a training/validation set.

Refer to FIG. 83.

Again the database does not have explicit links from the training/validation set to the input attribute set; the individual classification run to which they are assigned provides the technical link between the sets. This means that a well can only be used quantitatively if:

the given well is member of both the training/validation and the input attribute set's well supplement, all attributes can successfully be generated (the well supplement table has no empty cells (See "Well Supplement to Attribute Set Selection") and a class had been associated with the given well which can be done in this dialog section The top part of the frame lists all wells that have been selected as part of the set. Each list entry consists of the well/bore-hole name, the type-training or validation and the source of the class definition: constant, manual class assignment or class-log (the class is read tat the reference horizons log intersection). Note: Whether this option is implemented depends upon the availability, accessibility of class-logs and a consistent, common class definition.

The well list has extended selection policy. The multiple, extended selection feature is used to update optionally many well selections in one go. The same applies for the well removal function. The Current Well is updated on unique selection, but kept on non-unique selections.

A row of action but tons provides management functions for the wells in the set:

Selection of Wells:

"By Name . . . "—add a well-bore-hole by name, presenting a well-by-name selection dialog, a simple standard well selection dialog "By Well Log . . . "—add one or many wells that have at least one version of named well log (channel name) in common; the selection is handled by a separate dialog, the dialog is a generalized version of the selector used in InDepth, Well Velocity Selection.

"Wells List from Input Attribute Set"—replaces the current list by the list of wells in the current classification run's input attribute set (Well Supplement).

And De-Selection of Wells:

"Remove Selected"—removes the well/bore-hole currently selected in the main list. If more than one well were selected, the user is prompted for confirmation before this action is committed.

Refer to FIG. 84.

The ComboBox labeled with "Current Well" allows an alternative well selection. This widget is simultaneously used to indicate the well in context because the selection list may have been scrolled so that the current well is invisible. Selection actions in the main list are immediately reflected in the ComboBox widget.

The sub-frames Status and Class Definition finally provide the class and data type.

Status

The options "Training" and "Validation" are always sensitive; the Status selection behavior is one-of-two.

Class Definition

If class-logs are available, the "from Log" option is sensitive and the selection behavior is one-of-two. The ComboBox log-selector offers all available candidates for the current well. If no class logs are available, the from log option is insensitive and the "Constant" automatically pre-selected.

All options for "Class Definition" are presented in ComboBox widgets. The contents of the class selector is given by the classes in use class list that is a property of the classification run in context.

Well-in-Context Selection Action Buttons

Once a well selection is in context, this selection ay be applied either of following:
- to the well currently selected, "Update Current Well" or
- to all wells selected in the main list by "Update Selected Wells". This function will try to distribute the status and the class definition to the wells selected in the main list.

Dialog Action Buttons

The standard dialog action buttons perform the following functions:
- "OK"—applies the current selection the training/validation set in context. The set selected in context is communicated to the 'run in context' which is updated accordingly if necessary. The dialog is un-mapped. "OK" is insensitive in read-only mode.
- "Apply" (Default Button)—same as "OK"; the dialog, however, is kept. "Apply" is insensitive in read-only mode.
- "Rest"—restores the selections as they were after the last "Apply". The dialog is kept. "Reset" is insensitive In read-only mode.
- "Cancel"—quits any set modification and un-maps the dialog.
- "Help"—calls the 'help in context' for training/validation set selection.

2.5.5.1 New Training/Validation Set Dialog

This dialog enables the creation of new training/validation sets. The classification run domain is inherited from the administration window ("Classification Domain").

A training/validation set is identified by a user-defined name and a user defined remark string. Both can only be set once in this dialog. It is not required that set names have unique names. In case of multiple sets with same name, the user will have to distinguish the sets by means of the creation date.

Refer to FIG. 85.

A set will be coupled to a reference, i.e. a structural grid surface in the case of domain "Horizontal, Grids". This link is used for sorting and defaulting purposes. The reference is set by means of a ComboBox widget.

If a training/validation set was selected in context when activating the "New . . . " training/validation set creation function, the selection can be copied from that context. This includes the bulk representation and any available well training/validation supplements. If no set was selected in context before, the option is insensitive. Default is "Copy from current Context" on.

"OK" commits the requested set creation and removes the dialog. The new attribute set is automatically set into context of the Input Attribute Set selection dialog. The user is ready to select another bulk-representation, define well data or edit the inherited selection.

"Cancel" quits the set creation process and removes this dialog. The context of the Training/Validation Set selection dialog stays unchanged.

2.5.6 Classes in Use Dialogs

This dialog may appear in two basically different variants depending upon the availability or not of class-dependent para meters.
- Class versus parameter table or
- class list Above the table or list, the classification run in context is presented as a reference in a read-only text field.

The dialogs directly depend upon the classification methods. If the classification method is changed while the Classes in Use dialog is active, it is automatically un-manager; any non-applied changes are lost (no warning).

Entry Points

The dialog is made available from the Administration Window menu-bar "Selections", the convenience "Modify . . . " and the i-button next to it in the "Active Run" area. The dialog is read-only when activated from the i-button or fully editable when It has been initiated from "Select . . . " or from "Selections—Classes in Use".

2.5.6.1 Supervised Methods

Refer to FIG. 86 for classes in use dialogs (supervised methods).

Below the table or list, the class selection and definitions can be manipulated. The following action buttons are available: handled by a separate dialog, the dialog is a generalized version of the selector used in InDepth, Well Velocity Selection.
- "Wells List from Input Attribute Set"—replaces the current list by the list of wells in the current classification run's input attribute set (Well Supplement).

And De-Selection of Wells:
- "Remove Selected"—removes the well/bore-hole currently selected in the main list. If more than one well were selected, the user is prompted for confirmation before this action is committed.

Refer to FIG. 84.

The ComboBox labeled with "Current Well" allows an alternative well selection. This widget is simultaneously used to indicate the well in context because the main selection list may have been scrolled so that the current well is invisible. Selection actions in the main list are immediately reflected in the ComboBox widget.

The sub-frames Status and Class Definition finally provide the class and data type.

Status

The options "Training" and "Validation" are always sensitive; the Status selection behavior is one-of-two.

Class Definition

If class-logs are available, the "from Log" option is sensitive and the selection behavior is one-of-two. The ComboBox log-selector offers all available candidates for the current well. If no class logs are available, the from Log option is insensitive and the "Constant" automatically preselected.

All options for "Class Definition" are presented in ComboBox widgets. The contents of the class selector is given by the classes in use class list that is a property of the classification run in context.

Well-in-Context Selection Action Buttons

Once a well selection is in context, this selection may be applied either of following:
- to the well currently selected, "Update Current Well" or
- to all wells selected in the main list by "Update Selected Wells". This function will try to distribute the status and the class definition to the wells selected in the main list.

Dialog Action Buttons

The standard dialog action buttons perform the following functions:
- "OK"—applies the current selection the training/validation set in context. The set selected in context is communicated to the 'run in context' which is updated accordingly if necessary. The dialog is un-mapped. "OK" is insensitive in read-only mode.
- "Apply" (Default Button)—same as "OK"; the dialog, however, is kept.

"Apply" is insensitive in read-only mode.

"Rest"—restores the selections as they were after the last "Apply". The dialog is kept. "Reset" is insensitive in read-only mode.

"Cancel"—quits any set modification and un-maps the dialog.

"Help"—calls the 'help in context' for training/validation set selection.

2.5.5.1 New Training/Validation Set Dialog

This dialog enables the creation of new training/validation sets. The classification run domain is inherited from the administration window ("Classification Domain").

A training/validation set is identified by a user-defined name and a user defined remark string. Both can only be set once in this dialog. It is not required that set names have unique names. In case of multiple sets with same name, the user will have to distinguish the sets by means of the creation date.

Refer to FIG. 85.

A set will be coupled to a reference, i.e. a structural grid surface in the case of domain "Horizontal, Grids". This link is used for sorting and defaulting purposes. The reference is set by means of a ComboBox widget.

If a training/validation set was selected in context when activating the "New . . . " training/validation set creation function, the selection can be copied from that context. This includes the bulk representation and any available well training/validation supplements. If no set was selected in context before, the option is insensitive. Default is "Copy from current Context" on.

"OK" commits the requested set creation and removes the dialog. The new attribute set is automatically set into context of the Input Attribute Set selection dialog. The user is ready to select another bulk-representation, define well data or edit the inherited selection.

"Cancel" quits the set creation process and removes this dialog. The context of the Training/Validation Set selection dialog stays unchanged.

2.5.6 Classes in Use Dialogs

This dialog may appear in two basically different variants depending upon the availability or not of class-dependent parameters.

Class versus parameter table or class list

Above the table or list, the classification run in context is presented as a reference in a read-only text field.

The dialogs directly depend upon the classification methods. If the classification method is changed while the Classes in Use dialog is active, it is automatically un-manager; any non-applied changes are lost (no warning).

Entry Points

The dialog is made available from the Administration Window menu-bar "Selections", the convenience "Modify . . . " and the i-button next to it in the "Active Run" area. The dialog is read-only when activated from the i-button or fully editable when it has been initiated from "Select . . . " or from "Selections—Classes in Use".

2.5.6.1 Supervised Methods

Refer to FIG. 86 for classes in use dialogs (supervised methods). Below the table or list, the class selection and definitions can be manipulated. The following action buttons are available:

"Add Class . . . " adds a new class to the selection 'Classes in Use'. The selection is done via a separate class selection dialog (not sensitive in read-only mode).

"Class Properties . . . " is only sensitive if a class is selected in context, i.e. a class is highlighted in the list or a table cells is highlighted. The class library dialog is popped up having the current class pre-selected into context.

"Remove Class" is only sensitive if a class is selected in context, i.e. a class is highlighted in the list or a table cell is highlighted. When activated, the class is removed from the 'Classes in Use' selection (not sensitive in read-only mode).

2.5.6.2 Unsupervised Methods

An equivalent selection is implemented for unsupervised methods. The following action buttons are available:

"Add Class . . . " increments the number of classes in the current classification run. This is done by assigning all children of the class family ("n+1") to the classification run. The maximum number of classes is limited through the highest n-classes family, defined in the class catalog (not sensitive in read-only mode).

"Class Properties . . . " is only sensitive if a class is selected in context, i.e. a class is highlighted in the list or a table cell is highlighted. The class library dialog is popped up having the current class pre-selected into context.

"Remove Class" is only sensitive if the number of classes is greater than two. "Remove Class" decrements the number of classes in the current classification run. This is done by assigning all children of the class family ("n−1") to the classification run (not sensitive in read-only mode).

Refer to FIG. 87.

Context and Standard Dialog Action Buttons

The Classes in Use dialog depends upon the current classification run context. Changing the classification run context causes the Classes in Use dialog to be immediately refreshed. Any modifications that have not bee applied yet are lost.

If the dialog is in editable mode, all modifications are cached until "OK" or "Apply" are activated. The cached modifications can be un-done by selecting "Reset". "Cancel" will not apply any changes and remove the dialog from the screen. "Help" offers help in context.

"Cancel" and "Help" are the only sensitive action buttons in read-only mode.

Removing a class previously in use may have some consequences and requires clean-up actions in order to keep consistency. If auxiliary results exist that refer to the class no longer in use, the following confirmation dialog will be presented:

"Auxiliary results referring to the removed class XXX exist. The temporary data are deleted simultaneously. Continue? Yes/No."

2.5.7 Method Parameters

Only classification methods that have user-controlled parameters will have their version of the Method Parameter Dialog. The method/parameter table gives detailed information. (See "Classification Methods", Overview)

Since this dialog family directly depends upon the type of method, changes of the method cause the Method Parameter dialog to be un-manager. Any non-applied changes are lost (no warning).

Entry Points

The method dependent dialog is made available from the Administration Window menu-bar "Selections—Method Parameters . . . ", the convenience "Modify . . . " and the i-button next to it in the "Active Run" area. The dialog is read-only when activated from the i-button or fully editable when it has been initiated from "Select . . . " or from "Selections—Method Parameters . . . " Note that all parameter controls will be read-only when the dialog is in informational, read-only mode.

The choice of controls for the individual parameters depends in general upon the method/parameter catalog definition. Depending upon the value type, see "Method—Parameter Catalogue (Table 10:)".

Boolean parameters will be set by toggle buttons.

Float parameters will be set by
- a scale and a text-field to the right, if minimum or maximum or both are defined for this parameter [partially limited range can be extended by entering a value outside the range. If the range is fully limited, the range cannot be extended; values outside the range will not be accepted.]
- only a text field, if no range limits are defined.

Integer parameters will be set by:
- an editable ComboBox widget (resource XmNeditable=True), offering the discrete values as defined by the range. The range may be extended by typing a new value into the editable ComboBox text field.
- Or an editable text field only if the range is not limited at all.

Each method will be represented by its own method-parameter specification dialog. The dialog title will clearly show to which method the parameter set belongs. The controls will follow the rules stated above.

Each dialog will have the standard action buttons below the parameter controls:
- "OK"—will apply the modifications (if any) and remove the dialog (not sensitive if read-only mode),
- "Apply"—will apply the modifications (if any) and keep the dialog (not sensitive if read-only mode),
- "Reset"—will restore the parameter settings to the last saved state (not sensitive if read-only mode),
- "Cancel"—will only remove the dialog and not change any settings,
- "Help"—will activate the help in context for the given method and dialog.

Please note that "OK" and "Apply" invalidate any existing results of the current classification run. (See "Rule 22:")

The "Status" field in frame "Active Run" will be updated. The classification must be restarted by means of "Classify" in order to restore consistent and updated results.

2.5.7.1 Bayesian Parameters

The following figure shows the parameter dialog for the Bayesian and Contextual Bayesian classification method. Both methods share the same method dependent parameters, thus they share the dialog.

Refer to FIG. 88.

Once a classification result has been generated, changes of the Bayesian parameters are immediately applied to the class map/section.

"Confidence Limit"

Range: [0, 1001]%

Default: 95%

"Confidence Limit" defines the probability limit for the doubt class.

"Outlier Limit"

Range [>0.?]

Default 5.0

Outlier 2.5.7.2 Back Error Propagation Parameters

Refer to FIG. 89.

"Learn Rate"

Range: [0.0 1.0]

Default: [0.1]

"Learn Rate" tells the network how much its weights can be adjusted at each learning step. Setting this value high will make the network learn fast initially, but the risk is to end up quickly in a not very good local minimum. If the network is computing with a smaller learning rate, it has a better change of finding a good minimum as the error surface (on which we are doing a gradient descent) can be more accurately explored with smaller steps.

"Momentum"

Range: [0.0 1.0]

Default: 0.9

Since standard Back-Error Propagation is very slow, most implementations add a "Momentum" term to the learning rule. This is just a value in the interval [0,1] that is used when a new weight change is computed. The "Momentum" value simply adds an among of the last weight change to the current, those letting earlier weight changes influence the current. The result is a tremendously improved learning speed; however, sometimes at a minimal cost of accuracy. Setting the "Momentum" term to high will often result in weight oscillations where the network will not be able to start learning anything at all.

"Epochs"

Range: [1, 100]

Default: 100

"Epochs" controls how many times the whole set of input vectors are processed by the network. This default setting (and max-value) is probably too small. Ideally, the number of epochs should be decided by the system. See the next parameter.

"Error limit"

Range: [0.00, 1.00]

Default: 0.01

"Error limit" controls when to stop training. The value signifies the total RMS-error in the network output.

2.5.7.3 Competitive Learning Parameters

Refer to FIG. 90.

"Number of Iterations"

Range: [1, 100]

Default: 25

"Number of Iterations controls how many times the input vectors are iterated through in order to find stable cluster vectors.

"Learn Rate"

Range: [0.01, 0.99]

Default: [0.20]

This parameter adjusts how fast the competitive network is allowed to adjust its weights in order to map the input vectors into the pre-determined number of classes. Setting "Learn Rate" high will introduce more "freedom" in the clustering process, but at the cost of stability.

"Conscience"

Range: [0.0 50.0]

Default: 1.0

In the standard competitive learning algorithm, there is no guarantee that all the output classes will take a fair share of the input vectors. If we are unlucky, one output class could, in theory, win all input vectors. To guard against this, the "Conscience" mechanism ensures that output classes that are winning a lot, get a "bad consciousness" and temporarily withdraw from the competition. The result is an even spread of the input vectors over the output classes. A very high "Conscience" value will slow down the clustering process.

2.5.7.4 K-Means Clustering Parameters

Refer to FIG. 91.

"Error Limit"

Range: [0.0.0.1]

Default: 0.0.1

"Error Limit" controls when to stop learning. The training is stopped when the cluster vectors for the predetermined number of clusters change less than the error limit. Low error limit values will find adjust the cluster vectors at the cost of longer training time.

2.5.8 Save Results Selection Dialog

Some classification methods provide auxiliary output data, such as quality indicators in addition to the main output, the classification result. The auxiliary output is optional. The Save Results Selection dialog allows the selection/deselection of the output data.

Refer to FIG. 92.

Entry Points

The dialog is made available for the Administration Window menu-bar "Functions" and the convenience "Save . . . " in the "Active Run" area. The button sensitivity depends upon the existence of results, i.e. a classification must have been executed before ("Classify" button).

Functions

The dialog is exclusively valid for the current classification run in context. The classification context is show in a read-only area on top of the selection list.

The list "Available Data" offers all data items that are created during the classification run to be selected for storage. The list has extended selection behavior. The classgrid, as the primary output, is selected by default. If auxiliary representations exist, they are by default selected for storage. The convenience functions "Clear" and "Select All" allow global list manipulations.

Since the list selection offers some pitfalls, the user might run into confirmation dialogs which pop up under the following conditions after having pressed "OK":

"No Output selected—Only input bindings and parameter settings are saved as permanent database entities. Confirm: [Yes][No]."

"The classification result has not been selected for storage. Continue with storage of auxiliary results only? [Yes][No]"

At this stage of the process, after having performed a classification, it is convenient to document the process, its input binding and parameters since all components are consistent at that time. The option "Generate a Report", which is set by default, offers report generation. See "Report (2.5.10)" for further details.

As already discussed in section "Data Management," certain rules for keeping consistency have to be enforced. After having left the "Save Results Selection" with "OK" and classification results selected for storage, the current classification run becomes 'read-only'. All function buttons that allow input binding and parameter modifications become insensitive thus invalidating the classification run consistency Refer to FIG. 93.

The selected temporary data are saved to the database on "OK"; the read-only status is marked by setting the dialog component sensitivities. "Cancel" closes the dialog and keeps the classification run status unchanged. "Help" offers help in context.

2.5.9 Class Library

The Class Library Dialog is the user interface for manipulation of the class definition repository. The dialog itself is independent of any classification run. Changes in the class definition apply to any classification runs and results that refer to the class definitions having been modified.

Entry Points

The dialog is made available from the Administration Window menu-bar "Options" and the "Classes in Use Dialogues/Class Properties . . . "

Refer to FIG. 94.

The top frame "Class Hierarchy" serves as a navigation and selection device and uses the ListTree widget ["ListTree"]. The widget's (single) selection feature is used to identify a class or a class family. The class-families may be packed/unpacked by selecting the folder icons; individual classes or class families are selected by clicking on their name.

The class selected and highlighted in the "Class Hierarchy" is the class in context and can be edited in the "Class Properties" frame. In the first implementation phase only the "Name" and class color are editable. New attributes will be added on demand when the SeisClass class concept is generalized for use by other similar applications, i.e. RockClass. This is not expected to happened before GeoFrame 4.0.

A class can be renamed simply by entering a new name in the editable text field right of the "Class Name" label. The only constraint is that the class name is unique. Uniqueness is enforced upon "OK".

New, user-defined classes can be created by selection of the "Add a Classes . . . " option. The class or class family currently selected is taken to derive a default for the new class' parent:

if the class currently selected has children (i.e. it is a class family), then take the class family as parent if the class currently selected has no children, take the class' parent as parent if the class currently selected belongs to the "Built-in Classes" family, no parent is pre-selected.

Refer to FIG. 95.

The "Class Name" is user-defined and can directly be typed into the editable text field. It is required that class names are unique. Uniqueness is checked upon "OK".

The default parent can be altered by selecting "Parent . . . " and picking another parent class or family via the "Parent Selection" dialog.

The same "Parent Selection" dialog appears on selection of "Reparent . . . " in the Class Library dialog. Here the parent-child relation of existing classes can be modified.

Color Definition

Class Colors are selected via the Charisma 4.0 color selector. The current settings are presented as colored buttons and an X-color name reference.

Dialog Action Buttons

The dialog operates on a 'current context' given by the selected class or class family. Each modification must be committed individually, i.e. by pressing "Apply". When having modified a class' properties and changing the class context without having applied the changes, the following message will be displayed:

"The modifications have not been saved yet! Apply changes now? OK/Cancel"

On selection of "OK" in this message box, the modifications are applied before setting a new context or leaving the dialog; "Cancel" will not apply the changes.

In detail the action buttons cause the following:

"OK"—Apply (see below) any modifications and remove the class library dialog from the screen.

"Apply"—updates the class definition catalog with the modifications and notifies the application about the changes. The notification will only take place when either the name or the color of previously existing classes are changed.

"Reset"—restores the current class' status as before modification.

"Cancel"—does not apply any changes and removes the class library dialog from the screen.

"Help"—provides the corresponding help in context.

2.6 Crossplot

The SeisClass Crossplot acts as the main inspection and selection device for data in attribute space—view many or all attributes of one position simultaneously. The IMain Seis and IMain Map windows serve the opposite purpose—one attribute at all positions.

Since there is no limitation on the number of attributes, the Crossplot display is able to handle any number of dimensions in attribute space. The following figure shows the 2D case as a simple, comprehensible example and a 4D case representative for N-dimensional attribute spaces.

Attribute spaces having more than two dimensions will be mapped into the two-dimensional display space (Crossplot) by a projection function.

The parameters of the projects functions can be changed interactively to visualize a translation and rotation of the Crossplot projection place.

A "Histogram" window is optional available. It appears below the multi-frame crossplot area. Data displays do always refer to the currently active frame and its data visibility selection. Histograms of individual attributes or projection on to crossplot frame axes can be evaluated.

New to pure visualization, the crossplot window serves as data query and selection tool. Point properties and its origin are monitored in the information area. Various selection methods are offered to defined two-dimensionally shaped areas on crossplot. Two-dimensional selection areas intersected with a N-dimensional volume correspond to a N-dimensional sub-volume that determines whether a point is selected, i.e. inside the sub-volume, or not.

The selection or display manipulation function currently active in the crossplot frame is also active for the histogram frame. Crossplot's arbitrary area selection gets replaced by a bin selection for the histogram. This allows the identification of outliers in the distribution, either of selected data or of training/validation data.

The SeisClass Crossplot window is a new graphic window, parallel to the existing IMain graphic windows. (See "SeisClass and IMain Windows".) The window layout will be similar to the InDepth crossplot, having a "Histogram" on the left, one "active Crossplot Frame" and up to eight "passive Crossplot Frames" as main components and a standard "Histogram" at the bottom. The following figure presents the SeisClass crossplot window layout.

Refer to FIG. 96.

Two main categories of data can be visualized in crossplot frames, either separate or combined:

"Current Selection"

Attribute vectors from selected areas on the map window (horizontal classification domain) or the seismic section window (vertical classification domain).

"Training/Validation"

Attribute vectors from the training/validation areas defined in the input binding of supervised classification runs.

These categories are exclusively based on the current active classification run ("Active Run"). It provides the input binding, i.e. the link to the attributes and—in case of supervised methods—training/validation data selections. Since the training/validation set is structured, sub-selections are offered.

Attribute vectors are shown in crossplot frames as scattered points, color coded by their associated class or "current selection" color. The points symbols correspond to the point type, their size is a display option.

Refer to FIG. 97.

Based on the specific selection context, a variety of viewport setups can be defined via the "Crossplot Functions (2.6.1.1)" pull-down menu. Once a coordinate system has been established, it can interactively be modified through zoom, pan or rotation.

2.6.1 Crossplot Menu-Bar

The "File" pull-down contains only one button, allowing the termination of a SeisClass session. The button label will read "Exit" if SeisClass has been launched as a separate application or "Close SeisClass" if SeisClass has been started from an IMain session.

2.6.1.1 Crossplot Functions

Refer to FIG. 98.

The first group of functions deals with interactive viewport manipulations.

"Zoom" changes the active frame's scaling factor. "Zoom" is an interaction on the currently active frame. This is accomplished by putting up a rectangular area that is going to be the future frame boundary. The "Zoom" function stays active until it is replaced by any other interaction. The zoom window is marked by a rubber-band rectangle during dragging (MB1 pressed). Zooming is executed on MB1 release. While active, the One Line Help provides the message "MB1: Drag a rectangle to zoom in; MB2: reset zoom; MB3 zoom out 151%" when moving the cursor on the active frame.

The "Reset Zoom" function is selection sensitive. Similar to reset functions on the map or section window, the extent of the selected data in the current projection is the basis for a scaling factor. Since the number of selected data points and the projection may vary drastically from time to time, Crossplot' Reset Zoom" adjusts the scaling factor so that all points are visible in the viewport. Note that "Reset Zoom" does not change the current interaction context.

"Rotate" activates an interaction to change the current frame's coordinate system projection. A spheroid surface fit to the current frame is dragged by the cursor.

Refer to FIG. 99.

The Rotate function stays active as long as it is replaced by any other interaction. While active, the One Line Help provides the message "Drag the Ellipsoid lying in the frame; MB2: Quit Rotate" when moving the cursor on the active frame. The rotation is performed in real-time: a rubber-band vector from the cursor position to the viewport center symbolizes the rotation handle. Cursor tracking is disabled during rotation (MB1 pressed) and re-enabled on MB1 release.

"Pan is a convenience function to perform translations of the viewport center. The translation vector is defined by the start and end point of a cursor drag interaction. The vector is presented as rubber-band during the drag operation. "Pan" is executed on MB2 release. While active, the One Line Help proves the message MB1 Drag to Pan; MB2: Quit Pan" when moving the cursor on the active frame.

The second group of functions deals with editing selection and training/validation data. A sub-dialog (see "Training/Validation Edit [2.6.2]") controlling all selection and editing activities is available via "Edit Training/Validation . . . "; most interaction functions are available as icons or menu functions, so that expert users can leave as much screen space as possible for crossplot itself.

The "Graphic Selection" mode can be set in a cascading toggle menu. See also "Section 2.6.2" and Table 3, "Selection Function Button Bindings".

The definition of training/validation data requires a "Class in Context . . . " selection which is performed in a small list selection dialog.

"Data Type" cascades to a toggle menu to a set "Training" or "Validation" as data type in context. Details are discussed in "Section 2.6.2".

"Add to Class" and "Remove from Class" perform the final editing actions. Both functions refer to a current selection which is either added or deleted from the current training/validation set (classification run context; see "Training Validation Set Dialogue [2.5.51]". These functions usually invalidate an intermediate classification result since it is a modification of the input data.

The last group of functions covers coordinate system setup and projection manipulations in general.

"Reset Projection" resets the current frame's coordinate system according to the settings defined in the "Data Visibility (2.6.9)" dialog. The selected attributes are represented by their unit vectors. The attributes are used directly in the 2D case. When three or more attributes are selected, an averaged vector is derived from the selected attribute unit vectors. This average vector defines the out-of-screen direction, the first attribute in the list ("Data Visibility") point in the vertical direction. A reset zoom is implicitly activated in order to restore a meaningful display.

Refer to FIG. 100.

"Principal Component Projection" offers a data dependent coordinate system. The data selected in the "Data Visibility (2.6.9)" dialog are subject to a principal component analysis. The eigenvectors corresponding to the three largest eigenvalues build the new coordinate system. The initial display will follow the same procedure as shown in "FIG. 62"—"A" being the main principal component axis, "B" and "C" the small principal component axes.

"Multiple Magic Perspective" is only sensitive in a multiframe situation. This function takes the current frame's coordinate system and varies the perspective systematically. The non-active frames are updated each having a different perspective.

2.6.2 Training/Validation Edit

The Training/Validation dialog collects all functional controls and context selections that are required for editing Training/Validation data in crossplot frames. Each element of the dialog is also available from the icon column and the "Crossplot Functions" menu-bar pull-down. This dialog addresses specifically the untrained user who is not yet familiar with SeisClass functions.

Except for the "Data Selection", all other dialog components are only sensitive (and meaningful)in a supervised classification method context.

Refer to FIG. 101.

The dialog and its functions refer to the point cloud in the current active crossplot frame. Data selection interactions are initiated from this dialog that lead to a graphic selection, i.e. a marked point cloud. This selection can be associated to a class and added to or removed from the training/validation set in context. (See section "Training Validation Set Dialogue 2.5.5".)

Entry Points

The Training/Validation dialog is only available via "Crossplot Functions" menu-bar pull-down.

Functions

The upper frame, "Data Selection", offers the data selection modes available on the active crossplot frame. Simultaneously, it shows the current active selection mode. The selection modes are interactions on the current active crossplot frame. They are active until they are replaced by any other interaction, like "Zoom" or "Rotation". The toggle buttons show whether and which selection mode is active. The push buttons right of the toggles activate the respective crossplot interaction—like the toggles—but are regarded as more intuitive function activators than the mode selectors.

The following "Table 3" specifies the graphic selection behavior and "Table 4" the 'One Line help' texts.

TABLE 3

Selection Function Button Bindings

| Selection Function | Action | MB1 left Mouse Button | MB2 middle Mouse Button | MB3 right Mouse Button |
|---|---|---|---|---|
| Single Point | Press Drag | | | |
| | Release | Select nearest Point | | Deselect nearest Point |
| Paint Brush | Press | Select Points inside 'Brush'[a] | Start 'Brush'[a] size definition | Deselect points inside 'Brush'[a] |
| | Drag | Select Points inside 'Brush'[a] | Change 'Brush'[a] size | Deselect points inside 'Brush'[a] |
| | Release | | Start 'Brush'[a] size | |
| Polygon | Press | Start/continue digitization | | |
| | Drag | Add polygon points continuously[b] | | |
| | Release | Add a polygon point | Select all points inside polygon | Deselect all points inside polygon |

[a]'Brush' is to be understood as a rectangular selection area.
[b]The motion sensitivity is set to delta X/Delta Y >= 3 Pixel.

Repeated activation of the selection functions add data to or remove data from the current selection. The selection may be supplemented by selection done in other windows. Each data point can only be selected once. The selection buffer manipulation function takes care of this.

TABLE 4

One-Line Help for SeisClass Selections

| Selection Function | Message |
| --- | --- |
| Single Point | MB1: Select nearest point; MB3: Deselect nearest point |
| Paint Brush | MB1: Brush select points; MB2: Drag brush size; MB3: Deselect points |
| Polygon | MB1: Digitize polygon; MB2 Close and Select; MB3 Close and deselect |

A selection is cleared by activating the "Clear" button in the "Data Selection" frame.

The next block "Available Classes" presents a list of classes in use in conjunction with the current classification run context (the list is synchronous with the definitions done in "Classes in Use Dialogues (2.5.6). A selection of a class in context is mandatory. If no class is selected, the "Add" and "Remove" buttons stay insensitive.

Selections must be tagged either as Training or as Validation data when they are added or removed from the set. The data type in context is changed for the entire crossplot window. The context indicators are updated as well as the equivalent toggle buttons in the "Crossplot Functions" menu-bar.

Data that are highlighted as current selection can be added or removed from the current training/validation set by pressing the "Add" or "Remove" button. The action is applied instantaneously.

The status of a supervision sample is either "Training" or "Validation". Note that adding a selected sample to the training set which was previously a validation set member implies a removal of the sample from the validation set.

The current selection is kept active, independent of any assignments by "Add" or "Remove" and can be supplemented or refined. Alternating "Add" selection "Remove" selection causes an undo or redo selection.

Since the dialog controls mostly modes and contexts and "Add/Remove" actions are executed immediately, only a Close button is required to remove the dialog from the screen.

Refer to FIG. 102.

2.6.3 Multiframe

Crossplot Multiframe appears similar to the familiar Charisma Multiframe dialog. It has, however, been enhanced for the specific SeisClass crossplot purposes when creating new frames.

Entry Points

The Multiframe dialog is only available via "Crossplot Options" menu-bar pull-down.

Functions

As for the other Charisma windows, up to nine frames may be opened at the same time. The geometry can be set by pressing the respective "Multiframe" button; it will activate all neighboring frames in upper left direction. The buttons in the Multiframe matrix show the status via color.

The frames may have individual scroll bars. This option can be toggled; the default is common set of scroll bars since a pan function exists and this option leaves more space for the individual frames.

Rules on how to fill newly created frames initially can be set via the "New Frames" option menu. The frames are either left empty, filled with a copy of the current active frame or filled with the result of a systematic variation of the current active frame's projection perspective (Magi Perspective). This function is identical to the "Crossplot Functions" entry.

2.6.4 Crossplot Display

Entry Points

The crossplot Display Options dialog is only available via "Crossplot Options" menu-bar pull-down.

Functions

This dialog collects all crossplot display option selections, namely annotation, point symbol size and display priority.

Refer to FIG. 103.

The "Crossplot Annotation" frame controls via toggle buttons:

"Show Axes"—the attribute axes are shown as vectors (default on) pointing away from the center of the viewport, "Attribute Names"—the axes are annotated by their attribute names (default on), "Well Names"—whether attribute vectors derived from well logs should be annotated by the well name (default off, insensitive if no well data are available).

In the "Symbols" section, predefined symbol sizes can be associated with the data classes that can be displayed in crossplot frames. The symbol size can be used to emphasize certain data types relative to others. The symbols are offered in real size pixmap option buttons.

The "Display Priority" section finally allows the specification of a display sequence after data types and classes. Together with the symbol size, these options offer full flexibility to visualize and highlight specific classes or data types with respect to others.

The contents of the list reflect the settings in the "Data Visibility" dialog. The list operates in single selection mode. The selected list item can be moved upwards or downwards by one position when clicking on the respective arrow buttons on the right.

The convenience toggle button "Apply to all Frames" propagates the selections in this dialog to all other crossplot frames if it is set and "OK" is activated. Default setting is 'apply to current frame only'.

Since this dialog performs only non-destructive actions and selections, only "OK", "Cancel", and "Help" action buttons are provided.

2.6.5 Histogram Display

The Histogram Display dialog provides the necessary tools to control the data presentation in the crossplot histogram window. Since the histogram window inherits the data visibility and display settings from the current active crossplot frame, they are also implicitly valid for the histogram. (See "Crossplot Display" and "Data Visibility.") General, the current active selection or display manipulation interaction is also active for the histogram.

The specification cannot cover the histogram options in the required detail since the commercial widget package that is going to be used for the implementation is not yet accessible. Only basic features, independent of the widget type being used, are presented in this section. The detailed display manipulation options remain to be specified.

Entry Points

The Histogram Display dialog is only available via "Crossplot Options" menu-bar pull-down.

Refer to FIG. 104.

Functions

The widget independent options seen so far are:

Presentation toggles whether the frequency bars are drawn as outline or as filled rectangle; the color always corresponds to the class or selection color.

Scaling toggles whether the vertical axis (frequency) is normalized individually ("Individual") or scaled to the maximum frequency of all displayed histograms ("Common").

A control for the specification of the histogram bin size might be required. An automatic bin size calculation is being considered, following the empiric rule:

$$^N \text{ of bins} = C_1 + C_2 \cdot {}^{1g}(^N \text{ number of samples}) \text{ where } C_1=4, C_2=3/2. \quad (\text{Eq.1})$$

Since this dialog is going to be substantially extended, a full set of action buttons are proposed.

2.6.6 Information Area

This dialog follows the style of the common window's information area customization dialogs. (See "Histogram".) It contains, however, only crossplot relevant items. The information items on display refer to a crossplot data point next to the cursor position. No information will be displayed if the cursor to point distance exceeds three (3) screen pixels. The information area update is controlled by the settings done in "Cursor Tracking".

Refer to FIG. 105.

Entry Points

The Information Area customization dialog is only available via "Crossplot Options" menu-bar pull-down.

Functions

The user interactions and dialog handling is identical to the other information area customization dialogs. The list of available informational items is described in the following table:

TABLE 5

Crossplot Information Area Items

| Item | Description |
| --- | --- |
| Attribute Vector (A1 A2 . . . AN) | Lists the attribute vector components; the values are followed by their [unit]; the value sequence corresponds to the attribute sequence in the "Data Visibility" sector |
| Class | shows the class name |
| Data shown/Not Shown | relates the number of visible points in the active frame to all data points set in "Data Visibility". |
| Data Source | Either "Grid", "Section", or "Well" |
| Geographical Coordinates (Lat Long) | Current point's position in Latitude/Longitude |
| Histogram Bin | Bin interval boundary values, i.e. [V1 V2] |
| Projection Coordinates (X Y) | Current point's position in rectangular coordinate (project coordinate system) |
| Seismic Position | 'Current point's position in Inline/Crossline index number |
| Structure Reference Value | Value of the structural reference grid at the 'current point's position (depth or time)' |
| Supervision Type | Either "Selection", "Training", or "Validation" |
| Zoom Factor | Scaling factor: 1.0 corresponds to a viewport scaling in "Reset Zoom" condition, i.e. all points in the selection are visible. |

"OK" and "Apply" initiate the information fields in the information area and register them for being updated by "Cursor Tracking". "OK" and "Cancel" remove the dialog from the screen. "Reset" restores the dialog settings according to 'last applied'. "Help" provides help in context.

2.6.7 Cursor Tracking

Refer to FIG. 106.

The dialog's layout and human interface is identical to the common cursor tracking dialogs on the other windows. However, the event handling is adapted to the purposes of the crossplot window.

Send

Since a continuous cursor position monitoring in a general N-dimensional attribute space is impossible, the cursor is snapped to the nearest data point if the screen projection distance between cursor and data sample is less than or equal to three (3) pixels. The point is identified in the internal display buffer and traced back to a position. This position information is broadcast to other registered windows as "Send" is activated.

Tracking events are not generated during all interactive processes where cursor dragging is involved like rotation, panning, zoom window definitions, paintbrush selections and selection polygon definitions.

Receive

Crossplot cursor tracking receives position information on the cursor and will build up an attribute vector corresponding to this position. This attribute vector is displayed as track-cursor in the crossplot.

2.6.8 Tour Options

Refer to FIG. 107.

The Tour Options dialog offers a slider selection for the Rotation Increment used for the Start Tour function.

2.6.9 Data Visibility

This dialog allows the selection of the attributes defining the coordinate system and a data visibility selection according to their category. Selections can be applied to the active frame which is the default or to all frames. Data visibility is expected to be changed frequently; the Apply button activates the Selection keeping the dialog for convenience. The dialog is sensitive for changes in the current classification context, notably for changing the input attribute set.

Refer to FIG. 108.

Entry Points

Data Visibility is only available via "Crossplot Selections" menu-bar pull-down.

Functions

Attribute visibility is controlled via a list in extended selection mode. The selection of two attributes is a minimum requirement; it is enforced on Apply. The list presents all the attributes by measurement which are associated with the input attribute set in context for the current classification run. The grid identification is given as an addition navigation aid since it is expected that some attributes may have identical measurements, i.e. "Amplitude" or "Dimensionless".

Two main data categories can be visualized in crossplot, a "Current Selection", i.e. data without a class coupling, and class data (controlled under "Class Visibility"), e.g. results and/or "Training/Validation" data. Both categories refer to the attribute selection above. It should be noted that the options under "Training/Validation" are only sensitive in the case of supervised classification methods. The category "Current Selection" is unstructured, whereas the result selections and training/validation categories offer sub-selections. One may want to focus on certain classes or separate the data according to their source or supervision type.

The "Current Selection" data category can be toggled on or off independently. Classes are chosen from a list in extended selection mode. The classes offered correspond to the classification run context. See "Classes in Use Dialogues (2.5.6)." Class selections are valid for the "Histogram Data Visibility" dialog and communicated on "OK/Apply". Further sub-selections according to its supervision type under "Training/Validation" are performed through toggles. Alternatively or in addition, training and validation data visibility can be determined by source.

The data display is updated on "OK" and "Apply", following the toggle "Apply to all Frames" in the active or in all frames. The current frame's projection is kept as is if the attribute visibility selection stayed unchanged. Changing the attribute visibility causes a reset on projection of the current active frame, identical to the menu-bar function "Reset Projection". "Cancel" does not change any selection but removes the dialog from the screen. "Help" provides the usual help in context.

The default settings for this dialog are:
The first (maximum three) attributes in the "Attribute Visibility" list selected,
"Current Selection" enabled for display,
all "Available Classes" selected as visible,
all supervision and source types set visible.
Refer to FIG. 109.

2.6.10 Histogram Data Visibility

What the "Data Visibility" is for crossplot frames is this dialog for the histogram frame. Since the histogram shows the same data as the active crossplot frame, the most important selections of the "Data Visibility" dialog are inherited.

The "Attribute Selection" list offers all attributes that were selected to be active for the active crossplot frame. The list is supplemented by the projection onto the active frame's X and Y axis. Only one attribute or axis can be selected.

The "Class Visibility" refers to the parallel display of histograms showing the data distribution per class. Classes are selected from the list "Available Classes" in extended selection mode: the list includes only those classes that have been made visible through "Data Visibility".

The section "Training/Validation" controls some options for monitoring the data distribution of supervision data. "Individual histograms per Class" will compute and display a histogram graph for each selected class when activated or one single composite graph if the option has been activated. Multiple histogram graphs can be shown as Stacked (Summed) Histogram" if activated or as multiple graphs directly overlaid.

The data distribution of the whole attribute can be selected for computation and display as well. It may be used as a reference distribution with respect to any sub-selection.

2.6.11 Histograms

The detailed specification depends upon the type of commercial widget that is going to be used with SeisClass.

It is intended to provide a selection method similar to the crossplot data selections (discussed in section "Training/Validation Edit") also for the histogram frame.

The histogram frame is always 'active' since it relates itself to the current active crossplot frame.

2.7 GridMap Extension

The Charisma Map window plays a very important role for classification in the horizontal domain. It serves as the primary attribute grid display visualization tool, a task which it fulfills already today. It offers a selection platform for areas likely to have similar properties thus belong to a common class. Finally it is the proper place to present the result of a classification, the class map.

This chapter focuses on the functionality that is not yet available, but especially required by SeisClass.

Class Map as new data presentation method ("Class Grid Display")
Training/Validation Data display ("Training/Validation Display on GridMap")
selecting or editing training/validation data ("Area Selections on Map")

Since the class map is introduced as a new display object, the:

"Scaled Hardcopy" function must also be enhanced to cover class map and training/validation map displays. Refer to FIG. 110.

The concept of external map display control has already been introduced in InDepth where a dedicated display function causes a complete multi-grid or multi-scattered set display in the map frames. The update logic follows InDepth.

The display of multiple attribute grids being grouped in an input attribute set or other maps relevant to a classification run can be initiated from the SeisClass administration window via a dedicated "Display" function. See "Navigation, Selections and Context Activation" for further details. The current active selection in the List Tree widget will be transferred, it at all possible, to a "Multiframe" map display. This implies that both individual grid representations as well as entire attribute sets can be dispatched to be displayed on the map. A grid selection from the map is still possible, but the increasing number of attribute grids will make navigation more difficult.

2.7.1 Class Grid Display

In contrast to ordinary attribute grids, class grid values are discrete values, referencing a class description. Class maps represent the classes by their color code. The proportional attribute value to color mapping is replaced by a direct mapping into the discrete look-up table. While conventional look-up tables are read from a color scale definition file, the discrete class color look-up table must be set up dynamically.

When displaying or updating a class grid, the class_ decode relation is used, giving a convening overview of the classes in use for the given representation. (See "2.3.2 Class Representations" and "Class Representations".) This class list maps dynamically into the discrete class color look-up table. The mapping of the class Shale can be followed through the example.

Refer to FIG. 111.

The class map annotation utilizes the color bar display in conjunction with the map window's information area. When moving the cursor on a class map or on the color bar, the class name at the cursor position is monitored in the information area. "Class Name" is anew member in the map information area parameter catalog ("Table 6: Map Information Area Items").

Class maps require only limited edit options. Changing class grid cells is a forgery of the classification process result. Only an 'interpretive' delete option will be provided. GridMap's "EditMap" cascade pull-down menu will reflect the restricted edit options if a class grid is displayed in the active frame.

Rule 34: If a class grid is displayed in the active GripMap frame, the "Edit Map" menu are set insensitive, except;
Define Area
Delete Area
Delete All Inside Area
Delete
Save Edits
See FIG. 21 for a Class Map,Display example.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:
1. In a seismic classification system, a method of generating a classified result which can be recorded or displayed on a workstation display, comprising the steps of:
 (a) receiving at least a first attribute set where the attribute data set includes a plurality of points and a plurality of types of attribute data corresponding, respectively, to the plurality of points,
 (b) generating a first cross plot in attribute space in response to the attribute data on the first attribute data set, and
 (c) generating the classified result in response to the plurality of points on the first attribute data set and the first cross plot in attribute space, the classified result being based on clusters of the plurality of points as plotted in the first cross plot.

2. The method of claim 1, wherein the receiving step (a) for receiving at least a first attribute data set comprises the steps of:
 (a1) receiving a plurality of measurable quantities associated, respectively, with a plurality of points in a subsurface, the first attribute data set corresponding to the subsurface, and
 (a2) generating the plurality of attribute data "(a, b)" associated, respectively, with the plurality of points on the first attribute data set.

3. The method of claim 1, wherein the generating step (b) for generating the first cross plot in attribute space in response to the attribute data on the first attribute data set comprises the steps of:
 (b1) selecting a subset of the attribute data on the first attribute data set to represent a first set of inspection data,
 (b2) generating a second cross plot in attribute space from the first set of inspection data, the second cross plot having a distribution/separation of clusters, and
 (b3) evaluating the distribution/separation of the clusters on the second cross plot.

4. The method of claim 3, wherein the generating step (b) for generating the first cross plot in attribute space in response to the attribute data on the first attribute data set further comprises the steps of:
 (b4) selecting a subset of points among a set of clusters on the first cross plot in attribute space to represent a second set of inspection data,
 (b5) generating a second attribute data set from the second set of inspection data, the second attribute data set having a distribution of points, and
 (b6) evaluating the distribution of the points on the second attribute data set.

5. In a seismic classification system, a method of generating a classified result which can be recorded or displayed on a workstation display, comprising the steps of:
 (a) receiving at least a first attribute set where the attribute data set includes a plurality of points and a plurality of attribute data corresponding respectively to the plurality of points,
 (b) generating a first cross plot in attribute space in response to the attribute data on the first attribute data set, step b further comprising:
  (b1) selecting a subset of the attribute data on the first attribute data set to represent a first set of inspection data,
  (b2) generating a second cross plot in attribute space from the first set of inspection data, the second cross plot having a distribution/separation of clusters,
  (b3) evaluating the distribution/separation of the clusters on the second cross plot
  (b4) selecting a subset of points among a set of clusters on the first cross plot in attribute space to represent a second set of inspection data,
  (b5) generating a second attribute data set from the second set of inspection data, the second attribute data set having a distribution of points,
  (b6) evaluating the distribution of the points on the second attribute data set,
  (b7) selecting some of the attribute data on the first attribute data set to represent training data,
  (b8) selecting other attribute data on the first attribute data set to represent validation data, a class of the training data being approximately the same as a class of the validation data,
  (b9) generating a third cross plot in a particular attribute space in response to the training data, and
  (b10) generating a fourth cross plot in said particular attribute space in response to the validation data, whereby a cluster in said particular attribute space resultant from said validation data should be located adjacent to another cluster in the same said particular attribute space resultant from said training data when said class of said training data is approximately the same as said class of said validation data; and
 (c) generating the classified result in response to the plurality of points on the first attribute data set and the first cross plot in attribute space.

6. The method of claim 5, wherein the generating step (b) for generating the first cross plot in attribute space in response to the attribute data on the first attribute data set further comprises the steps of:
 (b11) generating said cross plot in attribute space having at least two clusters of points in response to the attribute data on the first attribute data set when:
  the distribution/separation of the clusters on the second cross plot evaluated during the step (b3) is acceptable,
  the distribution of the points on the second attribute data set evaluated during the step (b6) is acceptable, and
  said cluster in said particular attribute space resultant from said validation data is located adjacent to said another cluster in the same said particular attribute space resultant from said training data when said fourth cross plot in said particular attribute space is generated during the step (b10).

7. In a seismic classification system, a method of generating a classified result which can be recorded or displayed on a workstation display, comprising the steps of:
 (a) receiving at least a first attribute set where the attribute data set includes a plurality of points and a plurality of attribute data corresponding, respectively, to the plurality of points.
 (b) Penetrating a first cross plot in attribute space in response to the attribute data on the first attribute data set, and
 (c) generating the classified result in response to the plurality of points on the first attribute data set and the first cross plot in attribute space, wherein the generating step (c) for generating the classified result in response to the plurality of points on the first attribute data set and the cross plot in attribute space, having said at least two clusters of points, comprises the steps of:
  (c1) assigning a first label to a first one of said at least two clusters of points on said cross plot in attribute space, each point in said first one of said at least two clusters of points on said cross plot in attribute space having assigned thereto said first label and corresponding to a first set of locations on said first attribute data set, (c2) assigning a second label to a second one of said at least two clusters of points on said cross plot in attribute space, each point in said second one of said at least two clusters of points on said cross plot in attribute space having assigned thereto said second label and corresponding to a second set of locations on said first attribute data set, (c3) labeling each of said first set of locations on said first attribute data set with said first label, and (c4) labeling each of said second set of locations on said first attribute data set with said second label.

8. A seismic classification apparatus adapted for producing a classified result from a plurality of types of attribute data sets, comprising:

first generation means for generating a plurality of values associated, respectively, with a plurality of points distributed over the surface on a subsurface of an earth formation;

second generation means responsive to the plurality of values for generating a plurality of labels which are associated, respectively, with the plurality of values; and means for associating the plurality of labels with the respective plurality of points on the subsurface of the earth formation thereby generating a class data set plot comprising the plurality of points which are labeled, respectively, with the plurality of labels, the class data set plot representing the classified result, the classified result being based on clusters of the plurality of points as plotted in the first cross plot.

9. A seismic classification apparatus adapted for producing a classified result from a plurality of attribute data sets, comprising:

first generation means for generating a plurality of values associated, respectively, with a plurality of points distributed over the surface on a subsurface of an earth formation;

second generation means responsive to the plurality of values for generating a plurality of labels which are associated, respectively, with the plurality of values; and means for associating the plurality of labels with the respective plurality of points on the subsurface of the earth formation thereby generating a class data set plot comprising the plurality of points which are labeled, respectively, with the plurality of labels, the class data set plot representing the classified result, wherein the second generation means comprises:

selecting means for selecting an inspection subset of said plurality of values;

first clustering means responsive to the inspection subset for clustering said inspection subset of said plurality of values in attribute space; and second clustering means for clustering all of said plurality of values in the attribute space when the inspection subset of the plurality of values are clustered acceptably in the attribute space by the first clustering means.

10. The seismic classification apparatus of claim 9, wherein the selecting means selects the inspection subset of the plurality of values and a training subset of the plurality of values and a validation subset of the plurality of values, and wherein the first clustering means comprises:

inspection subset clustering means responsive to the inspection subset for clustering the inspection subset of the plurality of values in attribute space;

training subset clustering means responsive to the training subset for clustering the training subset of said plurality of values in attribute space; and validation subset clustering means responsive to the validation subset for clustering the validation subset of the plurality of values in attribute space, the second clustering means clustering all of said plurality of values in the attribute space and producing a plurality of clusters of values in the attribute space when the inspection subset of the plurality of values are clustered acceptably in the attribute space by the inspection subset clustering means and when the training subset of the plurality of values are clustered acceptably in the attribute space by the training subset clustering means and when the validation subset of the plurality of values are clustered acceptably in the attribute space by the validation subset clustering means.

11. The seismic classification apparatus of claim 10, wherein said second clustering means assigns a plurality of labels, respectively, to said plurality of clusters produced in the attribute space, a separate and distinct label being assigned to each of the clusters in said attribute space.

12. The seismic classification apparatus of claim 11, wherein said means for associating the plurality of labels, respectively, with the plurality of points on the subsurface of the earth formation further comprises:

data set generation means responsive to the assignment of the plurality of labels, respectively, to the plurality of clusters in the attribute space by the second clustering means for generating a class data set plot representing the classified result, the class data set plot representing an attribute data set plot of the plurality of points distributed over the surface on the subsurface of the earth formation having the plurality of labels associated, respectively, with that plurality of points on the surface of that subsurface.

13. A program storage device readable by a machine, tangibly embodying a program of instructions executable by the machine, to perform method steps for generating a classified result that can be recorded or displayed on a workstation display, said method steps comprising:

(a) receiving at least a first attribute data set where the attribute data set includes a plurality of points and a plurality of types of attribute data corresponding, respectively, to the plurality of points, (b) generating a first cross plot in attribute space in response to the attribute data on the first attribute data set, and (c) generating the classified result in response to the plurality of points on the first attribute data set and the cross plot in attribute space, the classified result being based on clusters of the plurality of points as plotted in the first cross plot.

14. The program storage device of claim 13, wherein said receiving step (a) of said method steps for receiving at least a first attribute data set further comprises the steps of:

(a1) receiving a plurality of measurable quantities associated, respectively, with a plurality of points in a subsurface, the first attribute data set corresponding to the subsurface, and (a2) generating the plurality of attribute data "(a, b)" associated, respectively, with the plurality of points on the first attribute data set.

15. The program storage device of claim 13, wherein the generating step (b) of said method steps for generating the first cross plot in attribute space in response to the attribute data on the first attribute data set comprises the steps of:

(b1) selecting a subset of the attribute data on the first attribute data set to represent a first set of inspection data, (b2) generating a second cross plot in attribute space from the first set of inspection data, the second cross plot having a distribution/separation of clusters, and (b3) evaluating the distribution/separation of the clusters on the second cross plot.

16. The program storage device of claim 15, wherein the generating step (b) of said method steps for generating the first cross plot in attribute space in response to the attribute data on the first attribute data set further comprises the steps of:

(b4) selecting a subset of points among a set of clusters on the first cross plot in attribute space to represent a second set of inspection data, (b5) generating a second attribute data set from the second set of inspection data, the second attribute data set having a distribution of points, and (b6) evaluating the distribution of the points on the second attribute data set.

17. A program storage device readable by a machine, tangibly embodying a program of instructions executable by the machine, to perform method steps for generating a classified result that can be recorded or displayed on a workstation display, said method steps comprising:

(a) receiving at least a first attribute data set where the attribute data set includes a plurality of points and a plurality of attribute data corresponding, respectively, to the plurality of points, (b) generating a first cross plot in attribute space in response to the attribute data on the first attribute data set, wherein the generating step (b) of said method steps for generating the first cross plot in attribute space in response to the attribute data on the first attribute data set further comprises the steps of (b1) selecting a subset of the attribute data on the first attribute data set to represent a first set of inspection data, (b2) generating a second cross plot in attribute space from the first set of inspection data, the second cross plot having a distribution/separation of clusters, (b3) evaluating the distribution/separation of the clusters on the second cross plot, (b4) selecting a subset of points among a set of clusters on the first cross plot in attribute space to represent a second set of inspection data, (b5) generating a second attribute data set from the second set of inspection data, the second attribute data set having a distribution of points, and (b6) evaluating the distribution of the points on the second attribute data set, (b7) selecting some of the attribute data on the first attribute data set to represent training data, (b8) selecting other attribute data on the first attribute data set to represent validation data, a class of the training data being approximately the same as a class of the validation data, (b9) generating a third cross plot in a particular attribute space in response to the training data, and (b10) generating a fourth cross plot in said particular attribute space in response to the validation data, whereby a cluster in said particular attribute space resultant from said validation data should be located adjacent to another cluster in the same said particular attribute space resultant from said training data when said class of said training data is approximately the same as said class of said validation data; and (c) generating the classified result in response to the plurality of points on the first attribute data set and the cross plot in attribute space.

18. The program storage device of claim 17, wherein the generating step (b) of said method steps for generating the first cross plot in attribute space in response to the attribute data on the first attribute data set comprises the steps of:

(b11) generating said cross plot in attribute space having at least two clusters of points in response to the attribute data on the first attribute data set when:

the distribution/separation of the clusters on the second cross plot evaluated during the step (b3) is acceptable, the distribution of the points on the second attribute data set evaluated during the step (b6) is acceptable, and said cluster in said particular attribute space resultant from said validation data is located adjacent to said another cluster in the same said particular attribute space resultant from said training data when said fourth cross plot in said particular attribute space is generated during the step (b10).

19. A program storage device readable by a machine, tangibly embodying a program of instructions executable by the machine, to perform method steps for generating a classified result that can be recorded or displayed on a workstation display, said method steps comprising:

(a) receiving at least a first attribute data set where the attribute data set includes a plurality of points and a plurality of types of attribute data corresponding, respectively, to the plurality of points, (b) generating a first cross plot in attribute space in response to the attribute data on the first attribute data set, and (c) generating the classified result in response to the plurality of points on the first attribute data set and the cross plot in attribute space, wherein the generating step (c) comprises the steps of:

(c1) assigning a first label to a first one of said at least two clusters of points on said cross plot in attribute space, each point in said first one of said at least two clusters of points on said cross plot in attribute space having assigned thereto said first label and corresponding to a first set of locations on said first attribute data set, (c2) assigning a second label to a second one of said at least two clusters of points on said cross plot in attribute space, each point in said second one of said at least two clusters of points on said cross plot in attribute space having assigned thereto said second label and corresponding to a second set of locations on said first attribute data set, (c3) labeling each of said first set of locations on said first attribute data set with said first label, and (c4) labeling each of said second set of locations on said first attribute data set with said second label.

20. A seismic classification system adapted for producing a classified result adapted from a plurality of types of attribute data, comprising:

first means for receiving said plurality of types of attribute data, said plurality of types of attribute data corresponding to a plurality of points on a first attribute data set;

second means for generating a first cross plot in attribute space in response to the plurality of types of attribute data on the first attribute data set; and third means for generating a classified result in response to the plurality of points on the first attribute data set and the first cross plot in attribute space, the classified result being based on clusters of the plurality of points as plotted in the first cross plot.

21. The seismic classification system of claim 20, further comprising a display adapted for displaying said classified result.

22. The seismic classification system of claim 20, wherein said first means for receiving said plurality of attribute data comprises:

measurable quantity receiving means for receiving measurable quantities associated, respectively, with a plurality of points in a subsurface, the first attribute data set corresponding to said horizon; and means responsive to the receipt of said measurable quantities associated, respectively, with the plurality of points in the subsurface by said measurable quantity receiving means for generating the plurality of attribute data "(a, b)" associated, respectively, with the plurality of points on the first attribute data set.

23. A seismic classification system adapted for producing a classified result adapted from a plurality of attribute data, comprising:

first means for receiving said plurality of attribute data, said plurality of attribute data corresponding to a plurality of points on a first attribute data set;

second means for generating a first cross plot in attribute space in response to the plurality of attribute data on the first attribute data set, wherein said second means for generating said first cross plot in attribute space in response to the plurality of attribute data on the first attribute data set comprises:

means for selecting a subset of the attribute data on the first attribute data set to represent a first set of inspection data, means for generating a second cross plot in attribute space from the first set of inspection data, the second cross plot having a distribution/separation of clusters, and means for evaluating the distribution/separation of the clusters on the second cross plot; and third means for generating a classified result in response to the plurality of points on the first attribute data set and the first cross plot in attribute space.

24. The seismic classification system of claim 23, wherein said second means for generating said first cross plot in attribute space in response to the plurality of attribute data on the first attribute data set further comprises:

means for selecting a subset of points among a set of clusters on the first cross plot in attribute space to represent a second set of inspection data, means for generating a second attribute data set from the second set of inspection data, the second attribute data set having a distribution of points, and means for evaluating the distribution of the points on the second attribute data set.

25. The seismic classification system of claim 24, wherein said second means for generating said first cross plot in attribute space in response to the plurality of attribute data on the first attribute data set further comprises:

means for selecting some of the attribute data on the first attribute data set to represent training data, means for selecting other attribute data on the first attribute data set to represent validation data, a class of the training data being approximately the same as a class of the validation data, means for generating a third cross plot in a particular attribute space in response to the training data, and means for generating a fourth cross plot in said particular attribute space in response to the validation data, whereby a cluster in said particular attribute space resultant from said validation data should be located adjacent to another cluster in the same said particular attribute space resultant from said training data when said class of said training data is approximately the same as said class of said validation data.

26. The seismic classification system of claim 25, wherein said second means for generating a first cross plot in attribute space in response to the plurality of attribute data on the first attribute data set further comprises:

means for generating said first cross plot in attribute space having at least two clusters of points in response to the attribute data on the first attribute data set when:

the distribution/separation of the clusters on the second cross plot is acceptable, the distribution of the points on the second attribute data set is acceptable, or said cluster in said particular attribute space resultant from said validation data is located adjacent to said another cluster in the same said particular attribute space resultant from said training data when said fourth cross plot in said particular attribute space is generated.

27. A seismic classification system, adapted for producing a classified result adapted from a plurality of attribute data, comprising:

first means for receiving said plurality of attribute data, said plurality of attribute data corresponding to a plurality of points on a first attribute data set;

second means for generating a first cross plot in attribute space in response to the plurality of attribute data on the first attribute data set and wherein said first cross plot in attribute space has at least two clusters of points, and third means for generating a classified result in response to the plurality of points on the first attribute data set and the first cross plot in attribute space, wherein said third means for generating a classified result in response to the plurality of points on the first attribute data set and the first cross plot in attribute space comprises:

means assigning a first label to a first one of said at least two clusters of points on said first cross plot in attribute space, each point in said first one of said at least two clusters of points on said first cross plot in attribute space having assigned thereto said first label and corresponding to a first set of locations on said first attribute data set, means for assigning a second label to a second one of said at least two clusters of points on said first cross plot in attribute space, each point in said second one of said at least two clusters of points on said first cross plot in attribute space having assigned thereto said second label and corresponding to a second set of locations on said first attribute data set, means for labeling each of said first set of locations on said first attribute data set with said first label, and means for labeling each of said second set of locations on said first attribute data set with said second label.

28. The seismic classification system of claim 26, wherein said first cross plot in attribute space has at least two clusters of points, and wherein said third means for generating a classified result in response to the plurality of points on the first attribute data set and the first cross plot in attribute space comprises:

means assigning a first label to a first one of said at least two clusters of points on said first cross plot in attribute space, each point in said first one of said at least two clusters of points on said first cross plot in attribute space having assigned thereto said first label and corresponding to a first set of locations on said first attribute data set, means for assigning a second label to a second one of said at least two clusters of points on said first cross plot in attribute space, each point in said second one of said at least two clusters of points on said first cross plot in attribute space having assigned thereto said second label arid corresponding to a second set of locations on said first attribute data set, means for labeling each of said first set of locations on said first attribute data set with said first label, and means for labeling each of said second set of locations on said first attribute data set with said second label.

* * * * *